US012281912B2

(12) United States Patent
Apuy et al.

(10) Patent No.: US 12,281,912 B2
(45) Date of Patent: Apr. 22, 2025

(54) USER INTERFACES FOR MAPS AND NAVIGATION

(71) Applicant: Apple Inc., Cupertino, CA (US)

(72) Inventors: Ryan W. Apuy, San Francisco, CA (US); Vincent P. Arroyo, Union City, CA (US); Brian J. Andrich, San Francisco, CA (US); Jaime Chen, Oakland, CA (US); Lukasz J. Pasek, Campbell, CA (US); Giovanni S. Luis, Manhattan Beach, CA (US); Sebastian A. Araya, San Francisco, CA (US); Syed Mohsin Hasan, San Jose, CA (US); Eugene P. Sturm, Mill Valley, CA (US); Linghao Li, Cupertino, CA (US); Benjamin R. Dreyer, Santa Cruz, CA (US); Sarah A. Bergquist, Sacramento, CA (US); William A. Viglakis, San Francisco, CA (US); William N. Danner, Santa Cruz, CA (US); Rachel A. Smith, San Mateo, CA (US); Aaron P. Dennis, Menlo Park, CA (US); Richard A. Small, San Jose, CA (US); Kirill Negoda, San Jose, CA (US); Alexander J. O'Connell, San Francisco, CA (US); Steven C. Beeby, Santa Clara, CA (US); Ryan Dignard, Piedmont, CA (US)

(73) Assignee: Apple Inc., Cupertino, CA (US)

( * ) Notice: Subject to any disclaimer, the term of this patent is extended or adjusted under 35 U.S.C. 154(b) by 338 days.

(21) Appl. No.: 17/448,857

(22) Filed: Sep. 24, 2021

(65) Prior Publication Data
US 2022/0390248 A1 Dec. 8, 2022

Related U.S. Application Data

(60) Provisional application No. 63/197,587, filed on Jun. 7, 2021.

(51) Int. Cl.
*G01C 21/36* (2006.01)
*G06F 3/04815* (2022.01)
(Continued)

(52) U.S. Cl.
CPC ....... *G01C 21/367* (2013.01); *G01C 21/3664* (2013.01); *G06F 3/04815* (2013.01);
(Continued)

(58) Field of Classification Search
CPC . G01C 21/367; G01C 21/3664; G06F 3/0482; G06T 13/80; G06T 3/40; G06T 11/001
See application file for complete search history.

(56) References Cited

U.S. PATENT DOCUMENTS

| 5,311,434 A | 5/1994 | Tamai |
| 5,790,976 A | 8/1998 | Boll et al. |

(Continued)

FOREIGN PATENT DOCUMENTS

| CN | 109000657 A | 12/2018 |
| CN | 109830118 A | 5/2019 |

(Continued)

OTHER PUBLICATIONS

Final Office Action received for U.S. Appl. No. 16/460,507, mailed on Aug. 11, 2020, 37 pages.
(Continued)

*Primary Examiner* — Kyle T Johnson
*Assistant Examiner* — Mohammed Yousef Abuelhawa
(74) *Attorney, Agent, or Firm* — Kubota & Basol LLP

(57) ABSTRACT

In some embodiments, an electronic device present navigation routes from various perspectives. In some embodiments, an electronic device modifies display of representations of (e.g., physical) objects in the vicinity of a navigation route while presenting navigation directions. In some embodiments, an electronic device modifies display of por-
(Continued)

tions of a navigation route that are occluded by representations of (e.g., physical) objects in a map. In some embodiments, an electronic device presents representations of (e.g., physical) objects in maps. In some embodiments, an electronic device presents representations of (e.g., physical) objects in maps in response to requests to search for (e.g., physical) objects.

60 Claims, 50 Drawing Sheets

(51) Int. Cl.
    *G06F 3/0482*     (2013.01)
    *G06F 3/04845*     (2022.01)
    *G06F 3/0485*     (2022.01)
    *G06T 3/40*     (2024.01)
    *G06T 11/00*     (2006.01)
    *G06T 13/80*     (2011.01)

(52) U.S. Cl.
    CPC ........ *G06F 3/0482* (2013.01); *G06F 3/04845* (2013.01); *G06F 3/0485* (2013.01); *G06T 3/40* (2013.01); *G06T 11/001* (2013.01); *G06T 13/80* (2013.01); *G06F 2203/04806* (2013.01); *G06T 2200/24* (2013.01); *G06T 2210/36* (2013.01); *G06T 2210/62* (2013.01)

(56) References Cited

U.S. PATENT DOCUMENTS

| | | | |
|---|---|---|---|
| 5,857,066 | A | 1/1999 | Wyche et al. |
| 5,948,040 | A | 9/1999 | Delorme et al. |
| 6,181,991 | B1 | 1/2001 | Kondo et al. |
| 6,188,957 | B1 | 2/2001 | Bechtolsheim et al. |
| 6,323,846 | B1 | 11/2001 | Westerman et al. |
| 6,340,936 | B1 | 1/2002 | Mcgaffey et al. |
| 6,570,557 | B1 | 5/2003 | Westerman et al. |
| 6,677,932 | B1 | 1/2004 | Westerman |
| 7,614,008 | B2 | 11/2009 | Ording |
| 7,633,076 | B2 | 12/2009 | Huppi et al. |
| 7,653,883 | B2 | 1/2010 | Hotelling et al. |
| 7,657,849 | B2 | 2/2010 | Chaudhri et al. |
| 7,663,607 | B2 | 2/2010 | Hotelling et al. |
| 7,844,914 | B2 | 11/2010 | Andre et al. |
| 7,957,762 | B2 | 6/2011 | Herz et al. |
| 8,006,002 | B2 | 8/2011 | Kalayjian et al. |
| 8,239,784 | B2 | 8/2012 | Hotelling et al. |
| 8,279,180 | B2 | 10/2012 | Hotelling et al. |
| 8,381,135 | B2 | 2/2013 | Hotelling et al. |
| 8,479,122 | B2 | 7/2013 | Hotelling et al. |
| 9,212,924 | B1 | 12/2015 | Salowitz |
| 9,348,458 | B2 | 5/2016 | Hotelling et al. |
| 9,417,933 | B2 | 8/2016 | Narayanan et al. |
| 9,933,937 | B2 | 4/2018 | Lemay et al. |
| 10,140,749 | B2* | 11/2018 | Pollock ............... G06F 3/04815 |
| 10,169,794 | B2 | 1/2019 | Aziz et al. |
| 10,184,800 | B2 | 1/2019 | Fowe et al. |
| 10,360,518 | B2 | 7/2019 | Hirose et al. |
| 10,371,536 | B2 | 8/2019 | König et al. |
| 10,424,195 | B2 | 9/2019 | Kim et al. |
| 10,488,215 | B1 | 11/2019 | Yu |
| 10,699,347 | B1 | 6/2020 | Slusar et al. |
| 10,760,917 | B2 | 9/2020 | Moore et al. |
| 11,015,952 | B1 | 5/2021 | Lyle et al. |
| 11,092,459 | B2 | 8/2021 | Hoffman et al. |
| 11,196,665 | B1 | 12/2021 | Pereira et al. |
| 11,359,929 | B2* | 6/2022 | Lee ....................... G01C 21/367 |
| 11,391,597 | B2 | 7/2022 | Teske |
| 11,441,911 | B2* | 9/2022 | Kageyama ........ G08G 1/096838 |
| 11,567,632 | B2 | 1/2023 | Fleizach et al. |
| 2002/0015024 | A1 | 2/2002 | Westerman et al. |
| 2002/0082773 | A1 | 6/2002 | Ikeuchi et al. |
| 2003/0178482 | A1 | 9/2003 | Kisliakov |
| 2005/0190059 | A1 | 9/2005 | Wehrenberg |
| 2005/0193117 | A1 | 9/2005 | Morris |
| 2005/0222766 | A1 | 10/2005 | Burch et al. |
| 2006/0017692 | A1 | 1/2006 | Wehrenberg et al. |
| 2006/0033724 | A1 | 2/2006 | Chaudhri et al. |
| 2006/0190167 | A1 | 8/2006 | Inukai |
| 2006/0197753 | A1 | 9/2006 | Hotelling |
| 2007/0088500 | A1 | 4/2007 | Spinelli |
| 2007/0288162 | A1* | 12/2007 | Furukawa ............ G01C 21/367 701/431 |
| 2008/0120171 | A1 | 5/2008 | Ikeuchi et al. |
| 2008/0136612 | A1 | 6/2008 | Machii et al. |
| 2008/0195314 | A1 | 8/2008 | Green |
| 2008/0262714 | A1 | 10/2008 | Abramovich |
| 2009/0027399 | A1 | 1/2009 | Sato et al. |
| 2009/0112462 | A1 | 4/2009 | Lo |
| 2009/0271109 | A1 | 10/2009 | Lee et al. |
| 2010/0036599 | A1 | 2/2010 | Froeberg et al. |
| 2010/0131190 | A1 | 5/2010 | Terauchi et al. |
| 2010/0321406 | A1 | 12/2010 | Iwase et al. |
| 2011/0040480 | A1 | 2/2011 | Tebbutt |
| 2011/0074350 | A1 | 3/2011 | Kocher |
| 2011/0112710 | A1 | 5/2011 | Meyer-ebeling et al. |
| 2011/0172909 | A1 | 7/2011 | Kahn et al. |
| 2011/0177845 | A1 | 7/2011 | Fasold |
| 2011/0178698 | A1 | 7/2011 | Aben et al. |
| 2011/0224852 | A1 | 9/2011 | Profitt-brown et al. |
| 2011/0238457 | A1 | 9/2011 | Mason et al. |
| 2011/0246055 | A1 | 10/2011 | Huck et al. |
| 2012/0004841 | A1 | 1/2012 | Schunder |
| 2012/0066035 | A1 | 3/2012 | Stanger et al. |
| 2012/0136567 | A1 | 5/2012 | Wang et al. |
| 2012/0179521 | A1 | 7/2012 | Nelson |
| 2012/0253596 | A1 | 10/2012 | Ibrahim et al. |
| 2012/0259541 | A1 | 10/2012 | Downey et al. |
| 2012/0271547 | A1 | 10/2012 | Mori |
| 2012/0324228 | A1 | 12/2012 | Padhye et al. |
| 2013/0024112 | A1 | 1/2013 | Tate, Jr. |
| 2013/0024113 | A1* | 1/2013 | Weng ................. G01C 21/3638 701/450 |
| 2013/0060462 | A1 | 3/2013 | Hansen |
| 2013/0116919 | A1 | 5/2013 | Furuhata et al. |
| 2013/0124006 | A1 | 5/2013 | Anantha et al. |
| 2013/0132019 | A1 | 5/2013 | Suzuno |
| 2013/0147820 | A1* | 6/2013 | Kalai ................. G01C 21/3889 345/522 |
| 2013/0179057 | A1 | 7/2013 | Fisher et al. |
| 2013/0226443 | A1 | 8/2013 | Scofield et al. |
| 2013/0297201 | A1 | 11/2013 | Van Hende |
| 2013/0304377 | A1 | 11/2013 | Van Hende |
| 2013/0328861 | A1 | 12/2013 | Arikan et al. |
| 2013/0332070 | A1 | 12/2013 | Fleizach et al. |
| 2013/0345959 | A1 | 12/2013 | Van Os et al. |
| 2013/0345975 | A1 | 12/2013 | Vulcano et al. |
| 2014/0104197 | A1* | 4/2014 | Khosravy ............... G09B 29/00 345/173 |
| 2014/0107919 | A1 | 4/2014 | Venkatraman et al. |
| 2014/0180582 | A1 | 6/2014 | Pontarelli et al. |
| 2014/0197924 | A1 | 7/2014 | Wegelin et al. |
| 2014/0214261 | A1 | 7/2014 | Ramamoorthy et al. |
| 2014/0244110 | A1 | 8/2014 | Tharaldson et al. |
| 2014/0365113 | A1 | 12/2014 | Mcgavran et al. |
| 2014/0365120 | A1 | 12/2014 | Vulcano et al. |
| 2014/0365122 | A1 | 12/2014 | Mcgavran et al. |
| 2015/0015513 | A1 | 1/2015 | Kwak et al. |
| 2015/0032366 | A1 | 1/2015 | Man et al. |
| 2015/0051829 | A1 | 2/2015 | Gearhart et al. |
| 2015/0081210 | A1 | 3/2015 | Yeh et al. |
| 2015/0125042 | A1 | 5/2015 | Haden et al. |
| 2015/0192426 | A1 | 7/2015 | Foster et al. |
| 2015/0285652 | A1 | 10/2015 | Peri et al. |
| 2015/0300823 | A1 | 10/2015 | Kahn et al. |
| 2015/0338223 | A1 | 11/2015 | Letz |
| 2015/0345958 | A1 | 12/2015 | Graham |
| 2016/0047666 | A1 | 2/2016 | Fuchs |
| 2016/0061623 | A1 | 3/2016 | Pahwa et al. |
| 2016/0078037 | A1 | 3/2016 | Ziezold et al. |
| 2016/0102992 | A1 | 4/2016 | Otero Diaz et al. |

(56) References Cited

U.S. PATENT DOCUMENTS

| | | |
|---|---|---|
| 2016/0124707 A1 | 5/2016 | Ermilov et al. |
| 2016/0138927 A1 | 5/2016 | Ettinger et al. |
| 2016/0187152 A1 | 6/2016 | Tanizaki et al. |
| 2016/0210834 A1 | 7/2016 | Dayal |
| 2016/0252362 A1* | 9/2016 | Tertoolen ............... G01S 19/42 |
| | | 701/428 |
| 2016/0252363 A1 | 9/2016 | Tertoolen et al. |
| 2016/0290818 A1 | 10/2016 | Kim et al. |
| 2016/0290822 A1 | 10/2016 | Kalyanaraman et al. |
| 2016/0298977 A1 | 10/2016 | Newlin et al. |
| 2016/0313138 A1 | 10/2016 | Chupakhin |
| 2016/0356613 A1 | 12/2016 | Hajj et al. |
| 2016/0358467 A1* | 12/2016 | Jeong ................... G08G 1/0133 |
| 2016/0358471 A1 | 12/2016 | Hajj et al. |
| 2016/0375306 A1 | 12/2016 | Gu et al. |
| 2017/0001649 A1 | 1/2017 | Dickow |
| 2017/0023373 A1 | 1/2017 | Buchholz et al. |
| 2017/0061708 A1 | 3/2017 | Sol |
| 2017/0074669 A1 | 3/2017 | Newlin et al. |
| 2017/0176195 A1 | 6/2017 | Rajagopalan et al. |
| 2017/0276502 A1 | 9/2017 | Fischer et al. |
| 2017/0328734 A1 | 11/2017 | Devkar et al. |
| 2017/0363437 A1 | 12/2017 | Baracco et al. |
| 2018/0017400 A1* | 1/2018 | Andrew ............. G01C 21/3679 |
| 2018/0058868 A1 | 3/2018 | Kang et al. |
| 2018/0080788 A1 | 3/2018 | Belvadi Shankaraiah et al. |
| 2018/0088966 A1 | 3/2018 | Chourasiya |
| 2018/0100742 A1 | 4/2018 | Greenwood et al. |
| 2018/0113606 A1 | 4/2018 | Crawford et al. |
| 2018/0129276 A1 | 5/2018 | Nguyen et al. |
| 2018/0143029 A1 | 5/2018 | Nikulin et al. |
| 2018/0253617 A1 | 9/2018 | Tsai et al. |
| 2018/0266842 A1 | 9/2018 | Di Censo et al. |
| 2019/0003849 A1 | 1/2019 | Pahwa et al. |
| 2019/0178660 A1 | 6/2019 | Greenberg et al. |
| 2019/0178672 A1 | 6/2019 | Woolley |
| 2019/0219410 A1 | 7/2019 | Burgess et al. |
| 2019/0219411 A1 | 7/2019 | Christen et al. |
| 2019/0266890 A1 | 8/2019 | Lei et al. |
| 2019/0293447 A1 | 9/2019 | O'beirne et al. |
| 2019/0303088 A1 | 10/2019 | Yuan |
| 2019/0383637 A1 | 12/2019 | Teske |
| 2020/0012391 A1 | 1/2020 | Fleizach et al. |
| 2020/0026946 A1 | 1/2020 | Hu et al. |
| 2020/0096358 A1 | 3/2020 | Dal Bo et al. |
| 2020/0200551 A1 | 6/2020 | Fischer et al. |
| 2020/0273333 A1 | 8/2020 | Elshenawy |
| 2021/0004627 A1 | 1/2021 | Chen et al. |
| 2021/0102819 A1 | 4/2021 | Gallo et al. |
| 2021/0213959 A1 | 7/2021 | Shahriari et al. |
| 2021/0233393 A1 | 7/2021 | Sievers et al. |
| 2021/0255828 A1 | 8/2021 | Krishnan et al. |
| 2021/0302175 A1 | 9/2021 | Pishdadian et al. |
| 2021/0356281 A1 | 11/2021 | Hajj |
| 2021/0356287 A1 | 11/2021 | Haj et al. |
| 2021/0356288 A1 | 11/2021 | Hajj et al. |
| 2021/0374285 A1 | 12/2021 | D'agostino |
| 2021/0389142 A1 | 12/2021 | Kim et al. |
| 2021/0389143 A1 | 12/2021 | Kim et al. |
| 2021/0389144 A1 | 12/2021 | Kim et al. |
| 2022/0089177 A1 | 3/2022 | Wang et al. |
| 2022/0221292 A1 | 7/2022 | Putnam et al. |
| 2022/0391074 A1 | 12/2022 | Apuy et al. |
| 2023/0160714 A1 | 5/2023 | Apuy et al. |
| 2023/0315260 A1 | 10/2023 | Fleizach et al. |
| 2024/0094017 A1 | 3/2024 | Baum et al. |
| 2024/0219188 A1 | 7/2024 | Kim et al. |

FOREIGN PATENT DOCUMENTS

| | | |
|---|---|---|
| CN | 109990799 A | 7/2019 |
| DE | 102007050021 A1 | 4/2009 |
| EP | 1275936 A2 | 1/2003 |
| EP | 2378249 A1 | 10/2011 |
| EP | 2721844 A2 | 4/2014 |
| EP | 2825902 A1 | 1/2015 |
| EP | 3104122 A1 | 12/2016 |
| EP | 3343472 A1 | 7/2018 |
| EP | 3534119 A1 | 9/2019 |
| KR | 10-2013-0033948 A | 4/2013 |
| WO | 2012/141827 A2 | 10/2012 |
| WO | 2013/138183 A1 | 9/2013 |
| WO | 2013/169849 A2 | 11/2013 |
| WO | 2014/105276 A1 | 7/2014 |
| WO | 2016/090282 A1 | 6/2016 |

OTHER PUBLICATIONS

Final Office Action received for U.S. Appl. No. 16/460,507, mailed on Aug. 18, 2021, 40 pages.
Final Office Action received for U.S. Appl. No. 17/028,638, mailed on Mar. 22, 2021, 15 pages.
International Search Report received for PCT Patent Application No. PCT/US2021/032640, mailed on Oct. 13, 2021, 7 pages.
International Search Report received for PCT Patent Application No. PCT/US2021/037124, mailed on Jan. 21, 2022, 9 pages.
Non-Final Office Action received for U.S. Appl. No. 16/460,507, mailed on Apr. 6, 2020, 37 pages.
Non-Final Office Action received for U.S. Appl. No. 16/460,507, mailed on Feb. 22, 2022, 50 pages.
Non-Final Office Action received for U.S. Appl. No. 16/460,507, mailed on Feb. 25, 2021, 37 pages.
Non-Final Office Action received for U.S. Appl. No. 17/028,638, mailed on Nov. 2, 2021, 17 pages.
Non-Final Office Action received for U.S. Appl. No. 17/028,638, mailed on Nov. 16, 2020, 16 pages.
Non-Final Office Action received for U.S. Appl. No. 17/028,675, mailed on Jan. 20, 2022, 13 pages.
Non-Final Office Action received for U.S. Appl. No. 17/030,091, mailed on Feb. 4, 2022, 21 pages.
Non-Final Office Action received for U.S. Appl. No. 17/485,344, mailed on Dec. 7, 2021, 40 pages.
Non-Final Office Action received for U.S. Appl. No. 17/030,165, mailed on Feb. 1, 2022, 30 pages.
Google, "Biking Directions on Google Maps", Available online at: <https://www.youtube.com/watch?v=JN5_NBSu7Lw>, Mar. 10, 2010, 1 page.
ABRP 3.7 Release Notes, Apple Store Release Notes, Available online at: <https://web.archive.org/web/20191225192637/https://apps.apple.com/us/app/a-better-routeplanner-abrp/id1490860521>, [Retrieved Jul. 19, 2022], Apr. 26, 2019, pp. 1-16.
Corrected Notice of Allowance received for U.S. Appl. No. 17/028,675, mailed on Jun. 15, 2023, 6 pages.
Corrected Notice of Allowance received for U.S. Appl. No. 17/030,091, mailed on Jun. 22, 2023, 6 pages.
Corrected Notice of Allowance received for U.S. Appl. No. 17/485,344, mailed on Oct. 3, 2022, 3 pages.
Final Office Action received for U.S. Appl. No. 17/028,322, mailed on Jan. 3, 2023, 22 pages.
Final Office Action received for U.S. Appl. No. 17/028,638, mailed on Dec. 7, 2022, 24 pages.
Final Office Action received for U.S. Appl. No. 17/028,675, mailed on Jul. 11, 2022, 14 pages.
Final Office Action received for U.S. Appl. No. 17/030,091, mailed on Aug. 17, 2022, 26 pages.
Final Office Action received for U.S. Appl. No. 17/030,165, mailed on Nov. 15, 2022, 50 pages.
International Search Report received for PCT Patent Application No. PCT/US2022/072600, mailed on Sep. 2, 2022, 5 pages.
International Search Report received for PCT Patent Application No. PCT/US2022/072783, mailed on Jan. 20, 2023, 6 pages.
Non-Final Office Action received for U.S. Appl. No. 17/028,322, mailed on Jul. 28, 2022, 22 pages.
Non-Final Office Action received for U.S. Appl. No. 17/028,638, mailed on Jun. 7, 2022, 20 pages.
Non-Final Office Action received for U.S. Appl. No. 17/030,131, mailed on Apr. 4, 2022, 51 pages.

(56) References Cited

OTHER PUBLICATIONS

Non-Final Office Action received for U.S. Appl. No. 17/030,165, mailed on Jan. 3, 2024, 49 pages.
Non-Final Office Action received for U.S. Appl. No. 17/030,165, mailed on May 24, 2023, 45 pages.
Non-Final Office Action received for U.S. Appl. No. 18/151,352, mailed on Jun. 23, 2023, 23 pages.
Non-Final Office Action received for U.S. Appl. No. 18/161,841, mailed on Oct. 25, 2023, 7 pages.
Notice of Allowance received for U.S. Appl. No. 16/460,507, mailed on Sep. 15, 2022, 35 pages.
Notice of Allowance received for U.S. Appl. No. 17/028,322, mailed on Apr. 18, 2023, 8 pages.
Notice of Allowance received for U.S. Appl. No. 17/028,322, mailed on Aug. 3, 2023, 5 pages.
Notice of Allowance received for U.S. Appl. No. 17/028,638, mailed on Apr. 4, 2023, 26 pages.
Notice of Allowance received for U.S. Appl. No. 17/028,675, mailed on Jan. 13, 2023, 9 pages.
Notice of Allowance received for U.S. Appl. No. 17/030,091, mailed on Feb. 3, 2023, 9 pages.
Notice of Allowance received for U.S. Appl. No. 17/030,131, mailed on Dec. 7, 2022, 11 pages.
Notice of Allowance received for U.S. Appl. No. 17/030,131, mailed on May 5, 2023, 5 pages.
Notice of Allowance received for U.S. Appl. No. 17/485,344, mailed on Apr. 19, 2022, 9 pages.
Notice of Allowance received for U.S. Appl. No. 17/485,344, mailed on Sep. 9, 2022, 9 pages.
Notice of Allowance received for U.S. Appl. No. 18/151,352, mailed on Feb. 5, 2024, 9 pages.
Notice of Allowance received for U.S. Appl. No. 18/161,841, mailed on Feb. 6, 2024, 5 pages.
Restriction Requirement received for U.S. Appl. No. 17/028,322, mailed on Apr. 13, 2022, 6 pages.
Waze Suggestion Box, Available online at: <https://waze.uservoice.com/forums/59223-waze-suggestion-box/suggestions/803059-add-pause-option-for-stops?page=3&per_page=20>, [Retrieved Jul. 21, 2022], 2010, pp. 1-7.
Welcome to EV Trip Planner Version 2.8, VTripPlanner, Available Online at: <https://web.archive.org/web/20180807120132/https://www.evtripplanner.com/planner/2-8/>, 2018, 3 pages.
What are the Best EV Route Planners?, enrg.io, Available online at: <https://enrg.io/what-are-the-best-ev-route-planners/>, [Retrieved Jul. 19, 2022], 2019, pp. 1-10.
Baum et al., "Shortest Feasible Paths with Charging Stops for Battery Electric Vehicles", ARXIV.org, Cornell University Library, Available online at: <https://doi.org/10.48550/arXiv.1910.09812>, [Retrieved on Sep. 8, 2022], Oct. 22, 2019, pp. 1-43.
Fingas, Jon, "Tesla's in-Car Trip Planning Tool is Available on the Web", Engadget, Available online at: <https://www.engadget.com/2018-01-04-tesla-trip-planner-available-on-web.html#:-:text=There's%20now%20a%20better%20way, particular%20Tesla%20you're%20driving.> [Retrieved Jul. 19, 2022], Jan. 4, 2018, pp. 1-5.
Lambert, Fred, "Tesla Launches a New Web-Based Trip Planning Tool Using the Supercharger Network", Electrek, Available online at: <https://electrek.co/2018/01/04/tesla-launches-new-web-based-trip-planning-tool-supercharger-network/> [Retrieved Jul. 19, 2022], Jan. 4, 2018, pp. 1-6.
Zündorf, Tobias, "Electric Vehicle Routing with Realistic Recharging Models", Available online at: <https://i11www.iti.kit.edu/_media/teaching/theses/ma-zuendorf-14.pdf>, [Retrieved on Aug. 22, 2022], Nov. 24, 2014, 94 pages.
Notice of Allowance received for U.S. Appl. No. 18/151,352, mailed on May 28, 2024, 9 pages.
Notice of Allowance received for U.S. Appl. No. 18/161,841, mailed on May 20, 2024, 5 pages.
Search Report received for Chinese Patent Application No. 202310692856.9, mailed on Feb. 24, 2024, 6 pages (3 pages of English Translation and 3 pages of Official Copy).
Non-Final Office Action received for U.S. Appl. No. 17/030,165, mailed on Oct. 22, 2024, 50 pages.

* cited by examiner

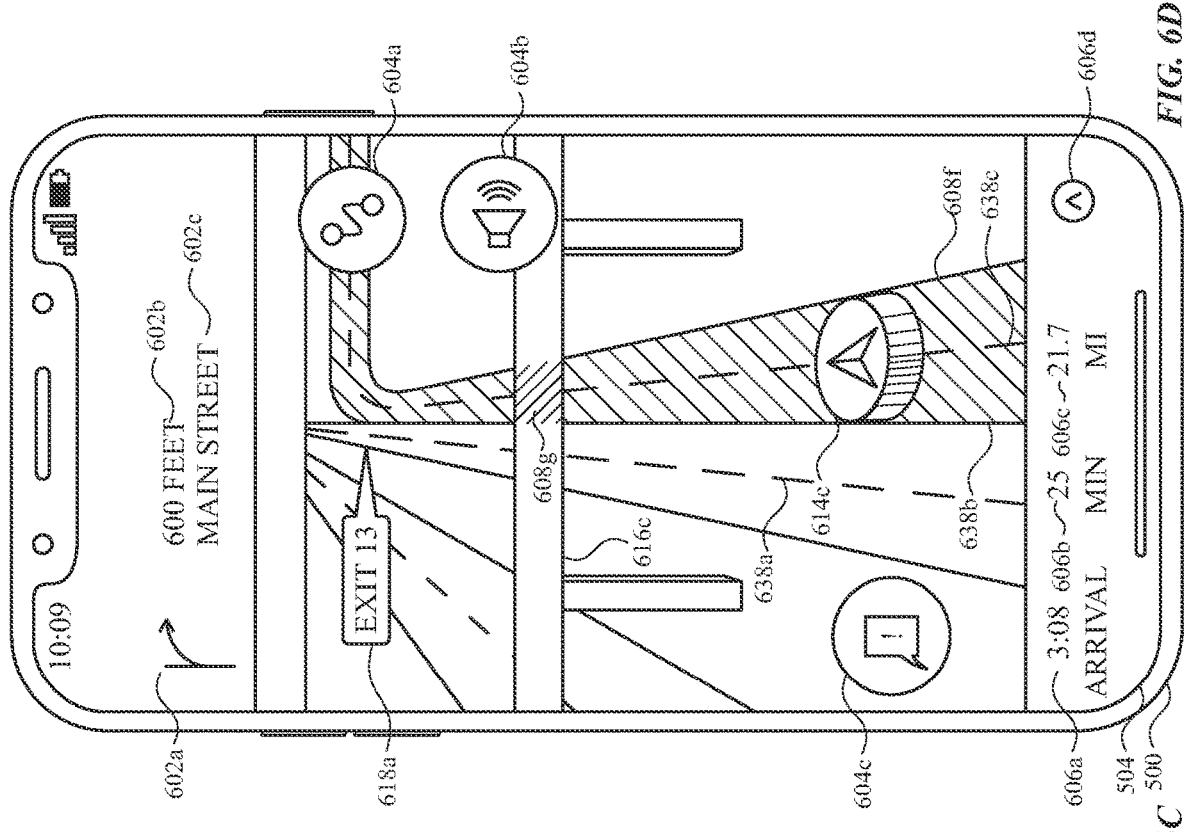
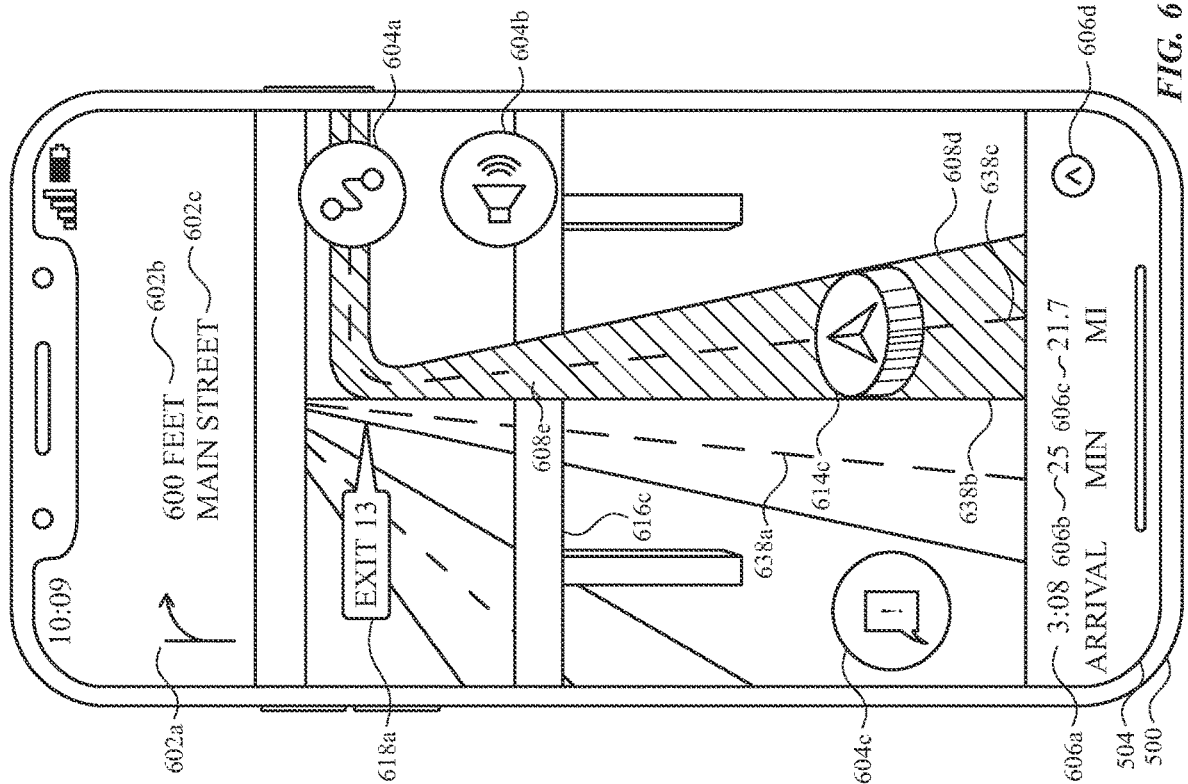

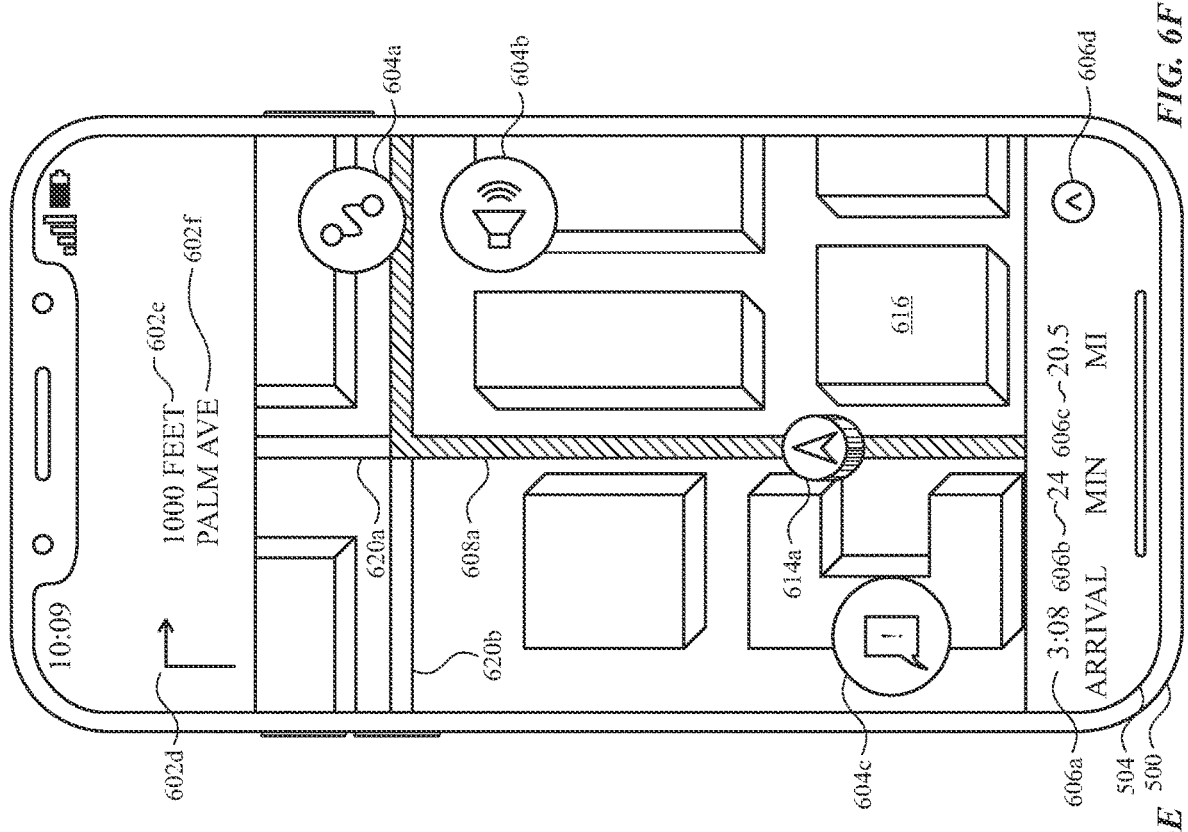
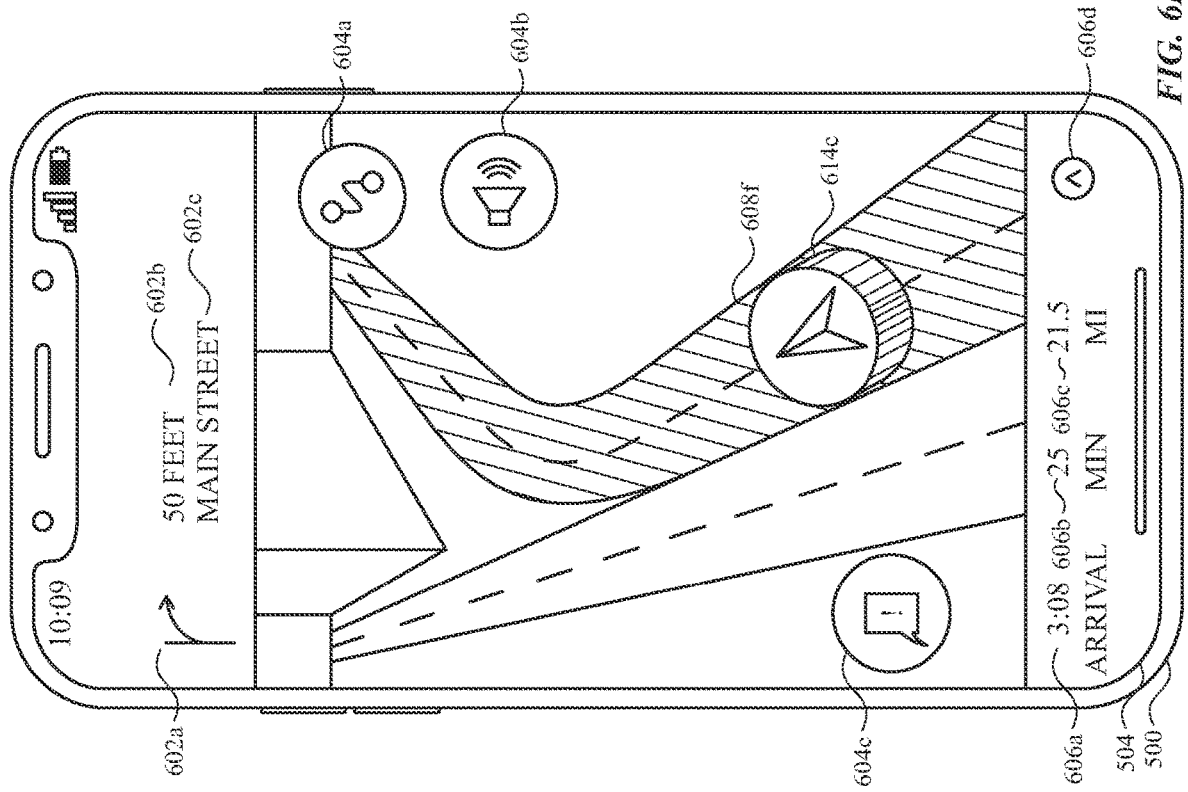

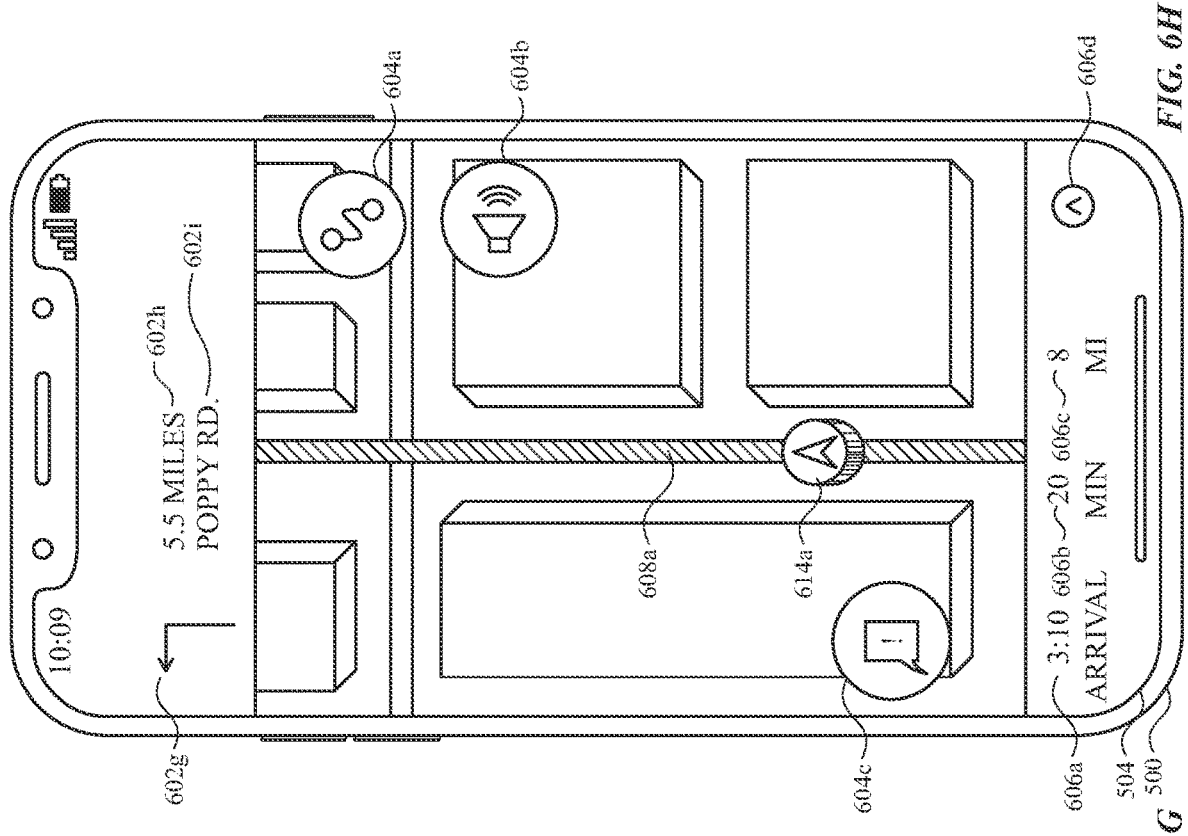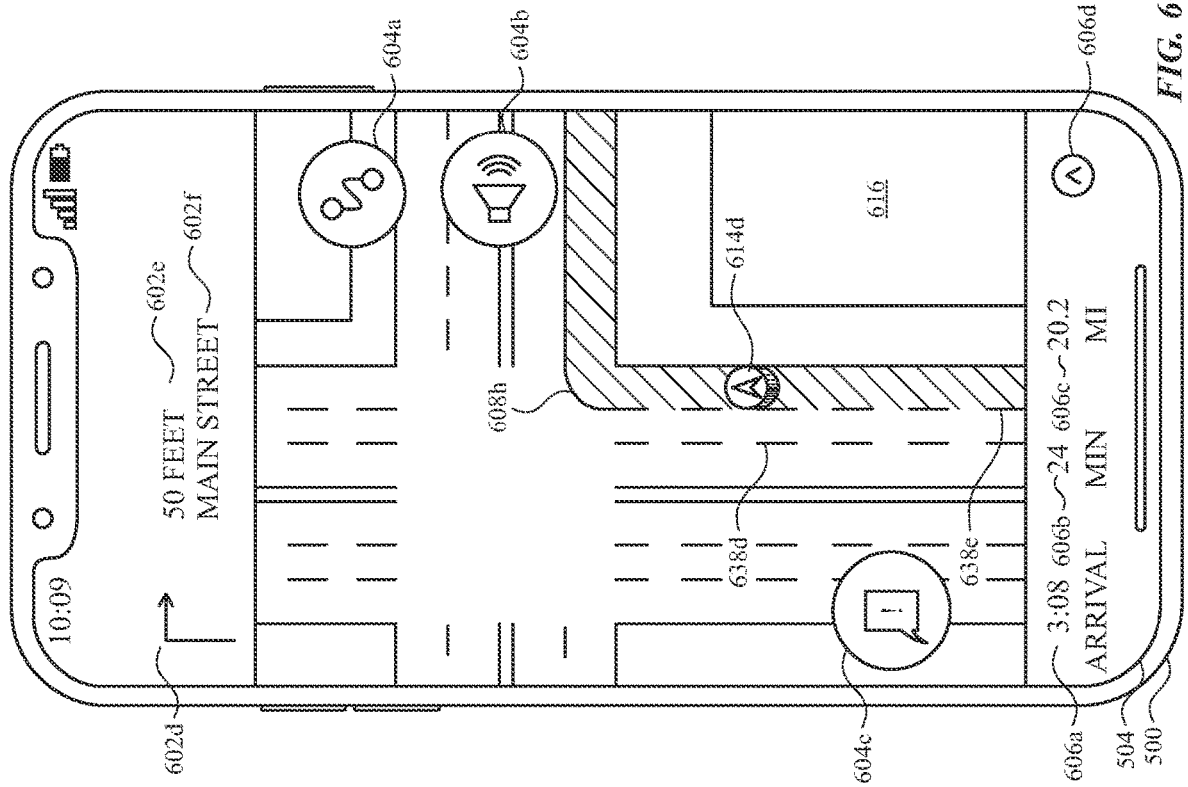

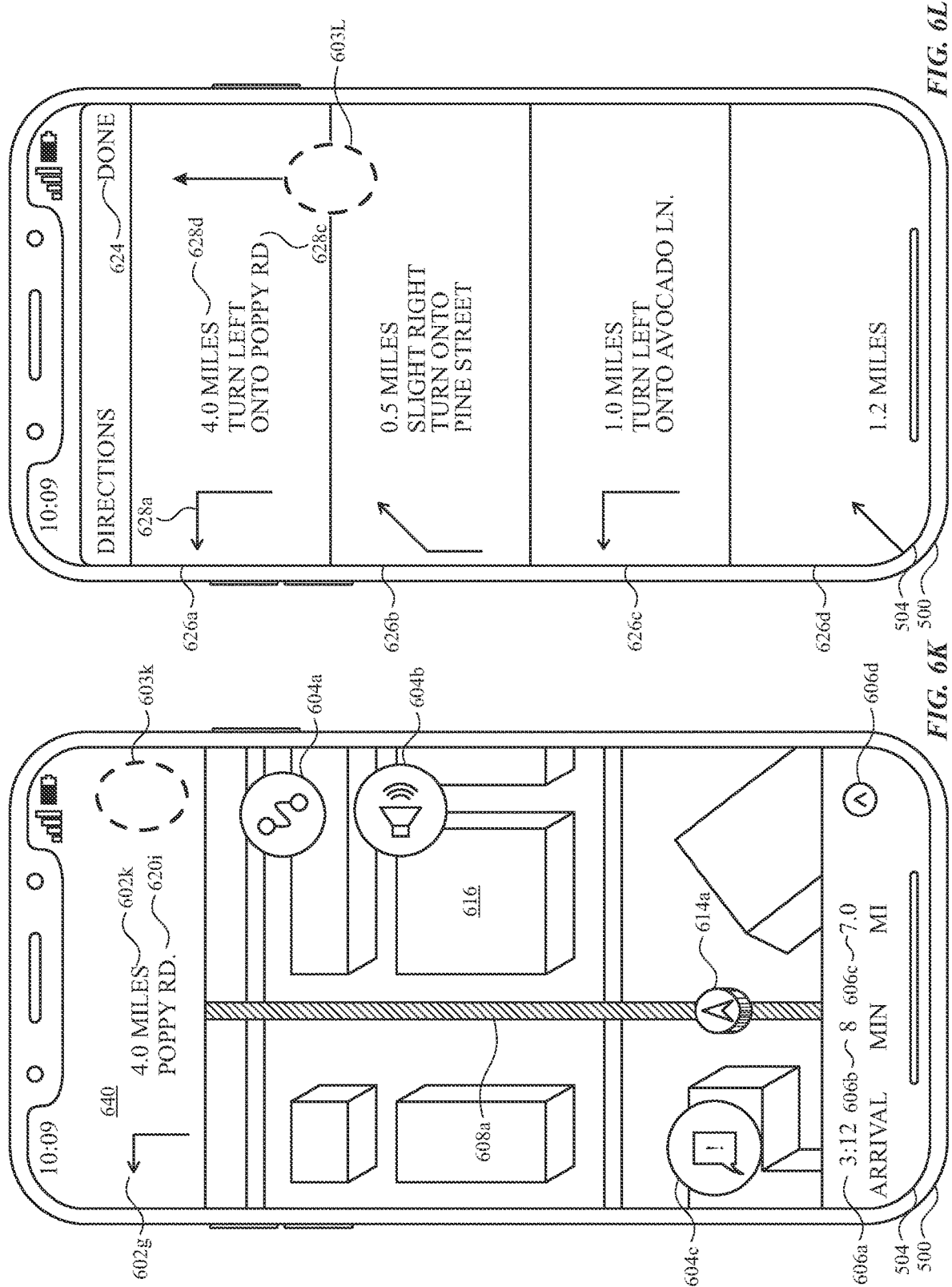

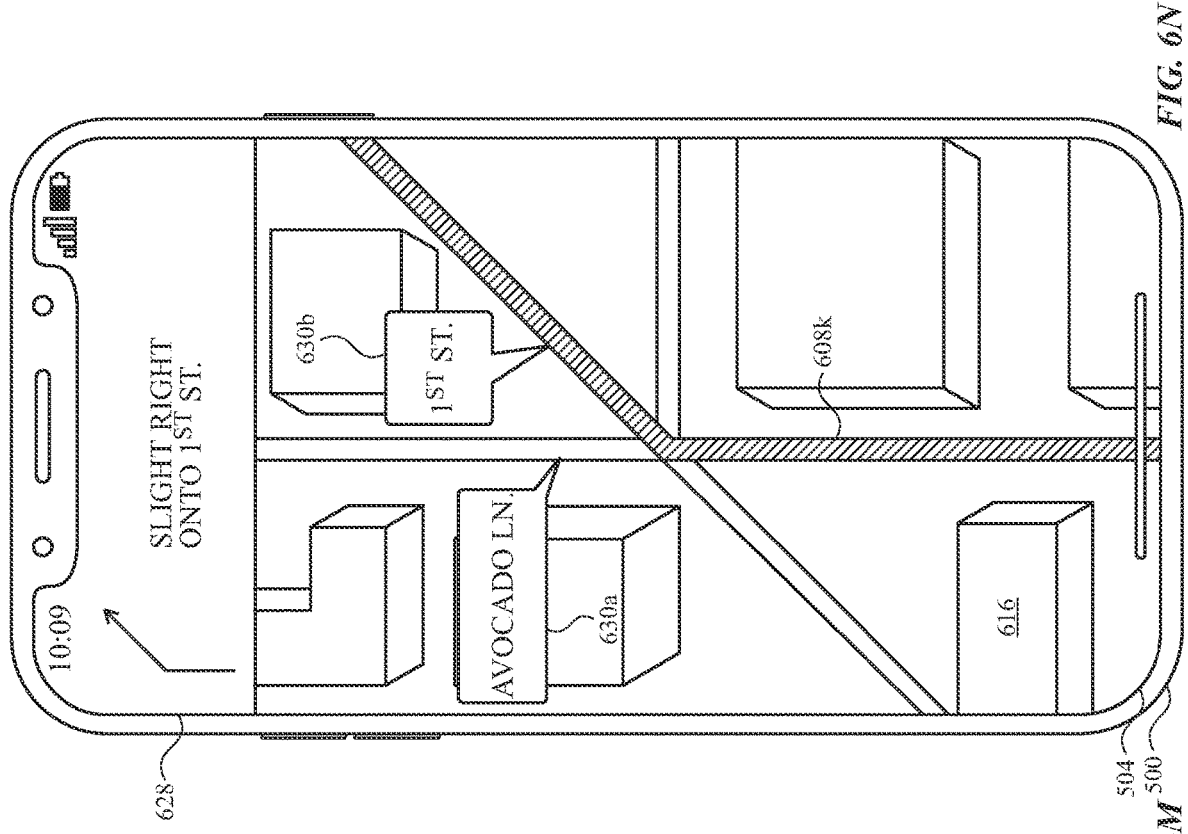
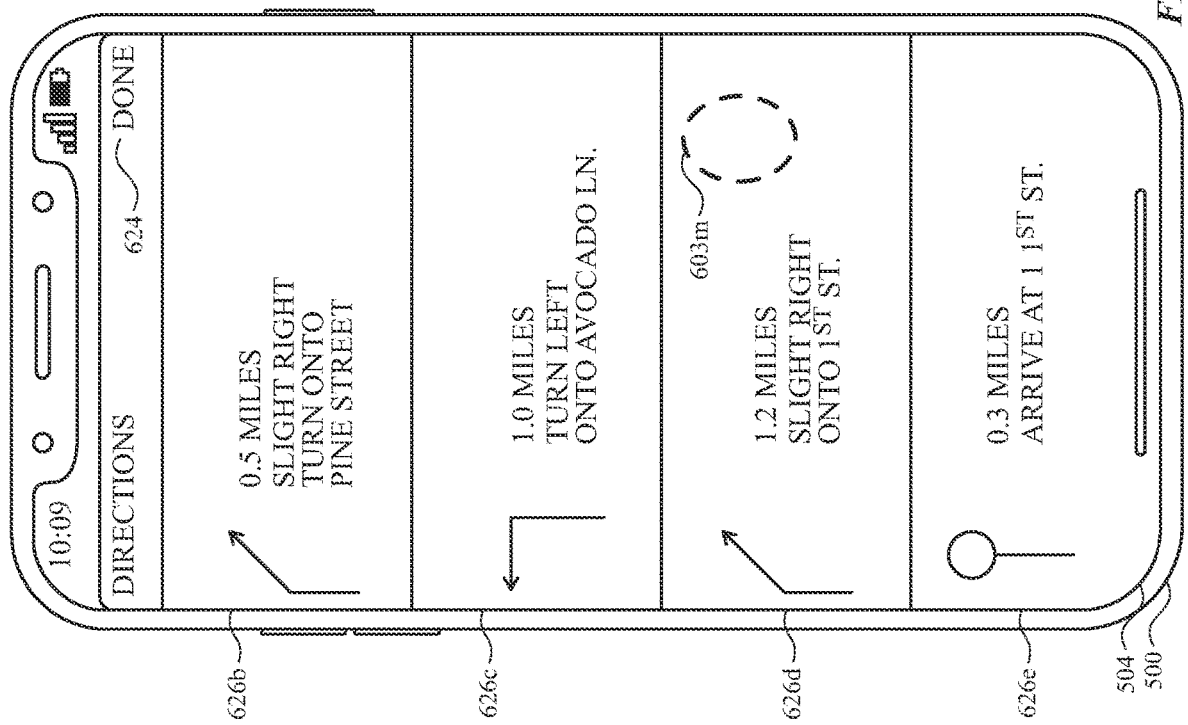

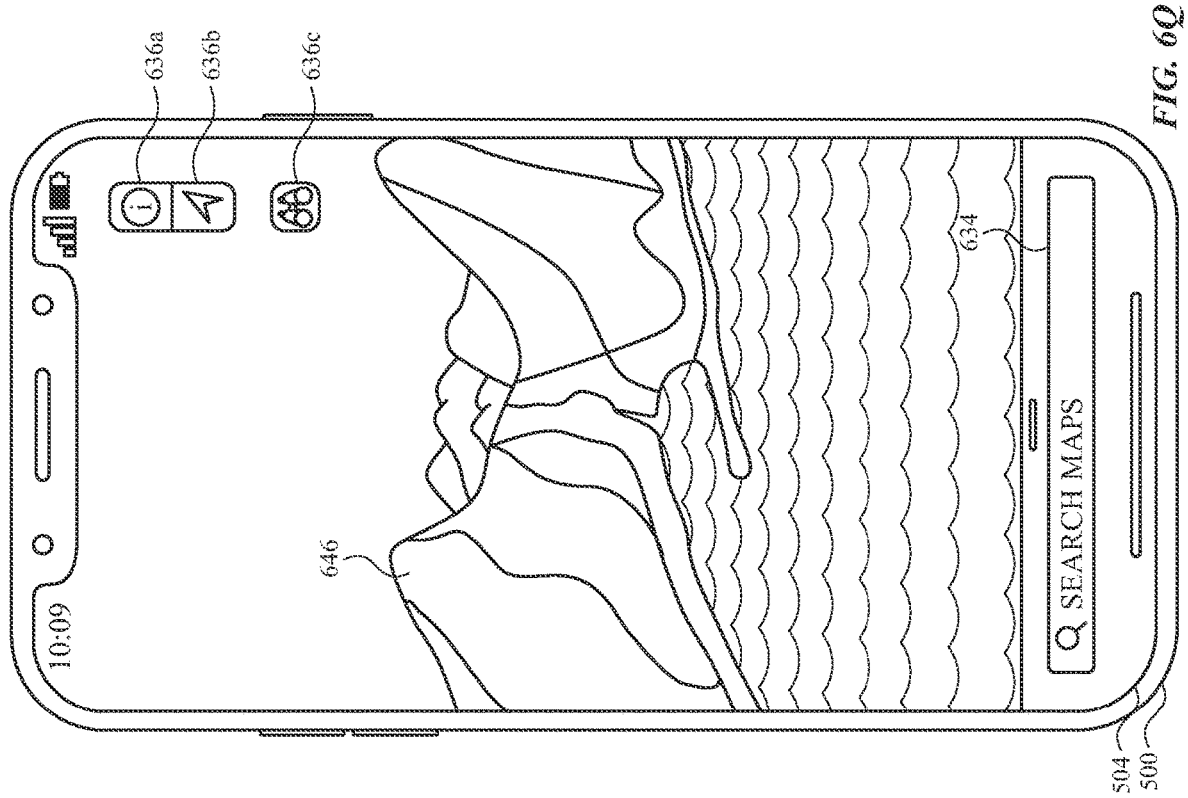

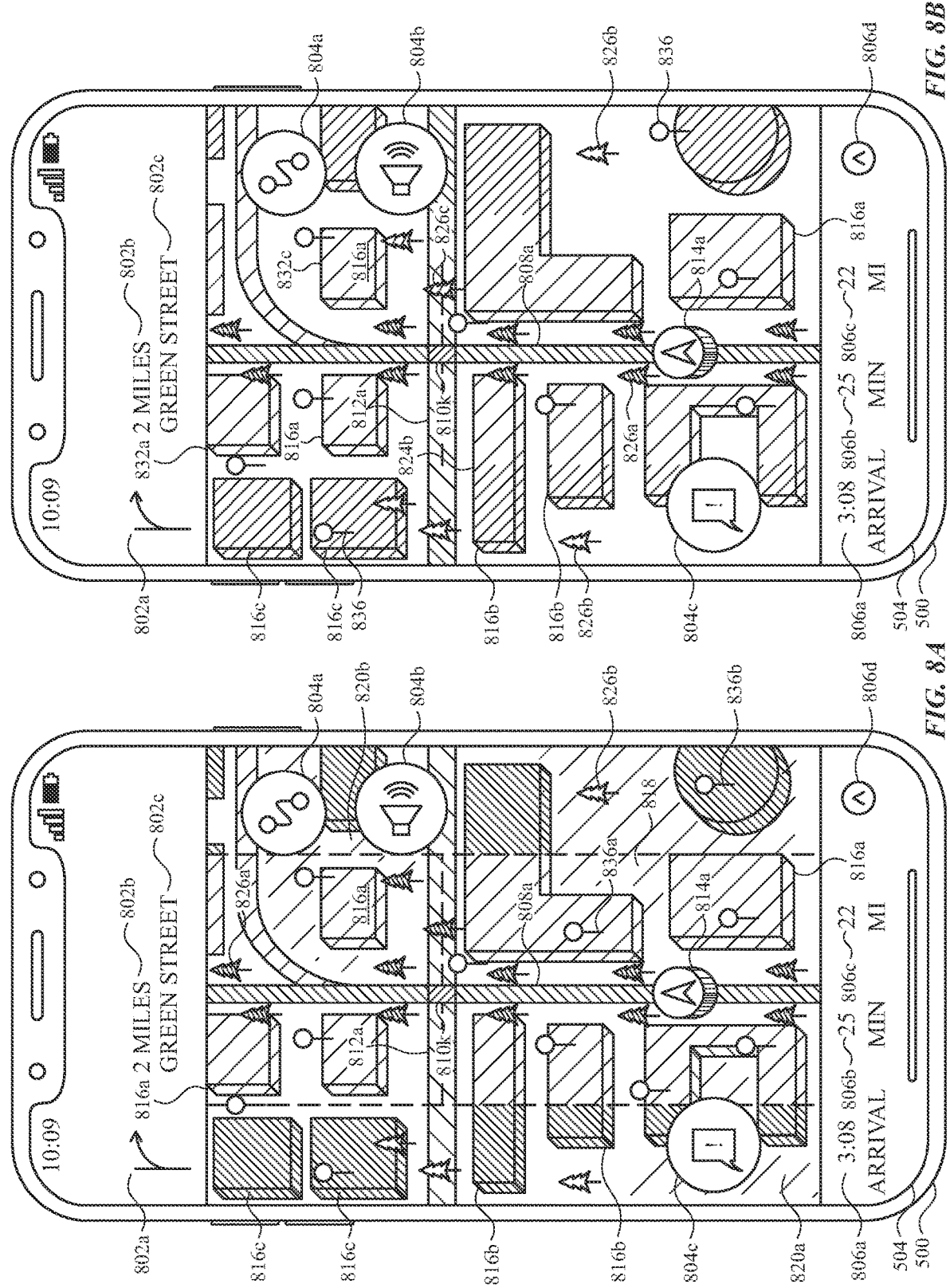

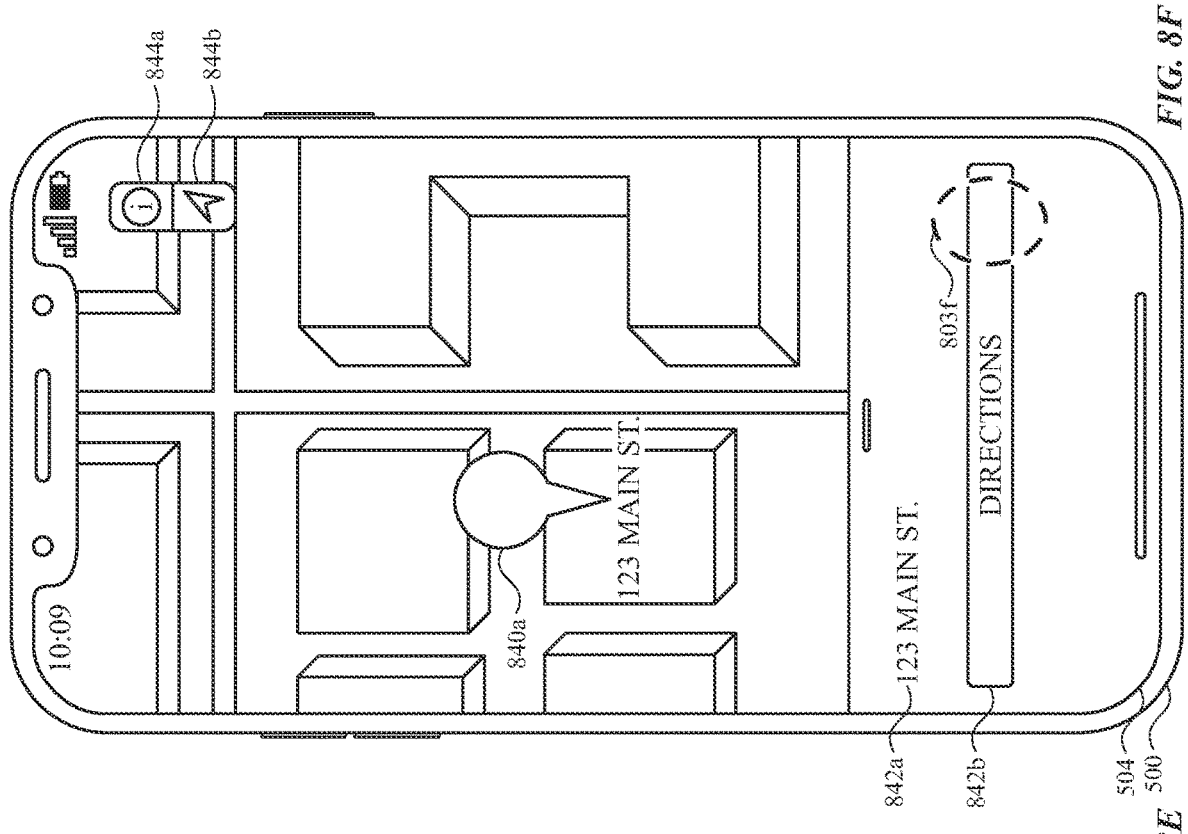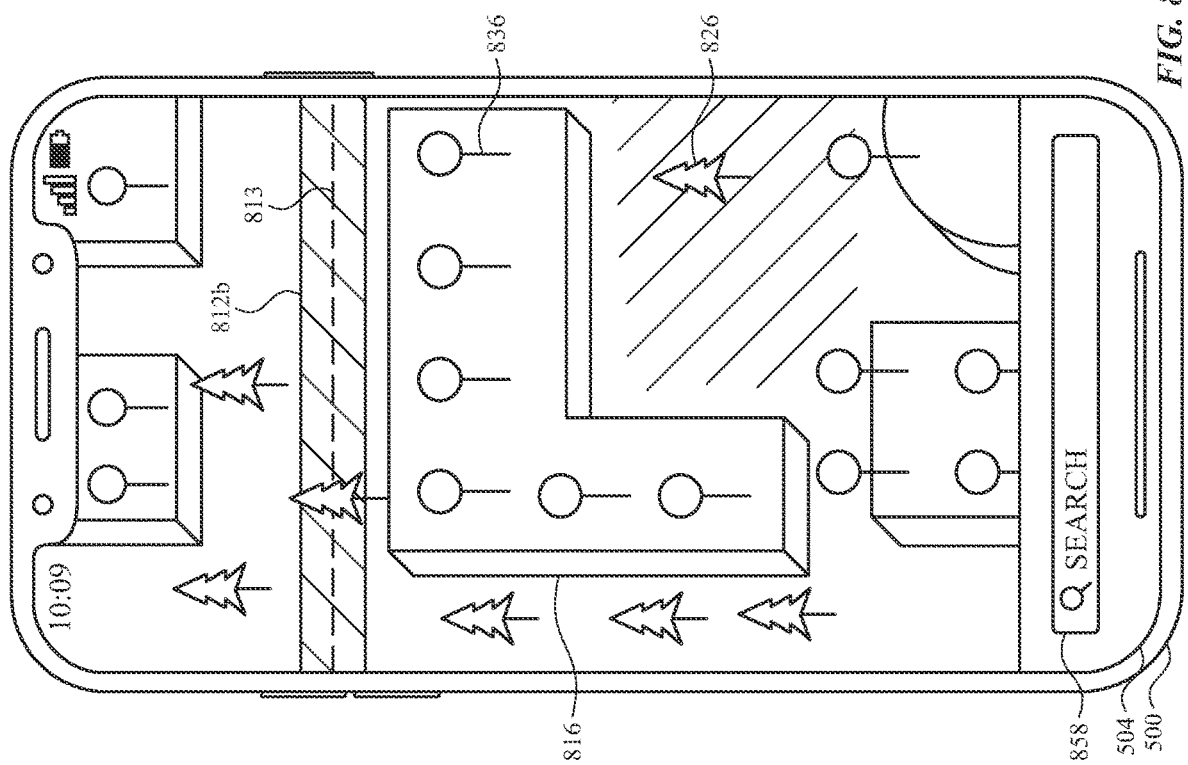

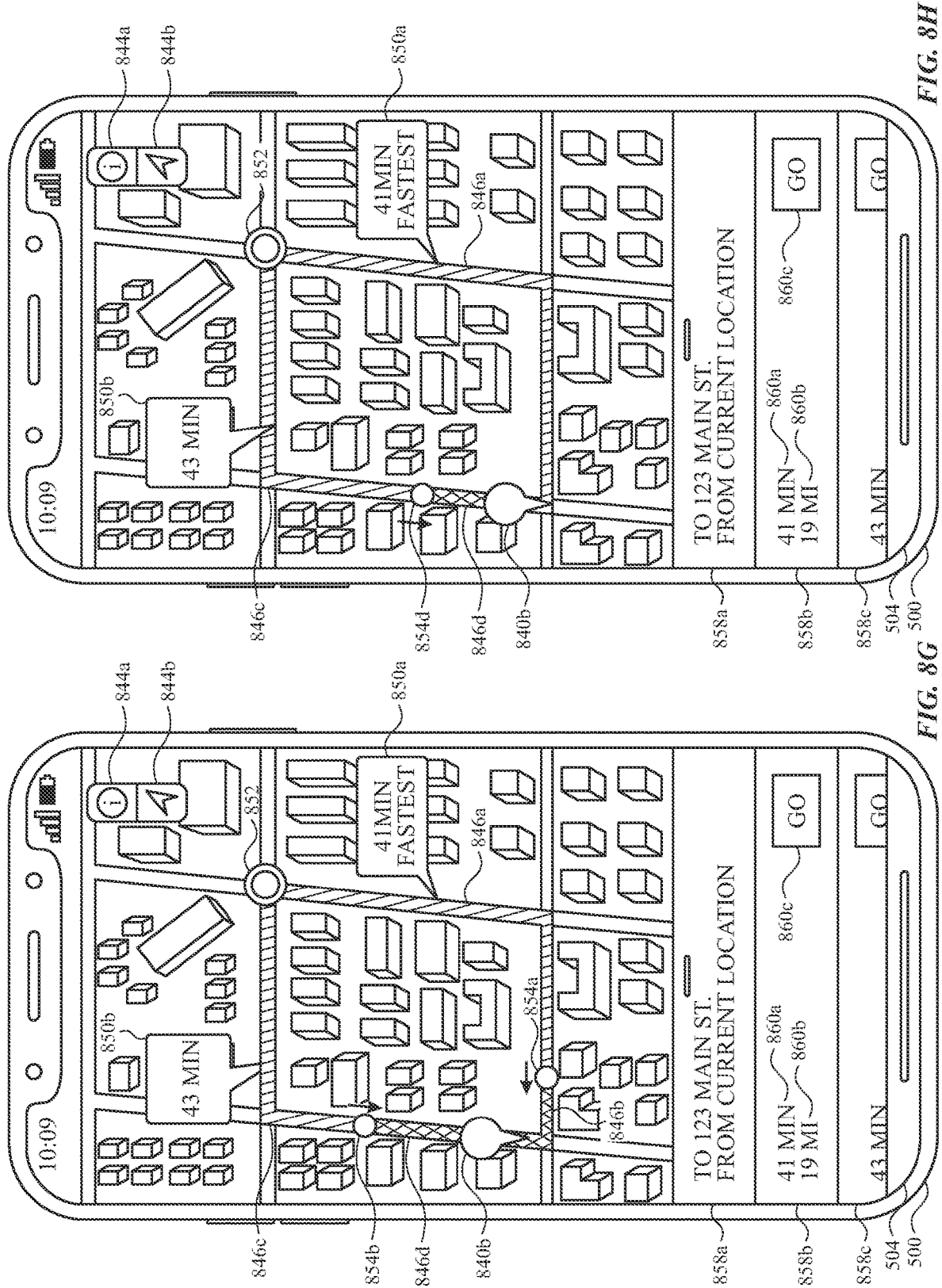

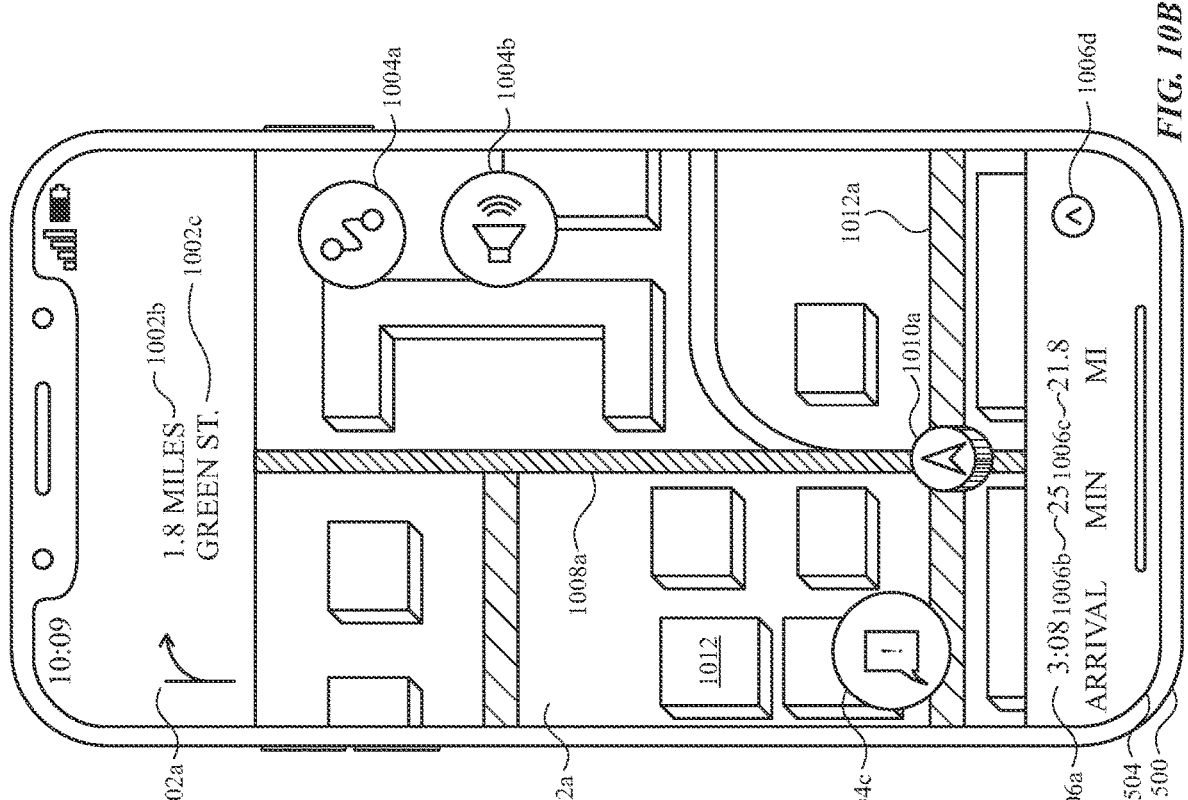
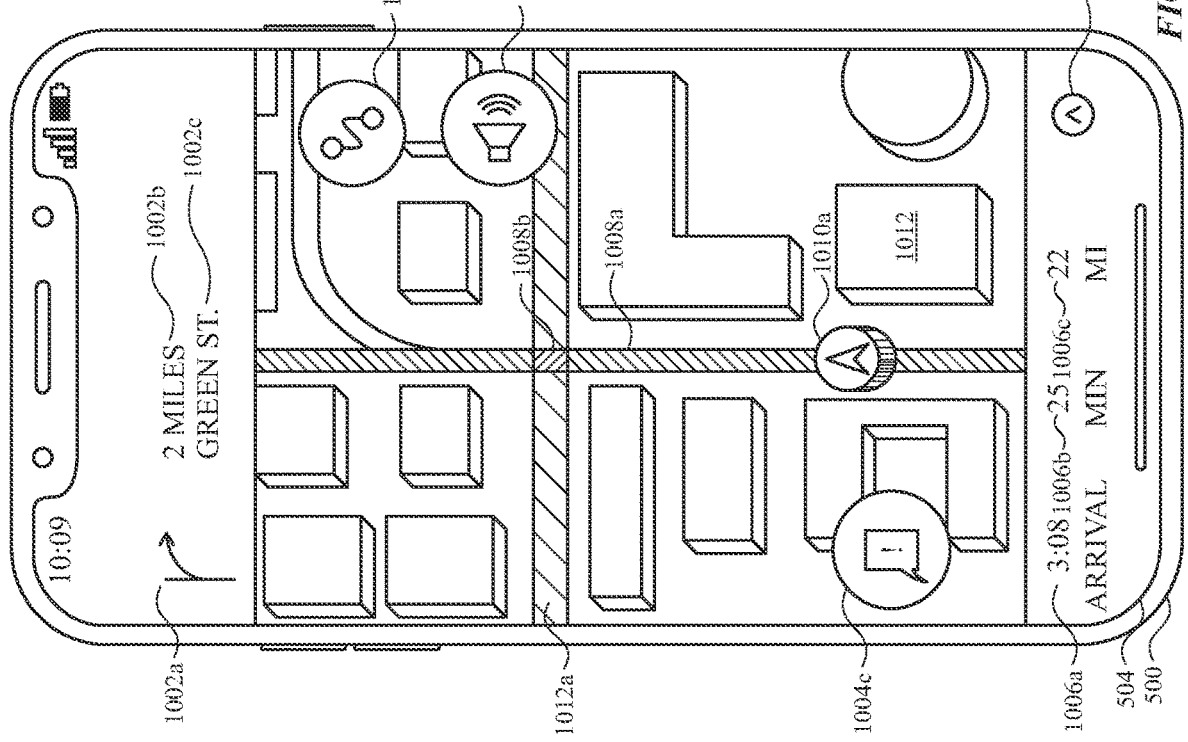

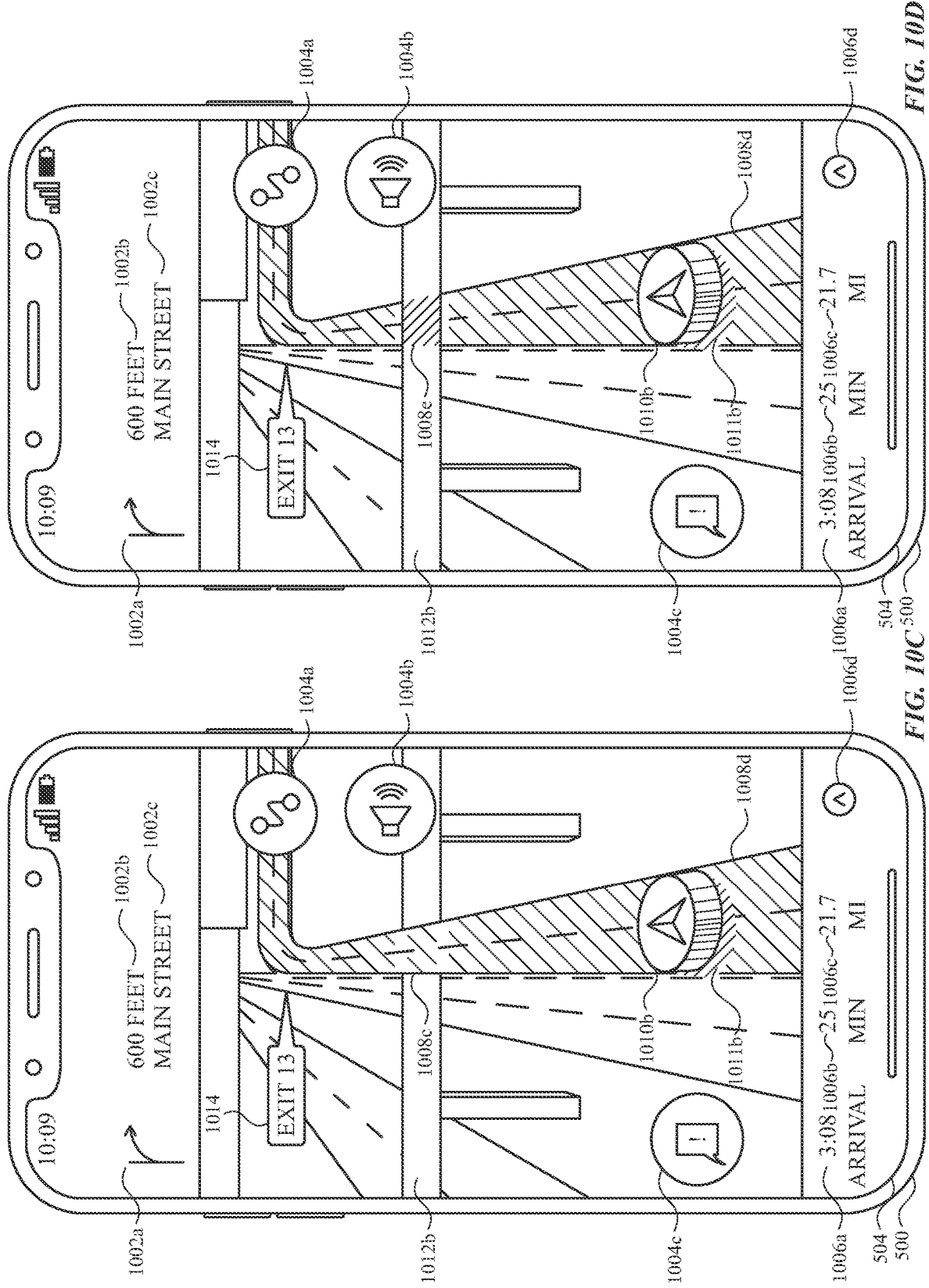

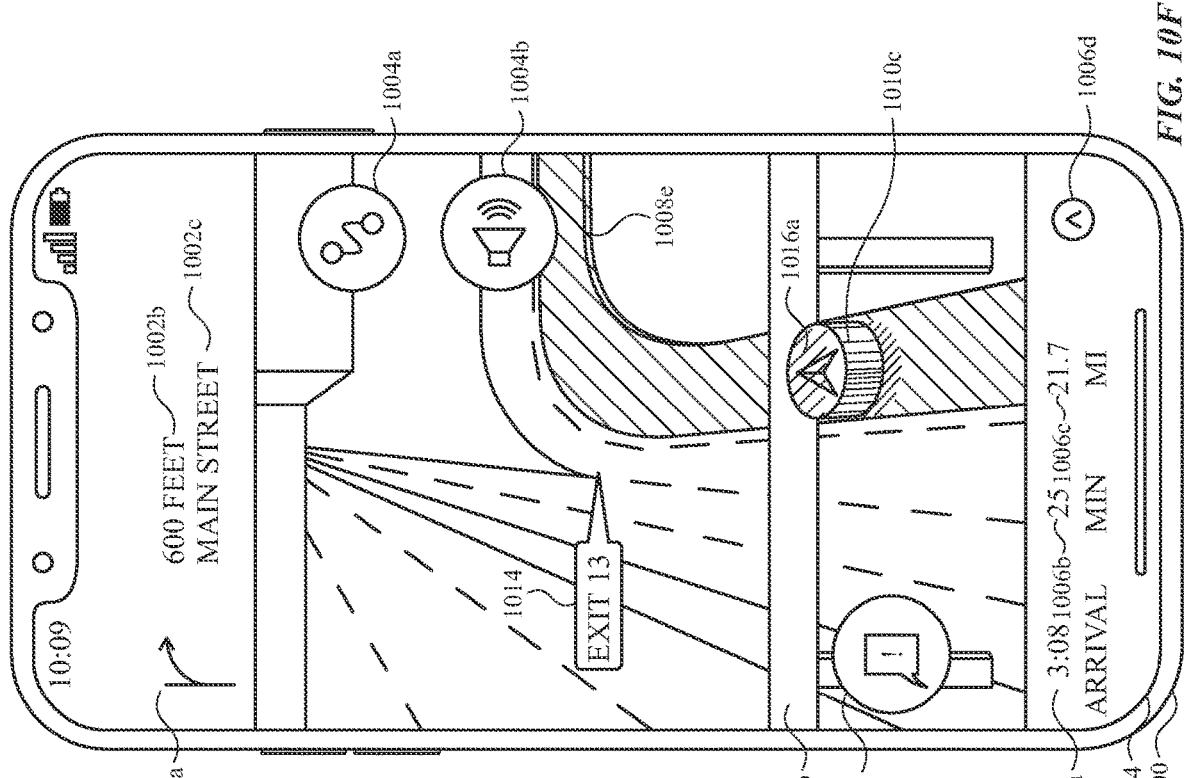
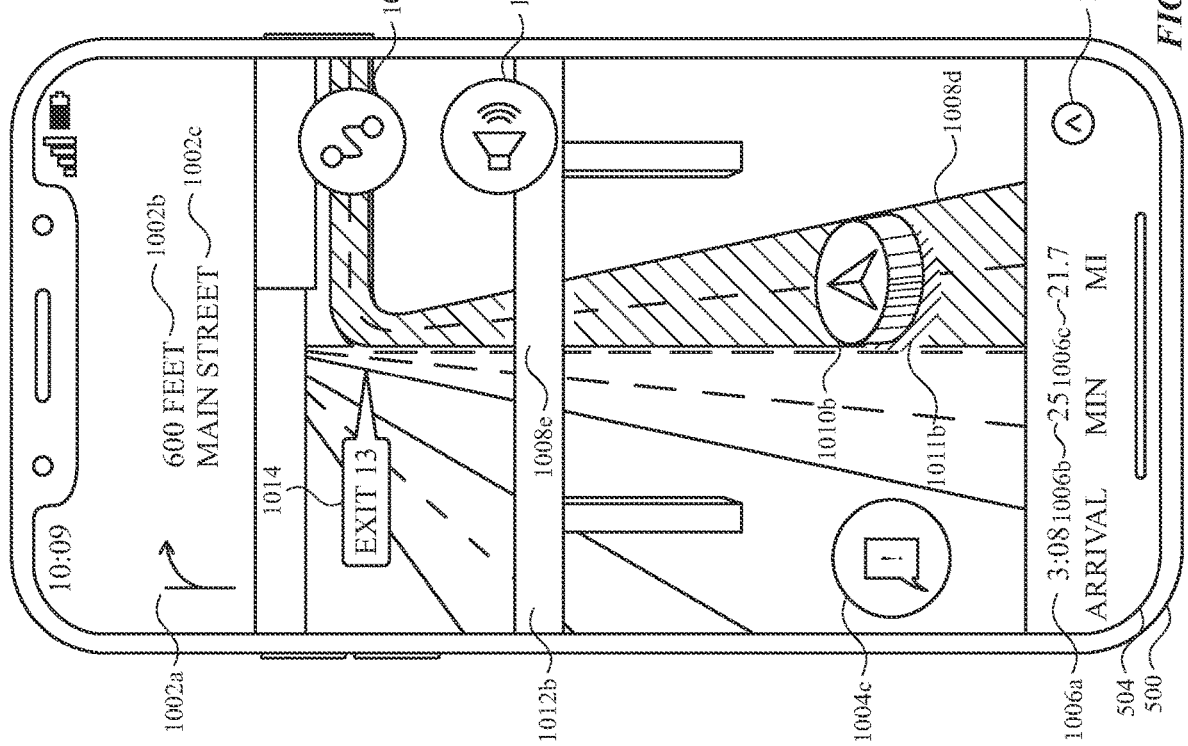

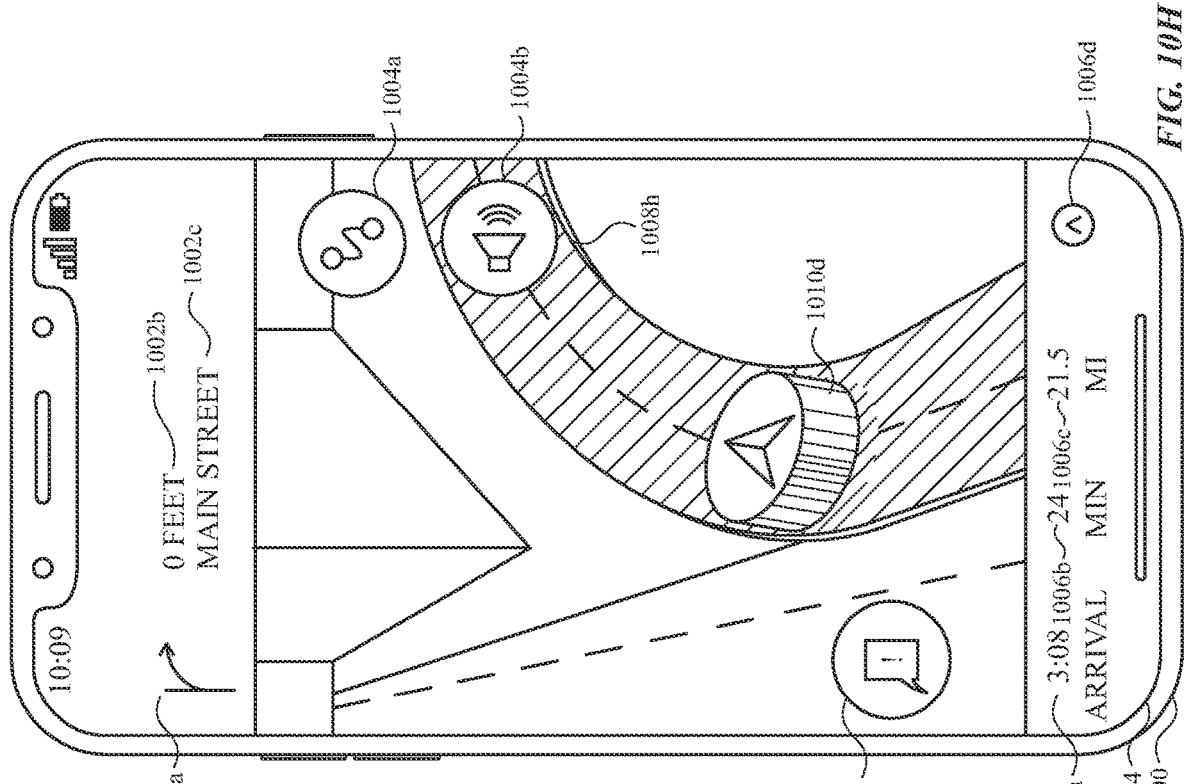
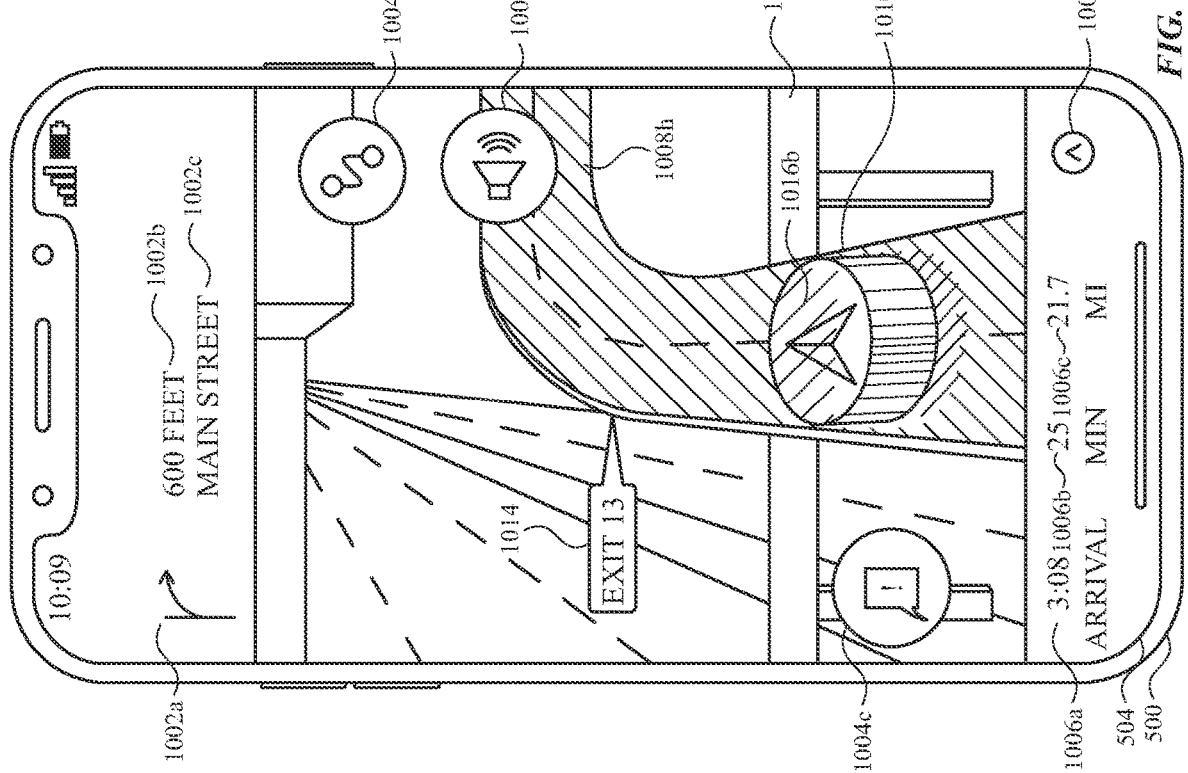

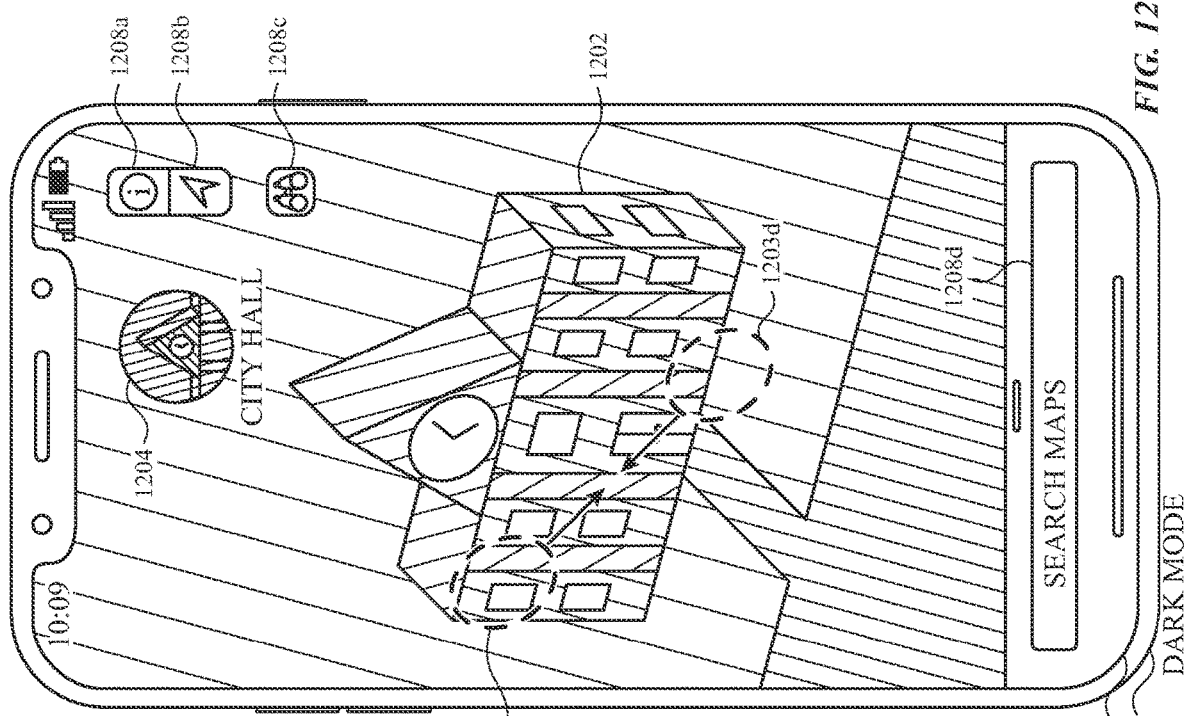
FIG. 12C ANIMATED TRANSITION
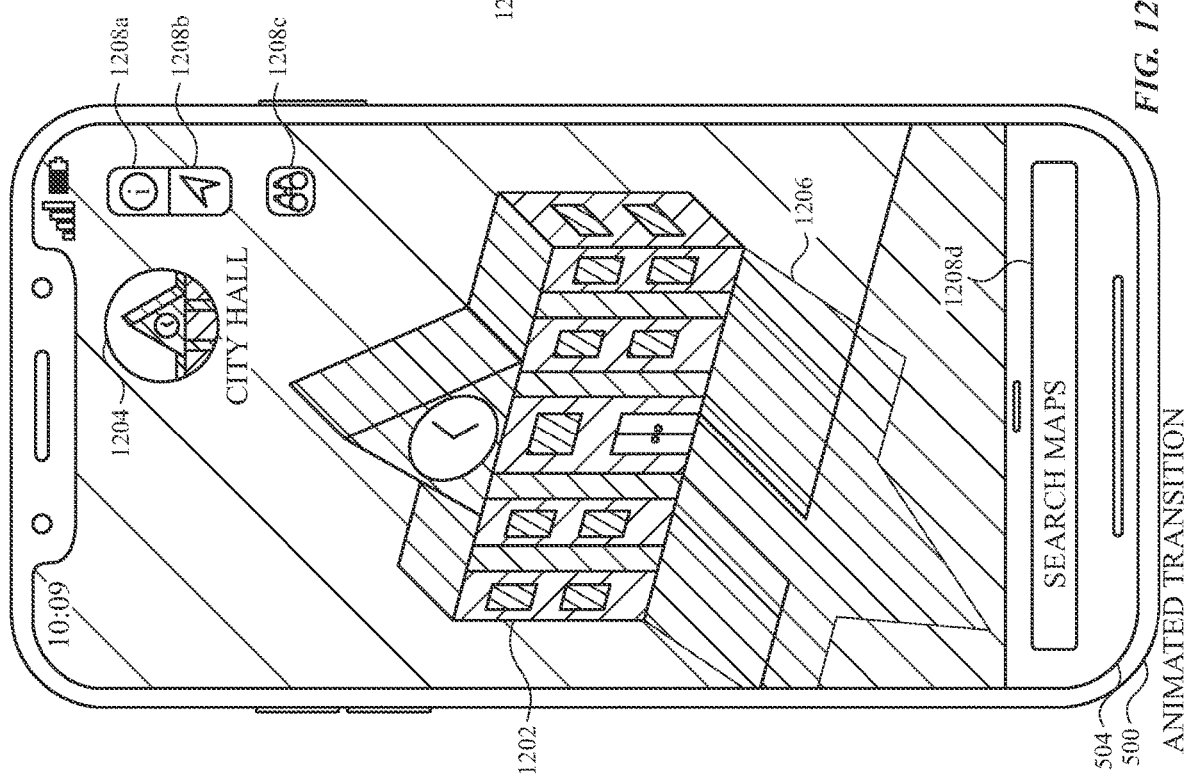
FIG. 12D DARK MODE

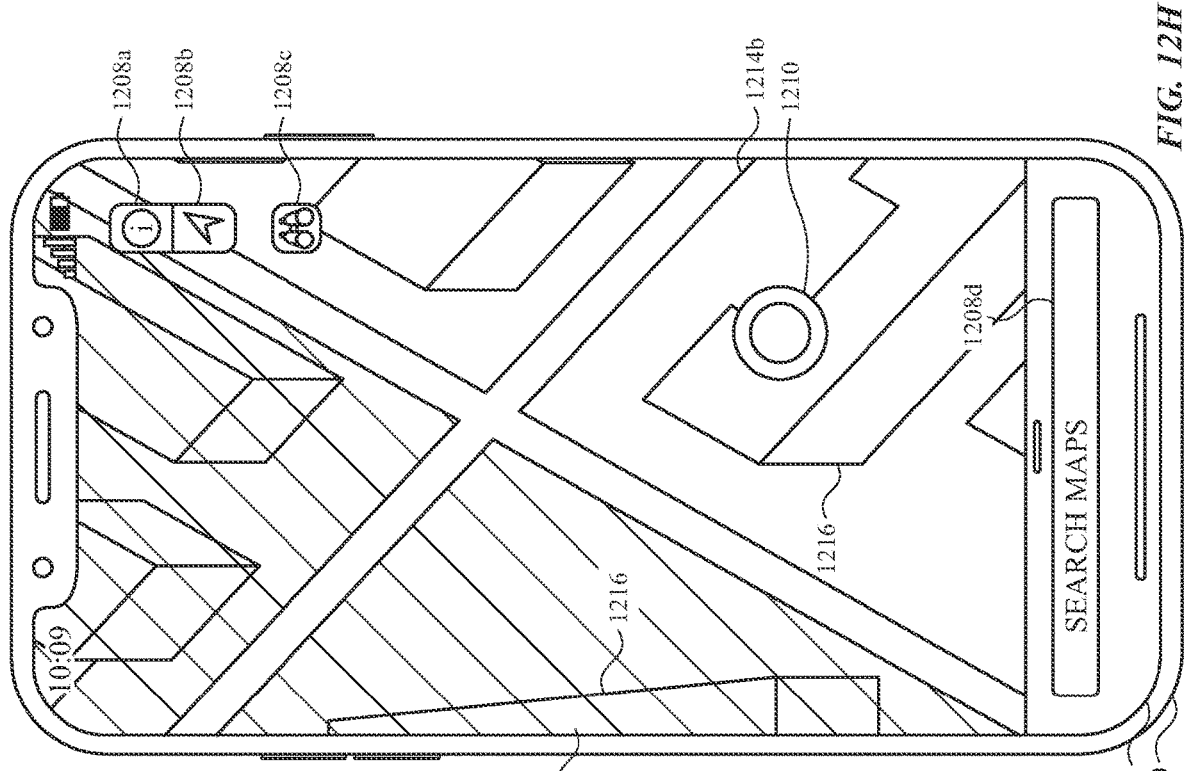
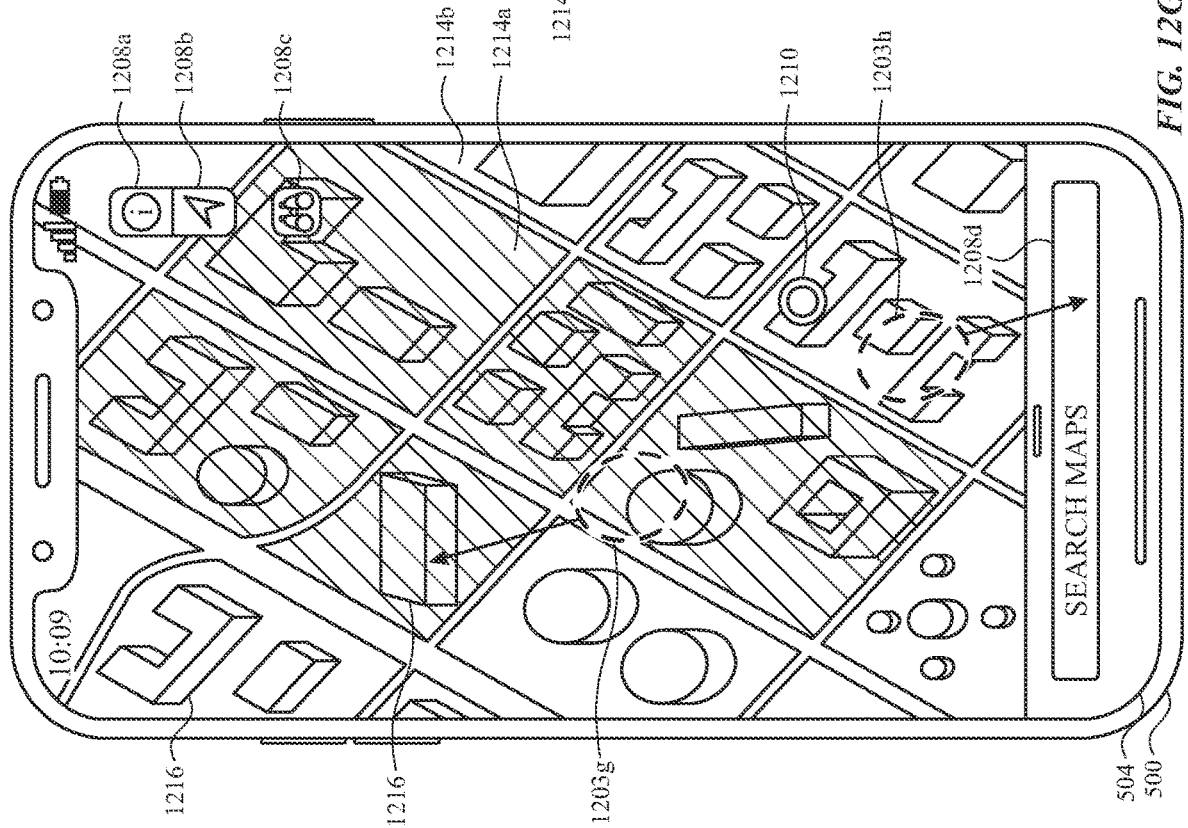

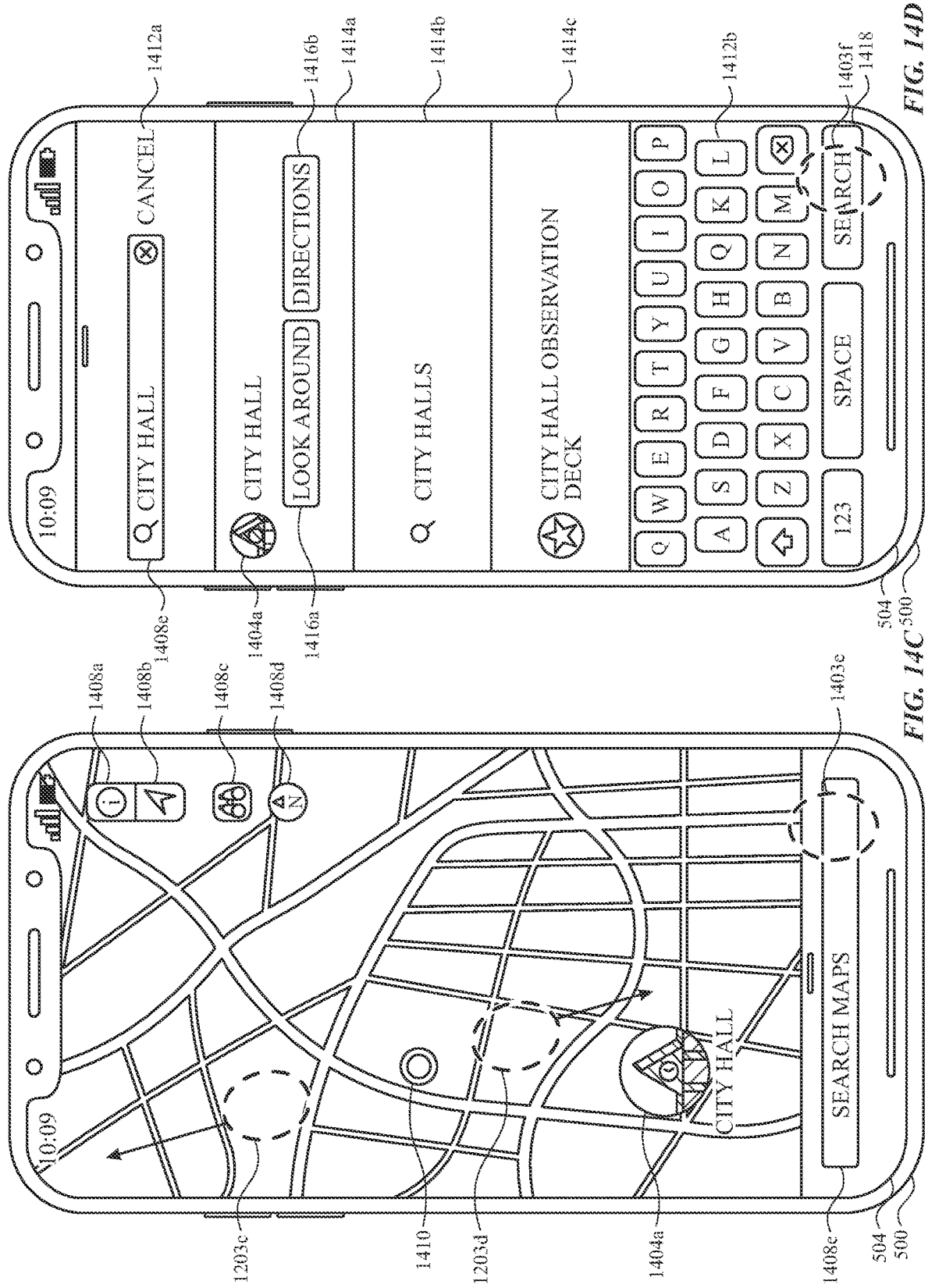

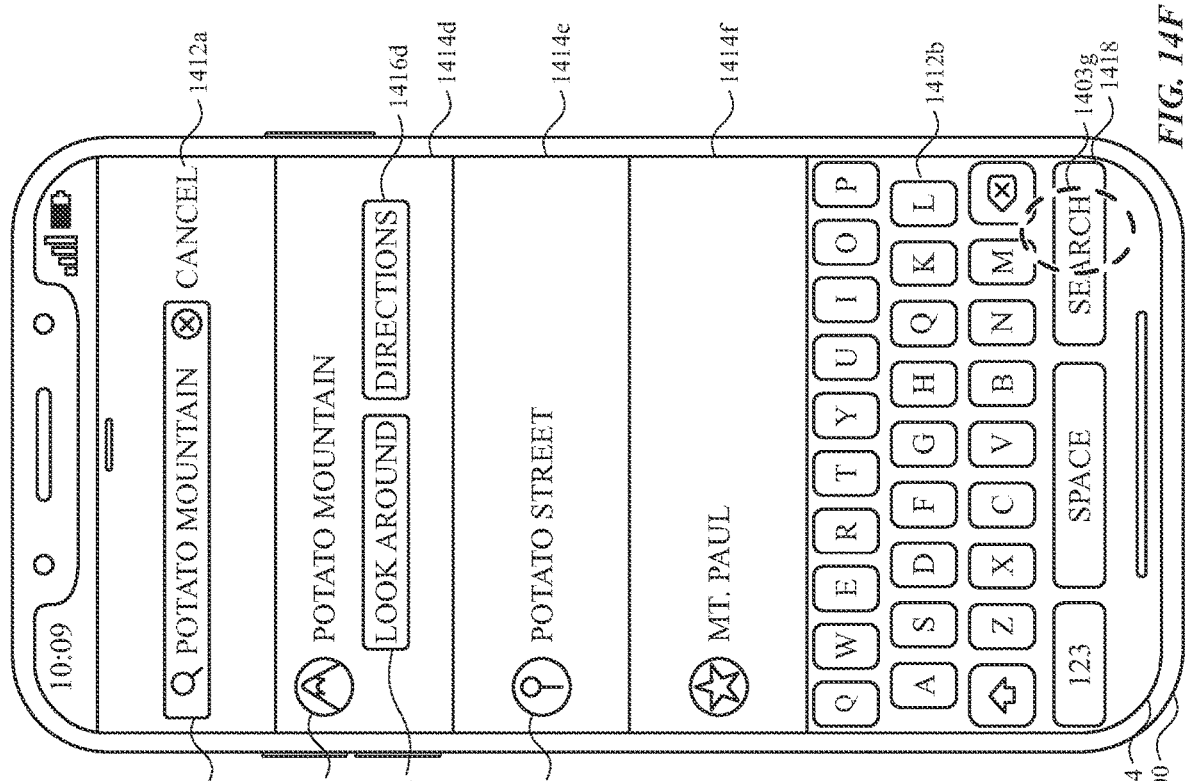
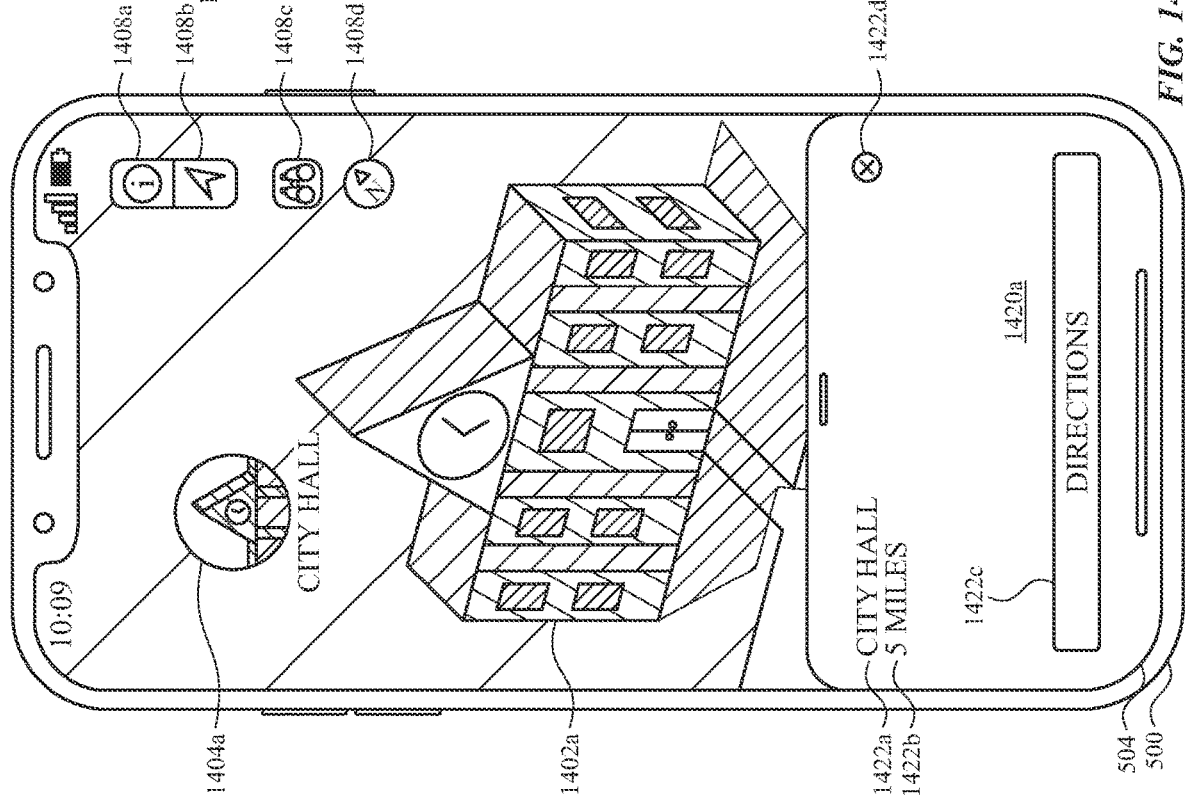

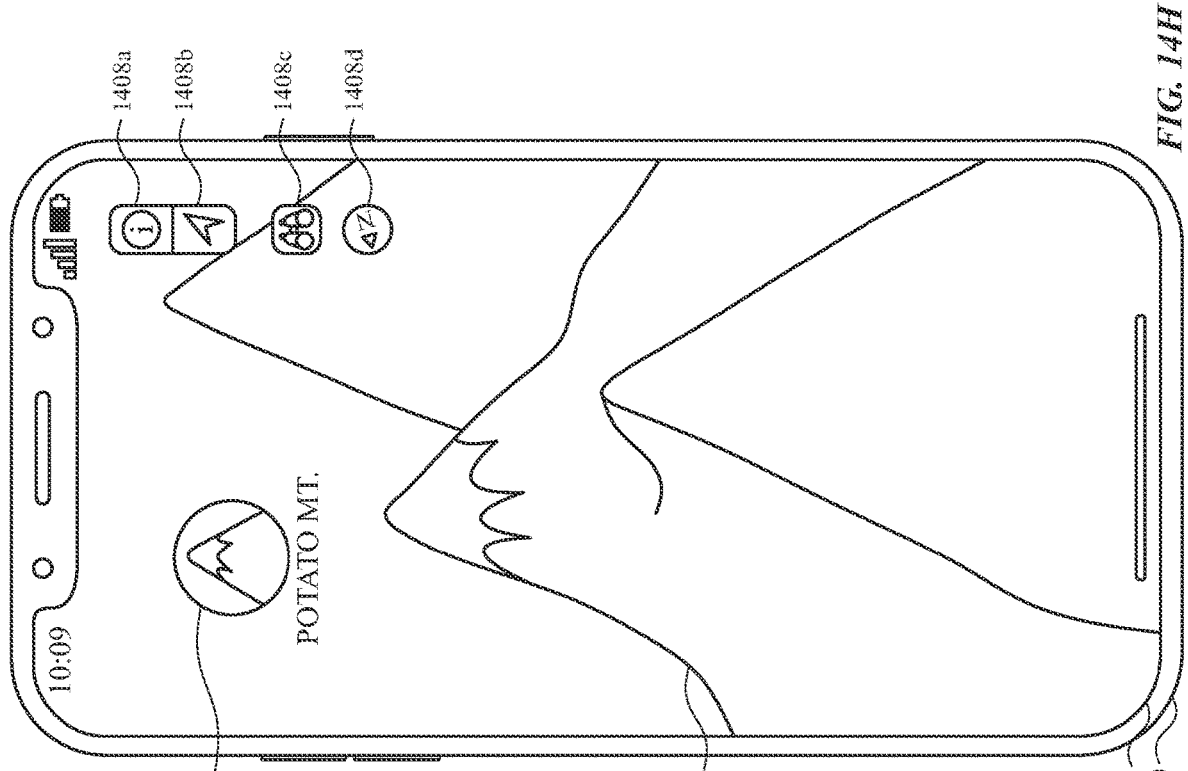
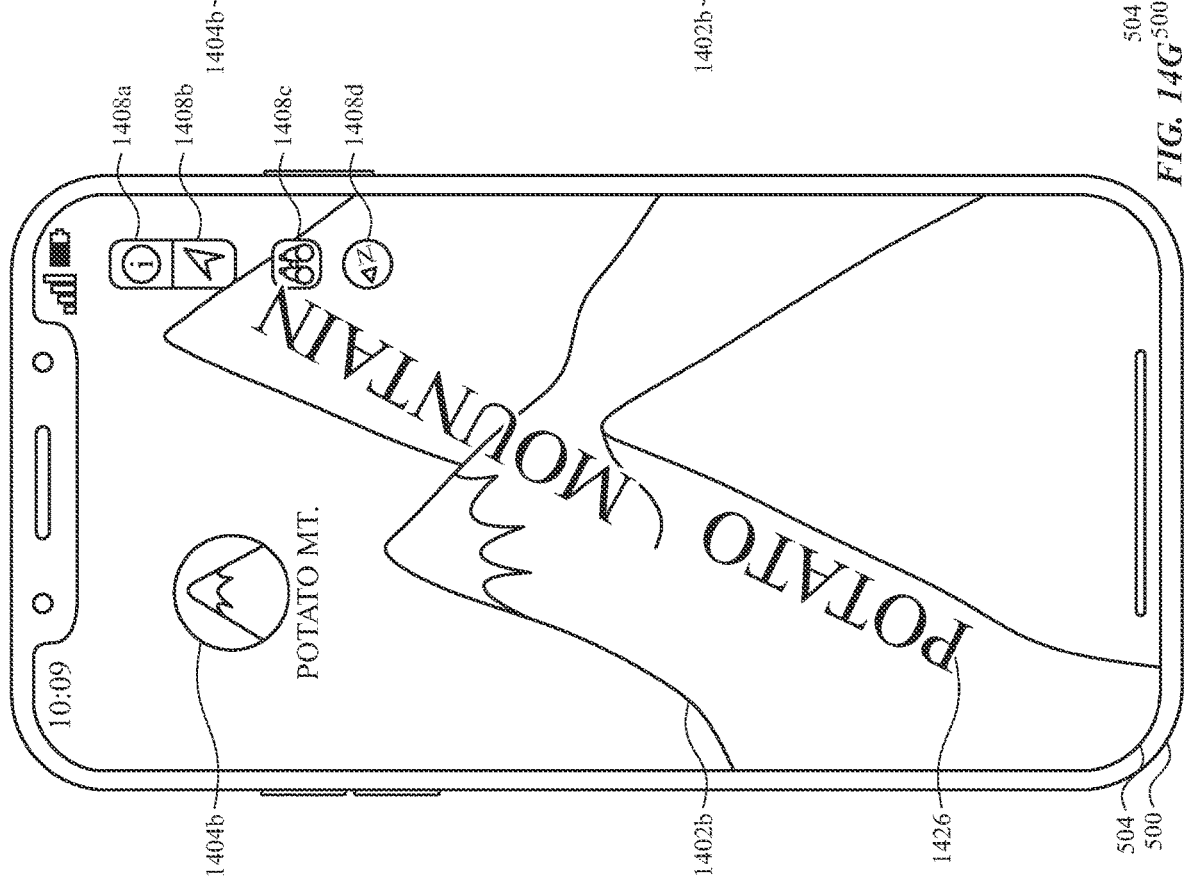

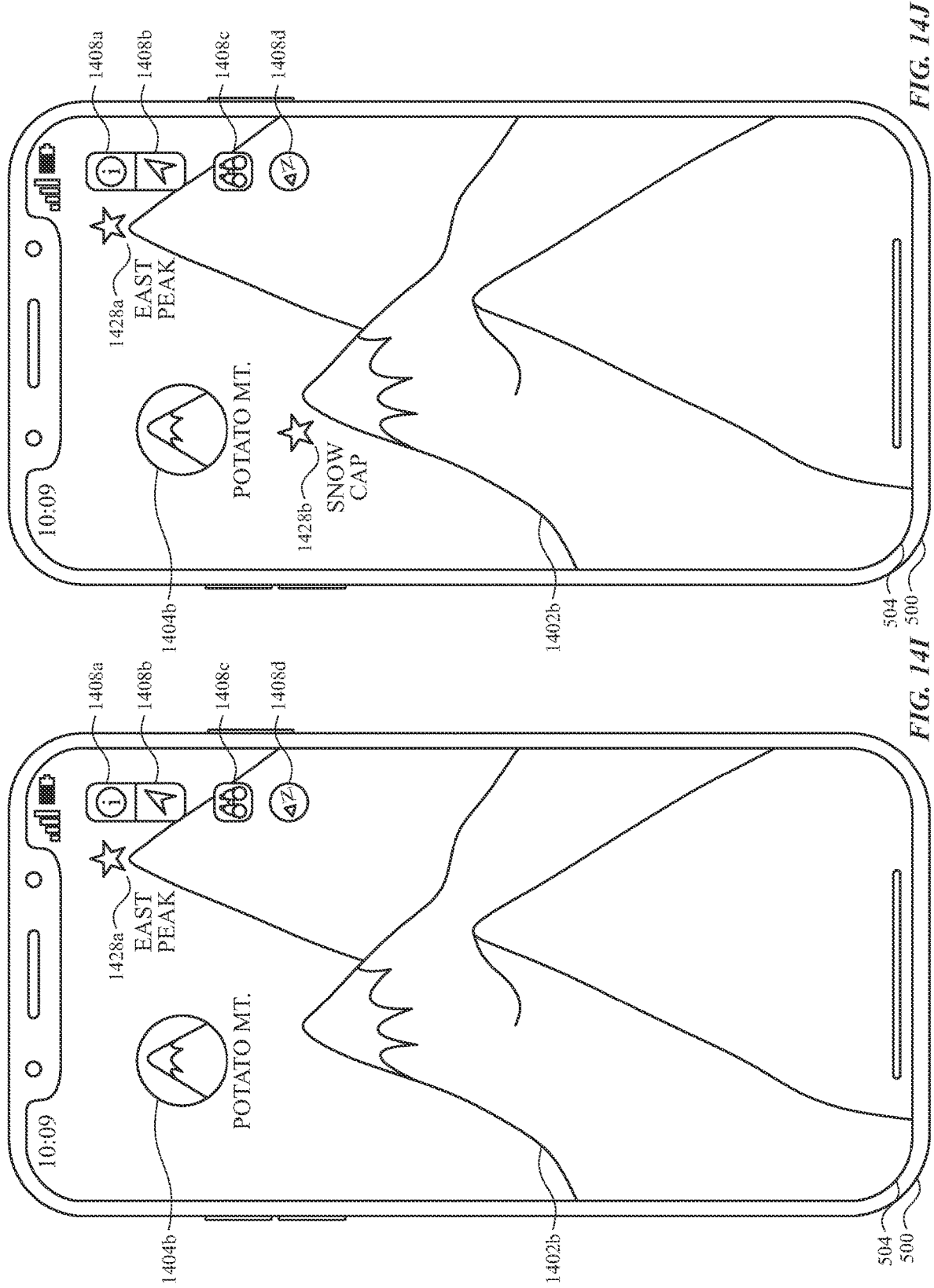

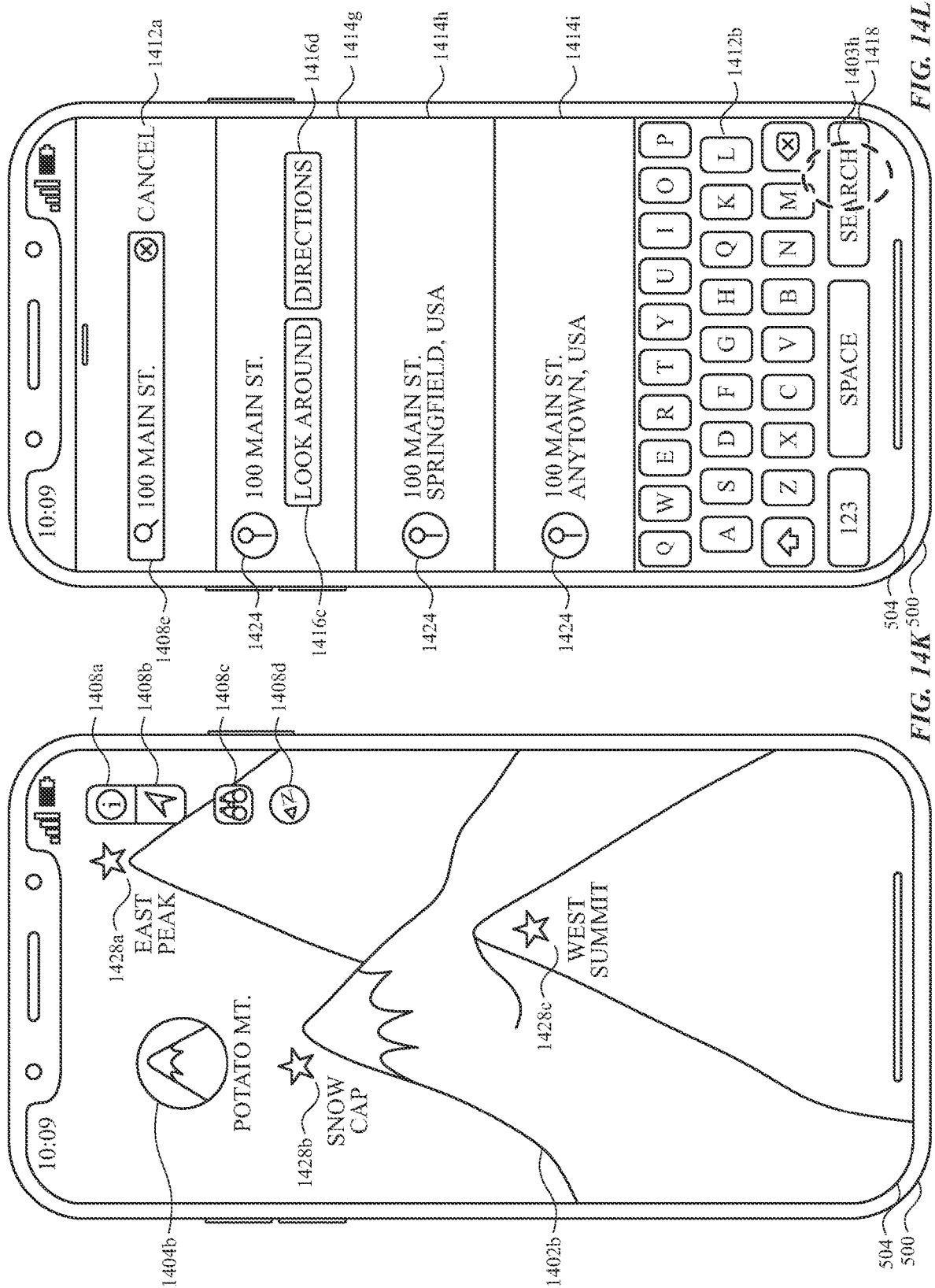

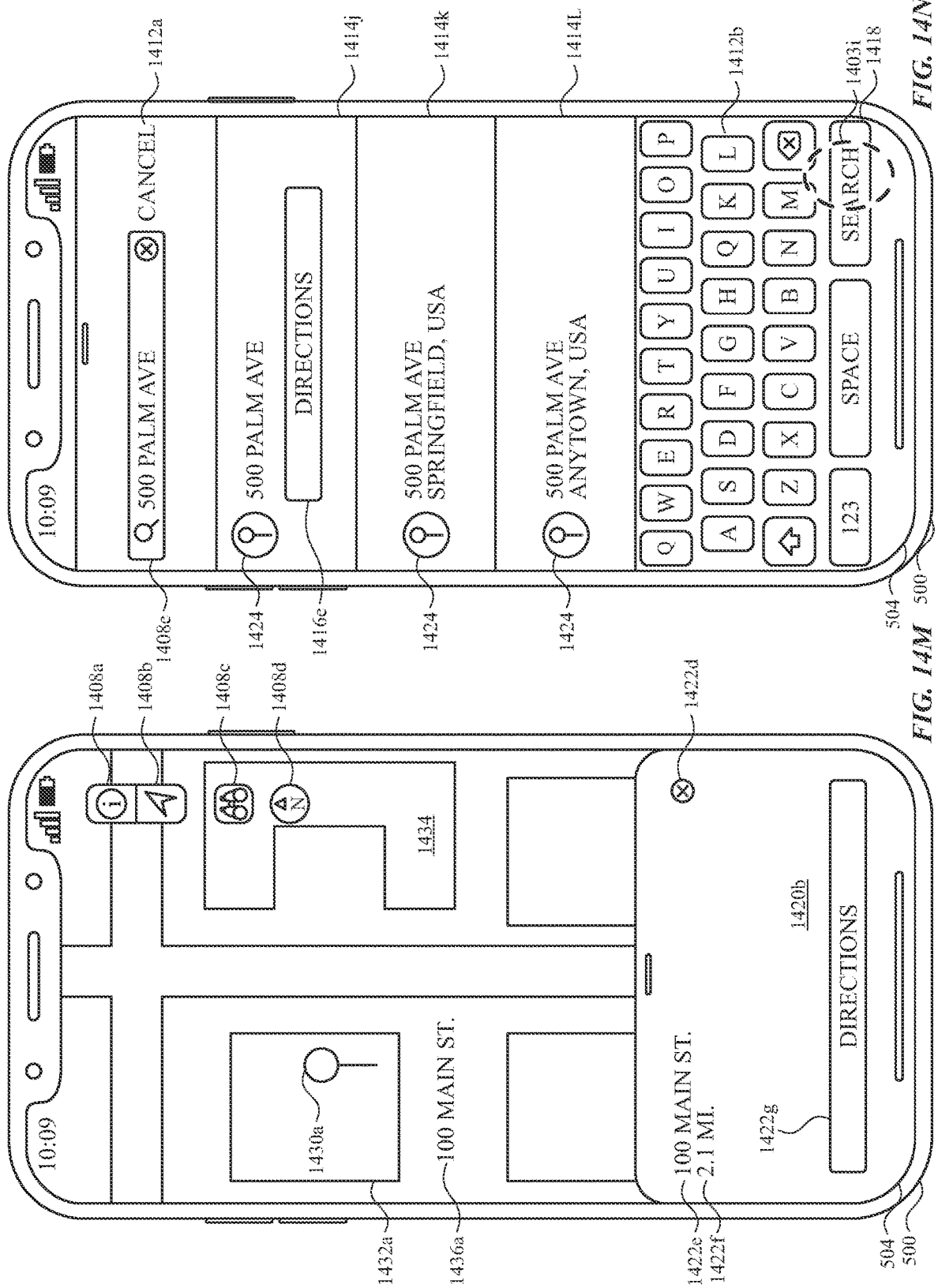

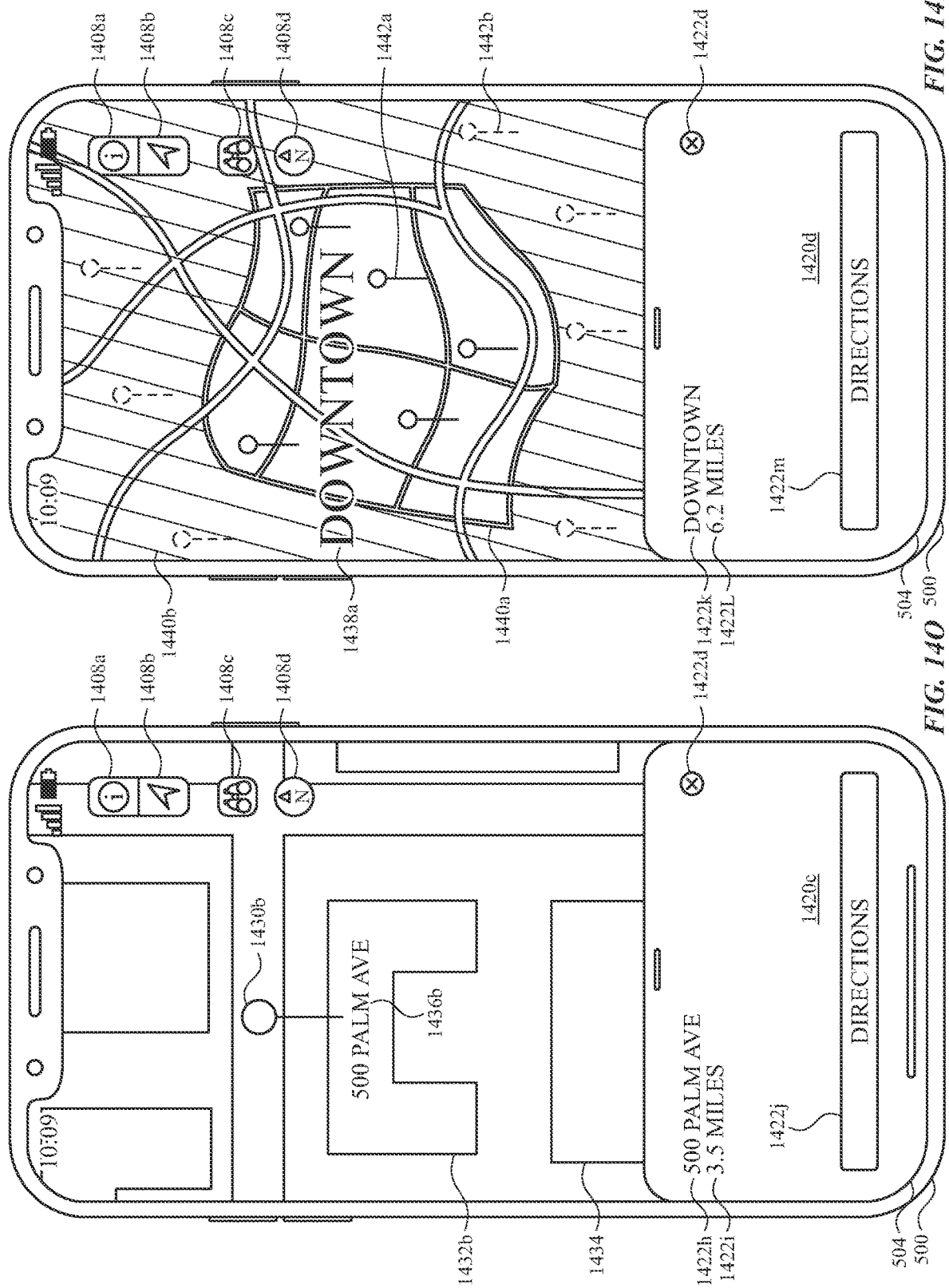

USER INTERFACES FOR MAPS AND NAVIGATION

CROSS-REFERENCE TO RELATED APPLICATIONS

This application claims the benefit of U.S. Provisional Application No. 63/197,587, filed Jun. 7, 2021, the content of which is incorporated herein by reference in its entirety for all purposes.

FIELD OF THE DISCLOSURE

This disclosure relates generally to user interfaces that enable a user to view maps, including maps that include navigation routes.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, an electronic device displays map user interfaces. In some circumstances, map user interfaces display suggested directions, routes, and/or representations of (e.g., physical) objects.

SUMMARY OF THE DISCLOSURE

Some embodiments described in this disclosure are directed to presenting navigation routes from various perspectives. Some embodiments described in this disclosure are directed to modifying display of representations of (e.g., physical) objects in the vicinity of a navigation route while presenting navigation directions. Some embodiments described in this disclosure are directed to modifying display of portions of a navigation route that are occluded by representations of (e.g., physical) objects in a map. Some embodiments described in this disclosure are directed to presenting representations of (e.g., physical) objects in maps. Some embodiments described in this disclosure are directed to presenting representations of (e.g., physical) objects in maps in response to requests to search for (e.g., physical) objects.

The embodiments described in this disclosure provide the user with the ability to view representations of navigation routes and (e.g., physical) objects on a map. Techniques described herein enhance the user's overall experience and interactions with the device. By modifying display of the representations of navigation routes and (e.g., physical) objects on the map in various situations, embodiments also decrease user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 8A-8H illustrate exemplary ways in which an electronic device modifies display of representations of (e.g., physical) objects in the vicinity of a navigation route while presenting navigation directions in accordance with some embodiments.

FIGS. 10A-10J illustrate exemplary ways in which an electronic device modifies display of portions of a navigation route that are occluded by representations of (e.g., physical) objects in a map in accordance with some embodiments.

FIGS. 12A-12H illustrate exemplary ways in which an electronic device presents representations of (e.g., physical) objects in maps in accordance with some embodiments.

objects in maps in response to requests to search for (e.g., physical) objects in accordance with some embodiments.

Figure 15:
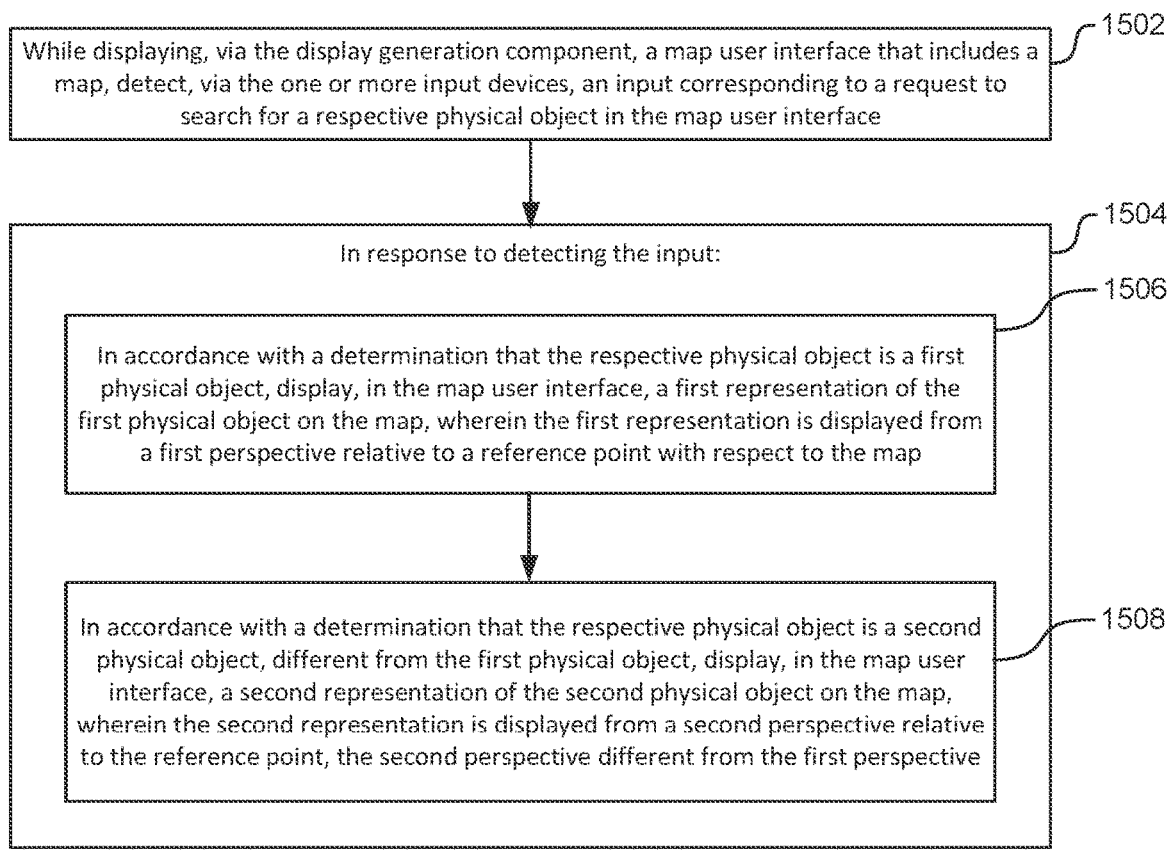

FIG. 15 is a flow diagram illustrating a method of presenting representations of (e.g., physical) objects in maps in response to requests to search for physical objects in accordance with some embodiments.

DETAILED DESCRIPTION

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient user interfaces and mechanisms for user interaction with maps. In some implementations, an electronic device presents navigation routes from various perspectives. In some implementations, an electronic device modifies display of representations of (e.g., physical) objects in the vicinity of a navigation route while presenting navigation directions. In some implementations, an electronic device modifies display of portions of a navigation route that are occluded by representations of (e.g., physical) objects in a map. In some implementations, an electronic device presents representations of (e.g., physical) objects in maps. In some implementations, an electronic device presents representations of (e.g., physical) objects in maps in response to requests to search for (e.g., physical) objects. Such techniques can reduce the cognitive burden on a user who uses such devices while presenting navigation routes and representations of (e.g., physical) objects in a maps user interface. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In some embodiments, device 100 is a portable computing system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., an integrated display, touch screen 112, etc.). In some embodiments, the display generation component is separate from the computer system (e.g., an external monitor, a projection system, etc.). As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
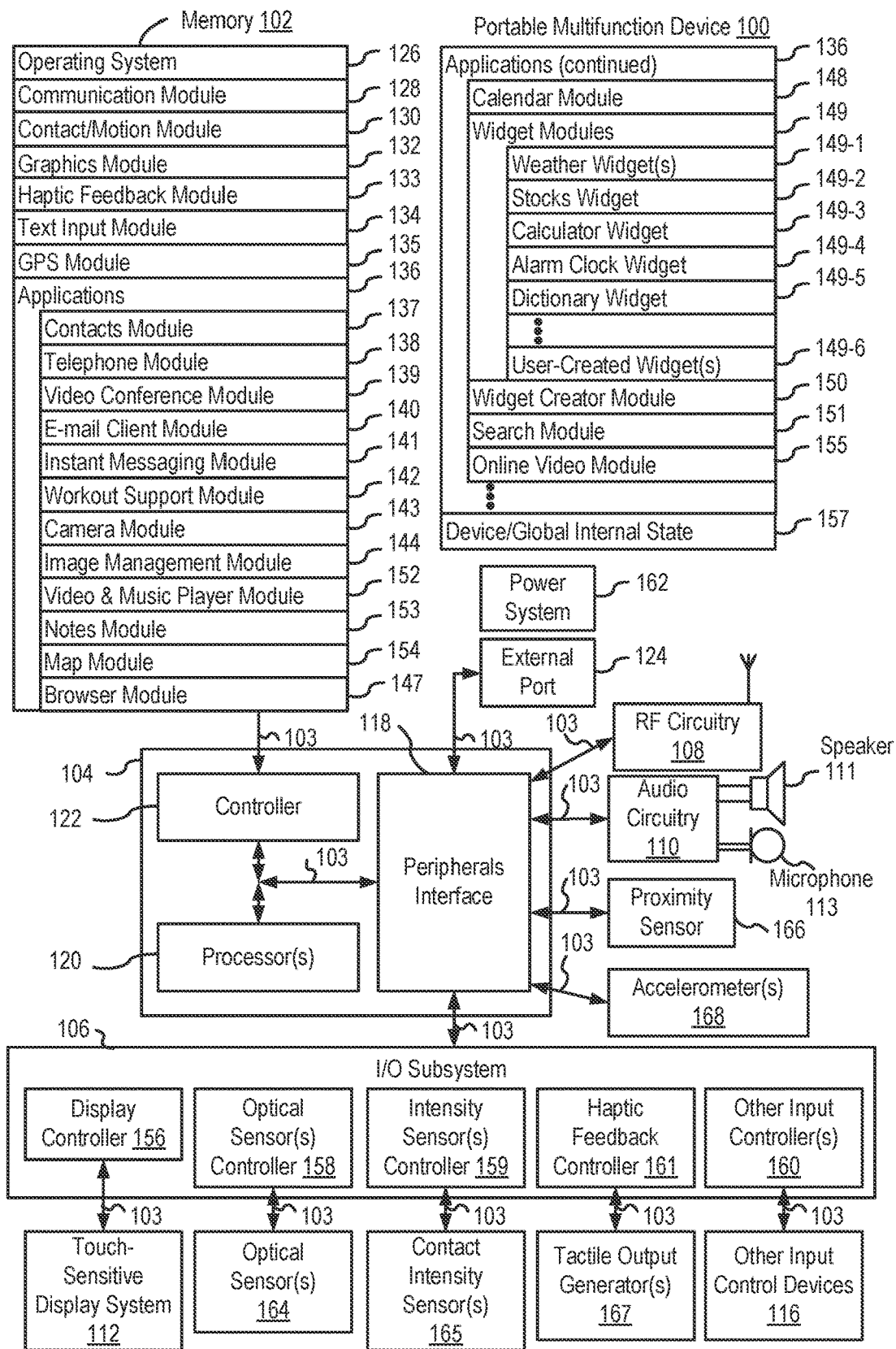
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No.

6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
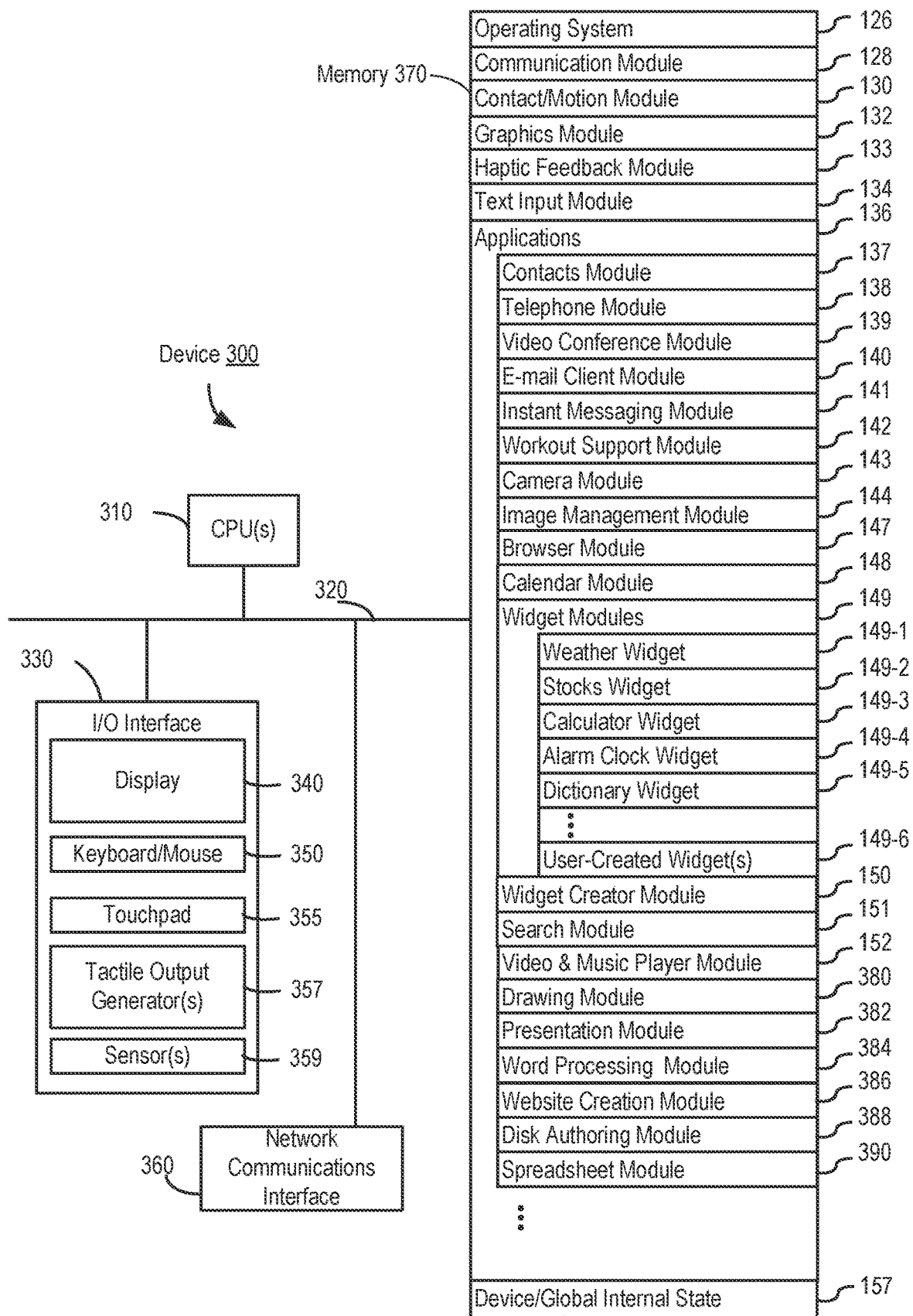
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone module 138 for use in location-based dialing; to camera module 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
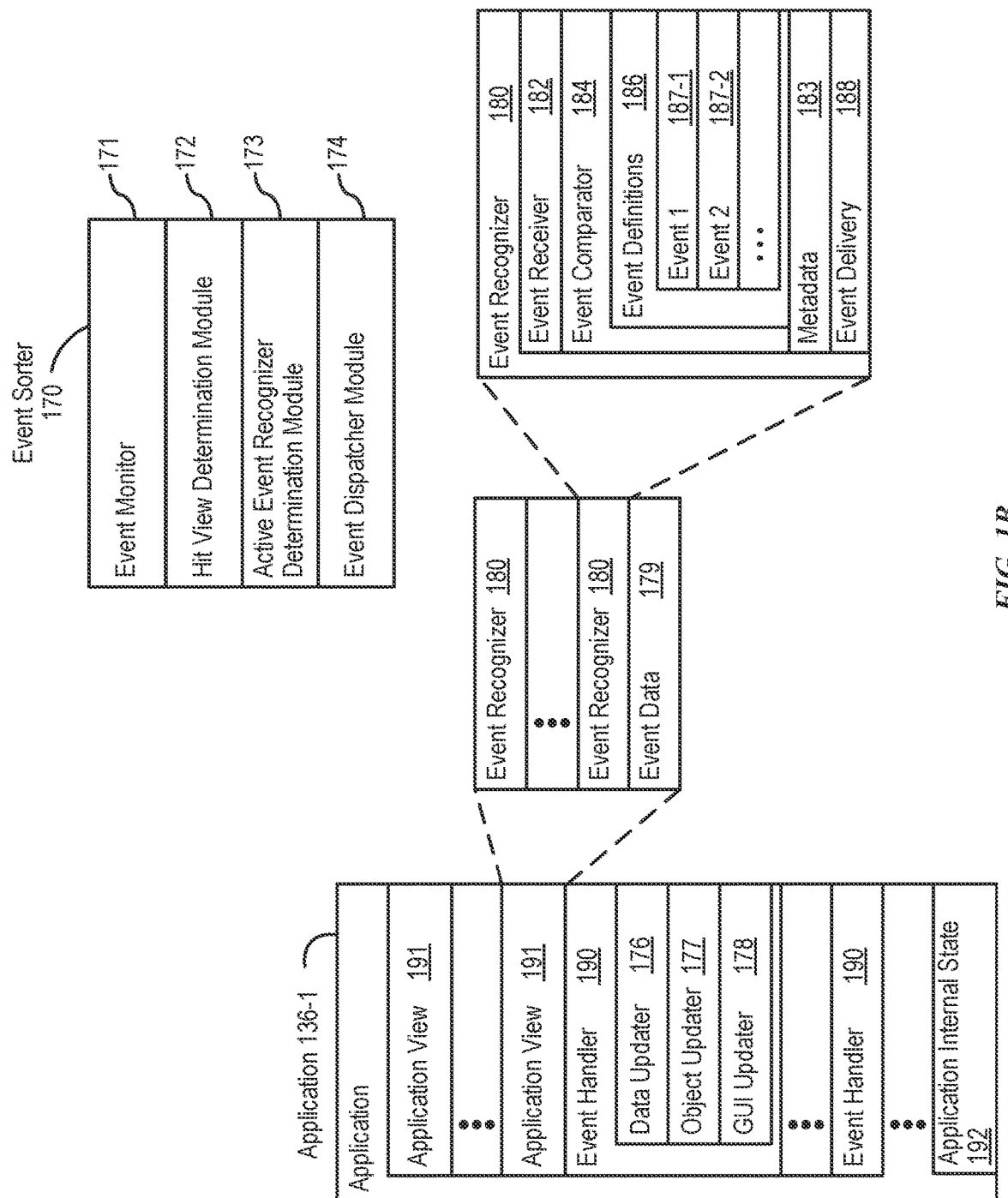
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG.

1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
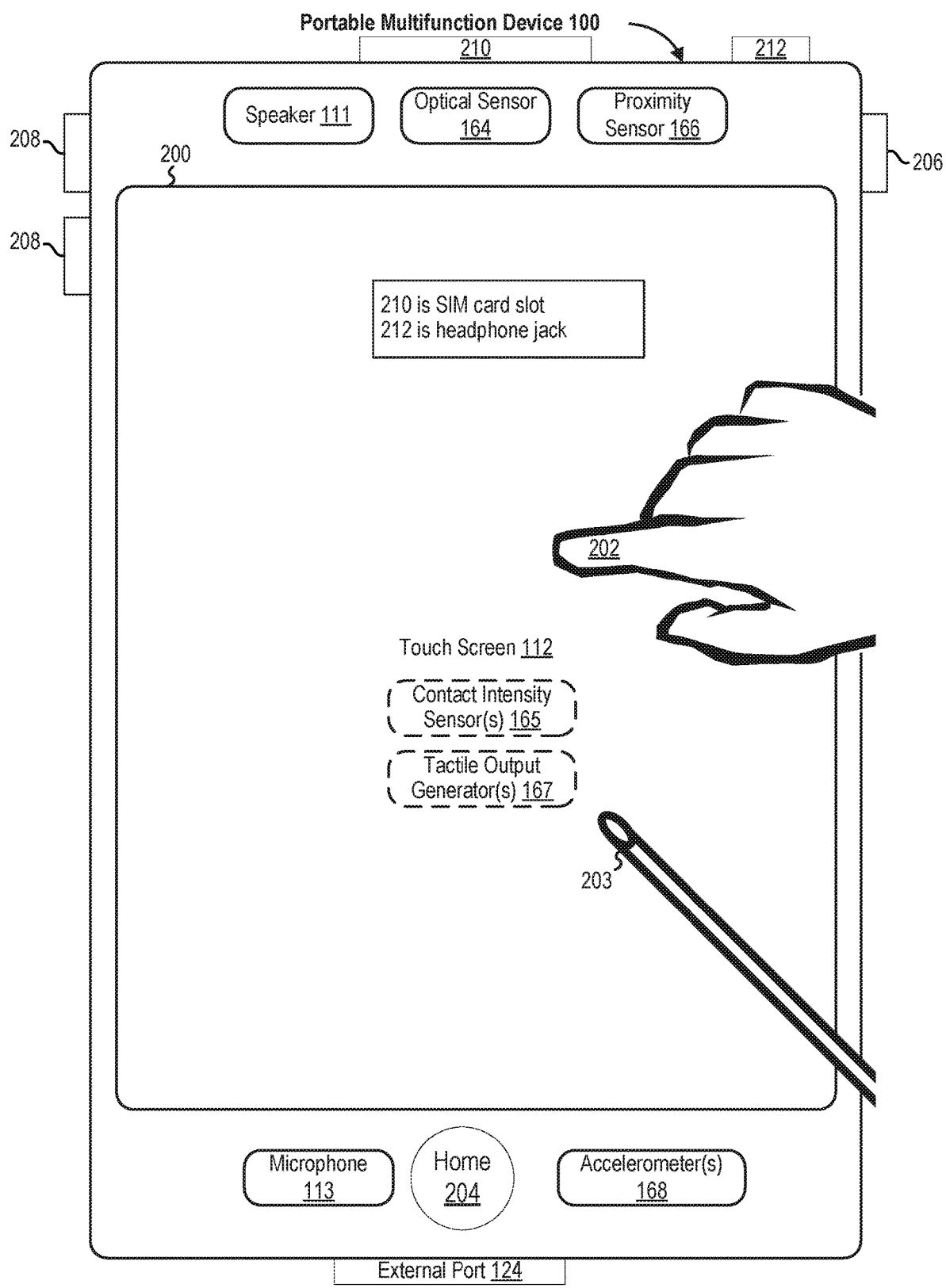
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

In some embodiments, stylus 203 is an active device and includes one or more electronic circuitry. For example, stylus 203 includes one or more sensors, and one or more communication circuitry (such as communication module 128 and/or RF circuitry 108). In some embodiments, stylus 203 includes one or more processors and power systems (e.g., similar to power system 162). In some embodiments, stylus 203 includes an accelerometer (such as accelerometer 168), magnetometer, and/or gyroscope that is able to determine the position, angle, location, and/or other physical characteristics of stylus 203 (e.g., such as whether the stylus is placed down, angled toward or away from a device, and/or near or far from a device). In some embodiments, stylus 203 is in communication with an electronic device (e.g., via communication circuitry, over a wireless communication protocol such as Bluetooth) and transmits sensor data to the electronic device. In some embodiments, stylus 203 is able to determine (e.g., via the accelerometer or other sensors) whether the user is holding the device. In some embodiments, stylus 203 can accept tap inputs (e.g., single tap or double tap) on stylus 203 (e.g., received by the accelerometer or other sensors) from the user and interpret the input as a command or request to perform a function or change to a different input mode.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
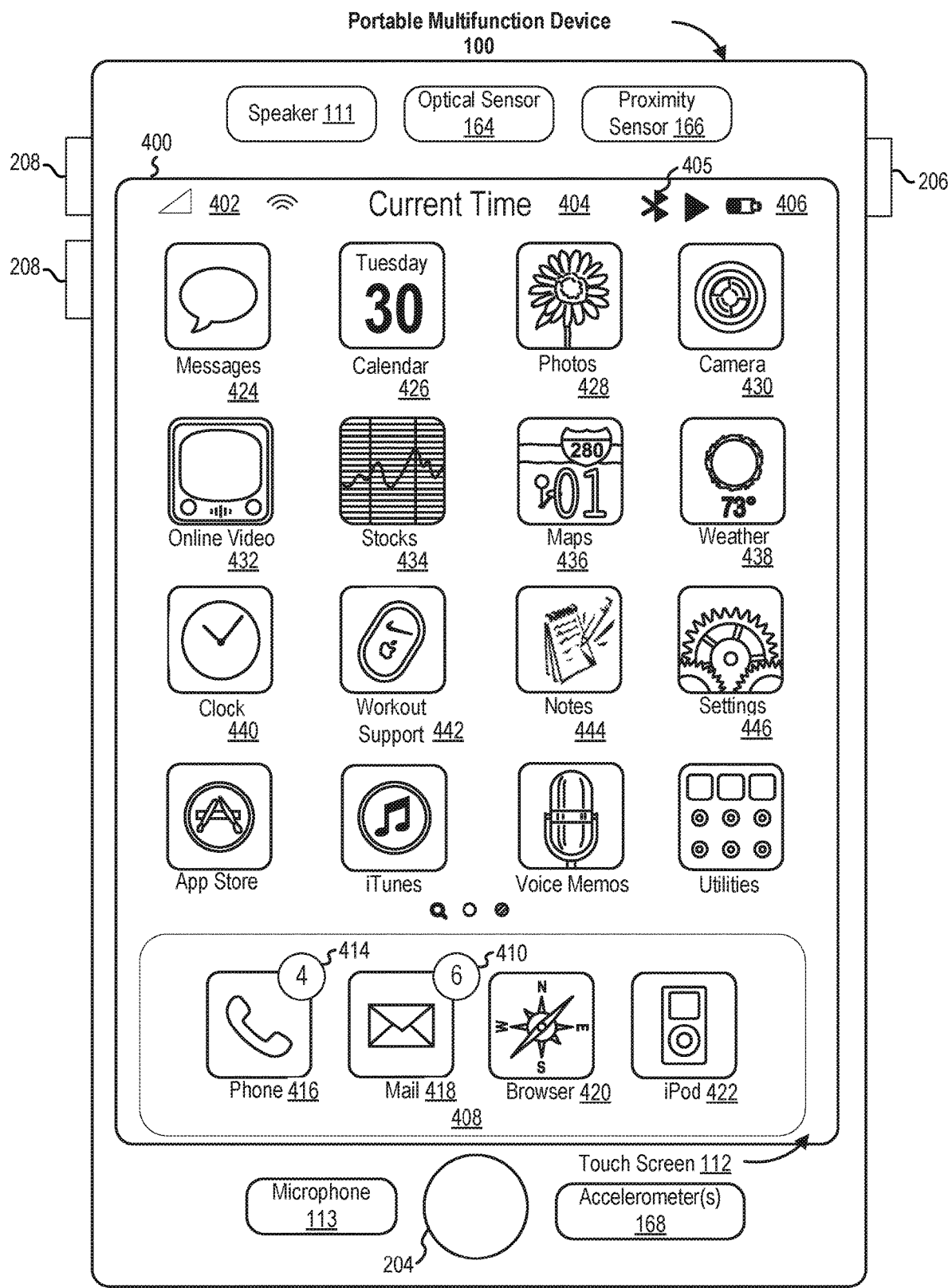
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;

Time 404;

Bluetooth indicator 405;

Battery status indicator 406;

Tray 408 with icons for frequently used applications, such as:

- Icon 416 for telephone module 138, labeled "Phone," which optionally includes an indicator 414 of the number of missed calls or voicemail messages;
- Icon 418 for e-mail client module 140, labeled "Mail," which optionally includes an indicator 410 of the number of unread e-mails;
- Icon 420 for browser module 147, labeled "Browser;" and
- Icon 422 for video and music player module 152, also referred to as iPod (trademark of Apple Inc.) module 152, labeled "iPod;" and Icons for other applications, such as:

- Icon 424 for IM module 141, labeled "Messages;"
- Icon 426 for calendar module 148, labeled "Calendar;"
- Icon 428 for image management module 144, labeled "Photos;"
- Icon 430 for camera module 143, labeled "Camera;"
- Icon 432 for online video module 155, labeled "Online Video;"
- Icon 434 for stocks widget 149-2, labeled "Stocks;"
- Icon 436 for map module 154, labeled "Maps;"
- Icon 438 for weather widget 149-1, labeled "Weather;"
- Icon 440 for alarm clock widget 149-4, labeled "Clock;"
- Icon 442 for workout support module 142, labeled "Workout Support;"
- Icon 444 for notes module 153, labeled "Notes;" and
- Icon 446 for a settings application or module, labeled "Settings," which provides access to settings for device 100 and its various applications 136

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
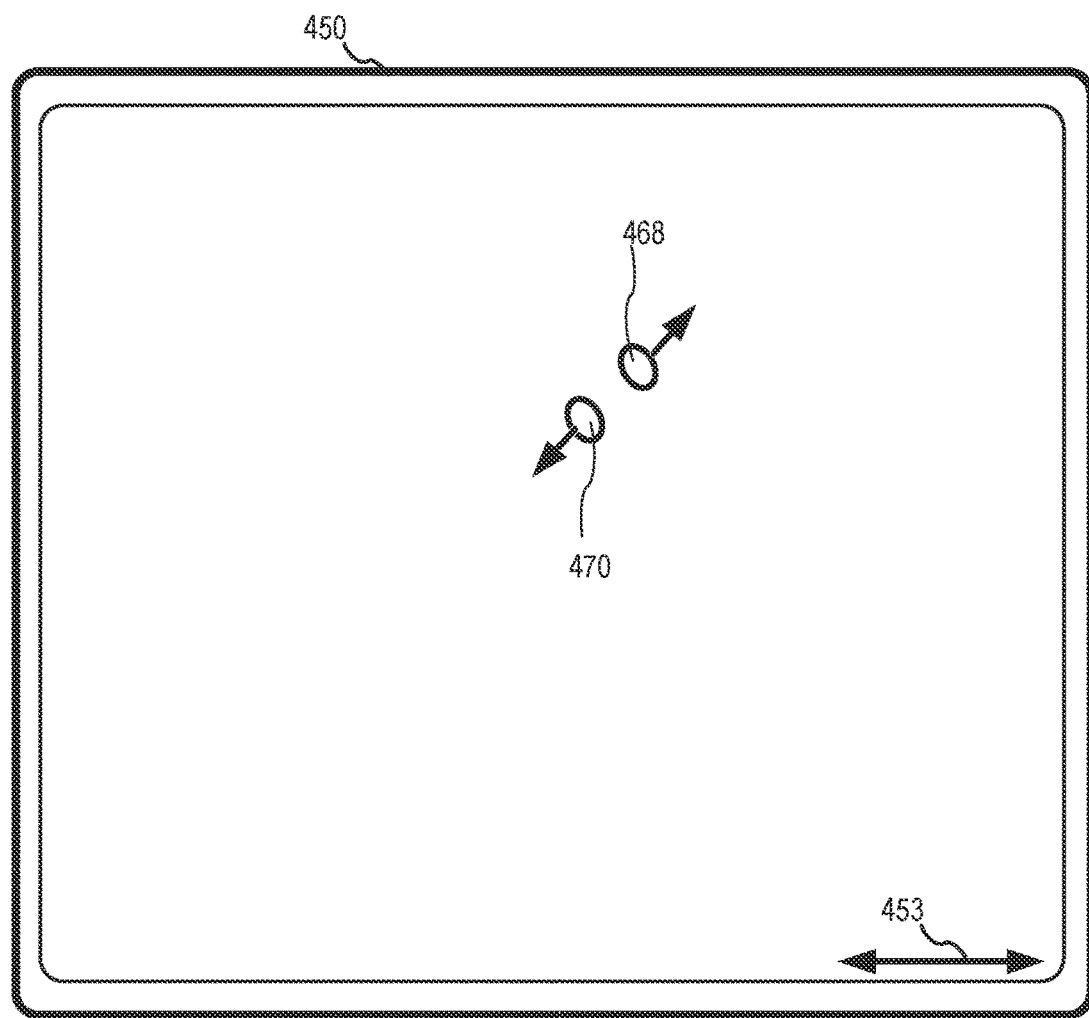
FIG. 4B illustrates an exemplary user interface for a multifunction device with a touch-sensitive surface that is separate from the display in accordance with some embodiments.
Figure 4B:
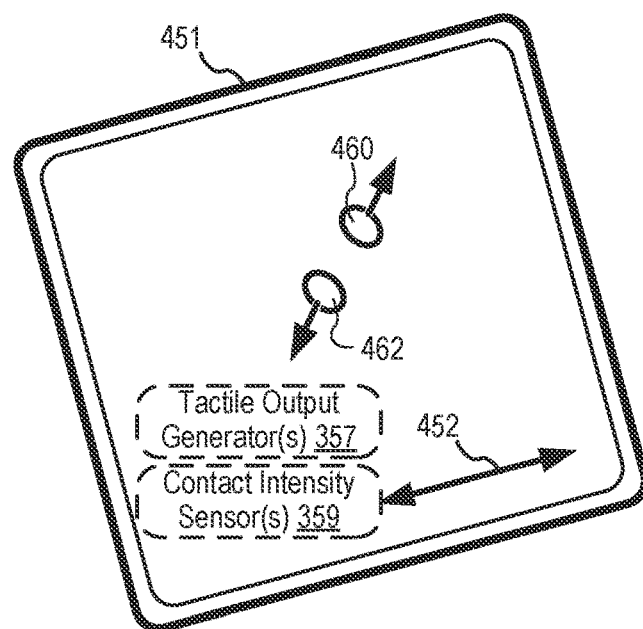

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
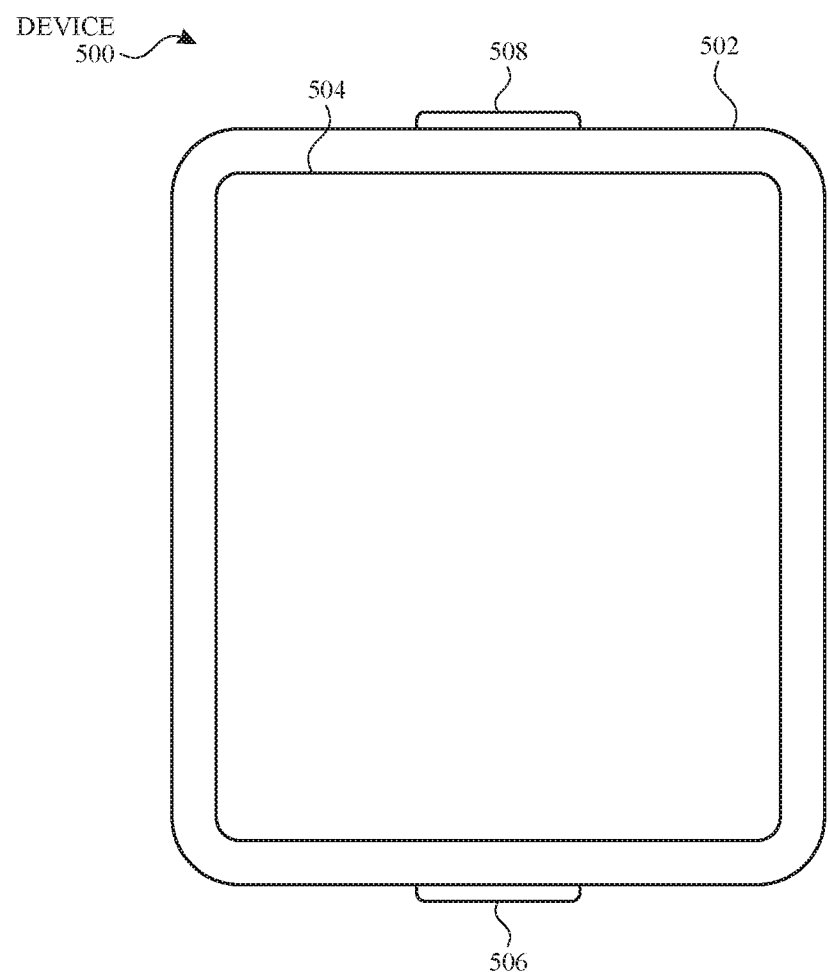
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
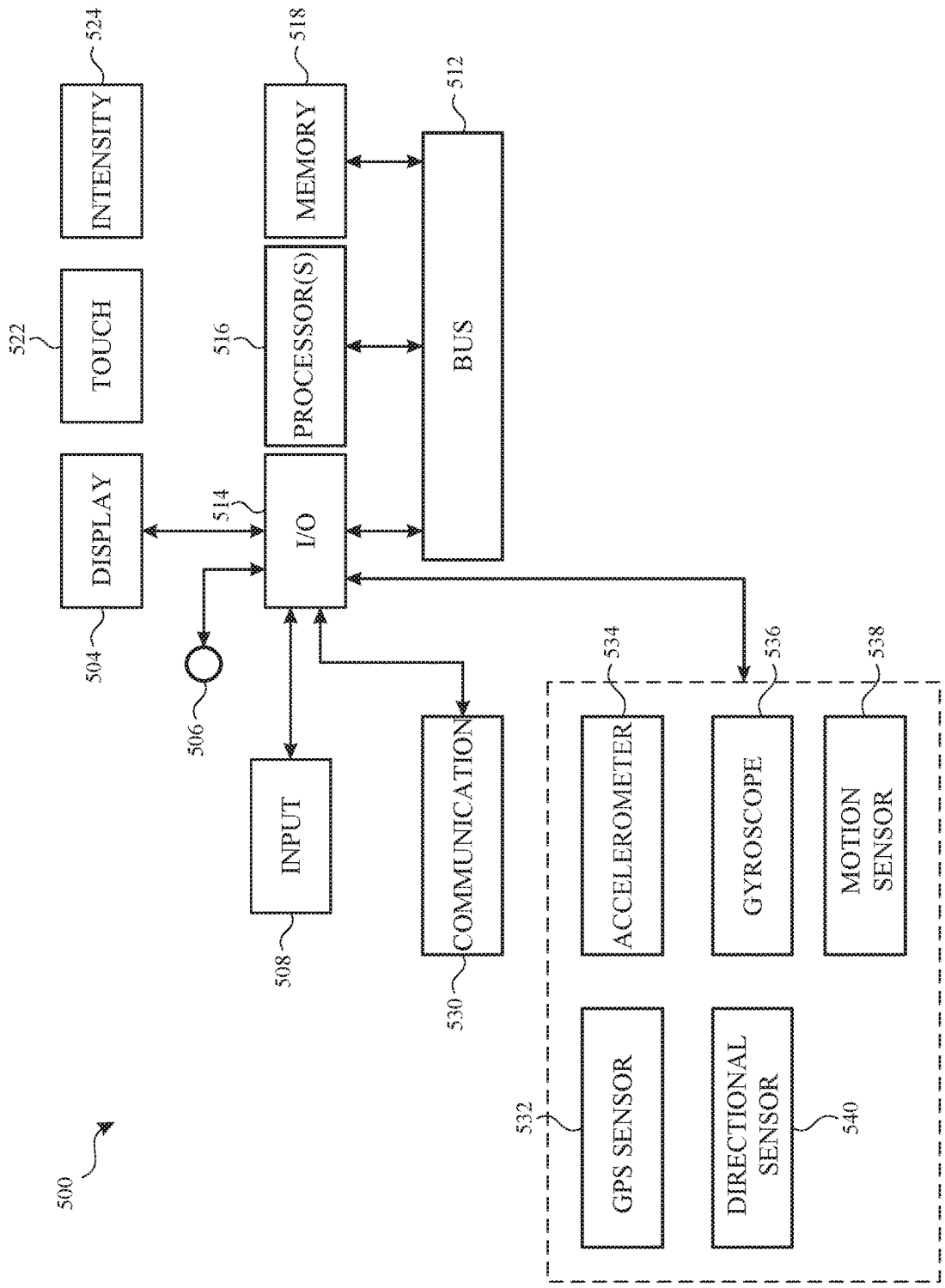
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700, 900, 1100, 1300, and 1500 (FIGS. 7, 9, 11, 13, and 15). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
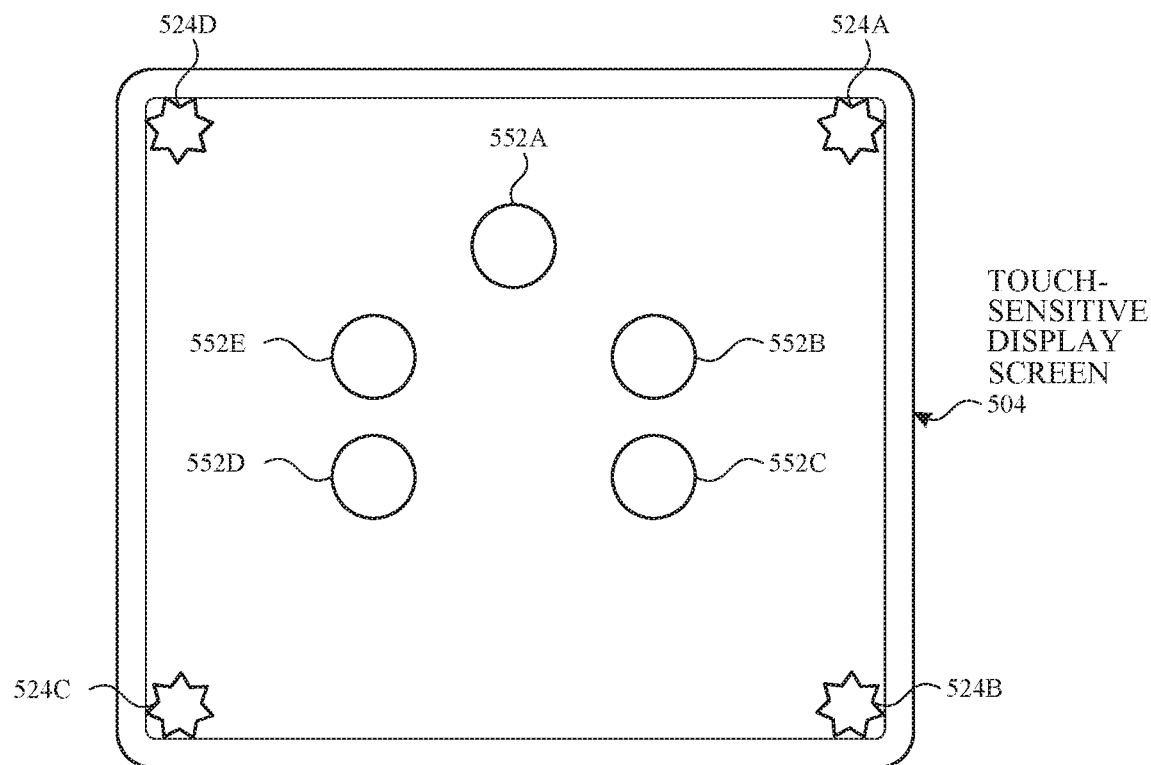
FIGS. 5C-5D illustrate exemplary components of a personal electronic device having a touch-sensitive display and intensity sensors in accordance with some embodiments.
Figure 5C:
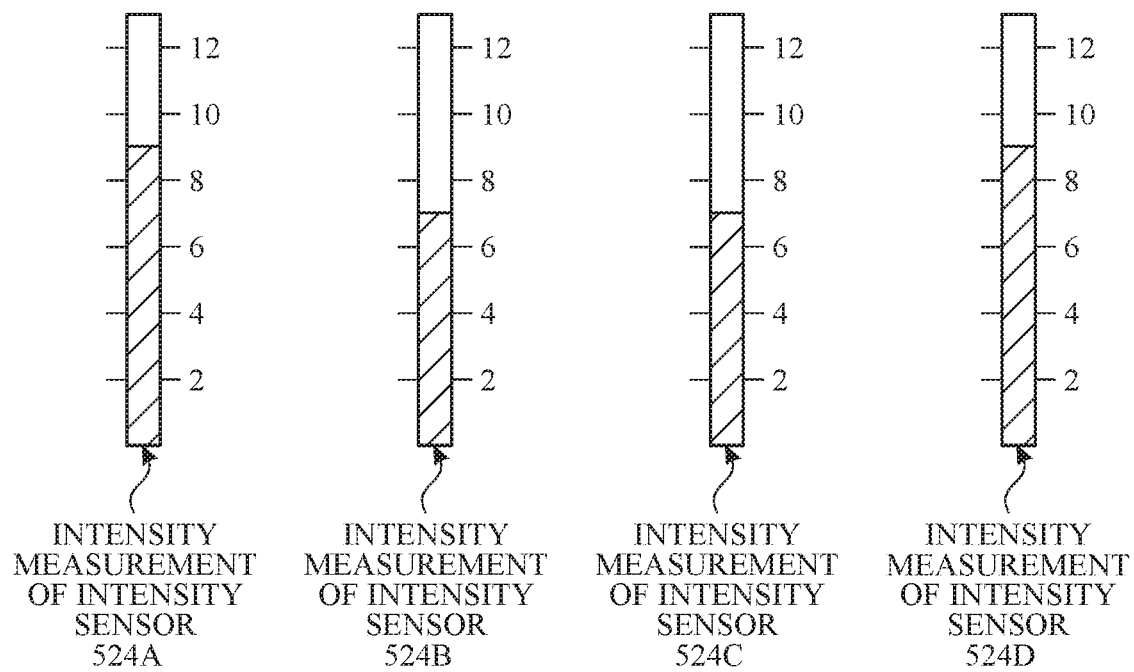
Figure 5D:
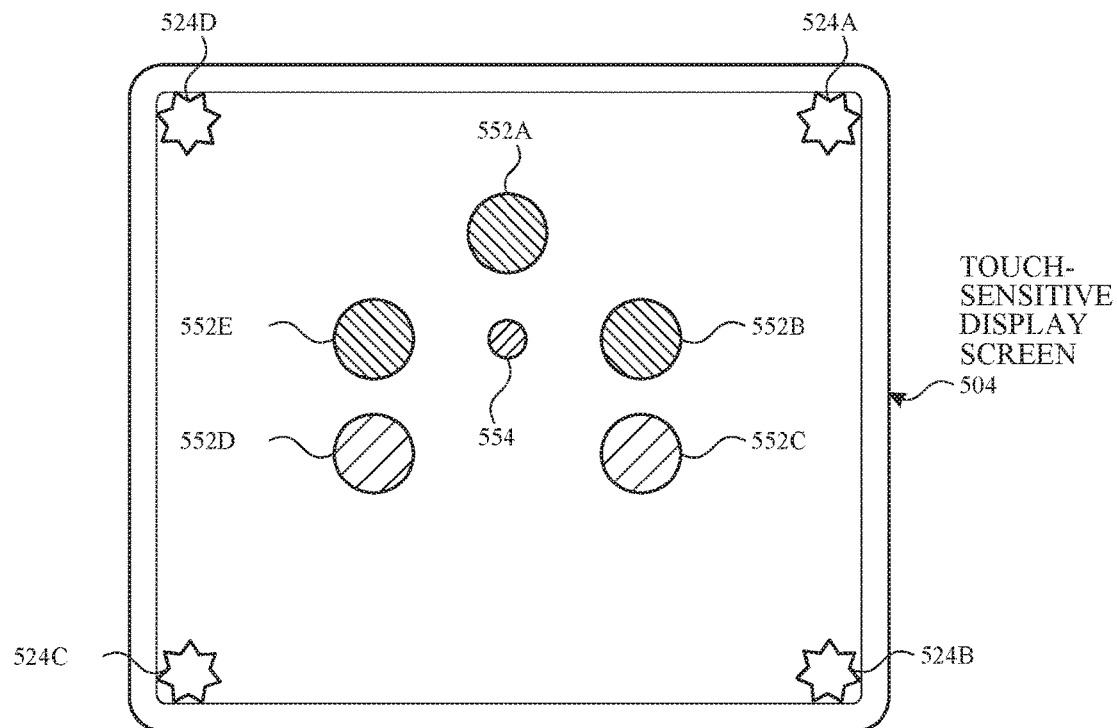
Figure 5D:
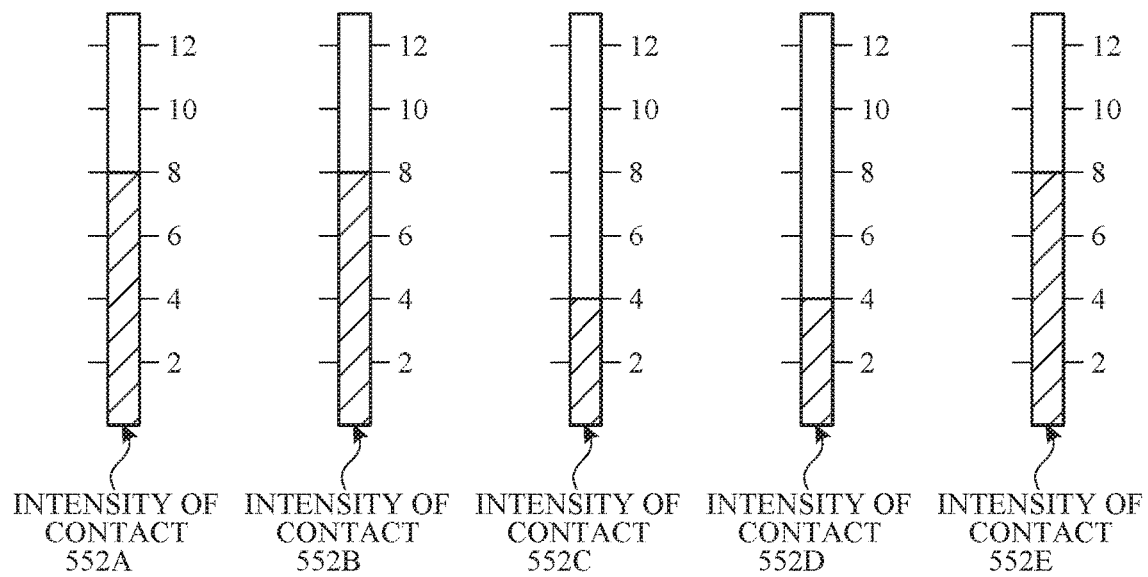

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
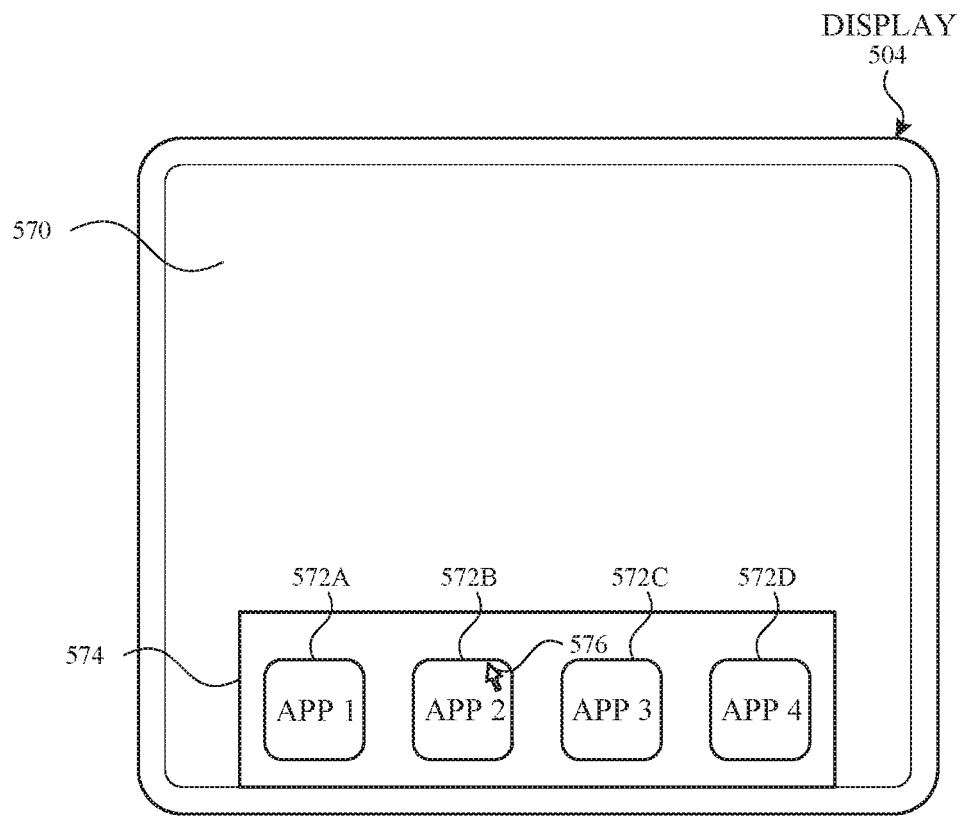
FIGS. 5E-5H illustrate exemplary components and user interfaces of a personal electronic device in accordance with some embodiments.
Figure 5E:
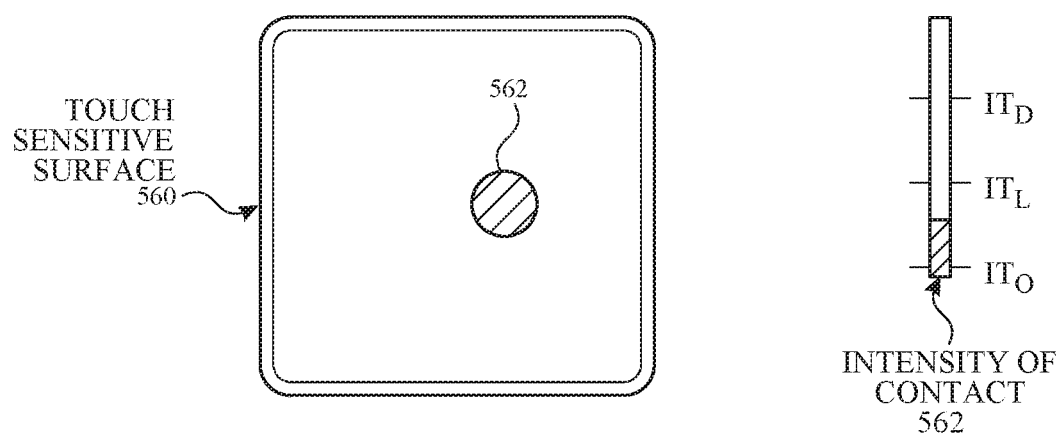
Figure 5F:
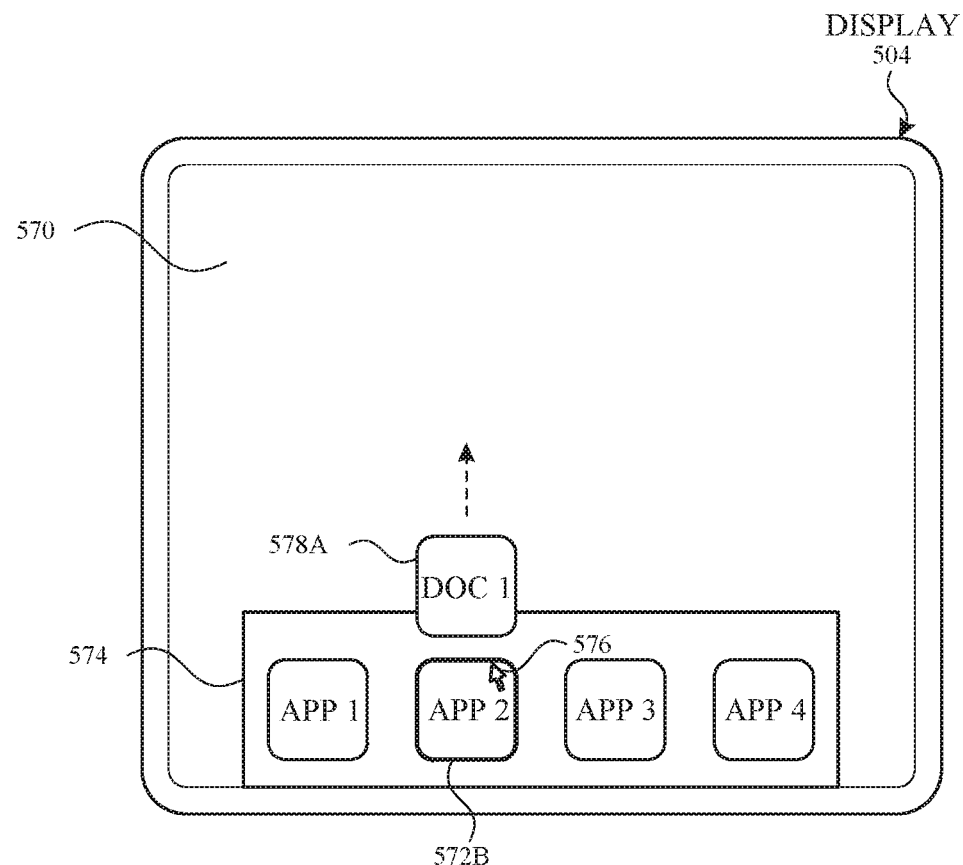
Figure 5F:
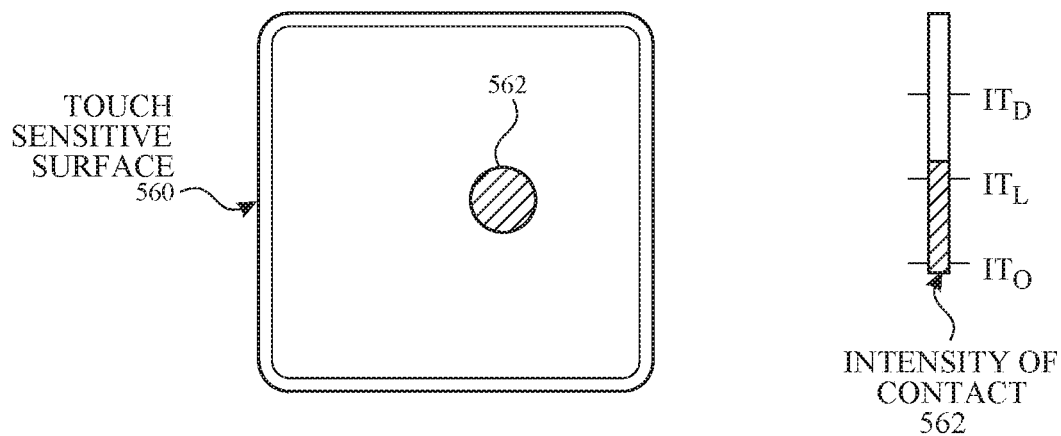
Figure 5G:
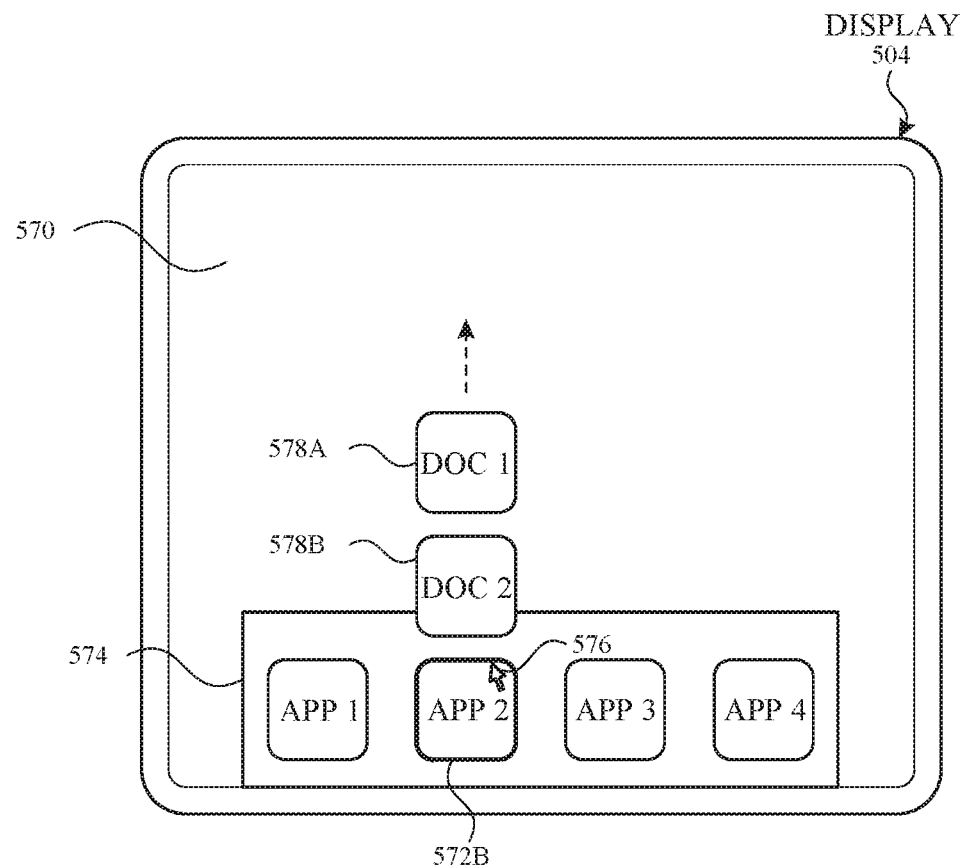
Figure 5G:
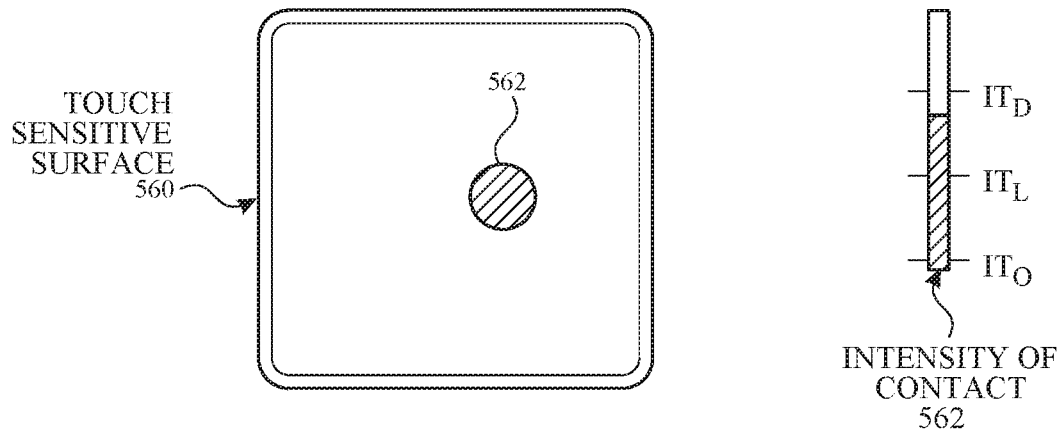
Figure 5H:
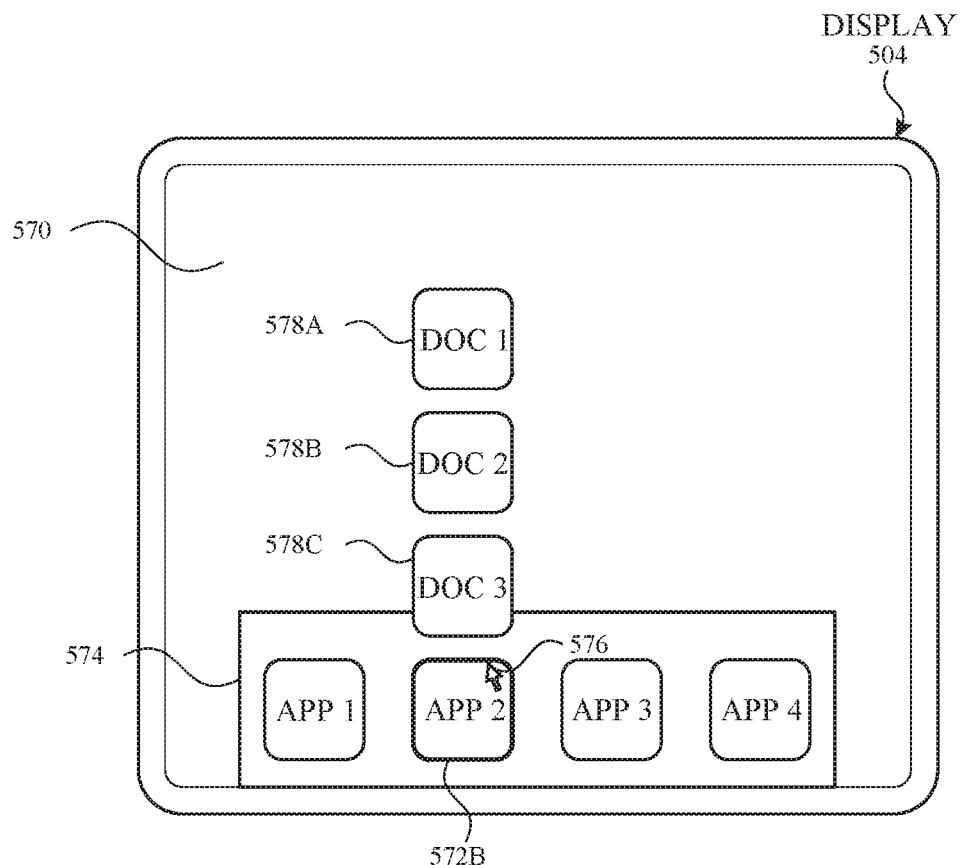
Figure 5H:
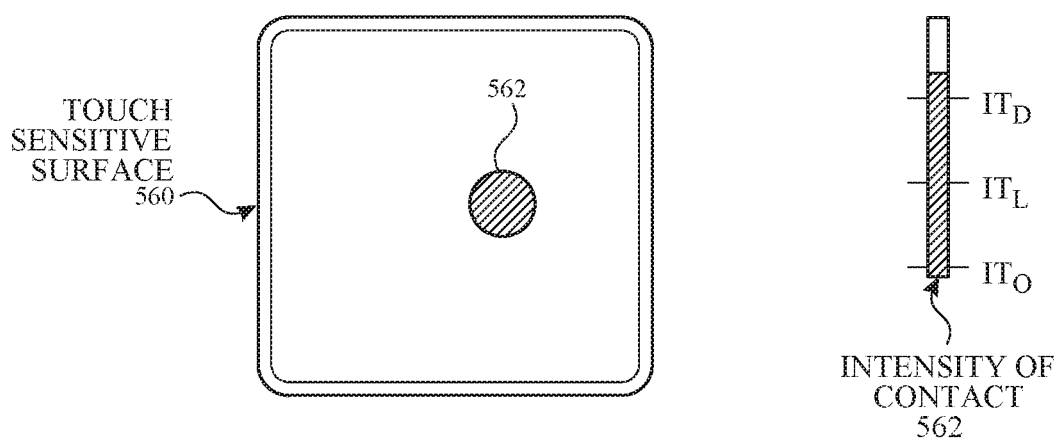

FIGS. 5E-5H illustrate detection of a gesture that includes a press input that corresponds to an increase in intensity of a contact 562 from an intensity below a light press intensity threshold (e.g., "ITL") in FIG. 5E, to an intensity above a deep press intensity threshold (e.g., "ITD") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "ITD"). Contact 562 is maintained on touch-sensitive surface 560. In response to the detection of the gesture, and in accordance with contact 562 having an intensity that goes above the deep press intensity threshold (e.g., "ITD") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITD"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

Attention is now directed towards embodiments of user interfaces ("UI") and associated processes that are implemented on an electronic device, such as device 100, device 300, or device 500.

User Interfaces and Associated Processes
User Interfaces for Presenting Navigation Maneuvers Users interact with electronic devices in many different manners, including using electronic devices to present navigation directions from a first physical location to a second physical location. In some embodiments, presenting the navigation directions includes presenting a representation of the route line and one or more representations of physical objects in the physical vicinity of the route line. The embodiments described below provide ways in which an electronic device presents the representation of the route line from different perspectives depending on the navigation maneuver currently being depicted. Providing efficient manners of presenting navigation directions from different perspectives enhances interactions with a device, thus reducing the amount of time a user needs to interact with the device while navigating, which increases battery life for battery-powered devices and improves safety (e.g., while driving). It is understood that people use devices. When a person uses a device, that person is optionally referred to as a user of the device.

Figure 6A:
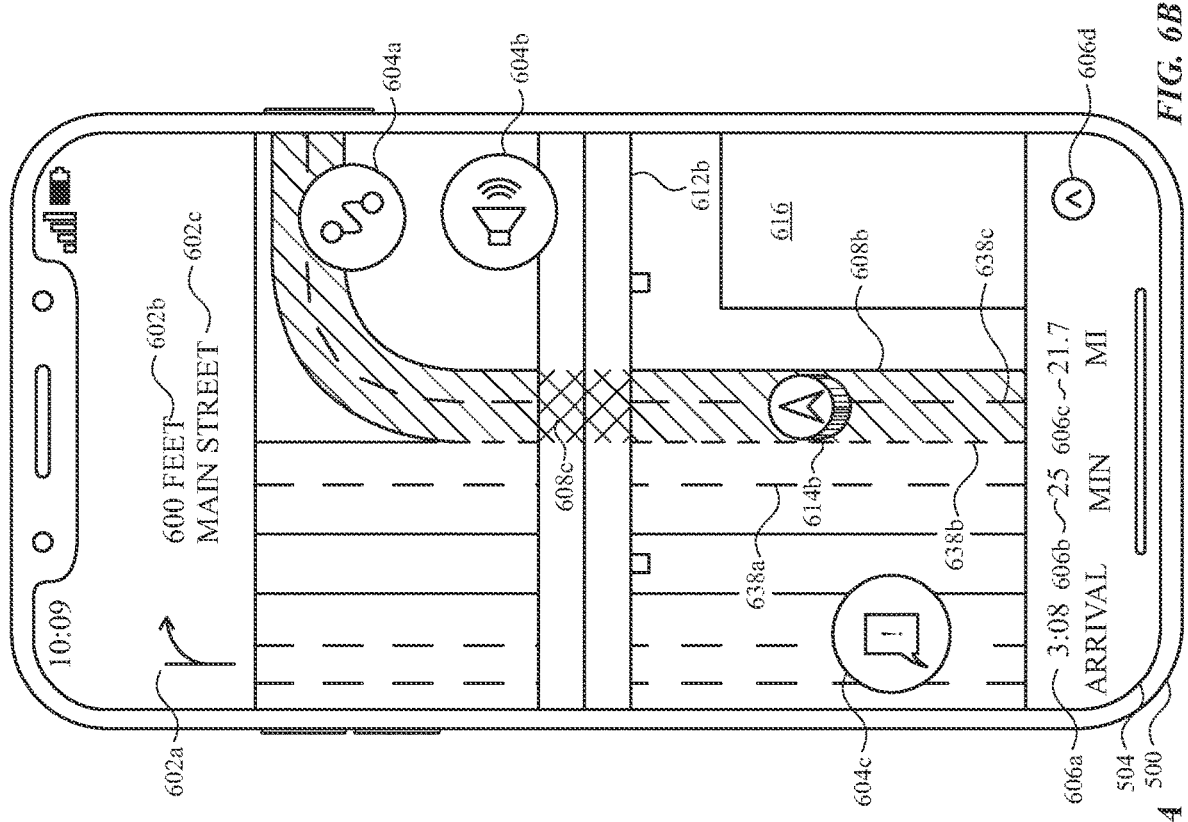
FIGS. 6A-6Q illustrate exemplary ways in which an electronic device presents navigation routes from various perspectives in accordance with some embodiments.

FIGS. 6A-6Q illustrate exemplary ways in which an electronic device presents navigation routes from various perspectives in accordance with some embodiments. The embodiments in these figures are used to illustrate the processes described below, including the processes described with reference to FIG. 7. Although FIGS. 6A-6Q illustrate various examples of ways an electronic device is able to perform the processes described below with reference to FIG. 7, it should be understood that these examples are not meant to be limiting, and the electronic device is able to perform one or more processes described below with reference to FIG. 7 in ways not expressly described with reference to FIGS. 6A-6Q.

FIGS. 6A-6Q illustrate various examples of user interfaces for viewing navigation directions on maps. For example, the electronic device displays an indication of the route from different perspectives depending on the maneuver being depicted.

FIG. 6A illustrates an example navigation user interface displayed by device on touch screen 504. In some embodiments, the user interface includes an indication 602*a* of the next maneuver in the navigation directions, an indication 602*b* of the distance between the current location of the electronic device 500 and the location of the next maneuver, an indication 602*c* of the street associated with the next maneuver (e.g., the street onto which the user will merge and/or turn), an option 604*a* to view an overview of the navigation directions, an option 604*b* to view settings related to audio guidance of the navigation route, an option 604*c* to report an incident along the navigation route, an indication 606*a* of the estimated time of arrival at the destination, an indication 606*b* of the estimated time remaining while navigating along the route, an indication 606*c* of the distance remaining along the route, and an option 606*d* to cause the electronic device 500 to display additional options related to the navigation directions. In some embodiments, the map further includes visual indications of points of interest (e.g., buildings, landmarks, public spaces, etc.) at locations on the map corresponding to the locations of the points of interest (e.g., in real life). In some embodiments, while presenting the map from the perspective illustrated in FIG. 6A, the electronic device 500 presents the visual indications of the points of interest on top of the representations 616 of buildings corresponding to the points of interest (e.g., when the points of interest are located in buildings). In some embodiments, indications 602*a*-*d*, options 604*a*-*c*, indications 606*a*-*c*, and option 606*d* are displayed overlaid on a map that includes an indication 608*a* of the route (e.g., a route line), an indication 612*a* of an overpass that intersects the route, an indication 614*a* of the current location of the electronic device 500, and a plurality of representations 616 of buildings or other objects in the vicinity of the route. In some embodiments, the indication 608*a* of the route is displayed overlaid on representations of roads on the map corresponding to the route. In some embodiments, the indication 608*a* of the route is (e.g., partially) transparent so details of the representation of the road, such as lane markings, color, and the like are visible through the indication 608*a* of the route. In some embodiments, the indication 608*a* of the route includes a portion 610*a* that corresponds to a portion of the route at which the road corresponding to the route passes under overpass 612*a* (e.g., the user will navigate below overpass 612*a*). In some embodiments, the portion 610*a* of the route is displayed with one or more visual characteristics (e.g., translucency, color, width) that differ from the visual characteristics of the rest of the indication 608*a* of the route to indicate that the portion 610*a* of the route is occluded by the overpass corresponding to indication 612*a* (e.g., because the route goes under the overpass). In some embodiments, the visual effect is as if at least some aspects of the portion of route indication 608*a* that is under overpass 612*a* are visible through overpass 612*a*. In some embodiments, portions of the representation 612*a* of the overpass that occlude the indication 608*a* of the route are visible through the portion 610*a* of indication 608*a* of the route line that is occluded by the representation 612*a* of the overpass.

In some embodiments, the electronic device 500 presents the navigation directions (e.g., the view of the map, route indication 608*a*, current location indication 614*a*, etc.) from the perspective (e.g., zoom and angle) illustrated in FIG. 6A while the current location of the electronic device 500 is greater than a threshold distance (e.g., 400, 500, 600, 700, etc. feet) from the location of the next maneuver of the navigation directions. In some embodiments, the perspective illustrated in FIG. 6A is a slightly pitched overhead view of the indication 614*a* of the current location of the electronic device 500. For example, the map is displayed from a viewpoint that is above and slightly behind the visual indication 614*a* of the current location of the electronic device. In some embodiments, the map is displayed from a bird's eye view. In some embodiments, in response to detecting the current location of the electronic device 500 update to a location within the threshold distance of the next maneuver of the navigation directions, the electronic device 500 presents an animated transition between presenting the navigation directions from the perspective illustrated in FIG. 6A to the perspective illustrated in FIG. 6C or the perspective illustrated in FIG. 6D.

Figure 6B:
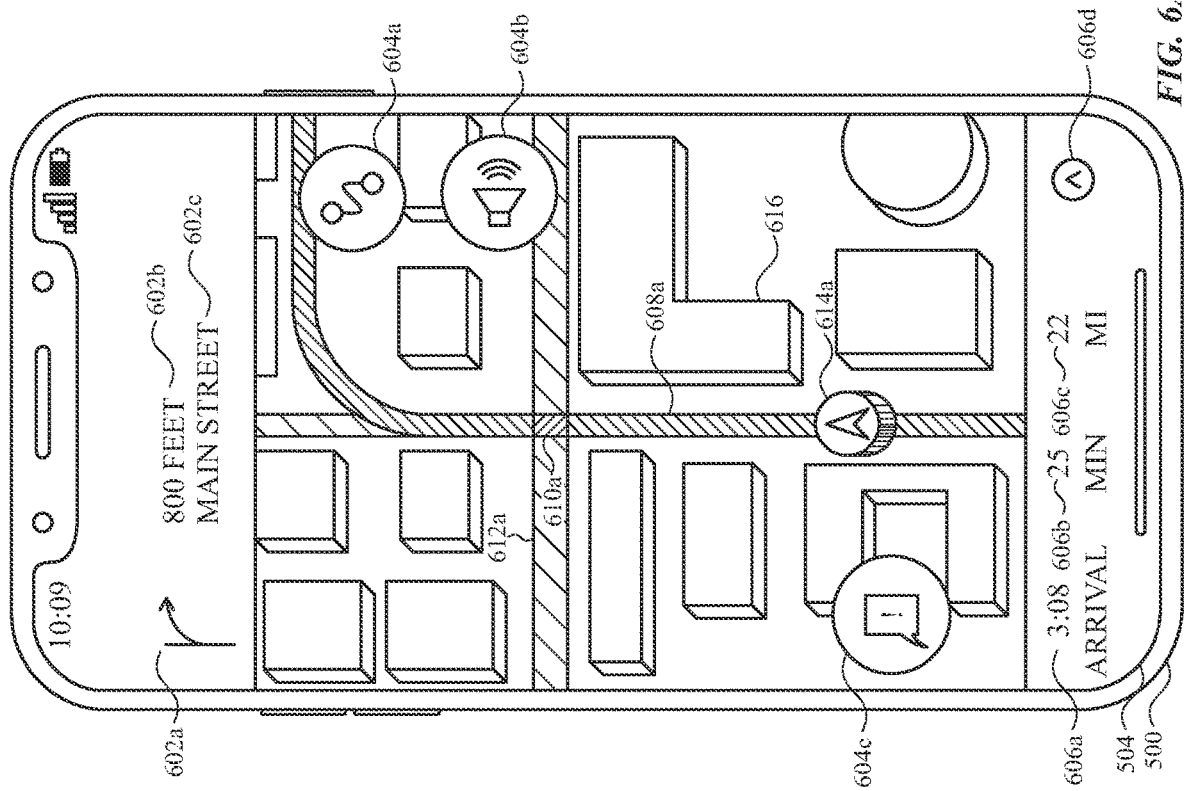

FIG. 6B illustrates an exemplary portion of an animated transition from displaying the navigation directions from a first perspective shown in FIG. 6A to displaying the navigation directions from a second perspective shown in FIG. 6C or the third perspective shown in FIG. 6D. In some embodiments, the animation includes animating a change in zoom and perspective from which the navigation directions are displayed. For example, in FIG. 6B, the level of zoom is greater than the level of zoom in FIG. 6A and the angle of the virtual camera through which the navigation user interface is presented is a greater angle relative to gravity than the perspective in FIG. 6A (e.g., the viewpoint from which the map is displayed is positioned further behind the indication 614 of the current location of the electronic device). In some embodiments, updating the level of zoom includes displaying indications 638*a-c* of lane lines on the road included in the navigation route, details of the representation 616*c* of the overpass, and details of roads not included in the navigation route (e.g., which were optionally not displayed at the level of zoom in FIG. 6A) and scaling and/or correctly placing the indication 608*b* of the route to indicate which lane(s) the user should drive in to (e.g., safely and/or legally) execute the next maneuver of the navigation directions. For example, in FIG. 6A, the electronic device 500 displayed the indication 608*b* of the route overlaid on the full width of a representation of a road, but in FIG. 6B, the electronic device 500 displays the indication 608*b* of the route overlaid on the right two lanes of the representation of the road. In some embodiments, the electronic device 500 scales the representation 614*b* of the current location of the electronic device to match the width of the indication 608*b* of the navigation route (e.g., to be the same width, 10% greater width, 20% greater width etc.). In some embodiments, a portion 608*c* of the indication 608*b* of the navigation route that represents a portion of the route that goes under the overpass corresponding to representation 612*b* is displayed with one or more visual characteristics (e.g., color, size, translucency) that differ from the visual characteristics of the rest of the indication 608*b* of the route. In some embodiments, as shown in FIG. 6B, the electronic device 500 updates indications 602*b* and 606*c* in accordance with the updated position of the electronic device 500.

In some embodiments, the animation continues until the electronic device 500 presents the user interface as shown in FIG. 6C or FIG. 6D. For example, FIG. 6C illustrates a user interface including a perspective view of the navigation directions. In some embodiments, the zoom level of the perspective in FIG. 6C is greater than the zoom shown in FIG. 6B and the angle of the virtual camera through which the navigation directions are displayed is a greater angle in FIG. 6C than the angle in FIG. 6B relative to a respective reference (e.g., gravity). For example, the viewpoint through which the map is displayed in FIG. 6C is further behind the indication 614*c* of the current location of the route. In some embodiments, the perspective from which the navigation directions are shown in FIGS. 6B-6C is associated with an exiting or merging maneuver and, as will be described below with reference to FIGS. 6F-6G, the electronic device 500 presents the navigation directions from a different perspective for different maneuvers, such as turns. In some embodiments, the map further includes visual indications of points of interest (e.g., buildings, landmarks, public spaces, etc.) at locations on the map corresponding to the locations of the points of interest (e.g., in real life). In some embodiments, while presenting the map from the perspective illustrated in FIG. 6C, the electronic device 500 presents the visual indications of the points of interest on the sides of or next to the sides of the representations 616 of buildings corresponding to the points of interest (e.g., when the points of interest are located in buildings). For example, the indications of the points of interest are displayed at locations corresponding to the entrances of the buildings.

In some embodiments, the user interface illustrated in FIG. 6C includes an indication 618*a* of the exit the user will merge onto as part of the upcoming navigation maneuver, and is displayed at a location along the route/on the map corresponding to the exit. In some embodiments, the indication 608*d* of the navigation route indicates the lanes of the road in which the user should drive in order to (e.g., safely and/or legally) execute the upcoming maneuver. For example, as shown in FIG. 6C, the indication 608*d* of the route is overlaid on the right two lanes of the representation of the road and not overlaid on the left two lanes of the representation of the road. Thus, in some embodiments, the perspective from which the navigation directions are displayed in FIG. 6C includes information about the upcoming maneuver that is not included in the perspective from which the navigation directions were displayed in FIG. 6A. In some embodiments, displaying the navigation directions with the perspective of FIG. 6C includes displaying the indication 608*d* of the route overlaid on the rest of the map. For example, a portion 608*e* of the indication 608*d* of the route that corresponds to the route going under an overpass corresponding to representation 616*c* is presented overlaid on (e.g., occluding display of) the representation 616*c* of the overpass (e.g., even though the navigation route goes under the overpass). In some embodiments, the portion 608e of the indication 608d of the route is opaque. In some embodiments, the portion 608e of the indication 608d of the route is translucent. In some embodiments, the portion 608e of the indication 608d of the route that is displayed overlaid on the representation 616c of the overpass has the same visual characteristics (e.g., color, translucency, size, etc.) as other portions of the indication 608d of the route. In some embodiments, as shown in FIG. 6C, the electronic device 500 updates indications 602b and 606c in accordance with the updated position of the electronic device 500. In some embodiments, as the current location of the electronic device 500 continues to update as the electronic device moves, the electronic device continues to display the visual indication 614c of the current location of the electronic device at the appropriate position relative to the indication 608d of the route and continues to scale the indication 614c of the current location of the electronic device 500 to the width of the indication 608d of the route (e.g., as the width of the indication 608d of the route changes).

In some embodiments, after displaying the animation illustrated in FIG. 6B, the electronic device (e.g., instead) displays the user interface illustrated in FIG. 6D. In some embodiments, the zoom level of the perspective in FIG. 6D is greater than the zoom shown in FIG. 6B and the angle of the virtual camera through which the navigation directions are displayed is a greater angle in FIG. 6D than the angle in FIG. 6B relative to a respective reference (e.g., gravity). For example, the viewpoint through which the map is displayed in FIG. 6C is further behind the indication 614c of the current location of the route. In some embodiments, the perspective from which the navigation directions are shown in FIG. 6D is associated with an exiting or merging maneuver and, as will be described below with reference to FIGS. 6F-6G, the electronic device 500 presents the navigation directions from a different perspective for different maneuvers, such as turns. In some embodiments, the map further includes visual indications of points of interest (e.g., buildings, landmarks, public spaces, etc.) at locations on the map corresponding to the locations of the points of interest (e.g., in real life). In some embodiments, while presenting the map from the perspective illustrated in FIG. 6D, the electronic device 500 presents the visual indications of the points of interest on the sides of or next to the sides of the representations 616 of buildings corresponding to the points of interest (e.g., when the points of interest are located in buildings). For example, the indications of the points of interest are displayed at locations corresponding to the entrances of the buildings.

In some embodiments, the user interface illustrated in FIG. 6D includes an indication 618a of the exit the user will merge onto as part of the upcoming navigation maneuver, and is displayed at a location along the route/on the map corresponding to the exit. In some embodiments, the indication 608f of the navigation route indicates the lanes of the road in which the user should drive in order to (e.g., safely and/or legally) execute the upcoming maneuver. For example, as shown in FIG. 6D, the indication 608f of the route is overlaid on the right two lanes of the representation of the road and not overlaid on the left two lanes of the representation of the road. Thus, in some embodiments, the perspective from which the navigation directions are displayed in FIG. 6D includes information about the upcoming maneuver that is not included in the perspective from which the navigation directions were displayed in FIG. 6A. In some embodiments, displaying the navigation directions with the perspective of FIG. 6D includes displaying a portion 608g of the indication 608f of the route that corresponds to the route going under an overpass corresponding to representation 616c with one or more visual characteristics (e.g., color, translucency, size, etc.) different from the visual characteristics of other portions of the indication 608f of the route according to one or more steps of method 1100. In some embodiments, as shown in FIG. 6D, the electronic device 500 updates indications 602b and 606c in accordance with the updated position of the electronic device 500. In some embodiments, as the current location of the electronic device 500 continues to update as the electronic device moves, the electronic device continues to display the visual indication 614c of the current location of the electronic device at the appropriate position relative to the indication 608f of the route and continues to scale the indication 614c of the current location of the electronic device 500 to the width of the indication 608f of the route (e.g., as the width of the indication 608f of the route changes).

In some embodiments, as the current location of the electronic device 500 continues to approach the location of the next maneuver of the navigation directions (e.g., and before the location of the next maneuver is reached), the electronic device 500 updates the perspective from which the navigation user interface is presented from the perspective of FIG. 6C or 6D to the perspective illustrated in FIG. 6E. In FIG. 6E, for example, the position and angle of the virtual camera move laterally with respect to the indication 614c of the current location of the electronic device 500 (e.g., the camera moves to the left and the angle shifts to the right). In some embodiments, the degree and direction in which the perspective from which the map is displayed is updated as the electronic device 500 begins a maneuver is based on characteristics of the maneuver, such as the direction and turn radius with which the route turns. In some embodiments, the electronic device 500 updates the perspective in order to show a portion of the indication 608f of the route that has a predetermined length or in order to show a portion of the map proximate to the route that includes at least a predetermined number of points of interest or at least a predetermined area size proximate to the route. Thus, in some embodiments, the perspective illustrated in FIG. 6E includes a larger portion of the indication 608f of the route line after the maneuver (e.g., turning to merge off of the current road) than what is shown in FIGS. 6C and 6D. In some embodiments, the electronic device 500 updates indications 602b and 606c in accordance with the updated position of the electronic device 500.

Thus, in some embodiments, the electronic device 500 updates the perspective from which the navigation route is presented in the manner illustrated in FIGS. 6A-6E in accordance with a determination that the next maneuver is a maneuver of a first type (e.g., merging, exiting, etc.). In some embodiments, the electronic device 500 updates the perspective from which the navigation route is presented in a different manner in accordance with a determination that the next maneuver is of a second type (e.g., a turn), as will be described with reference to FIGS. 6F-6G.

For example, FIG. 6F illustrates the electronic device 500 presenting the navigation directions from the same perspective as the perspective illustrated in FIG. 6A while the next maneuver in the navigation directions is a turn from one road onto another. FIG. 6F includes an indication 602d of the next maneuver, an indication 602e of the distance between the current location of the electronic device 500 and the next maneuver, and an indication 602f of the street associated with the next maneuver (e.g., the street onto which the user will turn to perform the maneuver), for example. In some embodiments, the map included in the user interface includes an indication 608a of the route line, an indication 614a of the current location of the electronic device, a representation 620a of a portion of the road on which the user is currently driving that is not included in the route, an indication 620b of a portion of a road onto which the user will turn that is not included in the route, and indications 616 of a plurality of buildings in the vicinity of the route. In some embodiments, the electronic device 500 presents the representation 608a of the route in a different color, style, pattern, etc. than the representations 620a and 620b of roads not included in the route. In some embodiments, the indication 608a of the route is displayed overlaid on representations of roads on the map corresponding to the route. In some embodiments, the indication 608a of the route is (e.g., partially) transparent so details of the representation of the road, such as lane markings, color, and the like are visible through the indication 608a of the route.

In some embodiments, the electronic device 500 presents the navigation directions from the perspective illustrated in FIG. 6F while the current location of the electronic device 500 is at least a threshold distance (e.g., 50, 100, 200, 300, 400, 500, 750, 1000, etc. feet) from the location of the next maneuver in the navigation directions. In some embodiments, in response to detecting that the current location of the electronic device is less than the threshold distance from the location of the next maneuver, the electronic device 500 presents an animated transition from the perspective illustrated in FIG. 6F to the perspective illustrated in FIG. 6G.

In some embodiments, the electronic device 500 presents the user interface illustrated in FIG. 6G when the electronic device 500 is within a threshold distance of a respective navigation maneuver (e.g., a turn). In some embodiments, displaying the navigation directions from the perspective illustrated in FIG. 6G includes displaying the map from an overhead angle (e.g., an angle relative to gravity that is smaller than the angle of the perspective of FIG. 6F relative to gravity) with a higher level of zoom than the level of zoom in FIG. 6F. In some embodiments, in accordance with the determination that the electronic device 500 is within the threshold distance of the respective navigation maneuver, the electronic device 500 maintains the same angle with which the map is presented as the angle illustrated in FIG. 6F and increases the level of zoom with which the map is presented. In some embodiments, as shown in FIG. 6G, the electronic device 500 displays indications 638d and 638e of lane lines of the road on which the user is currently driving and displays the route line 608h in the lane(s) in which the user should drive in order to (e.g., safely, legally) complete the upcoming turn that were not displayed in FIG. 6F. Thus, in some embodiments, the perspective in FIG. 6G includes additional information relevant to the maneuver that was not displayed from the perspective illustrated in FIG. 6H. In some embodiments, the electronic device 500 scales the indication 608h of the route to fit the width of the representation of the lane in which the user should drive to complete the maneuver and displays the indication 614d of the current location of the electronic device 500 at the same width as the indication 608h of the route. In some embodiments, in response to detecting the updated position of the electronic device 500, the electronic device 500 updates indications 602e, 606b, and 606c accordingly. In some embodiments, the map further includes visual indications of points of interest (e.g., buildings, landmarks, public spaces, etc.) at locations on the map corresponding to the locations of the points of interest (e.g., in real life). In some embodiments, while presenting the map from the perspective illustrated in FIG. 6G, the electronic device 500 presents the visual indications of the points of interest on top of the representations 616 of buildings corresponding to the points of interest (e.g., when the points of interest are located in buildings).

In some embodiments, in response to detecting that the route is about to approach (e.g., heavy) traffic that will cause delays, the electronic device 500 updates the level of zoom with which the navigation directions are shown in order to show the (e.g., entire) portion of the route that includes the traffic, as will be described with reference to FIGS. 6H-6K.

In FIG. 6H, for example, the electronic device 500 presents the map from the same perspective as the perspective of FIG. 6A. In some embodiments, while the electronic device 500 presents the map as shown in FIG. 6H, the current location of the electronic device 500 is greater than a predetermined distance (e.g., 0.1, 0.2, 0.3, 0.4, 0.5, etc. miles) or predetermined estimated time (e.g., 1, 2, 3, 5, 10, etc. minutes) from hitting traffic, so the electronic device 500 does not adjust the zoom level of the virtual camera to show the (e.g., entire) section of the route that is in the upcoming traffic.

Figure 6I:
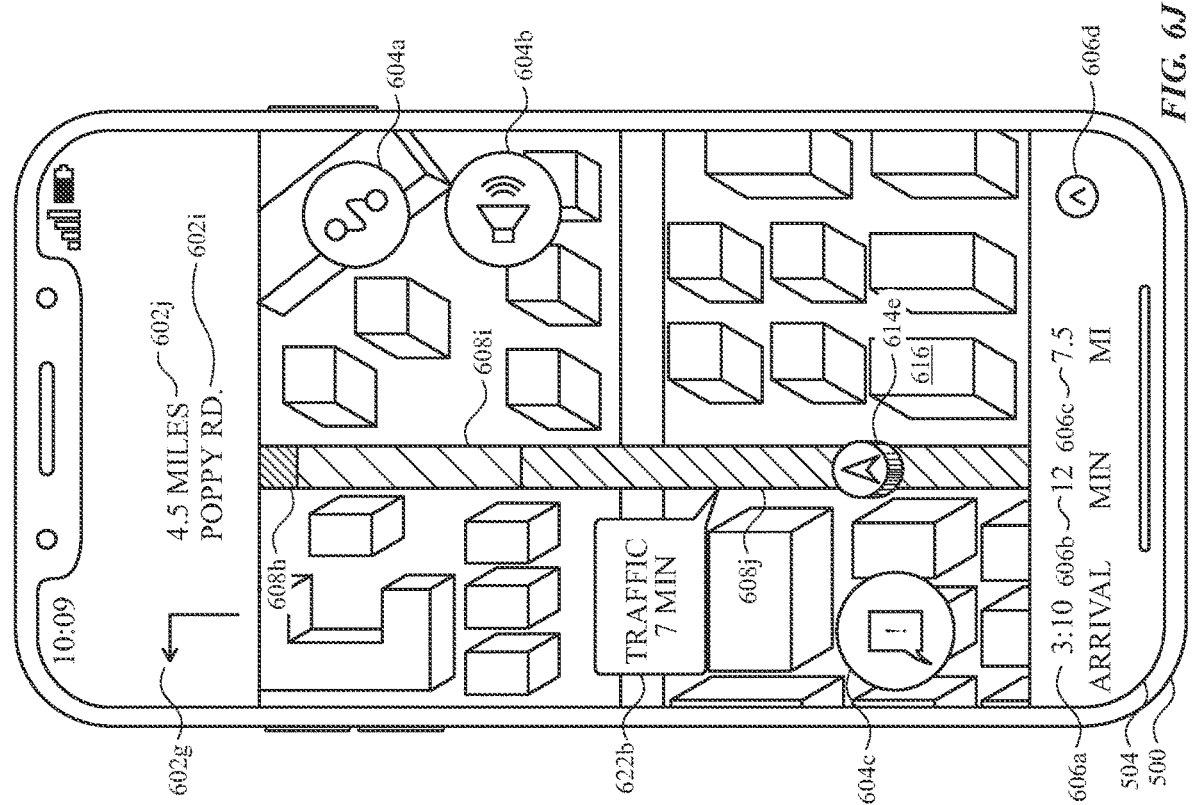

In some embodiments, once the electronic device 500 is within the predetermined time or distance of the beginning of the traffic, the electronic device 500 (e.g., without user input) updates the zoom with which the map is displayed to include the (e.g., entire) upcoming traffic. For example, in FIG. 6I, the electronic device 500 displays the map with a lower level of zoom than the level of zoom in FIG. 6H. In some embodiments, the electronic device 500 presents portions 608h of the indication of the route at which there is no traffic or light traffic, portions 608i of the indication of the route at which there is moderate traffic, a portion 608j of the indication of the route at which there is heavy traffic, and a visual indication 622a indicating the estimated time remaining in traffic. In some embodiments, the electronic device 500 displays the various portions 608h-j of the indication of the route with different colors, patterns, translucencies, sizes, etc. to visually distinguish the portions 608h-j from each other. In some embodiments, the level of zoom with which the electronic device 500 displays the map in FIG. 6I is selected to include the visual indication 614e of the current location of the electronic device 500 and at least a predetermined portion of the traffic (e.g., the end of the traffic). Thus, in some embodiments, the level of zoom depends on the length (e.g., distance) of the traffic remaining along the route (e.g., past the current location of the electronic device 500). In some embodiments, the angle from which the map is displayed in FIG. 6I is the same as the angle from which the map is displayed in FIG. 6H. In some embodiments, the angle from which the map is displayed in FIG. 6I is different from the angle with which the map is displayed in FIG. 6H.

In some embodiments, as the user drives through the traffic, thereby updating the location of the electronic device 500, the electronic device 500 (e.g., without user input) adjusts the zoom level of the map to zoom into the map while maintaining the (e.g., entire) portion of the upcoming route that includes traffic. In some embodiments, the electronic device 500 gradually zooms in as the electronic device 500 moves towards the end of the traffic. For example, in FIG. 6J, the electronic device 500 displays the map with a level of zoom that includes the indication 614e of the current location of the electronic device 500 and the end of the traffic along the route. In some embodiments, the zoom is increased as much as possible to include indication 614e of the current location of the electronic device 500 and the end of the traffic along the route. In some embodiments, the level of zoom updates as the current location of the electronic device 500 changes and/or the location of the end of the traffic changes. The electronic device 500 displays a portion 608j of the indication of the route at which there is heavy traffic, a portion 608i of the indication of the route at which there is moderate traffic, and a portion 608h of the indication of the route at which there is little or no traffic, for example. In some embodiments, the electronic device 500 displays an updated indication 622b of the estimated remaining time in traffic.

In some embodiments, once the user traverses the traffic, the electronic device 500 updates the perspective of the map to remain at a fixed zoom level that includes the visual indication of the current location of the electronic device 500 (e.g., instead of adjusting the zoom based on the remaining portion of the route in traffic) until adjusting the zoom in response to detecting the electronic device 500 approach an upcoming maneuver or more traffic. For example, FIG. 6K illustrates the electronic device 500 presenting the map in response to the user having driven through the traffic illustrated in FIGS. 6I-6J. In some embodiments, in FIG. 6K, the electronic device 500 presents the map at a higher level of zoom than the levels of zoom at which the electronic device 500 displayed the map in FIGS. 6I-6J (e.g., the same level of zoom as the level of zoom in FIG. 6H before the current location of the electronic device 500 entered the traffic). As shown in FIG. 6K, in some embodiments, the electronic device 500 presents the representation 608a of the route in a single color, style, pattern, etc. because no portion of the route being displayed by the electronic device 500 includes traffic.

In some embodiments, as shown in FIG. 6K, the electronic device 500 detects selection (e.g., via contact 603k) of a region 640 of the user interface including indications 602g-i. In some embodiments, in response to detecting the input illustrated in FIG. 6K, the electronic device 500 presents the navigation directions in a list view (e.g., obscuring display of the map).

FIG. 6K illustrates an example of the electronic device 500 presenting the navigation directions in a list view while remaining in a navigation mode. In some embodiments, in the list view, the electronic device 500 displays a list of maneuvers included in the directions (e.g., without displaying a map, an indication of the route, or a representation of the current location of the electronic device). For example, the user interface includes a plurality of representations 626a-d of maneuvers included in the directions. In some embodiments, a representation 626a of one of the maneuvers includes an indication 628a of the maneuver to be performed, an indication 628d of the distance between the previous maneuver and the maneuver associated with the representation 626a (e.g., or, if the maneuver is the next maneuver, an indication of the distance between the current location of the electronic device 500 and the maneuver associated with the representation 626a), and a description 628c of the maneuver. In some embodiments, the other representations 626b-d of maneuvers include similar elements as the elements included in representation 626a. In some embodiments, the user interface further includes a selectable option 624 that, when selected, causes the electronic device 500 to cease display of the list view of the navigation directions and resume display of the navigation directions on a map (e.g., as shown in FIG. 6K).

In some embodiments, the list of navigation directions is vertically scrollable to scroll to future or past maneuvers in the directions. For example, the electronic device 500 detects movement of contact 603L corresponding to a request to scroll the navigation directions down. In some embodiments, in response to (e.g., a sequence of inputs including) the input illustrated in FIG. 6L, the electronic device 500 updates the user interface as shown in FIG. 6M.

FIG. 6M illustrates an example of the updated user interface in response to the user input illustrated in FIG. 6L. In some embodiments, scrolling the user interface reveals a representation 626e of the end of the route that was not displayed in FIG. 6L. In some embodiments, as shown in FIG. 6M, the electronic device 500 detects selection of one of the representations 626d of the maneuvers in the route. In response to the input illustrated in FIG. 6M, the electronic device 500 optionally displays a map showing the maneuver corresponding to the selected representation, as shown in FIG. 6N.

FIG. 6N illustrates an example of the user interface presented by the electronic device 500 in response to the input illustrated in FIG. 6M. For example, the electronic device 500 presents a map that includes an indication 608k of the route making the maneuver corresponding to the representation 626d selected in FIG. 6M. In some embodiments, the maneuver corresponds to an upcoming maneuver along the route. In some embodiments, the maneuver corresponds to a previous maneuver along the route. In some embodiments, the map further includes indications 630a and 630b of the names of the streets from which and onto which the user will turn when completing the maneuver and an indication 628 of the maneuver. In some embodiments, the map does not include an indication of the current location of the electronic device 500 because the electronic device 500 is not located in the physical region represented by the boundaries of the map in FIG. 6N. In some embodiments, if the electronic device 500 is within the region represented by the map in FIG. 6N, the electronic device 500 would display an indication of the current location of the electronic device 500. In some embodiments, after a predetermined time (e.g., 5, 10, 15, 30, 60, etc. seconds) has passed since displaying the user interface in FIG. 6N, the electronic device 500 displays the user interface illustrated in FIG. 6M. In some embodiments, the user interface in FIG. 6N further includes a selectable option that, when selected, causes the electronic device 500 to display the user interface illustrated in FIG. 6M. In some embodiments, the electronic device 500 displays the user interface illustrated in FIG. 6M in response to detecting selection of the indication 628 of the maneuver.

In some embodiments, whether or not the electronic device 500 is presenting navigation directions, the electronic device 500 presents maps that illustrate the elevation of the regions represented by the maps. For example, in FIG. 6O, the electronic device 500 presents a map of the world at a far zoom level that displays a three-dimensional globe 642. In some embodiments, while the electronic device 500 presents a map (e.g., without navigation directions), the electronic device 500 presents an option 636a to view map settings, an option 636b to pan the map to the current location of the electronic device 500, and an option 636c to display the currently-displayed region from an on-the-ground perspective. In some embodiments, the options 636a-c are displayed overlaid on the map. In some embodiments, the user interface further includes a search box 634 into which the user is able to enter a landmark or address to search for on the map according to one or more steps of method 1500. In some embodiments, the electronic device 500 forgoes presenting an indication of the current location of the electronic device 500 in FIG. 6O because the electronic device 500 is not located in the region represented by the side of globe 642 displayed in FIG. 6O. In some embodiments, if the current location of the electronic device 500 was in the region of the globe 642 displayed in FIG. 6O, the electronic device 500 would include an indication of the current location of the electronic device 500 on globe 642.

Figure 6J:
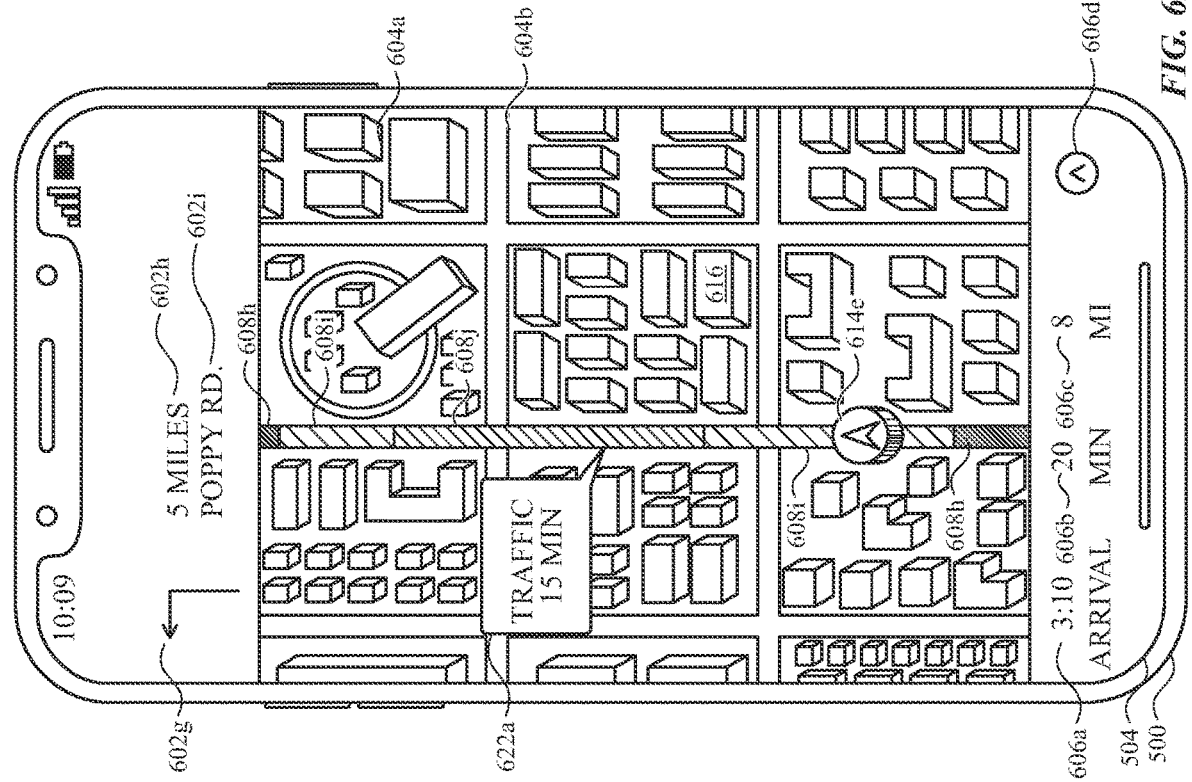
Figure 6P:
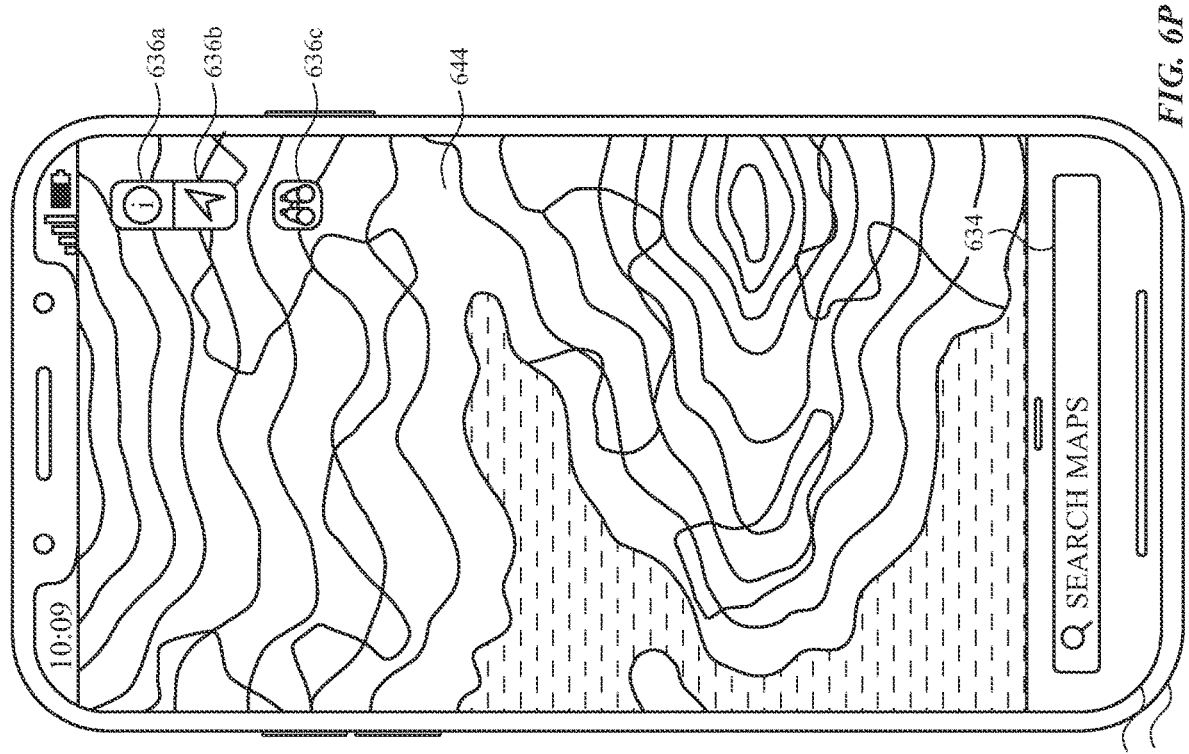
Figure 6O:
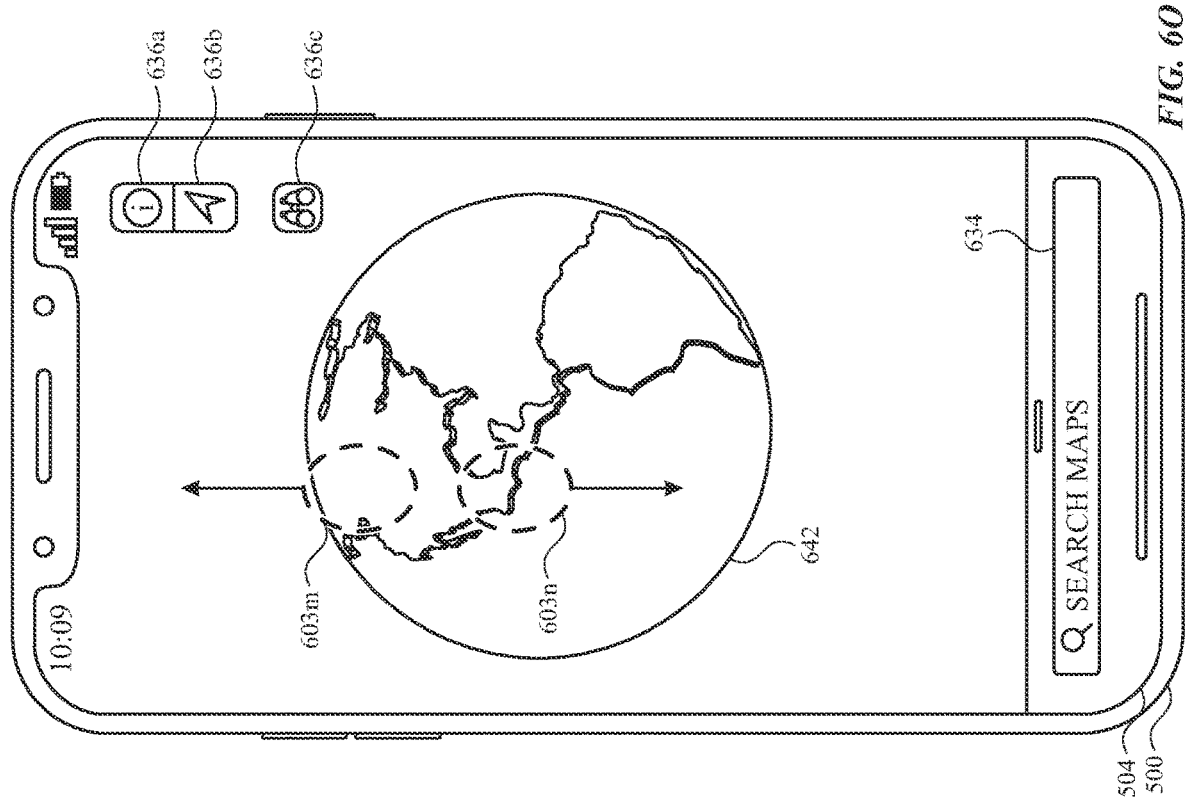

As shown in FIG. 6O, in some embodiments, the electronic device 500 detects movements of contacts 603m and 603n corresponding to a request to zoom the map in. In some embodiments, in response to the input illustrated in FIG. 6O, the electronic device 500 presents a two-dimensional topographical map as shown in FIG. 6P. In some embodiments, in response to the input illustrated in FIG. 6O, the electronic device 500 presents a three-dimensional map as shown in FIG. 6Q. For example, in some embodiments, the electronic device 500 displays a three-dimensional map, such as the map illustrated in FIG. 6Q, if there is a three-dimensional map available for the area in which the user zoomed in and displays a two-dimensional map, such as the map illustrated in FIG. 6P, if there is no three-dimensional map available for the area in which the user zoomed in.

FIG. 6P illustrates an example of a two-dimensional topographical map 644 displayed in response to the input illustrated in FIG. 6O. In some embodiments, the topographical map 644 indicates the elevation of the region represented by the map by, for example, displaying the contours of the region using different colors, shading, patterns, etc. In some embodiments, the two-dimensional map includes two-dimensional indications of roads, buildings, and other physical objects in the region represented by the map. In some embodiments, as shown in FIG. 6P, the electronic device 500 displays options 636a-c overlaid on the topographical map 644. In some embodiments, the electronic device 500 forgoes presenting an indication of the current location of the electronic device 500 in FIG. 6P because the electronic device 500 is not located in the region represented by map 644 displayed in FIG. 6P. In some embodiments, if the current location of the electronic device 500 was in the region of the map 644 displayed in FIG. 6P, the electronic device 500 would include an indication of the current location of the electronic device 500 within map 644.

FIG. 6Q illustrates an example three-dimensional map 646 displayed in response to the input illustrated in FIG. 6O. In some embodiments, the three-dimensional map 646 includes a three-dimensional representation of a region that indicates the elevation in the region. In some embodiments, the three-dimensional map includes three-dimensional indications of roads, buildings, and other physical objects in the region represented by the map. In some embodiments, as shown in FIG. 6Q, the electronic device 500 displays options 636a-c overlaid on the topographical map 644. In some embodiments, the electronic device 500 forgoes presenting an indication of the current location of the electronic device 500 in FIG. 6Q because the electronic device 500 is not located in the region represented by map 646 displayed in FIG. 6Q. In some embodiments, if the current location of the electronic device 500 was in the region of the map 646 displayed in FIG. 6Q, the electronic device 500 would include an indication of the current location of the electronic device 500 within map 646.

In some embodiments, three-dimensional maps, such as the map 646 illustrated in FIG. 6Q, are not available for every region in the world. In some embodiments, when a three-dimensional map is not available for a respective region, the electronic device 500 displays a two-dimensional topographical map of the region similar to the map 644 illustrated in FIG. 6P. In some embodiments, a three-dimensional map and a two-dimensional topographical map are available for (e.g., some, all) regions and the electronic device 500 displays either a three-dimensional map or a two-dimensional topographical map depending on a setting or mode selected by the user of the electronic device 500.

Figure 7:
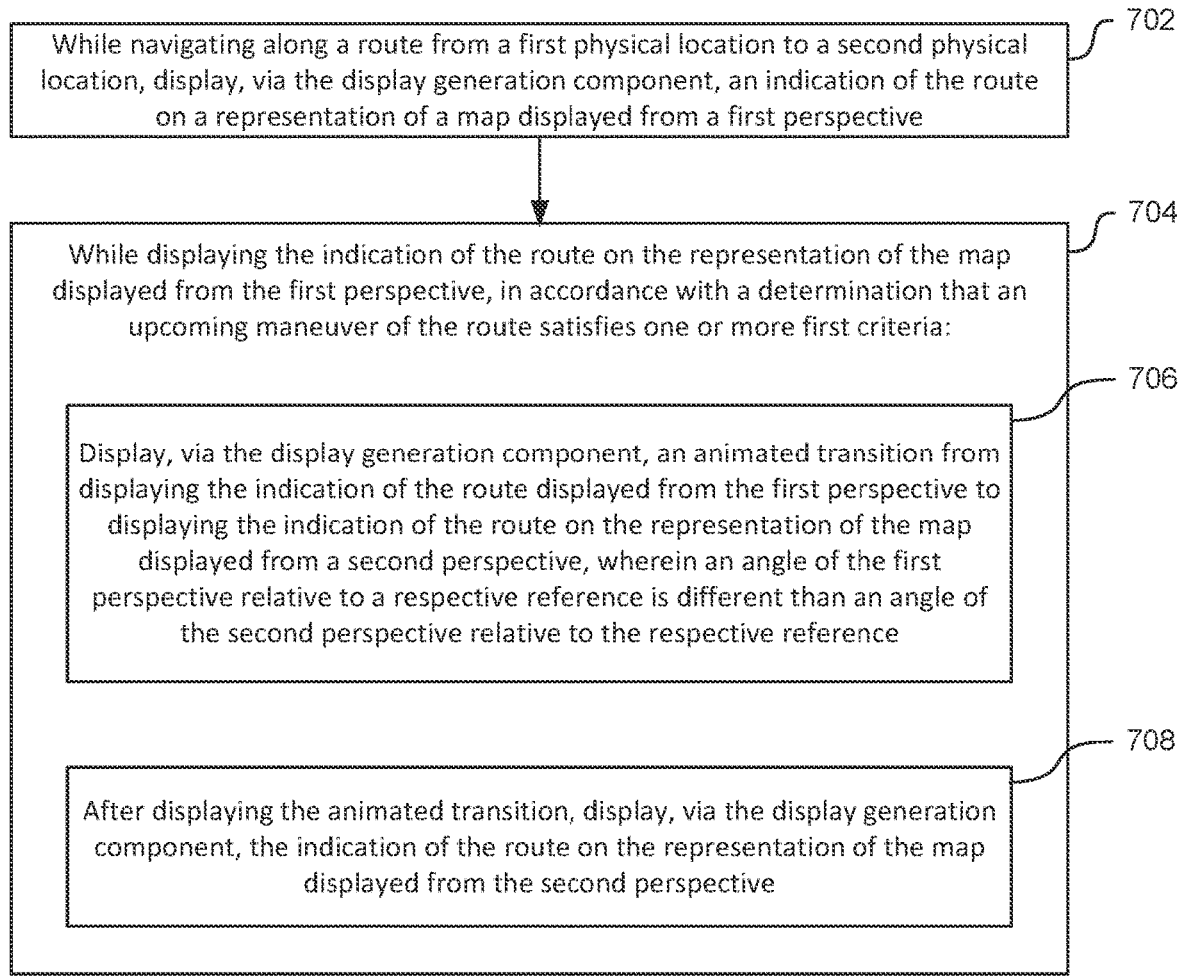
FIG. 7 is a flow diagram illustrating a method of presenting navigation routes from various perspectives in accordance with some embodiments.

FIG. 7 is a flow diagram illustrating a method of presenting navigation routes from various perspectives in accordance with some embodiments. The method 700 is optionally performed at an electronic device such as device 100, device 300, and device 500, as described above with reference to FIGS. 1A-1B, 2-3, 4A-4B and 5A-5H. Some operations in method 700 are, optionally combined and/or order of some operations is, optionally, changed.

As described below, the method 700 provides ways in which an electronic device presents navigation routes from various perspectives in accordance with some embodiments. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 6A, method 700 is performed at an electronic device in communication with a display generation component and one or more input devices. In some embodiments, the electronic device is a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, such as in FIG. 6A, while navigating along a route from a first physical location to a second physical location (e.g., such as described with reference to methods 900 and/or 1100), the electronic device (e.g., 500) displays (702), via the display generation component, an indication (e.g., 608a) of the route on a representation of a map displayed from a first perspective. In some embodiments, navigating along the route includes presenting navigation directions from the first physical location to the second physical location in a manner that is synchronized with the current location of the electronic device. In some embodiments, the indication of the route (e.g., a route line) is displayed overlaid on one or more roads, streets, etc. included in the route. For example, roads and streets not included in the route are displayed in a first plurality of colors (e.g., colors corresponding to the colors of the roads and streets in real life) and the indication of the route is displayed in a second color different from the first plurality of colors (e.g., blue, green, yellow, red, orange), such as overlaid on the roads/streets. In some embodiments, the route line has one or more of the characteristics of the route lines described with reference to methods 900 and/or 1100. In some embodiments, the first perspective refers to the zoom level and/or pose (e.g., position and angle) of a virtual camera relative to an indication of the current location of the electronic device that defines the field of view in which the representation of the map is presented.

In some embodiments, while displaying the indication of the route on the representation of the map displayed from the first perspective, such as in FIG. 6A, in accordance with a determination that an upcoming maneuver of the route satisfies one or more first criteria (704), the electronic device (e.g., 500) displays (706), via the display generation component, an animated transition from displaying the indication (e.g., 608*a*) of the route displayed from the first perspective, such as in FIG. 6A, to displaying the indication of the route (e.g., 608*d*) on the representation of the map displayed from a second perspective, such as in FIG. 6C, wherein an angle of the first perspective relative to a respective reference (e.g., gravity) is different than (e.g., less than, greater than) an angle of the second perspective relative to the respective reference. In some embodiments, the zoom level of the first perspective is different from the zoom level of the second perspective. In some embodiments, the pose of a virtual camera relative to an indication of the current location of the electronic device of the first perspective is different from the pose of the virtual camera relative to the indication of the current location of the electronic device of the second perspective. In some embodiments, the angle of the virtual camera (e.g., relative to gravity) of the first perspective is different from the angle of the virtual camera (e.g., relative to gravity) of the second perspective. For example, the first perspective is a zoomed out, slightly pitched view of the indication of current location of the electronic device and the indication of the route from the second perspective is a zoomed in, more pitched view of the indication of the current location of the electronic device and the indication of the route. In some embodiments, the animated transition includes gradually changing the zoom and/or pose of the virtual camera. In some embodiments, the first perspective is a slightly pitched view generated by a virtual camera at a first virtual distance and/or zoom relative to the current location of the electronic device and the second perspective is a "windshield" view with a greater angle relative to gravity and a virtual distance and/or zoom relative to the current location of the electronic device that is closer than the first virtual distance and/or zoom. In some embodiments, the one or more first criteria include a criterion that is satisfied when the location of the maneuver is less than a threshold distance from the location of the electronic device (e.g., 10, 20, 50, 100, 200, 300, 500, 800, 1000, etc. meters). In some embodiments, the one or more first criteria include a criterion that is satisfied when the type of the upcoming maneuver matches a predetermined maneuver type, such as turning, exiting, merging, etc. In some embodiments, the one or more criteria are not satisfied if the maneuver is more than the threshold distance from the location of the electronic device or if the maneuver is a type not included in the predetermined maneuver types, such as continuing straight.

In some embodiments, while displaying the indication of the route on the representation (e.g., 608*a*) of the map displayed from the first perspective, such as in FIG. 6A, in accordance with a determination that an upcoming maneuver of the route satisfies one or more first criteria (704), after displaying the animated transition, the electronic device (e.g., 500) displays (708), via the display generation component, the indication (e.g., 608*d*) of the route on the representation of the map displayed from the second perspective, such as in FIG. 6C. In some embodiments, displaying the indication of the route with the second perspective includes displaying the route with information about the maneuver not displayed while displaying the indication of the route with the first perspective. For example, displaying the indication of the route on the representation of the map from the first perspective does not include displaying an indication of which lane of the road the user should drive in to (e.g., safely, legally) execute a maneuver and displaying the indication of the route on the representation of the map from the second perspective includes displaying an indication of which lane of the road the user should drive in to (e.g., safely, legally) execute the maneuver. The above-described manner of displaying the animated transition from the first perspective to the second perspective in accordance with the determination that the upcoming maneuver satisfies the one or more criteria provides an efficient way of presenting information relevant to the upcoming maneuver, which additionally reduces power usage and improves battery life of the electronic device by enabling the user to use the electronic device more quickly and efficiently.

In some embodiments, such as in FIG. 6A, while displaying the indication (e.g., 608*a*) of the route on the representation of the map displayed from the first perspective, the electronic device (e.g., 500) displays an indication (e.g., 614*a*) of a current location of the electronic device with a first size. In some embodiments, the indication of the current location of the electronic device indicates the position and orientation of the electronic device. In some embodiments, the size of the indication of the current location of the electronic device is at least the size of the width of the indication of the route. In some embodiments, while displaying the indication of the route on the representation of the map from the first perspective, the electronic device displays the indication of the current location of the electronic device at a size that is larger than the width of the indication of the route (e.g., 110%, 120%, 140%, etc. the width of the indication of the route).

In some embodiments, such as in FIG. 6C, while displaying the indication (e.g., 608*d*) of the route on the representation of the map displayed from the second perspective, the electronic device (e.g., 500) displays the indication (e.g., 614*c*) of the current location of the electronic device with a second size different from the first size. In some embodiments, while displaying the indication of the current location of the electronic device from the second perspective, the electronic device displays the indication of the current location of the electronic device at a size that is (e.g., substantially) the same as the width of the indication of the route. In some embodiments, the width of the indication of the route is larger while displaying the indication of the route from the second perspective than the width of the indication of the route while displaying the indication of the route from the first perspective and the indication of the current location of the electronic device is larger while displaying the indication of the route from the second perspective than the indication of the current location of the electronic device while displaying the indication of the route from the first perspective. The above-described manner of displaying the indication of the current location of the electronic device with the first size while displaying the indication of the route from the first perspective and displaying the indication of the current location of the electronic device with the second size while displaying the indication of the route from the second perspective provides an efficient way of displaying the indication of the current location of the electronic device at a visible size when displaying the indication of the route from the first perspective and the second perspective which additionally reduces power usage and improves battery life of the electronic device by enabling the user to use the electronic device more quickly and efficiently.

In some embodiments, displaying the indication (e.g., 608a) of the route on the representation of the map displayed from the first perspective includes displaying the indication (e.g., 608a) of the route with a first size, such as in FIG. 6A, and displaying the indication (e.g., 608d) of the route on the representation of the map displayed from the second perspective includes displaying the indication (e.g., 608d) of the route with a second size different from the first size, such as in FIG. 6C. In some embodiments the second perspective includes a greater level of zoom than the first perspective and the second size is greater than the first size. The above-described manner of displaying the indication of the route at different sizes when displaying the indication of the route from the first perspective and second perspective provides an efficient way of presenting the indication of the route at a visible size from the first perspective and the second perspective which additionally reduces power usage and improves battery life of the electronic device by enabling the user to use the electronic device more quickly and efficiently.

In some embodiments, such as in FIG. 6A, while displaying the indication (e.g., 608a) of the route on the representation of the map displayed from the first perspective, the electronic device (e.g., 500) displays a first portion (e.g., 610a) of the indication (e.g., 608a) of the route that is occluded by a representation (e.g., 612a) of a first physical object with a first visual characteristic, and displays a second portion (e.g., 608a) of the indication (e.g., 608a) of the route that is not occluded by the representation (e.g., 612a) of the first physical object with a second visual characteristic different from the first visual characteristic. In some embodiments, displaying the first portion of the indication of the route with the first visual characteristic includes displaying the second portion of the indication of the route with a greater degree of translucency and/or a different color from the degree of translucency and/or color with which the second portion of the indication of the route is displayed with the second visual characteristic in accordance with one or more steps of method 1100. In some embodiments the first portion of the indication of the route is displayed overlaid on the representation of the first physical object even if the first physical object is above the route in real life. In some embodiments, the representation of the first physical object is above the representation of the route. In some embodiments the representation of the first physical object is laterally adjacent to the indication of the route, but occludes the first portion of the indication of the route due to the perspective with which the indication of the route is displayed by the electronic device (e.g., the representation of the first physical object is between the viewpoint from which the indication of the route is displayed and the first portion of the indication of the route).

In some embodiments, such as in FIG. 10E, while displaying the indication (e.g., 1008d) of the route on the representation of the map displayed from the second perspective, the electronic device (e.g., 500) displays a third portion (e.g., 1008e) (e.g., the third portion is the same as the first portion, the third portion is different from the first portion) of the indication (e.g., 1008d) of the route that is occluded by a representation (e.g., 1012b) of a second physical object, and displays a fourth portion (e.g., 1008d) (e.g., the fourth portion is the same as the second portion, the fourth portion is different from the second portion) of the indication (e.g., 1008d) of the route that is not occluded by the representation (e.g., 1012b) of the second physical object with a third visual characteristic. In some embodiments the third visual characteristic is the same as the first visual characteristic (e.g., same color, same level of translucency, etc.). In some embodiments the third visual characteristic is different from the first visual characteristic (e.g., different color, different level of translucency, etc.). In some embodiments, the electronic device displays the third portion of the indication of the route that is occluded by the representation of the second physical object with the third visual characteristic. In some embodiments, while displaying the representation of the map from the first perspective, the electronic device modifies display of portions of the indication of the route that are occluded by representations of physical objects and while displaying representations of the map from the second perspective, the electronic device forgoes display of portions of the indication of the route that are occluded by representations of physical objects, optionally in accordance with one or more steps of method 1100. The above-described manner of displaying the first portion of the indication of the route with the first visual characteristic and displaying the second portion of the indication of the route with the second visual characteristic provides an efficient way of maintaining display of portions of the route that are occluded by representations of physical objects while displaying the indication of the route from the first perspective which additionally reduces power usage and improves battery life of the electronic device by enabling the user to use the electronic device more quickly and efficiently.

In some embodiments, such as in FIG. 6A, while displaying the indication (e.g., 608a) of the route on the representation of the map displayed from the first perspective, the electronic device (e.g., 500) displays an indication (e.g., 614a) of a current location of the electronic device (e.g., 500). In some embodiments the indication of the current location of the electronic device indicates a location and orientation of the electronic device.

In some embodiments, in accordance with a determination that a first portion (e.g., 1016a) of the indication (e.g., 1010c) of the current location of the electronic device (e.g., 500) is occluded by (e.g., at a location corresponding to) a representation (e.g., 1012b) of a first physical object, the electronic device (e.g., 500) displays the first portion (e.g., 1016a) of the indication (e.g., 1010c) of the current location of the electronic device (e.g., 500) with a first visual characteristic, such as the visual characteristics illustrated in FIG. 10F, but from the perspective illustrated in FIG. 6A, for example. In some embodiments, the first portion of the indication of the current location of the electronic device is a subset of the indication of the current location of the electronic device. In some embodiments, the first portion of the indication of the current location of the electronic device is the entire indication of the current location of the electronic device. In some embodiments, the first portion of the indication of the current location of the electronic device is displayed overlaid on the representation of the first physical object even though the representation of the first physical object occludes the first portion of the indication of the current location of the electronic device.

In some embodiments, such as in FIG. 6A, in accordance with a determination that the first portion of the indication (e.g., 614a) of the current location of the electronic device (e.g., 500) is not occluded by (e.g., at the location corresponding to) the representation (e.g., 612a) of the first physical object (and is not included by any other representations of other physical objects included in the map), the electronic device (e.g., 500) displays the first portion of the indication (e.g., 614a) of the current location of the electronic device (e.g., 500) with a second visual characteristic different from the first visual characteristic. In some embodiments, the second visual characteristic is a different color from the first visual characteristic. In some embodiments, the second visual characteristic is a lesser degree of translucency than the first visual characteristic.

In some embodiments, such as in FIG. 6C, while displaying the indication (e.g., 608d) of the route on the representation of the map displayed from the second perspective, the electronic device (e.g., 500) displays the indication (e.g., 614c) of the current location of the electronic device (e.g., 500).

In some embodiments, such as in FIG. 10F, in accordance with a determination that a second portion (e.g., 1016a) (e.g., the second portion is the same as the first portion, the second portion is different from the first portion) of the indication (e.g., 1010c) of the current location of the electronic device (e.g., 500) is occluded by (e.g., at a location corresponding to) a representation (e.g., 1012b) of a second physical object, the electronic device (e.g., 500) displays the second portion (e.g., 1016a) of the second indication (e.g., 1010c) of the current location of the electronic device (e.g., 500) with a third visual characteristic (e.g., the third visual characteristic is the same as the first visual characteristic, the third visual characteristic is different from the first visual characteristic). In some embodiments, the second portion of the indication of the current location of the electronic device is a subset of the indication of the current location of the electronic device. In some embodiments, the second portion of the indication of the current location of the electronic device is the entire indication of the current location of the electronic device. In some embodiments, the second portion of the indication of the current location of the electronic device is displayed overlaid on the representation of the second physical object even though the representation of the second physical object occludes the second portion of the indication of the current location of the electronic device.

In some embodiments, such as in FIG. 6C, in accordance with a determination that the second portion of the indication (e.g., 614c) of the current location of the electronic device (e.g., 500) is not occluded by (e.g., at the location corresponding to) the representation (e.g., 616c) of the second physical object, the electronic device (e.g., 500) displays the second portion of the indication (e.g., 500) of the current location of the electronic device (e.g., 500) with a fourth visual characteristic (e.g., the fourth visual characteristic is the same as the second visual characteristic, the fourth visual characteristic is different from the second visual characteristic) different from the third visual characteristic. In some embodiments, the fourth visual characteristic is a different color from the third visual characteristic. In some embodiments, the fourth visual characteristic is a lesser degree of translucency than the third visual characteristic. In some embodiments, the electronic device displays portions of the indication of the current location of the electronic device that are occluded by representations of physical objects with different visual characteristics from the visual characteristics of portions of the indication of the current location of the electronic device that are not occluded by representations of physical objects according to one or more steps of method 1100, while displaying the indication of the map from the first perspective and second perspective. The above-described manner of displaying portions of the indication of the current location of the electronic device with different visual characteristics if the portions are occluded by representations of physical objects provides an efficient way of maintaining visibility of the entire indication of the current location of the electronic device at the first perspective and the second perspective, which additionally reduces power usage and improves battery life of the electronic device by enabling the user to use the electronic device more quickly and efficiently.

In some embodiments, such as in FIG. 6C, while displaying the indication (e.g., 608d) of the route on the representation of the map from the second perspective, in accordance with a determination that an elevation of a topography of the map at a current location of the electronic device is a first elevation, the second perspective is at a first respective elevation corresponding to the first elevation of the current location of the electronic device (e.g., 500). In some embodiments the first elevation of the second perspective is an elevation from which a representation of the current location of the electronic device is visible on the representation of the map.

In some embodiments, such as in FIG. 6C, while displaying the indication (e.g., 608d) of the route on the representation of the map from the second perspective, in accordance with a determination that an elevation of the topography of the map at the current location of the electronic device (e.g., 500) is a second elevation different from the first elevation, the second perspective is at a second respective elevation corresponding to the second elevation of the current location of the electronic device (e.g., 500). In some embodiments, the second elevation of the second perspective is an elevation from which a representation of the current location of the electronic device is visible on the representation of the map. In some embodiments, the elevation of the second perspective is based on the elevation of the current location of the electronic device. In some embodiments, the level of zoom with which the electronic device displays the representation of the map is based on the topography of the map (e.g., to ensure that an indication of the current location of the electronic device is visible in the map, is displayed at a respective size in the map, etc.). The above-described manner of displaying the indication of the route on the representation of the map from the second perspective with an elevation based on the elevation of the current location of the electronic device provides an efficient way of ensuring that an indication of the current location of the electronic device is visible on the representation of the map displayed from the second perspective, which additionally reduces power usage and improves battery life of the electronic device by enabling the user to use the electronic device more quickly and efficiently.

In some embodiments, the electronic device (e.g., 500) displays, via the display generation component in a list user interface (e.g., that does not include the map), such as in FIG. 6M, a plurality of visual indications (e.g., 626b-636e) of a plurality of maneuvers of the route. In some embodiments, the plurality of visual indications of the plurality of maneuvers each include an indication of the maneuver to be performed, an indication of the location of the maneuver (e.g., a street at which the maneuver is to be performed), and an indication of a distance between the maneuver and a previous maneuver in the navigation directions. In some embodiments, the plurality of maneuvers of the route include both past (e.g., maneuvers already completed/traversed by the electronic device) and future maneuvers in the route (e.g., the list includes all of the maneuvers in the route).

In some embodiments, while displaying the plurality of visual indications (e.g., 626b-626e) of the plurality of maneuvers of the route, such as in FIG. 6M, the electronic device (e.g., 500) receives, via the one or more input devices, an input (e.g., via contact 603*m*) corresponding to selection of a respective visual indication (e.g., 626*d*) of the plurality of visual indications (e.g., 626*b*-626*e*) of the plurality of maneuvers of the route.

In some embodiments, while displaying the plurality of visual indications (e.g., 626*b*-626*e*) of the plurality of maneuvers of the route, such as in FIG. 6M, in response to receiving the input (e.g., via contact 603*m*) corresponding to selection of the respective (e.g., 626*d*) visual indication, the electronic device (e.g., 500) displays, via the display generation component (e.g., 504), a portion of the indication (e.g., 608*k*) of the route on the representation of the map that corresponds to the respective visual indication, such as in FIG. 6N. In some embodiments, in response to receiving an input corresponding to selection of a second visual indication different from the respective visual indication, the electronic device displays a portion of the indication of the route on the representation of the map that corresponds to the second visual indication. In some embodiments, the portion of the indication of the route illustrates the maneuver corresponding to the respective visual indication. The above-described manner of displaying the portion of the indication of the route on the representation of the map that corresponds to the respective visual indication in response to receiving selection of the respective visual indication provides an efficient way of viewing upcoming maneuvers on a map, which additionally reduces power usage and improves battery life of the electronic device by enabling the user to use the electronic device more quickly and efficiently.

In some embodiments, a first plurality of visual indications corresponding to maneuvers that have already been performed are displayed with a different visual characteristic from a second plurality of visual indications corresponding to maneuvers that have not yet been performed. For example, visual indications of maneuvers that have already been performed are blurred and or darkened relative to visual indications of maneuvers that have not yet been performed. In some embodiments, the electronic device automatically scrolls the plurality of visual indications as the user navigates the route so that the next maneuver is at a respective position (e.g., the top) in the list user interface.

In some embodiments, while displaying the indication (e.g., 608*a*) of the route on the representation of the map, the electronic device (e.g., 500) receives, via the one or more input devices, an input (e.g., via contact 603*k*) corresponding to a request to display the list user interface (e.g., that does not include the representation of the map) including the plurality of visual indications of the plurality of maneuvers of the route, such as in FIG. 6K. In some embodiments the input corresponding to the request to display the user interface is selection of a respective region or element of the user interface including the indication of the route on the representation of the map.

In some embodiments, in response to receiving the input (e.g., via contact 603*k*) corresponding to the request to display the list user interface, such as in FIG. 6K, the electronic device (e.g., 500) displays, via the display generation component (e.g., 504), the list user interface including displaying a second respective visual indication (e.g., 626*a*) of the plurality of visual indications (e.g., 626*a*-626*d*) of the plurality of maneuvers of the route at a respective location in (e.g., at the top of) the list user interface, such as in FIG. 6L, wherein the second respective visual indication (e.g., 626*a*) corresponds to a next maneuver in the route. In some embodiments, the electronic device initially displays the list user interface with the second respective visual indication corresponding to the next maneuver in the route displayed at the top of the list user interface. in some embodiments, as the user of the electronic device navigates the route, the electronic device automatically scrolls the list user interface so that the next maneuver in the route is displayed at the top of the list user interface.

In some embodiments, while displaying the list user interface, such as in FIG. 6L, the electronic device (e.g., 500) receives, via the one or more input devices, an input (e.g., via contact 603L) corresponding to a request to scroll the plurality of visual indications (e.g., 626*a*-626*d*) of the plurality of maneuvers of the route. In some embodiments, receiving the input includes detecting movement of a contact on the display generation component (e.g., a touch screen) that is displaying the list user interface.

In some embodiments, while displaying the list user interface, such as in FIG. 6L, in response to receiving the input corresponding to the request to scroll the one or more visual indications (e.g., 626*a*-626*d*) of the one or more maneuvers of the route, in accordance with a determination that the input corresponding to the request to scroll the plurality of visual indications of the plurality of maneuvers of the route is a request to scroll in a first direction (e.g., up, left), such as in FIG. 6L, the electronic device (e.g., 500) scrolls to a third respective visual indication (e.g., 626*e*) of the plurality of visual indications (e.g., 626*b*-626*e*) corresponding to a previous maneuver of the route, such as in FIG. 6M. In some embodiments, the user of the electronic device has already executed the previous maneuver of the route. In some embodiments, the location of the previous maneuver of the route is at a location of the route that is prior to a current location of the electronic device along the route.

In some embodiments, while displaying the list user interface, such as in FIG. 6L, in response to receiving the input corresponding to the request to scroll the one or more visual indications (e.g., 626*a*-626*d*) of the one or more maneuvers of the route, in accordance with a determination that the input corresponding to the request to scroll the plurality of visual indications (e.g., 626*a*-626*d*) the plurality of maneuvers of the route is a request to scroll in a second direction (e.g., down, right) different from the first direction, such as an input similar to input illustrated in FIG. 6L, but in an opposite direction, the electronic device (e.g., 500) scrolls to a fourth respective visual indication of the plurality of visual indications corresponding to an upcoming maneuver of the route, such as an indication displayed above indication 626*a* in FIG. 6L. In some embodiments, the user of the electronic device has not yet executed the upcoming maneuver rotated is embodiments the location of the upcoming maneuver of the route is at a location of the route that is after the current location of the electronic device along the route. In some embodiments, it is possible to scroll to a respective representation of any maneuver in the route irrespective of whether that maneuver is upcoming or already completed. In some embodiments, in response to detecting selection of a representation of a previous or upcoming maneuver, the electronic device displays a representation of the respective maneuver on a map. The above-described manner of scrolling to previous maneuvers of the route and scrolling to upcoming maneuvers of the route in the list view provides an efficient way of previewing upcoming maneuvers and reviewing previous maneuvers in the list user interface, which additionally reduces power usage and improves battery life of the electronic device by enabling the user to use the electronic device more quickly and efficiently.

In some embodiments, such as in FIG. 6C, displaying the indication (e.g., 608*d*) of the route on the representation of the map from the second perspective includes displaying a visual indication (e.g., 638*b*, 638*c*, 618*a*) associated with the upcoming maneuver of the route. For example, the visual indication is a visual indication of one or more lanes of a road in which the user of the electronic device should drive in order to (e.g., safely, legally) complete an upcoming maneuver of the route. For example, the visual indication includes display of the indication of lane lines on a road on which the user of the electronic device is driving (e.g., a road on which the electronic device is currently located) and displaying the representation of the route within one or more lanes in which the user of the electronic device should drive in order to (e.g., safely, legally) complete the upcoming maneuver.

In some embodiments, such as in FIG. 6A, displaying the indication (e.g., 608*a*) of the route on the representation of the map from the first perspective does not include displaying the visual indication associated with the upcoming maneuver of the route. In some embodiments, displaying the indication of the route on the representation of the map from the first perspective includes displaying the indication of the route and/or indications of one or more physical objects along the route (e.g., roads, lane lines, etc.) with less detail than the level of detail with which the indication of the route is displayed from the second perspective. The above-described manner of displaying the visual indication associated with the upcoming maneuver of the route while displaying the indication of the route on the representation of the map from the second perspective provides an efficient way of providing additional details about an upcoming maneuver when the one or more first criteria for displaying the indication of the route from the second perspective are satisfied, which additionally reduces power usage and improves battery life of the electronic device by enabling the user to use the electronic device more quickly and efficiently.

In some embodiments, such as in FIG. 6C, the visual indication (e.g., 638*b*, 638*c*) associated with the upcoming maneuver of the route includes a visual indication (e.g., 638*b*, 638*c*) of lane lines of a road on which a current location of the device (e.g., 500) is located (e.g., a road on which the user of the electronic device is currently driving). In some embodiments, while displaying the visual indication of the lane lines on the road on which the current location of the electronic device is located, the electronic device displays a visual indication of one or more lanes in which the user of the electronic device should drive in order to (e.g., safely, legally) complete the upcoming maneuver. For example, the electronic device displays the visual indication of the route overlaid on the lanes in which the user of the electronic device should drive in order to (e.g., safely, legally) complete the upcoming maneuver. In some embodiments, the electronic device forgoes display of the visual indication associated with the upcoming maneuver of the route while displaying the map from the first perspective. In some embodiments, the electronic device forgoes display of the visual indication of the lane lines while displaying the map from the first perspective. The above-described manner of displaying the visual indication of lane lines of the road on which the current location of the device is located while displaying the indication of the route from the second perspective provides an efficient way of presenting additional details about the upcoming maneuver when the one or more first criteria for displaying the indication of the route from the second perspective are satisfied, which additionally reduces power usage and improves battery life of the electronic device by enabling the user to use the electronic device more quickly and efficiently.

In some embodiments, such as in FIG. 6C, the visual indication associated with the upcoming maneuver of the route includes a visual indication (e.g., 638*b*, 638*c*) of one or more respective lanes to drive in (e.g., and an indication of one or more respective lanes to not drive in) to complete the upcoming maneuver of the route. For example, the electronic device displays the visual indication of the route overlaid on the lanes in which the user of the electronic device should drive in (and not overlaid on the lanes in which the user should not drive in) order to (e.g., safely, legally) complete the upcoming maneuver. In some embodiments, the electronic device forgoes display of the visual indication of one or more respective lanes to drive in the complete the upcoming maneuver of the route while displaying the map from the first perspective. The above-described manner of Displaying the visual indication of the one or more respective lanes to drive in to complete the upcoming maneuver of the route provides an efficient way of providing the user with information they need to execute the upcoming maneuver, which additionally reduces power usage and improves battery life of the electronic device by enabling the user to use the electronic device more quickly and efficiently by reducing the likelihood that the user is unable to execute the maneuver and has to take a detour.

In some embodiments, such as in FIG. 6C, displaying the indication (e.g., 608*d*) of the route on the representation of the map from the second perspective includes displaying the indication (e.g., 608*d*) of the route with a visual characteristic (e.g., size, alignment, position) corresponding to one or more lanes in which to drive in order to (e.g., safely, legally) complete the upcoming maneuver of the route (e.g., and not corresponding to one or more lanes in which to not drive in to complete the upcoming maneuver of the route). In some embodiments, displaying the indication of the route on the representation of the map from the second perspective includes displaying indications of lanes on the road on which the user of the electronic device is currently driving (e.g., a road on which the current location of the electronic device is located). In some embodiments, the electronic device displays the indication of the route overlapping one or more lanes in which the user of the electronic device should drive in order to (e.g., safely, legally) complete the upcoming maneuver of the route. In some embodiments, the electronic device displays the indication of the route so that the indication of the route does not overlap one or more lanes in which the user of the electronic device should not drive in order to (e.g., safely, legally) complete the upcoming maneuver of the route.

In some embodiments, such as in FIG. 6A, displaying the indication (e.g., 608*a*) of the route on the representation of the map from the first perspective includes displaying the indication (e.g., 608*a*) of the route with a visual characteristic (e.g., size, alignment, position) that is independent of one or more lanes in which to drive in to complete the upcoming maneuver of the route. In some embodiments, while the electronic device displays the indication of the route on the representation of the map from the first perspective, the electronic device forgoes displaying indications of the lanes of the road on which the user of the electronic device is currently driving (e.g., the road on which the current location of the electronic device is located). In some embodiments, while displaying the indication of the route from the first perspective, the electronic device displays the indication of the route centered on an indication of the road on which the route is located in a way that does not indicate one or more lanes in which the user of the electronic device should drive in order to (e.g., safely, legally) complete an upcoming maneuver of the route. The above-described manner of displaying the indication of the route with the visual characteristic corresponding to one or more lanes in which to drive in order to complete the upcoming maneuver of the route while displaying the indication of the route from the second perspective provides an efficient way of presenting additional information about the upcoming maneuver in accordance with the determination that the upcoming maneuver satisfies the one or more first criteria for display of the indication of the route from the second perspective which additionally reduces power usage and improves battery life of the electronic device by enabling the user to use the electronic device more quickly and efficiently.

In some embodiments, while displaying the indication (e.g., 608d) of the route on the representation of the map from the second perspective, such as in FIG. 6C, the electronic device (e.g., 500) detects that a current location of the electronic device (e.g., 500) corresponds to completion of the upcoming maneuver of the route. In some embodiments, detecting that the current location of the electronic device corresponds to completion of the upcoming maneuver of the route includes detecting that the current location of the electronic device is past the location of the maneuver along the route. For example, if the upcoming maneuver is a right turn from a first road onto a second road, the electronic device detects that the current location of the electronic device corresponds to completion of the upcoming maneuver in accordance with a determination that the current location of the electronic device is on the second rather than being on the first road.

In some embodiments, in response to detecting that the current location of the electronic device (e.g., 500) corresponds to completion of the upcoming maneuver of the route, the electronic device (e.g., 500) displays, via the display generation component (e.g., 504), the indication (e.g., 608a) of the route on the representation of the map displayed from the first perspective, such as in FIG. 6F. In some embodiments, displaying the indication of the route from the second perspective includes displaying indications of lane lines on representations of roads included in the representation of the map. In some embodiments, displaying the indication of the route from the first perspective includes forgoing display of indications of lane lines on representations of roads included in the representations of the map. In some embodiments, in response to detecting that the current location of the electronic device corresponds to completion of the upcoming maneuver, the electronic device ceases display of indications of lane lines that were displayed while displaying the indication of the route from the second perspective. The above-described manner of Displaying the indication of the route from the first perspective in response to detecting that the current location of the electronic device corresponds to completion of the upcoming maneuver of the route provides an efficient way of displaying a larger map area in less detail while the upcoming maneuver does not satisfy the one or more first criteria for display of the indication of the route from the second perspective which additionally reduces power usage and improves battery life of the electronic device by enabling the user to use the electronic device more quickly and efficiently.

In some embodiments, while displaying the indication (e.g., 608f) of the route on the representation of the map from the second perspective, such as in FIG. 6D, the electronic device (e.g., 500) detects that a current location of the electronic device (e.g., 500) satisfies one or more second criteria. In some embodiments, the one or more second criteria include a criterion that is satisfied when the current location of the electronic device is within a predetermined threshold distance (e.g., 1, 2, 3, 5, 10, 20, 30, 50, 100, 200, etc. meters) of a location associated with the upcoming maneuver of the route. For example, if the upcoming maneuver of the route is a turn from a first road to a second road, the location associated with the upcoming maneuver is the intersection of the first and the second.

In some embodiments, in response to detecting that the current location of the electronic device (e.g., 500) satisfies one or more second criteria, the electronic device (e.g., 500) displays, via the display generation component (e.g., 504), the indication (e.g., 608f) of the route on the representation of the map displayed from a third perspective having a different lateral angle relative to a portion of the map corresponding to the current location of the electronic device (e.g., 500) than a lateral angle relative to the portion of the map corresponding to the current location of the electronic device (e.g., 500) of the second perspective, such as in FIG. 6E. In some embodiments, the second perspective and the third perspective have the same angle relative to the respective reference (e.g., gravity). In some embodiments, the third perspective includes a greater portion of a portion of the indication of the route corresponding to an upcoming portion of the route. For example, if the upcoming maneuver is merging off the freeway by making a slight right turn, the third perspective has a greater angle to the right relative to an indication of the current location the electronic device than the second perspective.

In some embodiments, such as in FIG. 6E, in accordance with a determination that the upcoming maneuver of the route has a first characteristic (e.g., turn angle, turn radius, turn direction), the third perspective has a first lateral angle. For example, if the upcoming maneuver is merging or turning to the right, the first lateral angle is an angle to the right of an indication of the current location of the electronic device. As another example, if the upcoming maneuver is a turn with a relatively large radius, the first lateral angle is a relatively small angle.

In some embodiments, in accordance with a determination that the upcoming maneuver of the route has a second characteristic different from the first characteristic, the third perspective has a second lateral angle different from the first lateral angle, such as a lateral angle in the lateral direction opposite of the lateral angle in FIG. 6E in response to an upcoming merge to the left instead of a merge to the right as shown in FIG. 6E. For example, if the upcoming maneuver is merging or turning to the left, the second lateral angle is an angle to the left of an indication of the current location of the electronic device. As another example, if the upcoming maneuver is a turn with a relatively small radius, the second lateral angle is a relatively large angle. The above-described manner of displaying the indication of the route from the third perspective having a different lateral angle than a lateral angle of the second perspective in accordance with the determination that the current location of the electronic device satisfies the one or more second criteria provides an efficient way of displaying a larger portion of an upcoming portion of the route in accordance with the determination that the one or more second criteria are satisfied which additionally reduces power usage and improves battery life of the electronic device by enabling the user to use the electronic device more quickly and efficiently.

In some embodiments, displaying the indication of the route on the representation of the map displayed from the third perspective, such as in FIG. 6E, includes displaying, on the map, (at least) a predetermined number (e.g., 1, 2, 3, 5, 10, 15, 20, etc.) of visual indications of physical objects along the route at locations along the route corresponding to physical locations of the physical objects, such as presenting indications of points of interest in the map illustrated in FIG. 6E. In some embodiments, the visual indications of respective objects are visual indications of points of interest, such as businesses, landmarks, and the like in the vicinity of the current location of the electronic device. In some embodiments, the visual indications of the respective physical objects are displayed at locations on the map corresponding to the locations of physical objects in real life. In some embodiments, the lateral angle of the third perspective is selected by the electronic device in order to include a portion of the representation of the map corresponding to (at least) the predetermined number of visual indications of physical objects. In some embodiments, the visual indications of physical objects along the route are displayed with a visual characteristic determined according to one or more steps of method 900. The above-described manner of displaying the predetermined number of visual indications of physical objects along the route while displaying the indication of the route from the third perspective provides an efficient way of displaying additional information about the vicinity of the current location of electronic device, which additionally reduces power usage and improves battery life of the electronic device by enabling the user to use the electronic device more quickly and efficiently.

In some embodiments, such as in FIG. 6F, while displaying the indication (e.g., 608a) of the route on the representation of the map displayed from the first perspective, in accordance with a determination that the upcoming maneuver of the route does not satisfy the one or more first criteria and satisfies one or more second criteria, the electronic device (e.g., 500) displays, via the display generation component (e.g., 504), the indication (e.g., 608h) of the route on the representation of the map displayed from a third perspective, such as in FIG. 6G, wherein an angle of the third perspective relative to the respective reference is different from (e.g., greater than, less than) the angle of the second perspective relative to the respective reference (e.g., gravity). In some embodiments, the angle of the third perspective relative to the respective reference is less than the angle of the first perspective relative to the respective reference. For example, the third perspective is a bird's eye view and the second perspective is a perspective view that has a larger angle relative to gravity than the angle relative to gravity of the bird's eye view. In some embodiments, the one or more second criteria include a criterion that is satisfied when the upcoming maneuver is a respective type of maneuver and the one or more first criteria are not satisfied when the upcoming maneuver is the respective type of maneuver. For example, the one or more second criteria are satisfied and the one or more first criteria are not satisfied when the upcoming maneuver is a turn from one road to another intersecting road. In this example, the one or more first criteria are satisfied when the upcoming maneuver is a merge from one road to another road. The above-described manner of displaying the indication of the route from the third perspective in accordance with the determination that the upcoming maneuver of the route satisfies the one or more second criteria provides an efficient way of presenting the user with information relevant to the upcoming maneuver, which additionally reduces power usage and improves battery life of the electronic device by enabling the user to use the electronic device more quickly and efficiently.

In some embodiments, while displaying the indication of the route on the representation of the map, in accordance with a determination that future traffic along the route satisfies one or more second criteria (e.g., the estimated delay caused by traffic exceeds a predetermined threshold time (e.g., 1, 2, 3, 5, 10, 15, etc. minutes; 100, 200, 300, 500, 1000, 2000, etc. kilometers), such as in FIG. 6I, the electronic device (e.g., 500) displays the indication (e.g., 608h) of the route on the representation of the map from a respective perspective based on a length of (e.g., the distance of) the traffic along the route to display a future portion (e.g., 608i) of the route that includes the future traffic that is a respective distance from a current location of the electronic device (e.g., 500). In some embodiments, displaying the indication of the route from the respective perspective includes zooming the representation of the map out in order to show (e.g., the entire duration of) an upcoming traffic incident. For example, if an upcoming traffic incident lasts for half a mile, displaying the indication of the route from the respective perspective includes displaying a portion of the representation of the map that includes half a mile ahead of the current location of the electronic device along the route. As another example, if an upcoming traffic incident lasts for two miles, displaying the indication of the route from the respective perspective includes displaying a portion of the representation of the map that includes two miles ahead of the current location of the electronic device along the route. In some embodiments, while the future traffic satisfies the one or more second criteria, the electronic device continuously updates the level of zoom with which the representation of the map is displayed in order to continuously display the representation of the map at a level of zoom that includes the (entire) upcoming traffic incident. In some embodiments, the electronic device updates the level of the zoom to (e.g., continuously) show a visual indication of the current location of the electronic device and the end of the upcoming traffic incident (e.g., updating the level of zoom as the current location of the electronic device changes and/or the traffic conditions change).

In some embodiments, while displaying the indication (e.g., 608a) of the route on the representation of the map, such as in FIG. 6K, in accordance with a determination that the future traffic along the route does not satisfy the one or more second criteria, the electronic device (e.g., 500) displays the indication (e.g., 608a) of the route on the representation of the map from the first perspective without displaying the future portion of the route that is the respective distance from the current location of the electronic device. In some embodiments, displaying the indication of the route from the first perspective includes displaying the representation of the map at a constant level of zoom irrespective of distance or duration of an upcoming traffic incident. In some embodiments, while displaying the indication of the route from the first perspective with the consistent level of zoom, the electronic device pans the view of the map as the current location of the electronic device changes so that the level of zoom remains consistent and so that a visual indication of the current location of the electronic device is continuously displayed on the representation of the map. The above-described manner of displaying the indication of the route from the respective perspective based on the length of the traffic provides an efficient way of indicating to the user the duration of the upcoming traffic, which additionally reduces power usage and improves battery life of the electronic device by enabling the user to use the electronic device more quickly and efficiently.

In some embodiments, while displaying the indication (e.g., 608i, 608j, 608k) of the route on the representation of the map from the respective perspective, such as in FIG. 6J, in accordance with a determination that the future traffic along the route no longer satisfies the one or more second criteria (e.g., the upcoming and/or remaining traffic is less than the predetermined time and/or distance threshold, the current location of the electronic device is no longer in the traffic), the electronic device (e.g., 500) ceases to display the indication of the route on the representation of the map from the respective perspective, such as in FIG. 6K.

In some embodiments, while displaying the indication (e.g., 608i, 608j, 608k) of the route on the representation of the map from the respective perspective, such as in FIG. 6J, in accordance with a determination that the future traffic along the route no longer satisfies the one or more second criteria (e.g., the upcoming and/or remaining traffic is less than the predetermined time and/or distance threshold, the current location of the electronic device is no longer in the traffic), the electronic device (e.g., 500) displays the indication (e.g., 608a) of the route on the representation of the map from the first perspective, such as in FIG. 6K. In some embodiments, once the current location of the electronic device is no longer at a location impacted by traffic, the electronic device no longer displays the indication of the route from a perspective based on the traffic. The above-described manner of displaying the indication of the route from the first perspective in accordance with the determination that the future traffic no longer satisfies the one or more second criteria provides an efficient way of displaying the indication of the route on a portion of the representation of the map relevant to current driving conditions of the current location of the electronic device which additionally reduces power usage and improves battery life of the electronic device by enabling the user to use the electronic device more quickly and efficiently.

In some embodiments, such as in FIGS. 6I-6J, displaying the indication 9eg 608h, 608i, 608j) of the route on the representation of the map from the respective perspective includes updating a level of zoom of the respective perspective as a distance remaining in the future traffic changes to display the (e.g., entire) future traffic on the representation of the map. In some embodiments, as the traffic changes and/or as the current location of the electronic device moves through the traffic, the electronic device updates the level of zoom to maintain display of the (e.g., entire) future traffic on the representation of the map. For example, while the future traffic covers one mile along the route past the current location of the electronic device, the level of zoom includes the mile along the route has the current location of the electronic device and while the future traffic covers half a mile along the route past the current location of the electronic device the level of zoom is adjusted (e.g., increased) to include half a mile along the route past the location of the electronic device (e.g., but not past that half mile). The above-described manner of updating the level of zoom of the respective perspective as the distance remaining in the future traffic changes provides an efficient way of maintaining display of the future traffic on the representation of the map which additionally reduces power usage and improves battery life of the electronic device by enabling the user to use the electronic device more quickly and efficiently.

In some embodiments, while displaying the indication of the route on the representation of the map, the electronic device displays, overlaid on the representation of the map, a selectable option that, when selected, causes the electronic device to display a menu for changing an audio notification setting of the navigation instructions. For example, the menu includes an option that, when selected, causes the electronic device to present audio notifications of all upcoming maneuvers and alerts, an option that, when selected, causes the electronic device to present audio notifications for alerts without presenting audio notifications for upcoming maneuvers, and an option that, when selected causes the electronic device to forgo presenting audio notifications.

In some embodiments, (while not navigating along the route) the electronic device (e.g., 500) displays, via the display generation component (e.g., 504), a three-dimensional globe (e.g., 642) including the representation of the map, such as in FIG. 6O. In some embodiments, while displaying the three-dimensional globe (e.g., 642) including the representation of the map, the electronic device (e.g., 500) detects, via the one or more input devices, an input (e.g., via contacts 603m and 603n) corresponding to a request to zoom in to a respective zoom level on a respective portion of the three-dimensional globe (e.g., 652), such as in FIG. 6O. In some embodiments, the three-dimensional details of the globe include representations of elevation on land and underwater.

In some embodiments, in response to detecting the input (e.g., via contacts 603m and 603n) corresponding to the request to zoom in to the respective zoom level on the respective portion of the three-dimensional globe (e.g., 642), such as in FIG. 6O, the electronic device (e.g., 500) ceases display of the three-dimensional globe, such as in FIG. 6P.

In some embodiments, in response to detecting the input (e.g., via contacts 603m and 603n) corresponding to the request to zoom in to the respective zoom level on the respective portion of the three-dimensional globe (e.g., 642), such as in FIG. 6O, the electronic device (e.g., 500) displays, via the display generation component (e.g., 504), a two-dimensional (e.g., elevation) map (e.g., 644) of the respective portion of the three-dimensional globe at the respective zoom level, such as in FIG. 6P. In some embodiments, the respective zoom level is based on a magnitude of the input. In some embodiments, the respective portion of the three-dimensional globe displayed in the two-dimensional map is based on a location of the globe to which the input was directed. In some embodiments, the map is a topographical map that represents the elevation of a region corresponding to the respective portion of the three-dimensional globe. The above-described manner of displaying the two dimensional map of the respective portion of the three-dimensional globe at the respective zoom level in response to the input provides an efficient way of presenting the respective portion of the three-dimensional globe in more detail, which additionally reduces power usage and improves battery life of the electronic device by enabling the user to use the electronic device more quickly and efficiently.

In some embodiments, (while not navigating along the route) the electronic device (e.g., 500), via the display generation component (e.g., 504), the three-dimensional globe (e.g., 642) including the representation of the map, such as in FIG. 6O. In some embodiments, while displaying the three-dimensional globe (e.g., 642) including the representation of the map, such as in FIG. 6O, the electronic device (e.g., 500) displays, via the one or more input devices, an input (e.g., via contacts 603m and 603n) corresponding to a request to zoom in to the respective zoom level on a second respective portion, different from the respective portion, of the three-dimensional globe (e.g., 642). In some embodiments, the three-dimensional details of the globe include representations of elevation on land and underwater.

In some embodiments, in response to detecting the input (e.g., via contacts 603*m* and 603*n*) corresponding to the request to zoom in to the respective zoom level on the second respective portion of the three-dimensional globe (e.g., 642), such as in FIG. 6O, the electronic device (e.g., 500) ceases display of the three-dimensional globe, such as in FIG. 6Q.

In some embodiments, in response to detecting the input (e.g., via contacts 603*m* and 603*n*) corresponding to the request to zoom in to the respective zoom level on the second respective portion of the three-dimensional globe (e.g., 642), such as in FIG. 6O, the electronic device (e.g., 500) displays, via the display generation component (e.g., 504), a three-dimensional (e.g., elevation) map (e.g., 646) of the second respective portion of the three-dimensional globe at the respective zoom level, such as in FIG. 6Q. In some embodiments, the respective zoom level is based on a magnitude of the input. In some embodiments, the respective portion of the three-dimensional globe displayed in the three-dimensional map is based on a location of the globe to which the input was directed. In some embodiments, the map is a three-dimensional map that includes shading and/or contouring that represent the elevation of a region corresponding to the respective portion of the three-dimensional globe. In some embodiments, the electronic device displays a three-dimensional globe and, in response to an input corresponding to a request to zoom in on a respective portion of the globe, displays a map of the respective portion. In some embodiments, three-dimensional maps are available for some regions and not others. In some embodiments, in response to the input to zoom in on the respective portion of the globe, in accordance with a determination that a three-dimensional map of the portion is available, the electronic device displays a three-dimensional map of the portion. In some embodiments, in response to the input to zoom in on the respective portion of the globe, in accordance with a determination that a three-dimensional map of the portion is not available, the electronic device displays a two-dimensional map of the portion. The above-described manner of displaying the three-dimensional map of the respective portion of the three-dimensional globe at the respective zoom level in response to the input provides an efficient way of presenting the respective portion of the three-dimensional globe in more detail, which additionally reduces power usage and improves battery life of the electronic device by enabling the user to use the electronic device more quickly and efficiently.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, 1300, and/or 1500) are also applicable in an analogous manner to method 700 described above with respect to FIG. 7. For example, the ways of presenting navigation routes from various perspectives described above with reference to method 700 optionally have one or more of the characteristics of the ways of modifying display of representations of physical objects in the vicinity of a navigation route while presenting navigation directions, modifying display of portions of a navigation route that are occluded by representations of (e.g., physical) objects in a map, presenting representations of physical objects in maps, and/or presenting representations of physical objects in maps in response to requests to search for physical objects described herein with reference to other methods described herein (e.g., methods 900, 1100, 1300, and/or 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 7 are, optionally, implemented by components depicted in FIGS. 1A-1B. For example, displaying operations 702, 706, and 708 are, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Presenting Navigation Routes on a Map

Users interact with electronic devices in many different manners, including using electronic devices to present navigation directions from a first physical location to a second physical location. In some embodiments, presenting the navigation directions include presenting a representation of the route line and one or more representations of physical objects in the physical vicinity of the route. The embodiments described below provide ways in which an electronic device modifies display of representations of physical objects in the vicinity of the route while presenting the navigation directions. Providing efficient manners of modifying display of the representations of physical objects while presenting the navigation directions enhances interactions with a device, thus reducing the amount of time a user needs to interact with the device while navigating, which increases battery life for battery-powered devices and improves safety (e.g., while driving). It is understood that people use devices. When a person uses a device, that person is optionally referred to as a user of the device.

FIGS. 8A-8H illustrate exemplary ways in which an electronic device modifies display of representations of physical objects in the vicinity of a navigation route while presenting navigation directions in accordance with some embodiments. The embodiments in these figures are used to illustrate the processes described below, including the processes described with reference to FIG. 9. Although FIGS. 8A-8H illustrate various examples of ways an electronic device is able to perform the processes described below with reference to FIG. 9, it should be understood that these examples are not meant to be limiting, and the electronic device is able to perform one or more processes described below with reference to FIG. 9 in ways not expressly described with reference to FIGS. 8A-8H.

FIGS. 8A-8H illustrate various examples of an electronic device 500 modifying display of representations of physical objects in the vicinity of a navigation route line while presenting navigation directions. For example, the electronic device displays representations of physical objects with a degree of visual prominence that depends on the distance between the physical objects and the route. In some embodiments, the electronic device 500 modifies the degrees of visual prominence with which representations of physical objects are displayed in order to reduce driver distraction while presenting the navigation instructions and/or to reduce the processing power required to render the representations of physical objects on the map while navigating.

FIG. 8A illustrates an example of a navigation user interface presented by electronic device 500. In some embodiments, the navigation user interface includes an indication 802a of the next navigation maneuver to be performed, an indication 802b of the distance between the current location of the electronic device 500 and the location of the next navigation maneuver to be performed, an indication 802c of the name of the street associated with the next navigation maneuver (e.g., the street to be merged or turned onto), an option 804a that, when selected, causes the electronic device 500 to present an overview of the navigation directions, an option 804b that, when selected, causes the electronic device 500 to present audio options associated with the navigation directions, an option 804c to report an incident in the vicinity of the electronic device 500, an indication 806a of the estimated time of arrival at the destination, an indication 806b of the estimated time remaining on the route to the destination, an indication 806c of the distance remaining on the route, and an option 806d to present a menu of actions related to the route overlaid on a map. In some embodiments, the map includes an indication 808a of the navigation route, an indication 814a of the current location of the electronic device 500, a representation 812a of an overpass that intersects (e.g., over) the navigation route, representations 816a-816c of buildings in the vicinity of the navigation route, representations 826a-b of trees in the vicinity of the navigation route, and representations 836a-b of points of interest (e.g., businesses, landmarks, public places) in the vicinity of the navigation route.

In some embodiments, the electronic device 500 modifies the visual characteristics of the representations of various objects in the vicinity of the navigation route based on the distance between the respective objects and the navigation route. In some embodiments, the electronic device 500 defines discrete regions 818 and 820a-b of the map based on distance from the navigation route and applies different visual styling to representations of objects in region 818 than the visual styling of representations of objects in regions 820a and 820b.

In some embodiments, in region 818, which is closer to the indication 808a of the route line than how close regions 820a and 820b are to the indication 808a of the route line, indications of buildings, roads, and points of interest are displayed with more visual prominence than the representations of buildings, roads, and points of interest in regions 820a and 820b. For example, representations 816a of buildings within region 818 are displayed with more visual prominence (e.g., less translucency, more color saturation, etc.) than representations 816c of buildings in region 820a. In some embodiments, the electronic device 500 displays portions of representations 816b of buildings that are in both region 818 and region 820a with different degrees of visual prominence depending on which region 818 and 820a the portions of the representations 816b are located in. For example, portions of representations 816b in region 818 are displayed with more visual prominence than portions of representations 816b that are in region 820a. As another example, the electronic device 500 presents more points of interest 836a in region 818 than the number of points of interest 836b in regions 820a and 820b. As another example, portions of the representation 812a of an overpass within region 818 are displayed with increased visual prominence (e.g., less translucency, more color saturation) and with lane lines, whereas portions of the representation 812a of the overpass in regions 820a and 820b are displayed with less visual prominence (e.g., more translucency, less color saturation) and without lane lines. In some embodiments, as shown in FIG. 8A, a portion 810k of the representation 812a of the overpass that is above the indication 808a of the route line is displayed with decreased visual prominence and no lane lines even though it is in region 818, because of the z-height distance between the indication 808a of the navigation route and the portion 810k of the indication 812a of the overpass. In some embodiments, the electronic device 500 adjusts the degrees of visual prominence with which representations of objects are displayed based on the lateral and/or vertical distance between the respective representations of objects and the indication 808a of the route.

In some embodiments, the electronic device 500 displays more representations of plants (e.g., trees) or displays the representations of plants (e.g., trees) with more visual prominence if the trees are further from the indication 808a of the route. For example, representations 826a of trees in region 818 are displayed with decreased visual prominence (e.g., more translucency, less color saturation) than representations 826b of trees in regions 820a and 820b. In some embodiments, the electronic device 500 displays more representations 826b of trees in regions 820a and 820b (e.g., relative to the actual number of tress in the physical regions corresponding to regions 820a and 820b) than the number of representations 826a of trees in region 818 (e.g., relative to the actual number of trees in the physical region corresponding to region 818).

In some embodiments, when generating representations of physical objects for display in the map, the electronic device 500 creates batches of representations that share visual characteristics and generates all of the representations in a respective batch together (e.g., at the same time, one after another, etc.). For example, representations 816a correspond to buildings with similar shapes and visual characteristics so the electronic device 500 is able to generate these representations 816a for display in the same batch. As another example, representations 816c correspond to buildings with similar shapes and visual characteristics so the electronic device 500 could generate these representations in the same batch. In some embodiments, the electronic device 500 generates the representations 826a of trees in region 818 in one batch and representations 826b of trees in regions 820a and 820b in different batches or in the same batch. In some embodiments, objects in each respective batch are all within the same region (e.g., region 818, 820a, 820b). In some embodiments, batches of objects include objects in region 820a and objects in region 820b because objects in regions 820a and 820b are displayed with the same visual characteristics.

In some embodiments, rather than modifying the visual prominence of representations of objects based on which of a plurality of discrete regions the representations are located in, the electronic device 500 modifies display of representations of objects based on a continuous distance of (e.g., one or more portions of) the objects from the navigation route (e.g., on a pixel-by-pixel basis). For example, FIG. 8B illustrates an example of a continuous approach to modifying the display of representations of physical objects in the vicinity of a navigation route while presenting navigation directions.

For example, portions of the representation 812a of the overpass that intersects the indication 808a of the route line have increased visual prominence (e.g., decreased translucency, increased color saturation, increased prominence of lane lines) the closer the portions are to the indication 808a of the route line. As another example, representations 816a of buildings are displayed with more visual prominence than representations 816c of buildings because representations 816a of buildings are closer to the indication 808a of the route than the representations 816c are. In some embodiments, some representations 816b of buildings have varying degrees of visual prominence such that portions of the representations 816b that are closer to the representation 808a of the route have more visual prominence than portions that are further from the representation 808a of the route. As another example, the electronic device 500 displays more indications 836 of points of interest in portions of the map that are closer to the representation 808a of the navigation route (e.g., relative to the number of points of interest at those physical locations) than the number of indications 836 of points of interest in portions of the map that are further from the representation 808a of the navigation route (e.g., relative to the number of points of interest at those physical locations). In some embodiments, the electronic device 500 displays more indications 836a-c of trees and displays the indications with more visual prominence the further the indications 836a-c are from the indication 808a of the route line. For example, indications 836b that are furthest from the indication 808a of the route line have the most visual prominence and indications 836a that re closest to the indication 808a of the route line have the least visual prominence and indications 836c have a degree of visual prominence between the degrees of visual prominence of indications 836a and 836b.

In some embodiments, the electronic device 500 batches the representations of objects illustrated in FIG. 8B in a manner similar to the manner of batching representations of objects described above with reference to FIG. 8A.

In some embodiments, while the electronic device 500 is presenting a maps user interface without presenting navigation directions, the electronic device 500 does not display representations of physical objects with varying degrees of visual prominence. For example, while presenting navigation directions, the electronic device 500 displays an indication of the navigation route and modifies the visual prominence of the representations of physical objects based on the proximity of the representations to the indication of the navigation route. Because the electronic device 500 does not display a navigation route when it is not presenting navigation directions, the electronic device 500 optionally forgoes modifying the degrees of visual prominence of the representations of objects when navigation directions are not being presented.

Figure 8D:
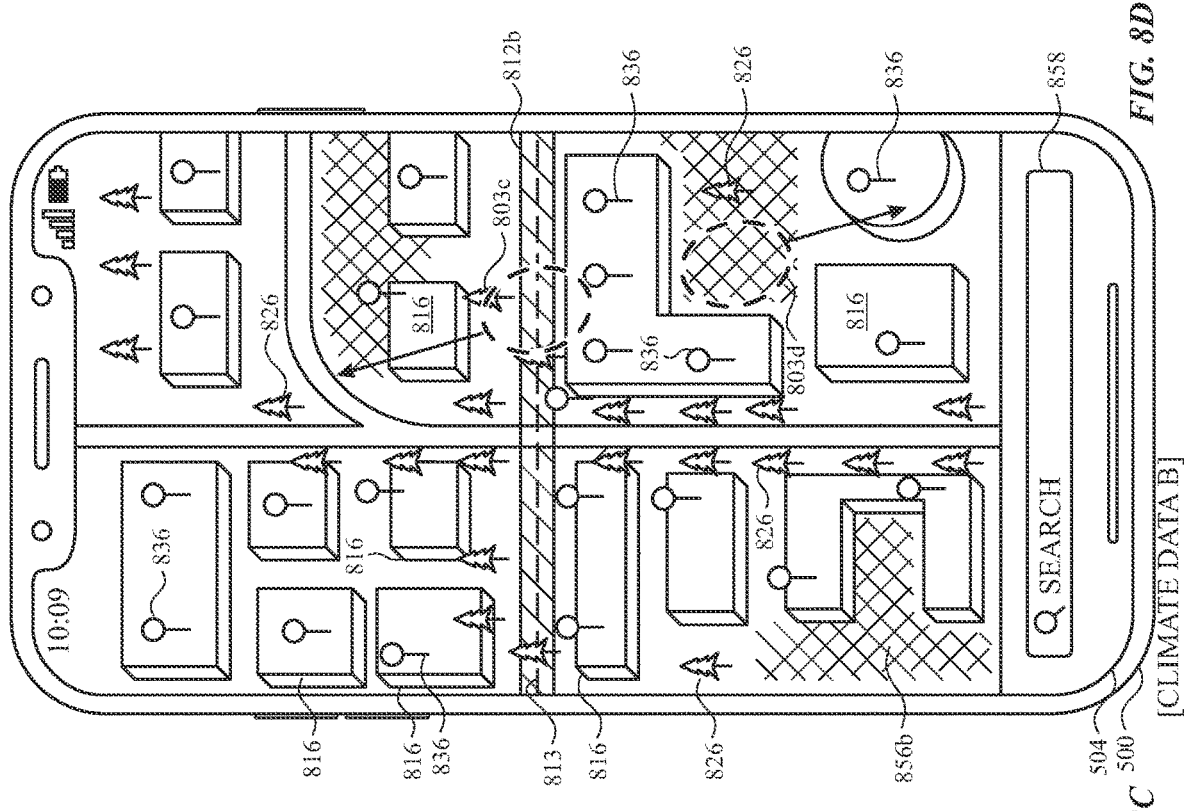
Figure 8C:
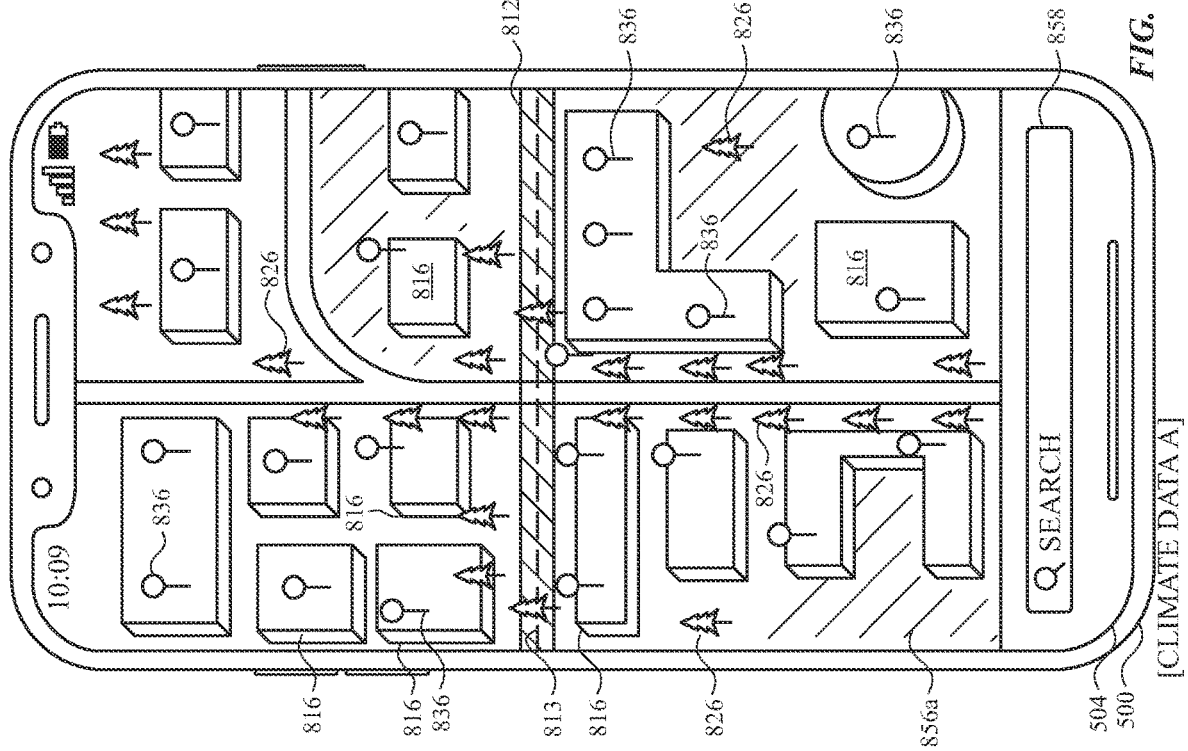

FIG. 8C illustrates an example of the electronic device 500 presenting the map without presenting navigation directions and without modifying the visual prominence of representations of physical objects. For example, FIG. 8C includes a representation 812b of the overpass, representations 836 of points of interest, representations 826 of trees, and representations of buildings 816 on a map that corresponds to the same region as the maps in FIGS. 8A and 8B. In some embodiments, the electronic device 500 displays a search box 858 overlaid on the map.

In some embodiments, the representations of various physical objects have the same degrees of visual prominence as other representations of the same types of physical objects. For example, representations 816 of buildings all have the same degree of visual prominence, though, in some embodiments, the electronic device 500 displays representations 816 of buildings in a variety of colors, such as to match or be similar to the colors of the real-world buildings corresponding to each representation 816. As another example, the representation 812b of the overpass has a consistent degree of visual prominence, including the display of the indication 813 of lane lines along the entire length of the representation of the overpass 812b (e.g., unlike in FIGS. 8A-8B in which portions of the representation 812b of the overpass that are relatively far from the indication 808a of the route did not include the indication of the lane lines). As another example, the representations 836 of points of interest are displayed with the same degrees of visual prominence and at a consistent density for all regions of the map in FIG. 8C (e.g., compared to the density and/or popularity of the points of interest in real life). As another example, the representations 826 of trees are displayed with the same degrees of visual prominence and at a consistent density for all regions of the map in FIG. 8C (e.g., compared to the density of trees in real life).

In some embodiments, the map includes landcover 856a that represents grass or other vegetation in the region represented by the map. For example, the landcover 856a is generated based on climate data for the region represented by the map. In FIG. 8C, the electronic device 500 displays the map with first landcover 856a based on first climate data for the region. In some embodiments, if the climate data for the region were different, the electronic device 500 would display the map with different landcover. For example, FIG. 8D illustrates a map of the same region as the region of the map in FIG. 8C. In FIG. 8D, the electronic device 500 is provided second climate data for the region and therefore displays the map with second landcover 856b, for example. In some embodiments, because the climate data in FIG. 8C is different from the climate data in FIG. 8D, the electronic device 500 displays different landcover 856a in FIG. 8C from the landcover 856b in FIG. 8D. For example, if the climate data in FIG. 8C corresponds to a desert (e.g., low rainfall, high temperatures), the landcover is dirt with sparse vegetation and if the climate data in FIG. 8D corresponds to a temperate climate (e.g., moderate rainfall, moderate temperatures), the landcover is grass.

As shown in FIG. 8D, in some embodiments, the electronic device 500 detects movement of two contacts 803c and 803d that corresponds to a request to zoom the map in (e.g., an outward pinch gesture with the contacts 803c and 803d moving away from each other). In some embodiments, in response to the input illustrated in FIG. 8D, the electronic device 500 updates the user interface as shown in FIG. 8E.

FIG. 8E illustrates an example of the electronic device 500 presenting the map with a higher level of zoom than the level of zoom in FIG. 8D in response to the input illustrated in FIG. 8D. In some embodiments, the electronic device 500 presents more details at higher levels of zoom. For example, as shown in FIG. 8D, the electronic device 500 displays more indications 836 of points of interest within an area of the map corresponding to a respective area (e.g., building) in real life in FIG. 8D than in FIG. 8C and displays an indication 813 of lane lines on the indication 812b of the overpass, which were optionally not displayed in FIG. 8D. In some embodiments, the electronic device 500 presents other details, such as more detailed representations of buildings 816, including details such as sidewalks, and the like at higher levels of zoom.

In some embodiments, in response to a request to present navigation directions from one location to another, the electronic device 500 presents indications of multiple available routes to the destination. In some embodiments, the different routes have different estimated durations (e.g., time and/or distance durations). The electronic device 500 optionally displays an animation of the routes that illustrates the differences in duration between the routes. FIGS. 8F-8H illustrate examples of the electronic device 500 displaying an animation illustrating the differences in estimated route duration for a plurality of routes to a destination according to some embodiments.

FIG. 8F illustrates an exemplary maps user interface featuring a respective location that the user searched for. In some embodiments, the maps user interface includes an indication 840a of the location on a map, an indication 842a of the address of the location, an option 842b to get directions to the location (e.g., from the current location of the electronic device 500), an option 844a to view display settings for the map, and an option 844b to pan and/or zoom the map to show an indication of the current location of the electronic device 500 on the map. As shown in FIG. 8F, in some embodiments, the electronic device 500 detects selection (e.g., with contact 803f) of the option 842b to present navigation directions to the location (e.g., from the current location of the electronic device 500). In some embodiments, in response to the input illustrated in FIG. 8F, the electronic device 500 presents a plurality of animated representations of navigation routes to the destination (e.g., from the current location of the electronic device 500), as shown in FIGS. 8G-8H.

FIGS. 8G-8H illustrate examples of animated representations of navigation routes that the electronic device 500 displays in response to the input illustrated in FIG. 8F. In some embodiments, the electronic device 500 presents an indication 852 of the current location of the electronic device 500, an indication 840b of the navigation destination, and indications 846a-d of the available navigation routes on a map. In some embodiments, the electronic device 500 displays an indication 858a of the starting point and ending point of the routes, and indications 858b and 858c of the available routes overlaid on the map. In some embodiments, indication 858b includes an indication 860a of the estimated duration of the route, an indication 860b of the distance of the route, and a selectable option 860c to begin navigating with the route. In some embodiments, indication 858c includes similar elements to the elements of indication 858b.

In some embodiments, the electronic device 500 displays animated indications 854a and 854b on the indications 846a-d of the available navigation routes. In some embodiments, the animations include animating movement of indications 854b and 854a along the routes from the indication 852 of the current location of the electronic device 500 (e.g., or, more generally, from the start point of the route) to the indication 840b of the destination of the route. In some embodiments, the speeds with which indications 854a and 854b move corresponds to the estimated speed of travel along the routes (e.g., moving slower for slower routes and/or slower sections of the routes and moving faster for faster routes and/or faster sections of the routes). Thus, in some embodiments, the amount of time it takes for the animations to complete corresponds to the estimated amount of time it will take to travel along the routes.

For example, indications 846a and 846b correspond to a first available route, with indication 846a corresponding to a portion of the route that animated indication 854a has already moved past and indication 846b corresponding to a portion of the route the indication 854a has not yet moved past. As another example, indications 846c and 846d correspond to a second available route, with indication 846c corresponding to a portion of the route that animated indication 854b has already moved past and indication 846d corresponding to a portion of the route the indication 854b has not yet moved past. In some embodiments, the indications move at speeds that correspond to the estimated speed of travel along the routes. As shown in FIG. 8H, the electronic device 500 completes the animation for the first route (e.g., corresponding to indication 846a) before completing the animation for the second route (e.g., corresponding to the indications 846c and 846d) because the first route has a shorter duration (e.g., time and/or length duration) than the second route. In some embodiments, the electronic device 500 continues to present the animation of indication 854d until indication 854d reaches the indication 840b of the end of the route. In some embodiments, after completing the animations for both routes, the electronic device 500 repeats both animations. In some embodiments, the electronic device 500 continues to repeat the animations while presenting the user interface illustrated in FIGS. 8G-8H (e.g., unless and until the electronic device 500 detects a request to display a different user interface or goes to sleep, etc.). In some embodiments, the electronic device 500 also displays indications 850a and 850b of the durations of the routes overlaid on the map.

Figure 9:
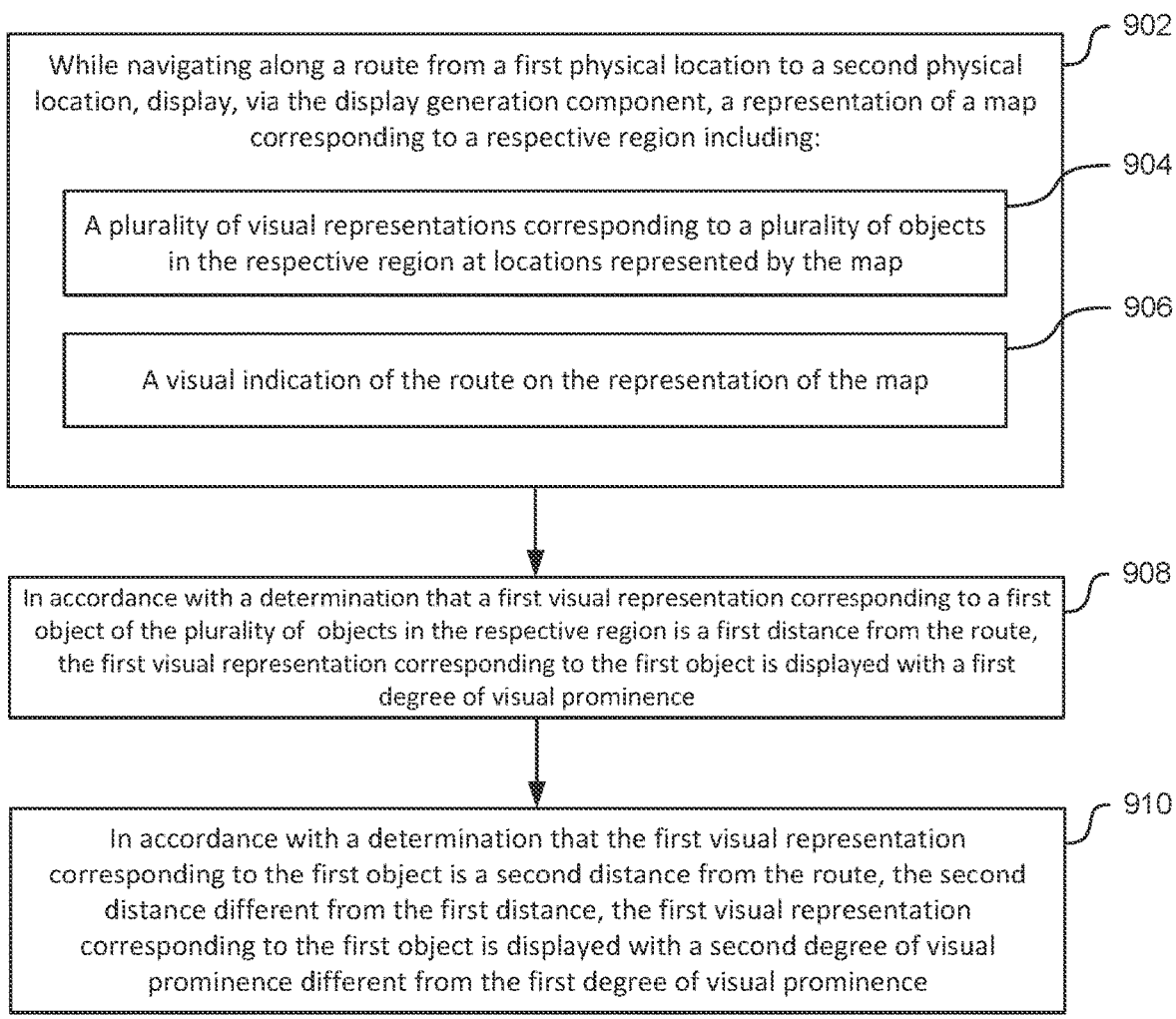
FIG. 9 is a flow diagram illustrating a method of modifying display of representations of (e.g., physical) objects in the vicinity of a navigation route while presenting navigation directions in accordance with some embodiments.

FIG. 9 is a flow diagram illustrating a method of modifying display of representations of physical objects in the vicinity of a navigation route while presenting navigation directions in accordance with some embodiments. The method 900 is optionally performed at an electronic device such as device 100, device 300, and device 500, as described above with reference to FIGS. 1A-1B, 2-3, 4A-4B and 5A-5H. Some operations in method 900 are, optionally, combined and/or order of some operations is, optionally, changed.

As described below, the method 900 provides ways in which an electronic device modifies display of representations of physical objects in the vicinity of a navigation route while presenting navigation directions in accordance with some embodiments. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 900 is performed at an electronic device (e.g., 500) in communication with a display generation component (e.g., 504) and one or more input devices. In some embodiments, the electronic device (e.g., 500) is a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, such as in FIG. 8A, while navigating along a route from a first physical location to a second physical location, the electronic device (e.g., 500) displays (902), via the display generation component, a representation of a map corresponding to a respective (e.g., physical) region including a plurality of visual representations (e.g., 826a, 812a, 816a, 810k, 836a) corresponding to a plurality of (e.g., physical) objects in the respective (e.g., physical) region at (e.g., physical) locations represented by the map (904). In some embodiments, the objects include buildings, landmarks, plants, landcover, roads, sidewalks, and other objects in the physical area represented by the map. In some embodiments, the representations physically resemble the objects to which they correspond. In some embodiments, the representations are displayed at locations on the map corresponding to the physical locations of the object in the physical area represented by the map. In some embodiments, navigating along the route includes presenting navigation directions from the first physical location to the second physical location in a manner that is synchronized with the current location of the electronic device, such as described with reference to methods 700 and/or 1100.

In some embodiments, such as in FIG. 8A, while navigating along a route from a first physical location to a second physical location, the electronic device (e.g., 500) displays (902), via the display generation component (e.g., 504), a representation of a map corresponding to a respective (e.g., physical) region including a visual indication (e.g., 808a) of the route on the representation of the map (906). In some embodiments, the indication of the route (e.g., a route line) is displayed overlaid on one or more roads, streets, etc. included in the route. For example, roads and streets not included in the route are displayed in a first plurality of colors (e.g., colors corresponding to the colors of the roads and streets in real life) and the indication of the route is displayed in a second color different from the first plurality of colors (e.g., blue, green, yellow, red, orange) overlaid on the roads/streets. In some embodiments, the route line has one or more of the characteristics of the route lines described with reference to methods 700 and/or 1100.

In some embodiments, such as in FIG. 8A, in accordance with a determination that a first visual representation (e.g., 816c) corresponding to a first (e.g., physical) object of the plurality of (e.g., physical) objects in the respective (e.g., physical) region is a first distance from the route (e.g., on the representation of the map), the first visual representation (e.g., 816c) corresponding to the first (e.g., physical) object is displayed with a first degree of visual prominence (908). In some embodiments, the (e.g. straight line or perpendicular) distance between the representation of the physical object and the route on the map corresponds to the distance between the physical object and the route in real life. In some embodiments, the degree of visual prominence corresponds to opacity, blur, and/or color saturation.

In some embodiments, such as in FIG. 8A, in accordance with a determination that the first visual representation (e.g., 816a) corresponding to the first (e.g., physical) object is a second distance from the route (e.g., on the representation of the map), the second distance different from the first distance, the first visual representation (e.g., 816a) corresponding to the first (e.g., physical) object is displayed with a second degree of visual prominence different from the first degree of visual prominence (910). In some embodiments, the closer the representation of the physical object is to the representation of the route, the greater the degree of visual prominence. In some embodiments, the closer the representation of the physical object is to the representation of the route, the lesser the degree of visual prominence. In some embodiments, the degree of visual prominence increases or decreases as the distance between the representation of the object and the representation of the route increases depending on the type of the object. In some embodiments, displaying a visual representation corresponding to a respective physical object with a reduced degree of visual prominence includes forgoing display of the visual representation corresponding to the respective physical object. The above-described manner of modifying the degree of visual prominence of the visual representation corresponding to the physical object based on the distance between the representation of the route and the representation corresponding to the physical object provides an efficient way of rendering the visual representation corresponding to the physical object (and visual representations corresponding to other physical objects) which additionally reduces power usage and improves battery life of the electronic device and reduces driver distraction while using the electronic device to navigate while driving.

In some embodiments, such as in FIG. 8C, while not navigating along a respective route and while displaying the representation of the map, the electronic device (e.g., 500) displays the first visual representation (e.g., 816, 826, 836) corresponding to the first (e.g., physical) object on the representation of the map at a third degree of visual prominence (e.g., the third degree of visual prominence is the same as the first degree of visual prominence, the third degree of visual prominence is the same as second degree of visual prominence, the third degree of visual prominence is different from the first degree of visual prominence and different from the second degree of visual prominence) that is independent of a distance from the first visual representation corresponding to the first (e.g., physical) object to any point on the representation of the map. In some embodiments, while navigating along the route, the electronic device displays representations of physical objects with degrees of visual prominence that vary based on the distances between the respective representations of physical objects and the visual indication of the route. In some embodiments, while not navigating along a route, the electronic device displays the representations of physical objects with a respective degree of visual prominence not based on distances between the representations of physical objects and a visual indication of a route because the electronic device does not display a visual indication of a route while not navigating along a route. In some embodiments, while not navigating along a route, the electronic device displays (e.g., all of) the representations of physical objects with the same degree of visual prominence. In some embodiments, the third degree of visual prominence is greater than the first and second degrees of visual prominence. The above-described manner of displaying the 1st visual representation with the third degree of visual prominence while not navigating along our respective route provides an efficient way of displaying representations of physical objects in a way that is legible while not navigating along our respective route which additionally reduces power usage and improves battery life of the electronic device.

In some embodiments, such as in FIG. 8A, the first distance is less than the second distance, and the first degree of visual prominence is greater than the second degree of visual prominence. In some embodiments, the electronic device displays representations of physical objects with greater degrees of visual prominence the closer the representations of physical objects are to the visual indication of the route. In some embodiments, the electronic device displays representations of first objects (e.g., roads, buildings, points of interest, landmarks, and infrastructure) with greater degrees of visual prominence the closer the representations of the first object are to the visual indication of the route. In some embodiments, the electronic device displays representations of second objects (e.g., plants, land cover, trees) with greater degrees of visual prominence the further the visual representations route. The above-described manner of displaying representations of physical objects with greater visual prominence the closer the representations are to a visual indication of the route provides an efficient way of reducing distractions caused by representations of objects that are further from the visual indication of the route, which additionally reduces power usage and improves battery life of the electronic device and reduces driver distraction while using the electronic device to navigate while driving.

In some embodiments, such as in FIG. 8A, the first distance is less than the second distance, and the first degree of visual prominence is greater than the second degree of visual prominence. In some embodiments, the electronic device displays representations of physical objects with greater degrees of visual prominence the closer the representations of physical objects are to the visual indication of the route. In some embodiments, the electronic device displays representations of first objects (e.g., roads, buildings, points of interest, landmarks, and infrastructure) with greater degrees of visual prominence the closer the representations of the first object are to the visual indication of the route.

In some embodiments, such as in FIG. 8A, in accordance with a determination that a second visual representation (e.g., 816a, 826a, 836a) corresponding to a second (e.g., physical) object of the plurality of physical objects in the respective (e.g., physical) region is a third distance from the route, the second visual representation (e.g., 816a, 826a, 836a) corresponding to the second (e.g., physical) object is displayed with a third degree of visual prominence (e.g., the third degree of visual prominence is the same as the first degree of visual prominence, the third degree of visual prominence is the same as the second degree of visual prominence, the third degree of visual prominence is different from the first degree of visual prominence and different from the second degree of visual prominence). In some embodiments, the second physical object is a different type of physical object than the first physical object. For example, the first physical object is one of a road, building, point of interest, landmark, or infrastructure and the second physical object is one of a plant, land cover, or tree.

In some embodiments, such as in FIG. 8A, in accordance with a determination that the second visual representation (e.g., 816c, 826b, 836b) corresponding to the second (e.g., physical) object is a fourth distance from the route, less than the third distance, the second visual representation (e.g., 816c, 826b, 836b) corresponding to the second (e.g., physical) object is displayed with a fourth degree of visual prominence (e.g., the fourth degree of visual prominence is the same as the first degree of visual prominence, the fourth degree of visual prominence is the same as the second degree of visual prominence, the fourth degree of visual prominence is different from the first degree of visual prominence and different from the second degree of visual prominence), less than the third degree of visual prominence. In some embodiments, the electronic device displays representations of second objects (e.g., plants, land cover, trees) with greater degrees of visual prominence the further the visual representations route. The above-described manner of Displaying the visual representation of the second object with greater visual prominence the further the visual representation of the second object is from the visual indication of the route provides an efficient way of reducing visual clutter proximate to the visual indication of the route, which additionally reduces power usage and improves battery life of the electronic device and reduces driver distraction while using the electronic device to navigate while driving.

In some embodiments, such as in FIG. 8A, the first visual representation corresponding to the first physical object includes a lane marking representation, a tree representation (e.g., 826a), a building representation (e.g., 816b), land cover representation, or a point of interest representation (e.g., 836a). In some embodiments, the lane marking representation is a representation of indications of lanes on a physical road displayed overlaid on a representation of the physical road, including driving lanes, bike lanes, and sidewalks. In some embodiments, the tree representation is a representation of a physical tree displayed at a location on the map corresponding to the location of the tree in real life. In some embodiments, the tree representation is displayed independent from a location of a physical tree in real life. In some embodiments, the building representation is played with a size, shape, color, location, etc. that corresponds to those of a physical building. In some embodiments, the landcover representation is a representation of land cover (e.g., grass or other plants, dirt, terrain, etc.) algorithmically generated for a respective location based on climate (e.g., rainfall, temperature, humidity, etc.) data for a respective location. In some embodiments, the point of interest representation is a visual indication that indicates a location and name of a point of interest (e.g., business, landmark, public building, etc.) on the map. The above-described manner of displaying visual representations of lane markings, trees, buildings, landcover, and points of interest on the map while navigating along the route provides an efficient way of presenting information about the vicinity of the current location of the electronic device, which additionally reduces power usage and improves battery life of the electronic device.

In some embodiments, the plurality of visual representations (e.g., 836) corresponding to the plurality of objects in the respective (e.g., physical) region is, in accordance with a determination that the representation of the map is displayed at a first zoom level, such as in FIG. 8D, a first set of visual representations (e.g., 836) corresponding to a first set of objects in the respective (e.g., physical) region. In some embodiments, the first set of visual representations corresponding to the first set of objects are displayed in a respective region of the map, and the electronic device concurrently displays a plurality of respective set of visual representations corresponding to an additional set of objects outside of the respective region of the map with the first set of visual representations.

In some embodiments, the plurality of visual representations (e.g., 836) corresponding to the plurality of objects in the respective (e.g., physical) region is, in accordance with a determination that the representation of the map is displayed at a second zoom level, greater than the first zoom level, such as in FIG. 8E, a second set of visual representations (e.g., 836) corresponding to a second set of objects in the respective (e.g., physical) region, including and greater than the first set of visual representations corresponding to the first set of objects in the respective (e.g., physical) region. In some embodiments, displaying the map at the second zoom level includes displaying the respective region of the map (e.g., at a larger size than the size with which the respective region of the map was displayed at the first zoom level) without displaying regions of the map other than the respective region that were displayed at the first zoom level. In some embodiments, the electronic device displays a greater level of detail at a higher level of zoom. In some embodiments, the electronic device displays more visual representations corresponding to physical objects per geographic area represented by the map at higher levels of zoom. The above-described manner of displaying additional visual representations corresponding to objects at greater zoom levels provides an efficient way of displaying the map with the level of detail specified by the user, which additionally reduces power usage and improves battery life of the electronic device and reduces driver distraction while using the electronic device to navigate while driving.

In some embodiments, the representation of the map, such as in FIG. 8A, includes representations of topographies of areas represented by the map in the respective (e.g., physical) region, and the representations of the topographies are displayed with a third degree of visual prominence (e.g., the third degree of visual prominence is the same as the first degree of visual prominence, the third degree of visual prominence is the same as the second degree of visual prominence, the third degree of visual prominence is different from the first degree of visual prominence and different from the second degree of visual prominence) that is independent of a distance between the representations of the topographies and the route. In some embodiments, the representations of topography of the areas represented by the maps include shading and contouring to represent elevation and other topography. In some embodiments, the representations of topography of areas represented by the map include undulations in the ground, such as hills, mountains, etc. that are displayed with a visual characteristic irrespective of the distance from the indication of the route. The above-described manner of displaying the representations of typographies with the third degree of visual prominence that is independent of the distance between the representations of the topographies and the routes provides an efficient way of displaying the representations of the typographies visibly irrespective of the distance between the representations of the topographies and the route which additionally reduces power usage and improves battery life of the electronic device and reduces driver distraction while using the electronic device to navigate while driving.

In some embodiments, such as in FIG. 8A, the first degree and the second degree of visual prominence include degrees of opacity. In some embodiments, the first degree of visual prominence includes greater opacity than the second degree of visual prominence. In some embodiments, the second degree of visual prominence includes greater opacity than the first degree of visual prominence. The above-described manner of displaying the degree is of visual prominence with different degrees of opacity provides an efficient way of varying the opacity of representations of objects based on the distance between the representations of objects and the visual indication of the route, which additionally reduces power usage and improves battery life of the electronic device and reduces driver distraction while using the electronic device to navigate while driving.

In some embodiments, such as in FIG. 8A, the first degree and the second degree of visual prominence include degrees of blur. In some embodiments, the first degree of visual prominence includes greater blur than the second degree of visual prominence. In some embodiments, the second degree of visual prominence includes greater blur than the first degree of visual prominence. The above-described manner of displaying the degree is of visual prominence with different degrees of blur provides an efficient way of varying the level of blur of representations of objects based on the distance between the representations of objects and the visual indication of the route, which additionally reduces power usage and improves battery life of the electronic device and reduces driver distraction while using the electronic device to navigate while driving.

In some embodiments, such as in FIG. 8A, the first degree and the second degree of visual prominence include degrees of color saturation. In some embodiments, the first degree of visual prominence includes greater color saturation than the second degree of visual prominence. In some embodiments, the second degree of visual prominence includes greater color saturation than the first degree of visual prominence. The above-described manner of displaying the degree is of visual prominence with different degrees of color saturation provides an efficient way of varying the color saturation of representations of objects based on the distance between the representations of objects and the visual indication of the route, which additionally reduces power usage and improves battery life of the electronic device and reduces driver distraction while using the electronic device to navigate while driving.

In some embodiments, such as in FIG. 8A, in accordance with a determination that a portion (e.g., 820*a*, 820*b*) of the representation of the map is a third distance from the route (e.g., on the representation of the map), the portion (e.g., 820*a*, 820*b*) of the map is displayed with a third degree of visual prominence (e.g., a third degree of dimness or darkness). In some embodiments, the electronic device displays the portion of the map, including representations of objects, landcover, and space between representations of objects and landcover in the portion of the map, with the third degree of visual prominence, including a third degree of dimness or darkness in accordance with the determination that the portion of the map is the third distance from the route.

In some embodiments, such as in FIG. 8A, in accordance with a determination that the portion (e.g., 818) of the map is a fourth distance from the route (e.g., on the representation of the map), the fourth distance different from the third distance, the portion (e.g., 818) of the map is displayed with a fourth degree of visual prominence different from the third degree of visual prominence (e.g., a fourth degree of dimness or darkness). In some embodiments, the electronic device displays the portion of the map, including representations of objects, landcover, and space between representations of objects and landcover in the portion of the map, with the fourth degree of visual prominence, including a fourth degree of dimness or darkness in accordance with the determination that the portion of the map is the fourth distance from the route. In some embodiments, the electronic device displays respective discrete regions of the maps with varying degrees of visual prominence (e.g., darkness, dimness) based on the distance of the respective discrete regions of the maps from the visual indication of the route. In some embodiments, the electronic device continuously varies the degree of visual prominence of the regions of the maps based on the distance of continuous portions (e.g., pixels) from the visual indication of the route. In some embodiments, in addition to modifying the visual characteristics with which representations of objects are displayed in accordance with the distance between the indication of the route and the representations of objects, the electronic device modifies the brightness (e.g., display brightness, color brightness) with which portions of the user interface are displayed based on the distance between the portions of the user interface and the indication of the route. The above-described manner of varying the visual prominence of portions of the map based on the distance of the portions of the map from the visual indication of the route provides an efficient way of rendering regions of the map while navigating, which additionally reduces power usage and improves battery life of the electronic device and reduces driver distraction while using the electronic device to navigate while driving.

In some embodiments, such as in FIG. 8F, the electronic device (e.g., 500) receives, via the one or more input devices, a first input (e.g., via contact 803f) corresponding to a request to display navigation directions from a third physical location (e.g., the current location of the electronic device) to a fourth physical location.

In some embodiments, in response to receiving the first input, the electronic device (e.g., 500) displays, overlaid on the representation of the map, a first respective indication (e.g., 846a, 846b) of a first route from the third physical location to the fourth physical location having a first route length (e.g., time and/or distance length), and a second respective (e.g., 846c, 846d) indication of a second route from the third physical location to the fourth physical location having a second route length, greater than the first route length (e.g., time and/or distance length). In some embodiments, the respective indications of the routes are displayed overlaid on representations of roads included in the routes with different visual characteristics (e.g., color, size, pattern, style, translucency, etc.) than the visual characteristics of the representations of the roads.

In some embodiments, such as in FIG. 8G, displaying the first respective indication (e.g., 846a, 846b) of the first route includes displaying a first animation of progression through the first route, the first animation having a first length (e.g., time length). In some embodiments, the length of the first animation corresponds to the first route length. In some embodiments, displaying the animation of progression through the first route includes displaying an animation of a visual indication traversing the route at a (e.g., variable) speed that corresponds to an estimated (e.g., variable) speed at which the user of the electronic device will be able to drive along the first route.

In some embodiments, such as in FIG. 8G, displaying the second respective indication (e.g., 846c, 846d) of the second route includes displaying a second animation of progression through the second route, the second animation having a second length (e.g., time length), greater than the first length. In some embodiments, the length of the second animation corresponds to the second route length. In some embodiments, the first and second animations are displayed concurrently and start at the same time, but end at different times. In some embodiments, displaying the animation of progression through the second route includes displaying an animation of a visual indication traversing the route at a (e.g., variable) speed that corresponds to an estimated (e.g., variable) speed at which the user of the electronic device will be able to drive along the second route. In some embodiments, the first and second animations are displayed concurrently and start at the same time, but end at different times. For example, if the first route is longer (e.g., in time and/or distance) than the second route, the electronic device completes the animation of the first route before completing the animation of the second route. In some embodiments, the difference in time between the first animation and the second animation corresponds to the difference in length (e.g., in time and/or distance) between the first route and second route. For example, if the difference in length (e.g., in time and/or distance) between the first route and the second route is relatively small, the difference in time between the first animation and second animation is relatively small. As another example, if the difference in length (e.g., in time and or distance) between the first route and the second route is relatively large, the difference in time between the first animation and second animation is relatively large. The above-described manner of displaying the first animation and second animation with lengths corresponding to the lengths of the first route and second route provides an efficient way of indicating the relative lengths of the first route and second route, which additionally reduces power usage and improves battery life of the electronic device.

In some embodiments, while navigating along the route from the first physical location to the second physical location, the electronic device displays, overlaid on the representation of the map, a selectable option that, when selected, causes the electronic device to initiate a process for reporting an incident in the vicinity of the current location of the electronic device. In some embodiments, in response to detecting selection of the selectable option, the electronic device displays a plurality of options for reporting a plurality of respective incidents, such as accidents, hazards, and or police along the route at the location of the electronic device.

In some embodiments, while not navigating along the route, the electronic device displays, via the display generation component, a user interface for requesting navigation directions that includes text entry fields into which inputs specifying the starting and ending locations of the route are provided and one or more selectable options for providing settings for the route. In some embodiments, the one or more selectable options include selectable options for setting a desired time at which to start the navigation route and for setting a desired time at which to arrive at the route destination. In some embodiments, the electronic device selects routes based on estimated traffic conditions at the desired time of starting the navigation or the desired time of arrival at the destination. In some embodiments, if the user provides a desired time to start the navigation, the electronic device presents an estimated time of arrival and route duration based on the provided time to start the navigation. In some embodiments, if the user provides a desired time to arrive at the destination, the electronic device provides a suggested time to start driving along the route and an estimated route duration based on the desired time of arrival.

While navigating along the route, in some embodiments, the electronic device displays a selectable option that, when selected, causes the electronic device to present additional selectable options that, when selected, cause the electronic device to perform respective operations with respect to the route. In some embodiments, the additional selectable options include an option to share an estimated time of arrival with a contact of (e.g., a user account associated with) the electronic device, an option to add a stop at a respective physical location along the route, and an option to initiate a process to report an incident along the route at the current location of the electronic device.

In some embodiments, the electronic device displays the representation of the map (e.g., while navigating along the route, while not navigating along the route) including representations of physical objects. In some embodiments, some of the representations of physical objects (e.g., representations of unique landmarks, such as the Golden Gate Bridge) are designed by humans (e.g., using digital rendering software). In some embodiments, some of the representations of physical objects (e.g., representations of common landmarks, such as buildings, tunnels, bridges) are generated algorithmically (e.g., based on a plurality of parameters optionally provided by a human).

In some embodiments, such as in FIG. 8C, the representation of the map includes a portion (e.g., 856a) corresponding to land cover (e.g., grass, other plants, rocks, dirt, sand, etc.), and displaying the portion (e.g., 856a) corresponding to land cover includes displaying the portion (e.g., 856a) with a visual characteristic (e.g., color, texture) based on precipitation and/or climate (e.g., temperature, humidity, daylight hours) data corresponding to the portion (e.g., 856a) of the representation of the map. For example, the electronic device displays a portion of the map corresponding to desert with a color and or texture corresponding to dirt and/or sand. As another example, the electronic device displays a portion of the map corresponding to a region with moderate rainfall and moderate temperatures with a color and/or texture corresponding to green grass. The above-described manner of displaying a portion of the map corresponding to landcover based on precipitation and/or climate data corresponding to the portion of the representation of the map provides an efficient way of accurately representing the appearance of a region on the map, which additionally reduces power usage and improves battery life of the electronic device.

In some embodiments, such as in FIG. 8A, the first distance is included in a first range of distances associated with the first degree of visual prominence (e.g., in region 818), and the second distance is included in a second range of distances associated with the second degree of visual prominence (e.g., in regions 820a and 820b). In some embodiments, the electronic device defines regions of the map based on the distances of the regions from the visual indication of the route line and displays representations of physical objects (e.g., of a respective type) with the same degree of visual prominence within each respective region. For example, representations of objects (e.g., of a respective type) within the first region are displayed with the first degree of visual prominence and representations of objects (e.g., of a respective type) within the second region are displayed with the second degree of visual prominence.

In some embodiments, such as in FIG. 8A, in accordance with a determination that the first visual representation (e.g., 816a, 826a, 836a) corresponding to the first (e.g., physical) object is a third distance from the route (e.g., in region 818), different from the first and second distances, the third distance within the first range of distances, the first visual representation corresponding to the first (e.g., physical) object is displayed with the first degree of visual prominence. In some embodiments, the electronic device displays other representations of physical objects (e.g., of the same type as the first physical object) that have respective distances from the visual indication of the route within the first range of distances with the first degree of visual prominence.

In some embodiments, such as in FIG. 8A, in accordance with a determination that the first visual representation (e.g., 816b, 826b, 836b) corresponding to the first (e.g., physical) object is a fourth distance from the route, different from the first, second and third distances, the fourth distance within the second range of distances (e.g., in region 820a or 820b), the first visual representation (e.g., 816b, 826b, 836b) corresponding to the first (e.g., physical) object is displayed with the second degree of visual prominence. In some embodiments, the electronic device displays other representations of physical objects (e.g., of the same type as the second physical object) that have respective distances from the visual indication of the route within the second range of distances with the second degree of visual prominence. In some embodiments, the electronic device defines regions of the representation of the map based on distance between the regions and the indication of the route and displays representations of objects in each region with a respective visual characteristic based on the distance between the indication of the route and the region. The above-described manner of displaying the first visual representation with a degree of visual prominence based on whether the first distance is within the first or second range of distances provides an efficient way of rendering the visual representation corresponding to the physical object (and visual representations corresponding to other physical objects), which additionally reduces power usage and improves battery life of the electronic device and reduces driver distraction while using the electronic device to navigate while driving.

In some embodiments, such as in FIG. 8B, the first visual representation (e.g., 816a) corresponding to the first (e.g., physical) object is displayed with the first degree of visual prominence only if it is the first distance from the route, the first visual representation (e.g., 826b) corresponding to the first (e.g., physical) object is displayed with the second degree of visual prominence only if it is the second distance from the route, and in accordance with a determination that the first visual representation (e.g., 816c) corresponding to the first (e.g., physical) object is a third distance, different from the first and second distances, from the route, the first visual representation corresponding to the first (e.g., physical) object is displayed with a third degree, different from the first and second degrees, of visual prominence. In some embodiments, the electronic device displays representations of physical objects on the map with degrees of visual prominence that continuously vary based on the distance of the representations of the physical objects from the visual indication of the route. In some embodiments, the electronic device adjusts the degree of visual prominence of representations of objects on a pixel-by-pixel basis based on the distance between each pixel and the indication of the route to continuously vary the degree of visual prominence. The above-described manner of modifying the degree of visual prominence of the visual representation corresponding to the physical object based on the distance between the representation of the route and the representation corresponding to the physical object provides an efficient way of rendering the visual representation corresponding to the physical object (and visual representations corresponding to other physical objects) which additionally reduces power usage and improves battery life of the electronic device and reduces driver distraction while using the electronic device to navigate while driving.

In some embodiments, such as in FIG. 8A, the first (e.g., physical) object is a first type (e.g., category) of object. In some embodiments, types of objects include buildings, roads, bridges, tunnels, lane lines, other infrastructure, trees, and other natural features.

In some embodiments, such as in FIG. 8A, in accordance with a determination that a second visual representation (e.g., 826a, 826b) corresponding to a second (e.g., physical)

object of the plurality of physical objects is the first distance from the route, wherein the second physical object is a second type of object, different from the first type of object, the second visual representation (e.g., 826a, 826b) corresponding to the second (e.g., physical) object is displayed with a third degree of visual prominence different from the first degree of visual prominence, and In some embodiments, the electronic device displays a third visual representation corresponding to the first object type the first distance from the route with the first degree of visual prominence. In some embodiments, the electronic device displays a fourth visual representation corresponding the second object type the first distance from the route with the third degree of visual prominence.

In some embodiments, such as in FIG. 8A, in accordance with a determination that the second visual representation (e.g., 816a, 816c) corresponding to the second (e.g., physical) object is the second distance from the route, the second visual representation (e.g., 816a, 816c) corresponding to the second (e.g., physical) object is displayed with a fourth degree of visual prominence different from the second degree of visual prominence. In some embodiments, the electronic device displays a third visual representation corresponding to the first object type the second distance from the route with the second degree of visual prominence. In some embodiments, the electronic device displays a fourth visual representation corresponding the second object type the second distance from the route with the fourth degree of visual prominence. In some embodiments, the degree of visual prominence with which representations of objects are displayed depends on the distance of the representations of the objects from the route and the type of object corresponding to the representation. For example, objects of a first type (e.g., buildings, roads, bridges, tunnels, other infrastructure) are displayed with greater visual prominence the closer the representations of these objects are to the indication of the route and objects of a second type (e.g., trees) are displayed with less visual prominence the closer the representations of these objects are to the indication of the route. The above-described manner of displaying the second visual representation corresponding to the second physical object with different degrees of visual prominence than the degrees of visual prominence with which the first visual representation corresponding to the first physical object provides an efficient way of rendering the visual representations corresponding to the first and second physical objects (and visual representations corresponding to other physical objects) based on the types of the first and second physical objects, which additionally reduces power usage and improves battery life of the electronic device and reduces driver distraction while using the electronic device to navigate while driving.

In some embodiments, such as in FIG. 8A, the first type of object is a tree, the second type of object is a building, the first degree of visual prominence is less than the second degree of visual prominence, and the third degree of visual prominence is greater than the fourth degree of visual prominence. In some embodiments, the electronic device displays representations of buildings with more visual prominence the closer the representations of the buildings are to the indication of the route. The above-described manner of modifying the degree of visual prominence of buildings to be more visually prominent closer to the indication of the route and less visually prominent further from the indication of the route provides an efficient way of rendering the visual representations corresponding to the buildings which additionally reduces power usage and improves battery life of the electronic device and reduces driver distraction while using the electronic device to navigate while driving.

In some embodiments, such as in FIG. 8A, the first distance includes a vertical (e.g., z-height) distance component (e.g., above, below, up, down). For example, a portion of an overpass or tunnel above the indication of the route is displayed with less visual prominence than a portion of an object at the same z-height as the visual indication of the route. The above-described manner of modifying the degree of visual prominence of the visual representation corresponding to the physical object based on the vertical distance between the representation of the route and the representation corresponding to the physical object provides an efficient way of rendering the visual representation corresponding to the physical object (and visual representations corresponding to other physical objects) which additionally reduces power usage and improves battery life of the electronic device and reduces driver distraction while using the electronic device to navigate while driving.

In some embodiments, such as in FIG. 8A, the first distance includes a lateral distance component (e.g., left, right, forward, back, north, south, east, west). For example, a visual representation of a first respective object that is at the same z-height as the visual indication of the route and a first respective lateral distance from the visual indication of the route is displayed with a first respective degree of visual prominence and a visual representation of a second respective object that is at the same z-height as the visual indication of the route and a second respective lateral distance from the visual indication of the route is displayed with a second respective degree of visual prominence. The above-described manner of modifying the degree of visual prominence of the visual representation corresponding to the physical object based on the lateral distance between the representation of the route and the representation corresponding to the physical object provides an efficient way of rendering the visual representation corresponding to the physical object (and visual representations corresponding to other physical objects) which additionally reduces power usage and improves battery life of the electronic device and reduces driver distraction while using the electronic device to navigate while driving.

In some embodiments, such as in FIG. 8A, in accordance with a determination that a first plurality of visual representations (e.g., 816c) corresponding to (e.g., physical) objects in the respective (e.g., physical) region are associated with the first degree of visual prominence (and have one or more other visual characteristics in common, such as object type, size, shape, color, pattern of the representation, etc.), and a second plurality of visual representations (e.g., 816a) corresponding to (e.g., physical) objects in the respective (e.g., physical) region are associated with the second degree of visual prominence (and have one or more other visual characteristics in common, such as object type, size, shape, color, pattern of the representation, etc.), the electronic device (e.g., 500) displays, as a batch, the first plurality of visual (e.g., 816c) representations displayed with the first degree of visual prominence. In some embodiments, the electronic device generates the first plurality of visual representations in a single batch, optionally based on a respective representation that has one or more visual characteristics (e.g., object type, size, shape, color, pattern of the representation, etc.) in common with the first plurality of visual representations.

In some embodiments, such as in FIG. 8A, in accordance with a determination that a first plurality of visual representations (e.g., 816*c*) corresponding to (e.g., physical) objects in the respective (e.g., physical) region are associated with the first degree of visual prominence (and have one or more other visual characteristics in common, such as object type, size, shape, color, pattern of the representation, etc.), and a second plurality of visual representations (e.g., 816*a*) corresponding to (e.g., physical) objects in the respective (e.g., physical) region are associated with the second degree of visual prominence (and have one or more other visual characteristics in common, such as object type, size, shape, color, pattern of the representation, etc.), the electronic device (e.g., 500) displays, as a batch, the second plurality of visual representations (e.g., 816*a*) displayed with the second degree of visual prominence; and In some embodiments, the electronic device generates the second plurality of visual representations in a single batch, optionally based on a respective representation that has one or more visual characteristics (e.g., object type, size, shape, color, pattern of the representation, etc.) in common with the second plurality of visual representations.

In some embodiments, such as in FIG. 8A, in accordance with a determination that a third plurality, different from the first plurality, of visual representations (e.g., 826*b*) corresponding to (e.g., physical) objects in the respective (e.g., physical) region are associated with the first degree of visual prominence, and a fourth plurality, different from the second plurality, of visual representations (e.g., 826*a*) corresponding to (e.g., physical) objects in the respective (e.g., physical) region are associated with the second degree of visual prominence, the electronic device (e.g., 500) displays, as a batch, the third plurality of visual representations (e.g., 826*b*) displayed with the first degree of visual prominence; and In some embodiments, the third plurality of visual representations have one or more visual characteristics (e.g., object type, size, shape, color, pattern of the representation, etc.) that are different from the one or more visual characteristics of the first plurality of visual representations and are displayed in a different batch from the batch of the first plurality of visual representations. In some embodiments, the third plurality of visual representations have one or more visual characteristics (e.g., object type, size, shape, color, pattern of the representation, etc.) in common with the one or more visual characteristics of the first plurality of visual representations and are displayed in the same batch as the batch of the first plurality of visual representations.

In some embodiments, such as in FIG. 8A, in accordance with a determination that a third plurality, different from the first plurality, of visual representations (e.g., 826*b*) corresponding to (e.g., physical) objects in the respective (e.g., physical) region are associated with the first degree of visual prominence, and a fourth plurality, different from the second plurality, of visual representations (e.g., 826*a*) corresponding to (e.g., physical) objects in the respective (e.g., physical) region are associated with the second degree of visual prominence, the electronic device (e.g., 500) displays, as a batch, the fourth plurality of visual representations (e.g., 826*a*) displayed with the second degree of visual prominence. In some embodiments, the fourth plurality of visual representations have one or more visual characteristics (e.g., object type, size, shape, color, pattern of the representation, etc.) that are different from the one or more visual characteristics of the second plurality of visual representations and are displayed in a different batch from the batch of the second plurality of visual representations. In some embodiments, the third plurality of visual representations have one or more visual characteristics (e.g., object type, size, shape, color, pattern of the representation, etc.) in common with the one or more visual characteristics of the second plurality of visual representations and are displayed in the same batch as the batch of the second plurality of visual representations. The above-described manner of batching the visual representations provides an efficient way of generating and displaying the visual representations, which additionally reduces power usage and improves battery life of the electronic device.

In some embodiments, (e.g., while not displaying navigation directions), the electronic device presents a representation of a respective region on a map, including representations of (e.g., physical) objects in the region. In some embodiments, the electronic device presents a plurality of selectable options that, when selected, causes the electronic device to present the map in a respective mode selected by the user. For example, the available modes include a driving mode, an explore mode, a transit mode, and a satellite mode. In some embodiments, while presenting the map in the driving mode, the map includes indications of information and objects relevant to driving, such as the names of streets and indications of traffic on the streets. In some embodiments, while presenting the map in the explore mode, the map includes indications of information and objects relevant to learning more about the respective region represented by the map, such as points of interest, the names of streets, and the like. In some embodiments, while presenting the map in the transit mode, the electronic device presents indications of information and objects relevant to public transportation, such as indications and names of stations and indications of transit routes (e.g., overlaid on representations of roads and other objects). In some embodiments, while displaying the map in the satellite mode, the electronic device displays an image of the region corresponding to the map that was captured, for example, overhead by a satellite.

It should be understood that the particular order in which the operations in FIG. 9 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, 1300, and/or 1500) are also applicable in an analogous manner to method 900 described above with respect to FIG. 9. For example, the ways of modifying display of representations of physical objects in the vicinity of a navigation route while presenting navigation directions described above with reference to method 900 optionally have one or more of the characteristics of the ways of presenting navigation routes from various perspectives, modifying display of portions of a navigation route that are occluded by representations of (e.g., physical) objects in a map, presenting representations of physical objects in maps, and/or presenting representations of physical objects in maps in response to requests to search for physical objects described herein with reference to other methods described herein (e.g., methods 700, 1100, 1300, and/or 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 9 are, optionally, implemented by components depicted in FIGS. 1A-1B. For example, displaying operation 902 is, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Presenting Indications of Navigation Routes

Users interact with electronic devices in many different manners, including using electronic devices to present navigation directions from a first physical location to a second physical location. In some embodiments, presenting the navigation directions include presenting a representation of the navigation route and one or more representations of objects and/or physical objects in the physical vicinity of the route. The embodiments described below provide ways in which an electronic device modifies display of the representation of the navigation route when a portion of the navigation route is occluded by a representation of anther (e.g., physical) object. Providing efficient manners of modifying display of the navigation route while presenting the navigation directions enhances interactions with a device, thus reducing the amount of time a user needs to interact with the device while navigating, which increases battery life for battery-powered devices and improves safety (e.g., while driving). It is understood that people use devices. When a person uses a device, that person is optionally referred to as a user of the device.

FIGS. 10A-10J illustrate exemplary ways in which an electronic device modifies display of portions of a navigation route that are occluded by representations of (e.g., physical) objects in a map in accordance with some embodiments. The embodiments in these figures are used to illustrate the processes described below, including the processes described with reference to FIG. 11. Although FIGS. 10A-10J illustrate various examples of ways an electronic device is able to perform the processes described below with reference to FIG. 11, it should be understood that these examples are not meant to be limiting, and the electronic device is able to perform one or more processes described below with reference to FIG. 11 in ways not expressly described with reference to FIGS. 10A-10J.

FIGS. 10A-10J illustrate various examples of an electronic device 500 modifying display of portions of an indication of a navigation route that are occluded by representations of physical objects according to some embodiments of the disclosure. Although the description of FIGS. 10A-10J refers to "physical objects" it should be understood that one or more of the techniques described herein can be applied to any object displayed by the device that occludes a portion of the indication of the navigation route, including virtual objects. For example, the electronic device displays portions of the navigation route that are occluded by representations of other objects with a different color, size, or degree of translucency compared to portions of the navigation route that are not occluded by representations of objects.

FIG. 10A illustrates an exemplary navigation user interface according to some embodiments of the disclosure. In some embodiments, the user interface includes a map that includes an indication 1010a of the current location of the electronic device 500, indications 1012 of buildings in the vicinity of the electronic device 500, an indication 1008a of the navigation route, and an indication 1012a of an overpass that goes over the navigation route. In some embodiments, at the level of zoom illustrated in FIG. 10A, the electronic device 500 presents a portion 1008b of the navigation route that goes under the overpass corresponding to indication 1012a with a different visual characteristic (e.g., color, size, translucency) than the visual characteristic of the rest of the indication 1008a of the navigation route. For example, the portion 1008b of the indication 1008a of the route is displayed at a lighter color and/or with increased translucency than the rest of the indication 1008a of the route. In some embodiments, the portion 1008b of the indication 1008a of the route is displayed overlaid on the representation 1012a of the overpass with translucency that makes the indication 1012a of the overpass visible through the portion 1008b of the indication 1008a of the route. In some embodiments, the representation 1012a of the overpass is displayed overlaid on the portion 1008b of the indication 1008a of the route with translucency that makes the portion 1008b of the indication 1008a of the route visible through the indication 1012a of the overpass. In some embodiments, the electronic device 500 selects the level of zoom with which to present the navigation directions according to one or more steps of method 700. In some embodiments, the electronic device 500 presents an indication 1002a of the next navigation maneuver, an indication 1002b of the distance between the current location of the electronic device 500 and the next navigation maneuver, an indication 1002c of the name of the street associated with the navigation maneuver (e.g., a street onto which the user will turn or merge), an option 1004a to view an overview of the navigation directions, an option 1004b to display audio settings for the navigation directions, an option 1004c to report an incident in the vicinity of the electronic device 500, an indication 1006a of the estimated time of arrival, an indication 1006b of the estimated remaining duration of the navigation, an indication 1006c of the remaining distance along the navigation route, and an option 1006d to view more settings related to the navigation directions overlaid on the map.

Thus, as described with reference to FIG. 10A, the electronic device 500 modifies a portion 1008b of the indication 1008a of the route that is occluded by the representation 1012a of an overpass when at a respective level of zoom. In some embodiments, as shown in FIG. 10B, the electronic device 500 does not modify the indication 1010a of the current location of the electronic device 500 at the respective level of zoom when the indication 1010a of the current location of the electronic device 500 is displayed at the location of the indication 1012a of the overpass.

FIG. 10B illustrates an example of the electronic device 500 displaying the indication 1010a of the current location of the electronic device 500 while the current location of the electronic device 500 corresponds to a portion of the indication 1008a of the navigation route that is occluded by the indication 1012a of the overpass. As shown in FIG. 10B, the electronic device 500 presents the indication 1010a of the current location of the electronic device 500 with the same visual characteristic as the visual characteristic with which the indication 1010a of the current location of the electronic device 500 was displayed when the current location of the electronic device 500 did not correspond to a portion of the indication 1008a of the navigation route that is occluded by the indication 1012a of the overpass. In some embodiments, although the user is driving under the underpass corresponding to representation 1012a, the electronic device 500 presents the indication 1010a of the current location of the electronic device 500 as if it were overlaid on the indication 1012a of the overpass, and not occluded by the indication 1012a of the overpass.

FIGS. 10C-10G illustrate various examples of the electronic device 500 presenting the indication of the route and the indication of the current location of the electronic device 500 while presenting the map from a different perspective and/or level of zoom from the perspective and level of zoom illustrated in FIGS. 10A-10B. For example, the level of zoom in FIGS. 10C-10G is greater than the level of zoom illustrated in FIGS. 10A-10B. In some embodiments, the electronic device 500 updates the perspective from which the maps user interface is displayed from the perspective shown in FIGS. 10A-10B to the perspective shown in FIGS. 10C-10G in accordance with one or more steps of method 700.

FIG. 10C illustrates an example of the electronic device 500 presenting the maps user interface at a perspective and/or level of zoom associated with an upcoming maneuver (e.g., merging and/or exiting from a freeway). In some embodiments, the user interface includes an indication 1008d of the navigation route overlaid on the lanes of the road in which the user should drive in order to (e.g., safely, legally) execute an upcoming navigation maneuver, an indication 1010b of the current location of the electronic device 500 that is the same width as the indication 1008d of the navigation route, an indication 1014 of an upcoming exit, and a representation 1012b of an overpass that goes over the navigation route. For example, in FIG. 10C, the indication 1008d of the route is overlaid on the right two lanes of the road and is not overlaid on the left two lanes of the road because the user should drive in one of the right two lanes in order to (e.g., safely, legally) merge off the highway at the upcoming exit, as shown in FIG. 10C. In some embodiments, the indication 1008d of the navigation route is elevated above a representation of the surface of the road (e.g., equivalent to 1, 3, 5, 10, 20 feet above the surface of the road). In some embodiments, the indication 1008d of the navigation route is at the same level as the surface of the road. In some embodiments, the indication 1010b of the current location of the electronic device 500 includes a virtual shadow 1011b generated based on simulated (e.g., natural, artificial) light sources in the map (e.g., according to one or more steps of method 1300). In some embodiments, one or more other objects in the user interface (e.g., the representation 1012b of the overpass) also include virtual shadows generated based on simulated (e.g., natural, artificial) light sources in the map (e.g., according to one or more steps of method 1300). In some embodiments, the indication 1010b of the current location of the electronic device 500 does not include a virtual shadow 1011b. As shown in FIG. 10C, in some embodiments, the electronic device 500 displays a portion 1008c of the indication 1008d of the navigation route corresponding to a portion of the route that goes under the overpass corresponding to representation 1012b as if overlaid on representation 1012b (e.g., thus occluding that portion of overpass 1012b). In some embodiments, the portion 1008c of the indication 1008d of the navigation route has the same color, styling, translucency, shading, etc. as the rest of the indication 1008d of the navigation route.

FIG. 10D illustrates another example of the electronic device 500 presenting the maps user interface at a perspective and/or level of zoom associated with the upcoming maneuver (e.g., merging and/or exiting from the freeway). FIG. 10D can be the same as FIG. 10C, except the portion 1008e of the indication 1008d of the navigation route that corresponds to a portion of the navigation route that goes under the overpass corresponding to representation 1012b is displayed with different color, styling, translucency, shading, etc. than the rest of the indication 1008d of the navigation route. For example, the portion 1008e of the indication 1008d of the navigation route has increased translucency and/or a lighter color than the rest of the indication 1008d of the navigation route. In some embodiments, the portion 1008e of the indication 1008d of the route is displayed overlaid on the representation 1012b of the overpass with translucency that makes the indication 1012b of the overpass visible through the portion 1008e of the indication 1008d of the route. In some embodiments, the representation 1012b of the overpass is displayed overlaid on the portion 1008e of the indication 1008d of the route with translucency that makes the portion 1008e of the indication 1008d of the route visible through the indication 1012b of the overpass.

FIG. 10E illustrates another example of the electronic device 500 presenting the maps user interface at a perspective and/or level of zoom associated with the upcoming maneuver (e.g., merging and/or exiting from the freeway). FIG. 10E can be the same as FIGS. 10C-10D, except the representation 1008e of the overpass that goes over the navigation route (e.g., completely) obscures a portion of the indication 1008d of the navigation route that goes under the representation 1008e of the overpass.

In some embodiments, at the perspective and/or zoom illustrated in FIGS. 10C-10E (e.g., a level of zoom associated with a respective upcoming navigation maneuver), the electronic device 500 modifies display of a portion of the representation of the current location of the electronic device 500 that is at a location overlapping a representation of a physical object, such as the representation 1012b of overpass.

FIG. 10F illustrates an example of modifying display of a portion 1016a of the representation 1010c of the current location of the electronic device 500 that overlaps with the location of the representation 1012b of the overpass. In some embodiments, the portion 1016a of the indication 1010c of the current location of the electronic device 500 is displayed in a different color or with increased translucency compared to the rest of the indication 1010c of the current location of the electronic device 500. In some embodiments, the portion 1016a of the indication 1010c of the current location of the electronic device 500 is displayed overlaid on the representation 1012b of the overpass with translucency that makes the indication 1012b of the overpass visible through the portion 1016a of the indication 1010c of the current location of the electronic device 500. In some embodiments, the representation 1012b of the overpass is displayed overlaid on the portion 1016a of the indication 1010c of the current location of the electronic device 500 with translucency that makes the portion 1016a of the indication 1010c of the current location of the electronic device 500 visible through the indication 1012b of the overpass. As shown in FIG. 10F, if the electronic device 500 determines that the user of the electronic device 500 should drive in one particular lane in order to (e.g., safely, legally) complete the upcoming maneuvers of the navigation directions, the indication 1008e of the navigation route is overlaid on the lane in which the user should drive, for example. In some embodiments, the electronic device 500 displays the indication 1010c of the current location of the electronic device 500 at the same width as the indication 1008e of the navigation route. In some embodiments, because the indication 1008e of the navigation route is the width of one lane, the width of the indication 1010c of the current location of the electronic device 500 is also the width of one lane.

FIG. 10G illustrates another example of modifying display of a portion 1016b of the indication 1010g of the current location of the electronic device 500 that overlaps a location of the representation 1012b of the overpass. In some embodiments, the electronic device 500 modifies a portion 1016b of the indication 1010g of the current location of the electronic device 500 in FIG. 10F in a manner similar to the manner described above with reference to FIG. 10F. As shown in FIG. 10G, if the electronic device 500 determines that the user of the electronic device 500 may drive in one of two particular lanes in order to (e.g., safely, legally) complete the upcoming maneuvers of the navigation directions, the indication 1008h of the navigation route is overlaid on those two lanes in which the user should drive, for example. In some embodiments, the electronic device 500 displays the indication 1010g of the current location of the electronic device 500 at the same width as the indication 1008h of the navigation route. In some embodiments, because the indication 1008h of the navigation route is the width of two lanes, the width of the indication 1010g of the current location of the electronic device 500 is also the width of two lanes.

In some embodiments, the electronic device 500 tilts the representation of the current location of the electronic device 500 to reflect the topography of the road on which the user of the electronic device 500 is driving (e.g., hills, banked turns, etc.). For example, FIG. 10H illustrates the electronic device 500 presenting navigation instructions in the maps user interface while the user of the electronic device 500 drives on a banked turn. FIG. 10H illustrates, for example, the indication 1008h of the navigation route overlaid on the two lanes in which the user of the electronic device 500 is able to drive to (e.g., safely, legally) complete the upcoming navigation maneuvers, and an indication 1010d of the current location of the electronic device 500. In some embodiments, the indication 1010d of the current location of the electronic device 500 is displayed with a horizontal tilt to reflect the horizontal tilt of the portion of the road corresponding to the current location of the electronic device 500 (e.g., the portion of road on which the user of the electronic device 500 is currently driving). In some embodiments, the electronic device 500 also tilts the indication of the current location of the electronic device 500 when displaying the maps user interface at different levels of zoom from the level of zoom illustrated in FIG. 10H, such as the level of zoom illustrated in FIGS. 10A-10B and the levels of zoom described above with reference to method 700. In some embodiments, the electronic device 500 does not display the horizontal tilt of the indication of the current location of the electronic device 500 at levels of zoom other than the level of zoom illustrated in FIG. 10H, such as the level of zoom illustrated in FIGS. 10A-10B and the levels of zoom described above with reference to method 700. For example, the level of zoom in FIG. 10H is greater than the level of zoom in FIGS. 10A-10B. In some embodiments, the electronic device 500 only displays the indication of the current location of the electronic device 500 with horizontal tilt if the horizontal tilt of the portion of road corresponding to the current location of the electronic device 500 (e.g., the location at which the user of the electronic device 500 is currently driving) has a horizontal tilt exceeding a respective threshold angle (e.g., 0.5°, 1°, 2°, 3°, 5°, 10°, etc.).

Figure 10I:
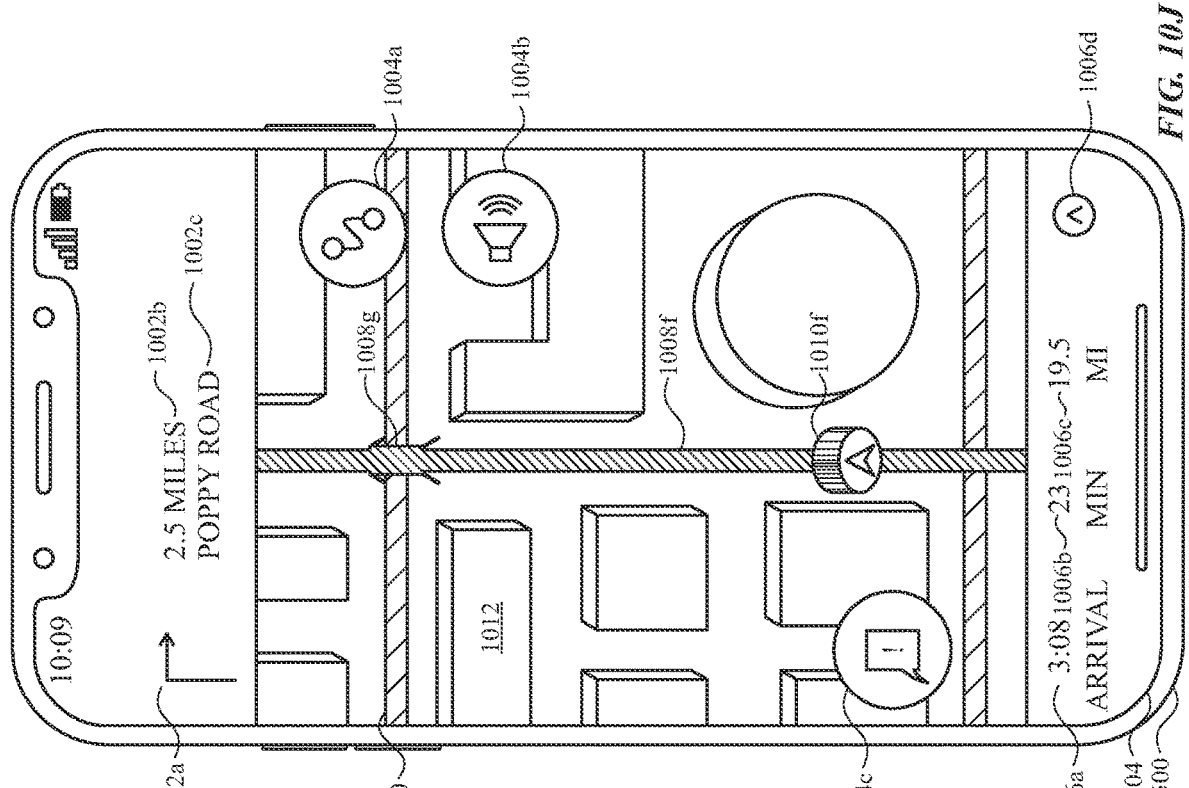
Figure 10J:
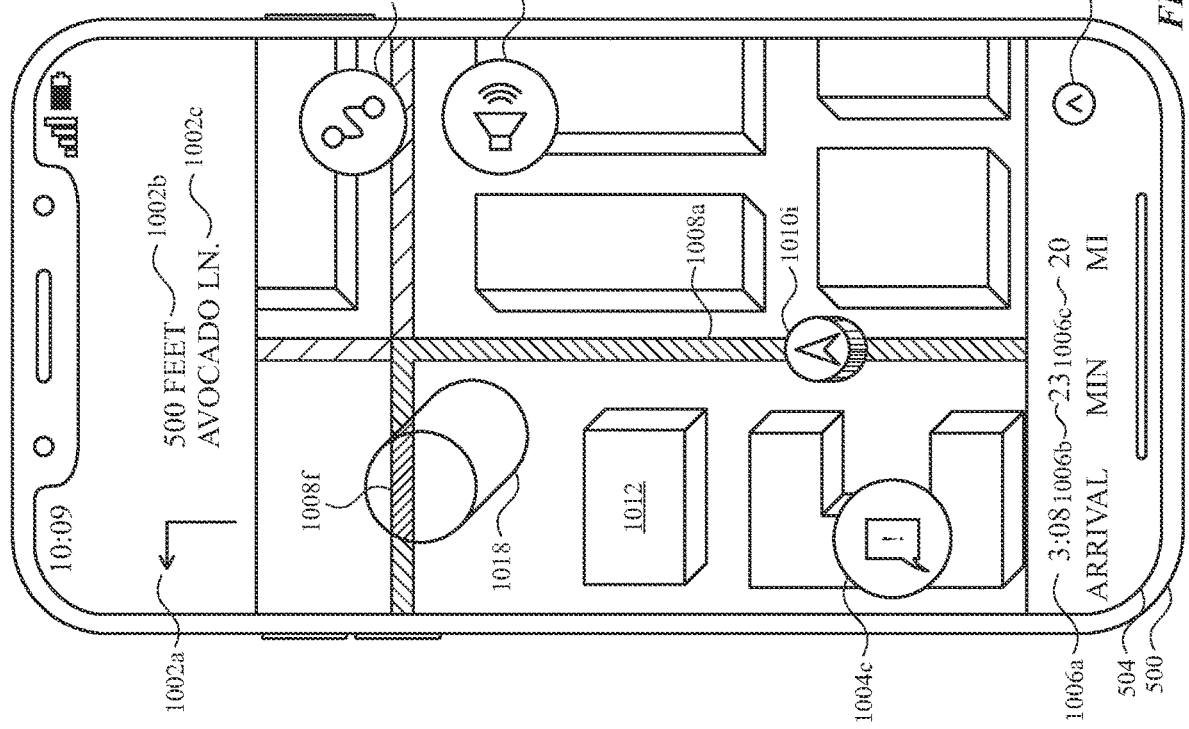

In some embodiments, the electronic device 500 similarly tilts the representation of the current location of the electronic device 500 in the maps user interface to reflect vertical (e.g., forward/backward) tilt of the road corresponding to the current location of the electronic device 500 (e.g., the location of the road on which the user of the electronic device 500 is currently driving), as shown in FIGS. 10I-10J. In some embodiments, the level of zoom in FIGS. 10I-10J is the same as the level of zoom in FIGS. 10A-10B and less than the level of zoom in FIGS. 10C-10H.

For example, FIG. 10I illustrates an example of the electronic device 500 presenting the navigation user interface while the current location of the electronic device 500 (e.g., the portion of the road on which the user of the electronic device 500 is currently driving) is going down a hill. As shown in FIG. 10I, in some embodiments, the electronic device 500 presents the indication 1010i of the current location of the electronic device 500 and representations 1012 of the buildings in the user interface with a vertical (e.g., forward/backward) tilt that indicates that the electronic device 500 is moving downhill (e.g., the portion of the map towards the top of the user interface is at a lower elevation (e.g., further from the virtual camera via which the map is presented) than the portion of the map towards the bottom of the user interface (e.g., which is closer to the virtual camera via which the map is presented)). For example, the top and back surfaces of the indication 1010i of the current location of the electronic device 500 are visible in FIG. 10I.

FIG. 10I also illustrates an example of a portion 1008f of the indication 1008a of the navigation route that is obstructed by a representation 1018 of a physical object in the perspective of the map shown in FIG. 10I. For example, representation 1018 corresponds to a building that is next to the navigation route. In some embodiments, although the navigation route does not go under the building corresponding to representation 1018, a portion 1008f of the indication 1008a of the navigation route is obstructed by the representation 1018 of the building due to the perspective of the virtual camera through which the user interface is displayed. In some embodiments, the portion 1008f of the indication 1008a of the navigation route that is obstructed by the representation 1018 of the building is displayed with a different color, translucency, size, style, etc. from those of portions of the indication 1008a of the navigation route that are not obstructed by representations of physical objects.

In some embodiments, if multiple (e.g., non-consecutive) portions of the indication 1008a of the navigation route are obstructed by representations of physical objects in the user interface, the electronic device 500 displays those portions of the indication 1008a of the navigation route with different colors, translucencies, sizes, styles, etc. from the portions of the indication 1008a of the navigation route not obstructed by representations of physical objects. In some embodiments, the ways the electronic device 500 modifies display of portion 1008f of the indication 1008a of the route are similar to the previously-described ways in which the electronic device 500 modifies other portions of the indications of the routes when occluded by representations of other objects (e.g., indications of overpasses). In some embodiments, the portions of the indication 1008a of the navigation route that are obstructed by representations of physical objects are displayed with the same colors, translucencies, sizes, styles, etc. as one another. In some embodiments, the portions of the indication 1008a of the navigation route that are obstructed by representations of physical objects are displayed with the different colors, translucencies, sizes, styles, etc. that correspond to, for example, the type of object corresponding to the representation obstructing the indication 1008a of the navigation route and/or the color, style, size, translucency, etc. of the portion of the representation of the physical object obstructing the portion of the indication 1008a of the navigation route. For example, a portion of the indication of the route that is occluded by a building has a different color than a portion of the indication of the route that is occluded by an overpass.

As another example, FIG. 10J illustrates an example of the electronic device 500 presenting the navigation user interface while the current location of the electronic device 500 (e.g., the portion of the road on which the user of the electronic device 500 is currently driving) is going up a hill. As shown in FIG. 10J, in some embodiments, the electronic device 500 presents the indication 1010f of the current location of the electronic device 500 and representations 1012 of the buildings in the user interface with a vertical (e.g., forward/backward) tilt that indicates that the electronic device 500 is moving uphill (e.g., the portion of the map towards the top of the user interface is at a higher elevation (e.g., closer to the virtual camera via which the map is presented) than the portion of the map towards the bottom of the user interface (e.g., which is further from the virtual camera via which the map is presented)). For example, the top and front surfaces of the indication 1010f of the current location of the electronic device 500 are visible in FIG. 10J.

In some embodiments, as shown in FIG. 10J, the electronic device 500 displays the indication 1008f of the navigation route with z-height that reflects the elevation of the navigation route in real life. For example, a portion 1008g of the navigation route that goes over an overpass is displayed at a higher z-height than a representation 1020 of the road that goes under the overpass.

Figure 11:
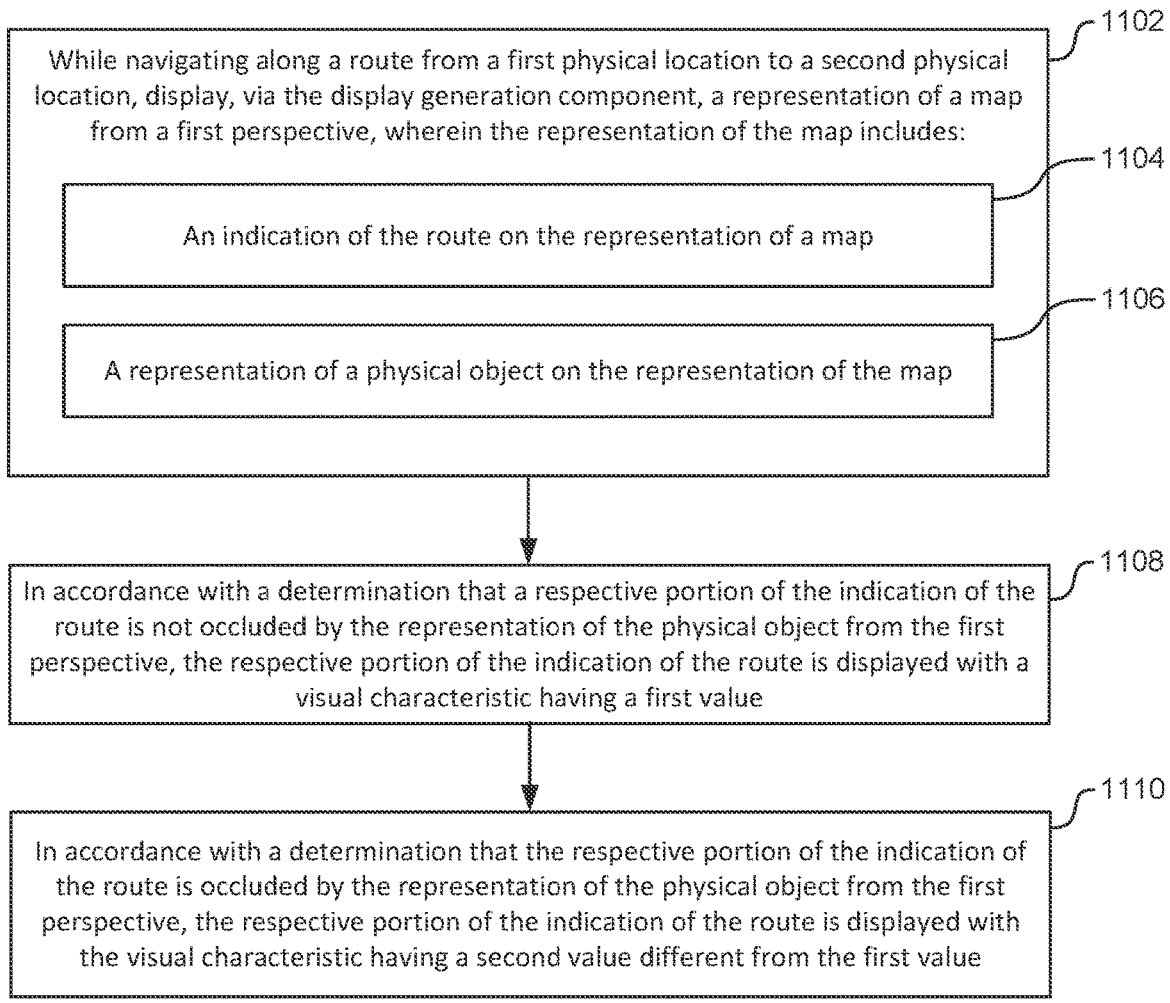
FIG. 11 is a flow diagram illustrating a method of modifying display of portions of a navigation route that are occluded by representations of (e.g., physical) objects in a map in accordance with some embodiments.

FIG. 11 is a flow diagram illustrating a method of modifying display of portions of a navigation route that are occluded by representations of (e.g., physical) objects in a map in accordance with some embodiments. The method 1100 is optionally performed at an electronic device such as device 100, device 300, and device 500, as described above with reference to FIGS. 1A-1B, 2-3, 4A-4B and 5A-5H. Some operations in method 1100 are, optionally combined and/or order of some operations is, optionally, changed.

As described below, the method 1100 provides ways in which an electronic device modifies display of portions of a navigation route that are occluded by representations of (e.g., physical) objects in a map in accordance with some embodiments. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 10A, method 1100 is performed at an electronic device (e.g., 500) in communication with a display generation component and one or more input devices. In some embodiments, the electronic device (e.g., 500) a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, such as in FIG. 10A, while navigating along a route from a first physical location to a second physical location (e.g., such as described with reference to methods 700 and/or 900), the electronic device (e.g., 500) displays, via the display generation component (e.g., 504), a representation of a map from a first perspective, wherein the representation of the map includes an indication (e.g., 1008a) of the route on the representation of a map. In some embodiments, the indication of the route (e.g., a route line) is displayed overlaid on one or more roads, streets, etc. included in the route. For example, roads and streets not included in the route are displayed in a first plurality of colors (e.g., colors corresponding to the colors of the roads and streets in real life) and the indication of the route is displayed in a second color different from the first plurality of colors (e.g., blue, green, yellow, red, orange) overlaid on the roads/streets. In some embodiments, the route line has one or more of the characteristics of the route lines described with reference to methods 700 and/or 900. In some embodiments, navigating along the route includes presenting navigation directions from the first physical location to the second physical location in a manner that is synchronized with the current location of the electronic device. In some embodiments, the first perspective refers to the zoom level and/or pose (e.g., position and angle) of a virtual camera relative to an indication of the current location of the electronic device that defines the field of view in which the representation of the map is presented.

In some embodiments, such as in FIG. 10A, while navigating along a route from a first physical location to a second physical location (e.g., such as described with reference to methods 700 and/or 900), the electronic device (e.g., 500) displays, via the display generation component (e.g., 504), a representation of a map from a first perspective, wherein the representation of the map includes a representation (e.g., 1012a) of a physical object on the representation of the map. In some embodiments, the objects is one of a building, landmark, plant, or other object in the physical area represented by the map. In some embodiments, the representation physically resembles the object to which it corresponds. In some embodiments, the representation is displayed at a location on the map corresponding to the physical location of the object in the physical area represented by the map. In some embodiments, the representation of the physical object is a representation of an object, such as described with reference to method 900.

In some embodiments, such as in FIG. 10A, while navigating along a route from a first physical location to a second physical location (e.g., such as described with reference to methods 700 and/or 900), the electronic device (e.g., 500) displays, via the display generation component (e.g., 504), a representation of a map from a first perspective, wherein the representation of the map includes, in accordance with a determination that a respective portion (e.g., 1008a) of the indication (e.g., 1008a) of the route is not occluded by the representation (e.g., 1012a) of the physical object from the first perspective, the respective portion of the indication of the route is displayed with a visual characteristic (e.g., color, size, opacity, pattern) having a first value. In some embodiments, the indication of the route is not occluded by the representation of the physical object if the representation of the physical object does not overlap any portion of the indication of the route when displayed from the first perspective. In some embodiments, other portions of the route not occluded by representations of physical objects are also displayed with the visual characteristic having the first value. In some embodiments, although the respective portion of the indication of the route is not occluded by the representation of the physical object from the first perspective, the respective portion of the indication of the route is occluded by the representation of the physical object from a different perspective.

In some embodiments, such as in FIG. 10A, while navigating along a route from a first physical location to a second physical location (e.g., such as described with reference to methods 700 and/or 900), the electronic device (e.g., 500) displays, via the display generation component (e.g., 504), a representation of a map from a first perspective, wherein the representation of the map includes, in accordance with a determination that the respective portion (e.g., 1008b) of the indication (e.g., 1008a) of the route is occluded by the representation (e.g., 1012a) of the physical object from the first perspective, the respective portion (e.g., 1008b) of the indication of the route is displayed with the visual characteristic (e.g., color, size, opacity, pattern) having a second value different from the first value. In some embodiments, other portions of the route occluded by representations of other physical objects are displayed with the visual characteristic having the second value. In some embodiments, although the respective portion of the indication of the route is occluded by the representation of the physical object from the first perspective, the respective portion of the indication of the route is not occluded by the representation of the physical object from a different perspective. In some embodiments, portions of the indication of the route occluded by representations of physical objects are displayed with a different color and/or with increased translucency compared to portions of the route not occluded by representations of physical objects. In some embodiments, the portion of the route that is occluded by the representation of the physical object is displayed overlaid on the representation of the physical object (e.g., with increased translucency compared to portions of the route not occluded by representations of physical objects). In some embodiments, the representation of the physical object is overlaid on the indication of the route and the representation of the physical object (e.g., or a portion of the representation of the physical object that occludes the indication of the route) is displayed with a level of translucency that makes the indication of the route visible through the representation of the physical object. In some embodiments, a portion of the representation of the physical object that occludes the route has increased translucency compared to other portions of the representation of the physical object that do not occlude the route (e.g., so that the portion of the route is visible through the representation of the physical object). The above-described manner of displaying the respective portion of the indication of the route with the visual characteristic having different values depending on whether or not the respective portion of the indication of the route is occluded by the representation of the physical object provides an efficient way of concurrently displaying the indication of the route and the representation of the physical object, which additionally reduces power usage and improves battery life of the electronic device by enabling the user to use the electronic device more quickly and efficiently.

In some embodiments, such as in FIG. 10D, while navigating along the route from the first physical location to the second physical location, the electronic device (e.g., 500) displays, via the display generation component (e.g., 504), the representation of the map from a second perspective, different from the first perspective. In some embodiments, the electronic device updates the perspective with which the representation of the map is displayed in accordance with one or more steps of method 700. In some embodiments, the first perspective has a lower level of zoom and a different angle relative to a respective reference (e.g., gravity) compared to those of the second perspective. In some embodiments, the first perspective has a different lateral angle compared to the second perspective.

In some embodiments, such as in FIG. 10D, in accordance with a determination that the respective portion (e.g., 1008d) of the indication (e.g., 1008d) of the route is not occluded by the representation (e.g., 1012b) of the physical object from the second perspective, the respective portion (e.g., 1008d) of the indication (e.g., 1008d) of the route is displayed with the visual characteristic having the first value, and In some embodiments, due to the differences between the first perspective and second perspective, the respective portion of the indication of the route may not be occluded from the second perspective even if it was occluded from the first perspective. In some embodiments, the respective portion of the indication of the route is not occluded from the first perspective or second perspective.

In some embodiments, such as in FIG. 10D, in accordance with a determination that the respective portion (e.g., 1008e) of the indication (e.g., 1008d) of the route is occluded by the representation (e.g., 1012b) of the physical object from the second perspective, the respective portion (e.g., 1008e) of the indication (e.g., 1008d) of the route is displayed with the visual characteristic having the second value. In some embodiments, due to differences between the first perspective and second perspective, the respective portion of the indication of the route may be occluded from the second perspective even if it was not occluded from the first perspective. In some embodiments, the respective portion of the indication of the route is occluded from the first perspective and second perspective. The above-described manner of displaying the respective portion of the indication with a different visual characteristic depending on whether or not the respective portion of the indication is occlude by the representation of the physical object from the second perspective provides an efficient way of presenting portions of the indication of the route line that are occluded by representations of objects from the second perspective, which additionally reduces power usage and improves battery life of the electronic device by enabling the user to use the electronic device more quickly and efficiently.

In some embodiments, such as in FIG. 10A, in accordance with the determination that the respective portion (e.g., 1008b) of the indication of the route is occluded by the representation (e.g., 1012a) of the physical object from the first perspective, the electronic device (e.g., 500) displays a respective portion (e.g., 1008b) of the representation (e.g., 1012a) of the physical object that is occluding the respective portion (e.g., 1008b) of the indication (e.g., 1008a) of the route with a first visual appearance. In some embodiments, displaying the respective portion of the representation of the physical object with the first visual appearance includes displaying the respective portion of the representation of the physical object with a first color, translucency, style, level of detail, etc. For example, if a representation of an overpass includes an indication of lane lines of the overpass, the electronic device forgoes displaying the lane lines of the portion of the representation of the overpass that is occluding the respective portion of the indication of the route.

In some embodiments, such as in FIG. 10A, in accordance with the determination that the respective portion (e.g., 1008a) of the indication of the route is not occluded by the representation (e.g., 1012a) of the physical object from the first perspective, the electronic device (e.g., 500) displays the respective portion (e.g., 1012a) of the representation (e.g., 1012a) of the physical object with a second visual appearance different from the first visual appearance. In some embodiments, displaying the respective portion of the representation of the physical object with the second visual appearance includes displaying the respective portion of the representation of the physical object with a second color, translucency, style, level of detail, etc. For example, if a representation of an overpass includes an indication of lane lines of the overpass, the electronic device displays the lane lines of the respective portion of the representation of the overpass if the respective portion of the representation of the overpass does not occlude the visual indication of the route. The above-described manner of modifying the visual appearance of the respective representation of the physical object provides an efficient way of increasing the visibility of the indication of the route, which additionally reduces power usage and improves battery life of the electronic device by enabling the user to use the electronic device more quickly and efficiently.

In some embodiments, such as in FIG. 10I, the electronic device (e.g., 500) displays, on the indication (e.g., 1008a) of the route on the representation of the map, a current location indicator (e.g., 1010i) that corresponds to a current location of the electronic device (e.g., 500) on the representation of the map. For example, if the electronic device is at a first physical location, the electronic device displays the current location indicator at a first respective position on the map corresponding to the first physical location and if the electronic device is at a second physical location, the electronic device displays the current location indicator at a second respective position on the map corresponding to the second physical location.

In some embodiments, such as in FIG. 10I, in accordance with a determination that a topography of the representation of the map at the current location indicator (e.g., 1010i) has a first grade (e.g., roll, pitch), the current location indicator (e.g., 1010i) is displayed with a first orientation based on the first grade. In some embodiments, if the topography of the map at the current location indicator is tilted to the left, the current location indicator is displayed tilted to the left. In some embodiments, if the topography of the map at the current location indicator is tilted up with respect to the direction of movement along the route, the electronic device displays the current location indicator tilted up with respect to the direction of movement along the route.

In some embodiments, such as in FIG. 10J, in accordance with a determination that the topography of the representation of the map at the current location indicator (e.g., 1010f) has a second grade (e.g., roll, pitch), different from the first grade, the current location indicator (e.g., 10100) is displayed with a second orientation, different from the first orientation, based on the second grade. In some embodiments, if the topography of the map at the current location indicator is tilted to the right, the current location indicator is displayed tilted to the right. In some embodiments, if the topography of the map at the current location indicator is tilted down with respect to the direction of movement along the route, the electronic device displays the current location indicator tilted down with respect to the direction of movement along the route. In some embodiments, the electronic device displays the current location indicator with an orientation based on the pitch (e.g., tilting up/down relative to the direction of motion along the route) of the topography of the map, but not based on the roll (e.g., tilting left/right) of the topography of the map. The above-described manner of displaying the current location indicator with an orientation based on the topography of the representation of the map at the current location indicator provides an efficient way of consistently representing the topography of the map, which additionally reduces power usage and improves battery life of the electronic device by enabling the user to use the electronic device more quickly and efficiently.

In some embodiments, such as in FIG. 10C, the electronic device (e.g., 500) displays, on the indication of the route (e.g., 1008d) on the representation of the map a current location indicator (e.g., 1010b) that corresponds to a current location of the electronic device (e.g., 500) on the representation of the map. For example, if the electronic device is at a first physical location, the electronic device displays the current location indicator at a first respective position on the map corresponding to the first physical location and if the electronic device is at a second physical location, the electronic device displays the current location indicator at a second respective position on the map corresponding to the second physical location.

In some embodiments, such as in FIG. 10C, the electronic device (e.g., 500) displays, on the indication of the route (e.g., 1008d) on the representation of the map a simulated shadow (e.g., 1011b) cast by the current location indicator on the representation of the map. In some embodiments, the simulated shadow is displayed with a visual characteristic based on a visual characteristic mode of the electronic device according to one or more steps of method 1300. In some embodiments, the direction of the simulated shadow is based on the position of the sun at the current time and location of the electronic device. For example, if the map is oriented so that north is up and the sun is currently northeast of the current location of the electronic device, the electronic device displays the simulated shadow down and to the left of the current location indicator. In some embodiments, the position, size, etc. of the simulated shadow is based on the location, intensity, color, etc. of one or more simulated natural and/or artificial light sources with which the map is currently displayed according to one or more steps of method 1300. The above-described manner of displaying the simulated shadow cast by the current location indicator provides a visually pleasing way of presenting the current location indicator on the visual indication of the route, which additionally reduces power usage and improves battery life of the electronic device by enabling the user to use the electronic device more quickly and efficiently and reduces distraction while using the electronic device to navigate while driving.

In some embodiments, such as in FIG. 10E, the electronic device (e.g., 500) displays, on the indication (e.g., 1008d) of the route on the representation of the map, a current location indicator (e.g., 1010b) that corresponds to a current location of the electronic device (e.g., 500) on the representation of the map. For example, if the electronic device is at a first physical location, the electronic device displays the current location indicator at a first respective position on the map corresponding to the first physical location and if the electronic device is at a second physical location, the electronic device displays the current location indicator at a second respective position on the map corresponding to the second physical location.

In some embodiments, such as in FIG. 10E, in accordance with a determination that a respective portion of the current location indicator (e.g., 1010*b*) is not occluded by the representation (e.g., 1012*b*) of the physical object from the first perspective, the respective portion of the current location indicator (e.g., 1010*b*) is displayed with a second visual characteristic (e.g., color, translucency, pattern, etc.) having a third value. In some embodiments, if the entire current location indicator is not occluded by the representation of the physical object, the electronic device displays the entire current location indicator with the second visual characteristic having the third value.

In some embodiments, such as in FIG. 10F, in accordance with a determination that the respective portion (e.g., 1016*a*) of the current location indicator (e.g., 1010*c*) is occluded by the representation (e.g., 1012*b*) of the physical object from the first perspective, the respective portion (e.g., 1016*a*) of the current location indicator (e.g., 1010*c*) is displayed with the second visual characteristic (e.g., color, translucency, pattern, etc.) having a fourth value, different from the third value. In some embodiments, even if the representation of the physical object is between the current location indicator and the viewpoint from which the map is displayed, the electronic device displays the portion of the current location indicator that is occluded by the representation of the physical object overlaid on the representation of the physical object. In some embodiments, the representation of the physical object is overlaid on the indication of the route and the representation of the physical object (e.g., or a portion of the representation of the physical object that occludes the indication of the route) is displayed with a level of translucency that makes the indication of the route visible through the representation of the physical object. In some embodiments, the occluded portion of the current location indicator is displayed with a different color, with increased translucency, and/or a different pattern than portions of the current location indicator not occluded by the representation of the physical object. In some embodiments, if the entire current location indicator is occluded by the representation of the physical object, the electronic device displays the entire current location indicator with the second visual characteristic having the fourth value. In some embodiments, as the portion of the current location indicator that is occluded by the representation of the physical object changes (e.g., due to motion of the electronic device and corresponding motion of the current location indicator), the electronic device updates which portion of the current location indicator is displayed with the second visual characteristic having the fourth value. In some embodiments, in response to detecting the current location indicator moves from being occluded to not being occluded, the electronic device updates a respective portion of the current location indicator with the second visual characteristic having the fourth value to displaying the (e.g., entire) current location indicator with the second visual characteristic having the third value. In some embodiments, in response to detecting the current location indicator moves from not being occluded to being occluded, the electronic device updates the current location indicator from being displayed with the second visual characteristic having the fourth value to displaying a respective portion current location indicator that is occluded with the second visual characteristic having the fourth value. The above-described manner of displaying the portion of the current location indicator with the second visual characteristic having the value based on whether or not the portion of the current location indicator is occluded by the representation of the physical object provides an efficient way of maintaining display of the current location indicator even if it is (e.g., partially) occluded by the representation of the physical object which additionally reduces power usage and improves battery life of the electronic device by enabling the user to use the electronic device more quickly and efficiently.

In some embodiments, such as in FIG. 10A, the electronic device (e.g., 500) displays, on the indication (e.g., 1008*a*) of the route on the representation of the map, a current location indicator (e.g., 1010*a*) that corresponds to a current location of the electronic device (e.g., 500) on the representation of the map. For example, if the electronic device is at a first physical location, the electronic device displays the current location indicator at a first respective position on the map corresponding to the first physical location and if the electronic device is at a second physical location, the electronic device displays the current location indicator at a second respective position on the map corresponding to the second physical location.

In some embodiments, in accordance with a determination that a zoom level at which the representation of the map is displayed is a first zoom level, such as in FIG. 10A, in accordance with the determination that the respective portion (e.g., 1008*a*) of the indication of the route is not occluded by the representation (e.g., 1012*a*) of the physical object (e.g., from the first perspective, at the first zoom), the respective portion (e.g., 1008*a*) of the indication (e.g., 1008*a*) of the route is displayed with the visual characteristic (e.g., color, translucency, pattern, style, etc.) having the first value.

In some embodiments, in accordance with a determination that a zoom level at which the representation of the map is displayed is a first zoom level, such as in FIG. 10A, in accordance with the determination that the respective portion (e.g., 1008*b*) of the indication (e.g., 1008*a*) of the route is occluded by the representation (e.g., 1012*a*) of the physical object (e.g., from the first perspective, at the first zoom), the respective portion (e.g., 1008*b*) of the indication (e.g., 1008*a*) of the route is displayed with the visual characteristic (e.g., color, translucency, pattern, style, etc.) having the second value. In some embodiments, the portion of the indication of the route that is occluded by the representation of the physical object is displayed with a different color or pattern and/or increased level of translucency than portions of the indication of the route that are not occluded by the representation of the physical object. In some embodiments, the portion of the indication of the route that is occluded by the representation of the physical object is displayed overlaid on the representation of the physical object even if the representation of the physical object is between the portion of the indication of the route and the viewpoint from which the map is being displayed. For example, the portion of the indication of the route is displayed overlaid on the representation of the physical object with increased translucency relative to the rest of the indication of the route. In some embodiments, the representation of the physical object is overlaid on the indication of the route and the representation of the physical object (e.g., or a portion of the representation of the physical object that occludes the indication of the route) is displayed with a level of translucency that makes the indication of the route visible through the representation of the physical object. In some embodiments, the portion of the representation of the physical object that occludes the indication of the route is visible through the transparent portion of the visual indication of the route that is occluded by the representation of the physical object.

In some embodiments, such as in FIG. 10F, in accordance with a determination that a zoom level at which the representation of the map is displayed is a first zoom level, such as in FIG. 10E, in accordance with a determination that a respective portion (e.g., 1010b) of the current location indicator (e.g., 1010b) is not occluded by the representation (e.g., 1012b) of the physical object (e.g., from the first perspective, at the first zoom), the respective portion (e.g., 1010b) of the current location indicator is displayed with a second visual characteristic (e.g., color, translucency, pattern, style, etc.) having a third value. In some embodiments, the second visual characteristic is the same as the first visual characteristic. In some embodiments, the second visual characteristic is different from the first visual characteristic. In some embodiments, the second visual characteristic having the third value is the same as the first visual characteristic having the first value. In some embodiments, the second visual characteristic having the third value is different from as the first visual characteristic having the first value.

In some embodiments, such as in FIG. 10F, in accordance with a determination that a zoom level at which the representation of the map is displayed is a first zoom level, in accordance with a determination that the respective portion (e.g., 1016a) of the current location indicator (e.g., 1010c) is occluded by the representation (e.g., 1012b) of the physical object (e.g., from the first perspective, at the first zoom), the respective portion (e.g., 1016a) of the current location indicator (e.g., 1010c) is displayed with the second visual characteristic (e.g., color, translucency, pattern, style, etc.) having a fourth value, different from the third value. In some embodiments, the second visual characteristic having the fourth value is the same as the first visual characteristic having the second value. In some embodiments, the second visual characteristic having the fourth value is different from as the first visual characteristic having the second value. In some embodiments, the portion of the current location indicator that is occluded by the representation of the physical object is displayed with a different color or pattern and/or increased level of translucency than portions of the current location indicator that are not occluded by the representation of the physical object. In some embodiments, the portion of the current location indicator that is occluded by the representation of the physical object is displayed overlaid on the representation of the physical object even if the representation of the physical object is between the portion of the current location indicator and the viewpoint from which the map is being displayed. For example, the portion of the current location indicator is displayed overlaid on the representation of the physical object with increased translucency relative to the rest of the current location indicator (or relative to display of the current location indicator at a different time while the current location indicator is not occluded by the representation of the physical object). In some embodiments, the portion of the representation of the physical object that occludes the current location indicator is visible through the transparent portion of the current location indicator that is occluded by the representation of the physical object. In some embodiments, the representation of the physical object is overlaid on the indication of the current location of the electronic device and the representation of the physical object (e.g., or a portion of the representation of the physical object that occludes the indication of the current location of the electronic device) is displayed with a level of translucency that makes the indication of the current location visible through the representation of the physical object.

In some embodiments, such as in FIG. 10E, in accordance with a determination that the zoom level at which the representation of the map is displayed is a second zoom level, different from (e.g., greater than, less than) the first zoom level, in accordance with the determination that the respective portion (e.g., 1008d) of the indication (e.g., 1008d) of the route is not occluded by the representation (e.g., 1012b) of the physical object (e.g., from the first perspective, from a second perspective, at the second zoom), the respective portion (e.g., 1008d) of the indication (e.g., 1008d) of the route is displayed with the visual characteristic (e.g., color, translucency, pattern, style, etc.) having the first value.

In some embodiments, such as in FIG. 10E, in accordance with a determination that the zoom level at which the representation of the map is displayed is a second zoom level, different from (e.g., greater than, less than) the first zoom level, in accordance with the determination that the respective portion (e.g., 1008e) of the indication (e.g., 1008d) of the route is occluded by the representation (e.g., 1012b) of the physical object (e.g., from the first perspective, from a second perspective, at the second zoom), the respective portion (e.g., 1008e) of the indication (e.g., 1008d) of the route is not displayed; In some embodiments, while displaying the map from the second zoom level, the electronic device forgoes display of portions of the indication of the route that are occluded by the representation of the physical object. In some embodiments, while displaying the map from the second zoom level, the electronic device displays the portions of the indication of the route that are occluded by the representation of the physical object with the visual characteristic having the first value. In some embodiments, while displaying the map from the second zoom level, the electronic device displays the portions of the indication of the route that are occluded by the representation of the physical object with the visual characteristic having the second value.

In some embodiments, such as in FIG. 10F, in accordance with a determination that the zoom level at which the representation of the map is displayed is a second zoom level, different from (e.g., greater than, less than) the first zoom level, in accordance with a determination that a respective portion (e.g., 1010c) of the current location indicator (e.g., 1010c) is not occluded by the representation (e.g., 1012b) of the physical object (e.g., from the first perspective, from a second perspective, at the second zoom), the respective portion (e.g., 1016a) of the current location indicator is displayed with the second visual characteristic (e.g., color, translucency, pattern, style, etc.) having the third value.

In some embodiments, such as in FIG. 10F, in accordance with a determination that the zoom level at which the representation of the map is displayed is a second zoom level, different from (e.g., greater than, less than) the first zoom level, in accordance with a determination that the respective portion (e.g., 1016a) of the current location indicator (e.g., 1010c) is occluded by the representation (e.g., 1012b) of the physical object (e.g., from the first perspective, from a second perspective, at the second zoom), the respective portion (e.g., 1016a) of the current location indicator (e.g., 1010c) is displayed with the second visual characteristic (e.g., color, translucency, pattern, style, etc.) having the fourth value, different from the third value. In some embodiments, while displaying the map from the second zoom level, the electronic device forgoes display of the portions of the current location indicator that are occluded by the representation of the physical object. In some embodiments, while displaying the map from the second zoom level, the electronic device displays the portions of current location indicator that are occluded by the representation of the physical object with the second visual characteristic having the third value. The above-described manner of displaying the portion of the indication of the route with the visual characteristic having the second value while displaying the map at the first zoom level provides an efficient way of maintaining display of the portion of the indication of the route that is occluded by the representation of the object, which additionally reduces power usage and improves battery life of the electronic device by enabling the user to use the electronic device more quickly and efficiently.

In some embodiments, such as in FIG. 10J, in accordance with a determination that the respective portion (e.g., 1008g) of the indication (e.g., 1008f) of the route occludes a respective portion of the representation of the physical object, the respective portion (e.g., 1008g) of the indication (e.g., 1008f) of the route is displayed with the visual characteristic having the first value. In some embodiments, in accordance with a determination that the respective portion of the indication of the route does not occlude a representation of a physical object, the respective portion of the indication of the route is displayed with the visual characteristic having the first value. In some embodiments, the electronic device displays the indication of the route with the visual characteristic having the first value irrespective of which portions of the indication of the route, if any, occlude representations of physical objects on the map. For example, the route goes over an overpass that occludes a road below and portions of the route that are on the overpass are displayed with the same visual characteristics as portions of the route that are not on the overpass (e.g., portions of the route that are on a road on the ground). The above-described manner of displaying the respective portion of the indication of the route that occludes a respective portion of the representation of the physical object with the visual characteristic having the first value provides an efficient way of presenting the indication of the route visibly on the map which additionally reduces power usage and improves battery life of the electronic device by enabling the user to use the electronic device more quickly and efficiently.

In some embodiments, such as in FIG. 10I, the representation (e.g., 1018) of the physical object is not coincident with (e.g., on top of) the indication of the route on the representation of the map (e.g., the representation of the physical object is adjacent to the indication of the route on the representation of the map). In some embodiments, the representation of the physical object is displayed in three dimensions. For example, the route is adjacent to a building and the electronic device displays the map from a perspective such that the building is between a portion of the indication of the route and the viewpoint from which the map is displayed, and the portion of the indication of the route occluded by the representation of the building is displayed with the visual characteristic having the second value and the rest of the indication of the route is displayed with the visual characteristic having the first value. The above-described manner of displaying the portion of the representation of the route that is occluded by a representation of the object that is not coincident with the indication of the route with the visual characteristic having the second value provides an efficient way of displaying the portion of the indication of the route visibly on the map which additionally reduces power usage and improves battery life of the electronic device by enabling the user to use the electronic device more quickly and efficiently.

In some embodiments, such as in FIG. 10E, the indication (e.g., 1008d) of the route is displayed overlaid on a portion of a representation of a road included in the route from the first physical location to the second physical location. In some embodiments, the representation of the road is wider than the width of the indication of the route. In some embodiments, the representation of the road includes visual indications of lanes of the road.

In some embodiments, such as in FIG. 10E, in accordance with a determination that the route includes driving on a first side of the portion of the road, the indication (e.g., 1008d) of the route is displayed overlaid on the first side of the portion of the representation of the road and is not overlaid on the second side of the portion of the representation of the road. For example, the road includes a first lane for traffic moving in a first direction and a second lane for traffic moving in a second direction and the electronic device displays the indication of the route overlaid on the lane corresponding to the direction in which the electronic device is moving. As another example, if an upcoming maneuver of the navigation route requires driving in a first lane of the road and not a second lane of the road in order to (e.g., safely, legally) complete the maneuver, the electronic device displays the indication of the route overlaid on the side of the road having the first lane (e.g., according to one or more steps of method 700).

In some embodiments, such as in FIG. 10E, in accordance with a determination that the route includes driving on a second side, different from the first side, of the portion of the representation of the road, the indication (e.g., 1008d) of the route is displayed overlaid on the second side of the portion of the representation of the road and is not overlaid on the first side of the portion of the representation of the road. In some embodiments, if an upcoming maneuver of the navigation route requires driving in a second lane of the road and not a first lane of the road in order to (e.g., safely, legally) complete the maneuver, the electronic device displays the indication of the route overlaid on the side of the road having the second lane (e.g., according to one or more steps of method 700). The above-described manner of displaying the indication of the route overlaid on the side of the road including the route provides an efficient way of presenting a realistic and detailed map of the route, which additionally reduces power usage and improves battery life of the electronic device by enabling the user to use the electronic device more quickly and efficiently.

In some embodiments, such as in FIG. 10E, the indication (e.g., 1008d) of the route is displayed overlaid on a portion of a road included in the route from the first physical location to the second physical location, wherein the portion of the road includes a first lane and a second lane corresponding to a same direction of traffic on the portion of the road. In some embodiments, the representation of the road is wider than the width of the indication of the route. In some embodiments, the representation of the road includes visual indications of lanes of the road.

In some embodiments, such as in FIG. 10E, in accordance with a determination that the route corresponds to driving in the first lane but not the second lane (e.g., in order to (e.g., safely, legally) complete an upcoming maneuver of the route), the indication (e.g., 1008d) of the route is displayed overlaid on the first lane of the portion of the road and is not overlaid on the second lane of the portion of the road. In some embodiments, the electronic device displays the indication of the route overlaid on the first lane of the portion of the road in accordance with one or more steps of method 700.

In some embodiments, such as in FIG. 10E, in accordance with a determination that the route corresponds to driving in the second lane but not the first lane, the indication (e.g., 1008*d*) of the route is displayed overlaid on the second lane of the portion of the road and is not overlaid on the first lane of the portion of the road.

In some embodiments, such as in FIG. 10E, in accordance with a determination that the route corresponds to driving in the first lane and the second lane, the indication (e.g., 1008*d*) of the route is displayed overlaid on the first and second lanes of the portion of the road. In some embodiments, the electronic device displays the visual indication of the route overlaid on a plurality of lanes of the portion of the road if the route corresponds to driving in one of the plurality of lanes (e.g., the user is able to (e.g., safely, legally) complete the upcoming maneuver from any of the plurality of lanes). The above-described manner of displaying the indication of the route overlaid on one or more lanes corresponding to the navigation directions provides an efficient way of indicating to the user which lanes to drive in, which additionally reduces power usage and improves battery life of the electronic device by enabling the user to use the electronic device more quickly and efficiently.

In some embodiments, such as in FIG. 10E, in accordance with a determination that a portion of the route corresponds to a first maneuver on the route, the indication (e.g., 1008*d*) of the route displayed on the representation of the map at a first zoom level has a first width. In some embodiments, the first zoom level is associated with the first maneuver according to one or more steps of method 700. In some embodiments, the first width of the indication of the route is associated with the first maneuver according to one or more steps of method 700. For example, the first maneuver is merging from a first road to a second road from one of three lanes of the first road and the indication of the route is displayed at a width that covers the three lanes of the first road (and does not cover one or more additional lanes of the first road).

In some embodiments, such as in FIG. 10F, in accordance with a determination that the portion of the route corresponds to a second maneuver on the route, the indication (e.g., 1008*e*) of the route displayed on the representation of the map at a second zoom level (e.g., the second zoom level is the same as the first zoom level, the second zoom level is different from the first zoom level) has a second width, different from the first width. In some embodiments, the second zoom level is associated with the second maneuver according to one or more steps of method 700. In some embodiments, the second width of the indication of the route is associated with the second maneuver according to one or more steps of method 700. For example, the second maneuver is turning from a first road to a second road from one lane of the first road and the indication of the route is displayed at a width that covers the one lane of the first road (and does not cover one or more additional lanes of the first road). The above-described manner of displaying the indication of the route with a width corresponding to an upcoming maneuver provides an efficient way of displaying the details needed to execute the upcoming maneuver, which additionally reduces power usage and improves battery life of the electronic device by enabling the user to use the electronic device more quickly and efficiently.

In some embodiments, such as in FIG. 10I, the electronic device (e.g., 500) displays a first portion of the indication (e.g., 1008*a*) of the route at a first elevation, wherein the first portion of the indication (e.g., 1008*a*) of the route corresponds to a first portion of the representation of the map that has a topography corresponding to a first respective elevation. In some embodiments, the representation of the map includes contours and/or shading to indicate topography of the region corresponding to the map. For example, if the first portion of the route has a lower elevation than a region proximate to the first portion of the route, the first portion of the representation of the route is displayed with a lower elevation than a portion of the map corresponding to the region proximate to the first portion of the route.

In some embodiments, such as in FIG. 10J, the electronic device (e.g., 500) displays a second portion (e.g., 1008*g*), different from the first portion, of the indication (e.g., 1008*f*) of the route at a second elevation, different from the first elevation, wherein the second portion (e.g., 1008*g*) of the indication of the route corresponds to a second portion, different from the first portion, of the representation of the map that has a topography corresponding to a second respective elevation, different from the first respective elevation. For example, if the first portion of the route has a higher elevation than a region proximate to the first portion of the route, the first portion of the representation of the route is displayed with a higher elevation than a portion of the map corresponding to the region proximate to the first portion of the route. The above-described manner of displaying the indication of the route with an elevation corresponding to the elevation of the portion of the route provides an efficient way of accurately representing the region corresponding to the map, which additionally reduces power usage and improves battery life of the electronic device by enabling the user to use the electronic device more quickly and efficiently.

In some embodiments, such as in FIG. 10D, the indication (e.g., 1008*d*) of the route is displayed with translucency such that one or more features of one or more elements on the representation of the map that are underneath the indication of the route are visible through the indication of the route. In some embodiments, the road included in the route includes markings, such as lane markings, intersections, and the like. In some embodiments, the electronic device displays representations of the markings on representations of the roads. In some embodiments, the translucency of the indication of the route is a level of translucency that causes the markings of a road included in the route to be visible through the indication of the route. The above-described manner of displaying the one or more features of the one or more elements on the representation of the map through the indication of the route provides an efficient way of displaying the one or more features visibly on the map, which additionally reduces power usage and improves battery life of the electronic device by enabling the user to use the electronic device more quickly and efficiently.

In some embodiments, the indication of the route is displayed with a visual characteristic having a value that varies based on traffic conditions along the route. For example, if traffic is relatively congested at a respective portion of the route, the electronic device displays a respective portion of the indication of the route in red. As another example, if traffic is relatively moderate at a respective portion of the route, the electronic device displays a respective portion of the indication of the route in orange. As another example, if traffic is relatively clear at a respective portion of the route, the electronic device displays a respective portion of the indication of the route in blue. In some embodiments, the electronic device blends the colors of adjacent portions of the indication of the route with different traffic conditions.

In some embodiments, the electronic device displays the route line in a color corresponding to the traffic conditions along the route, including displaying a portion of the route line that goes through an intersection in a color corresponding to the traffic conditions along the road of the route (and not the other road through the intersection). In some embodiments, while displaying indications of traffic for multiple roads (e.g., while navigating along a route or while not navigating along a route), the electronic device displays intersections with indications of traffic corresponding to the traffic of the road of the intersection that has the greatest degree of traffic. For example, an intersection of a highway and a residential street includes an indication of the traffic on the highway. As another example, an intersection of a road experiencing a traffic jam and a road not experiencing a traffic jam is displayed with a visual indication of the traffic jam.

In some embodiments, indications of traffic are displayed with a width corresponding to the level of zoom with which the map is displayed (e.g., to correspond to the width of the road relative to the size of the area represented by the map) and the class of the road. For example, indications of traffic on highways with many lanes are displayed with a greater width than indications of traffic on residential roads that have fewer lanes.

In some embodiments, the indication of traffic is displayed overlaid on a representation of a road at a height above the representation of the road (e.g., similar to the indication of the route).

It should be understood that the particular order in which the operations in FIG. 11 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1300, and/or 1500) are also applicable in an analogous manner to method 1100 described above with respect to FIG. 11. For example, the ways of modifying display of portions of a navigation route that are occluded by representations of (e.g., physical) objects in a map described above with reference to method 1100 optionally have one or more of the characteristics of the ways of presenting navigation routes from various perspectives, modifying display of representations of physical objects in the vicinity of a navigation route while presenting navigation directions, presenting representations of physical objects in maps, and/or presenting representations of physical objects in maps in response to requests to search for physical objects described herein with reference to other methods described herein (e.g., methods 700, 900, 1300, and/or 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 11 are, optionally, implemented by components depicted in FIGS. 1A-1B. For example, displaying operation 1102 is, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Presenting Representations of Physical Objects on Maps

Users interact with electronic devices in many different manners, including using electronic devices to present maps of physical locations. In some embodiments, presenting the map includes presenting representations of physical objects in the physical region represented by the map. The embodiments described below provide ways in which an electronic device presents representations of physical objects in a map in various display modes of the electronic device. Providing efficient manners of presenting representations of physical objects on maps enhances interactions with a device, thus reducing the amount of time a user needs to interact with the device while viewing a map, which increases battery life for battery-powered devices. It is understood that people use devices. When a person uses a device, that person is optionally referred to as a user of the device.

FIGS. 12A-12H illustrate exemplary ways in which an electronic device presents representations of physical objects in maps in accordance with some embodiments. The embodiments in these figures are used to illustrate the processes described below, including the processes described with reference to FIG. 13. Although FIGS. 12A-12H illustrate various examples of ways an electronic device is able to perform the processes described below with reference to FIG. 13, it should be understood that these examples are not meant to be limiting, and the electronic device is able to perform one or more processes described below with reference to FIG. 13 in ways not expressly described with reference to FIGS. 12A-12H.

FIGS. 12A-12H illustrate various examples of maps user interfaces that include representations of physical objects. For example, the electronic device displays the maps in multiple display modes, such as light mode and dark mode. In some embodiments, an operating system of the electronic device controls the setting of the light mode and dark mode display modes. For example, the user is able to select whether to display user interfaces on the electronic device in the light mode, in the dark mode, or in a mode that uses the light mode during a first (e.g., predetermined) time of day (e.g., during daytime) and uses the dark mode during a second (e.g., predetermined) time of day (e.g., during nighttime).

In some embodiments, displaying user interfaces in the light mode includes applying light mode styling specific to the application of the user interface and/or overriding the styling of the application to use a lighter color palette than the color palette of the dark mode. For example, in the light mode, text is generally styled with a dark colored font on a light background. As another example, in the light mode, the application presents maps that use a relatively light color palette compared to the color palette of the dark mode.

In some embodiments, displaying user interfaces in the dark mode includes applying dark mode styling specific to the application of the user interface and/or overriding the styling of the application to use a darker color palette than the color palette of the light mode. For example, in the dark mode, text is generally styled with a light colored font on a dark background. As another example, in the dark mode, the application presents maps that use a relatively dark color palette compared to the color palette of the light mode.

Figure 12A:
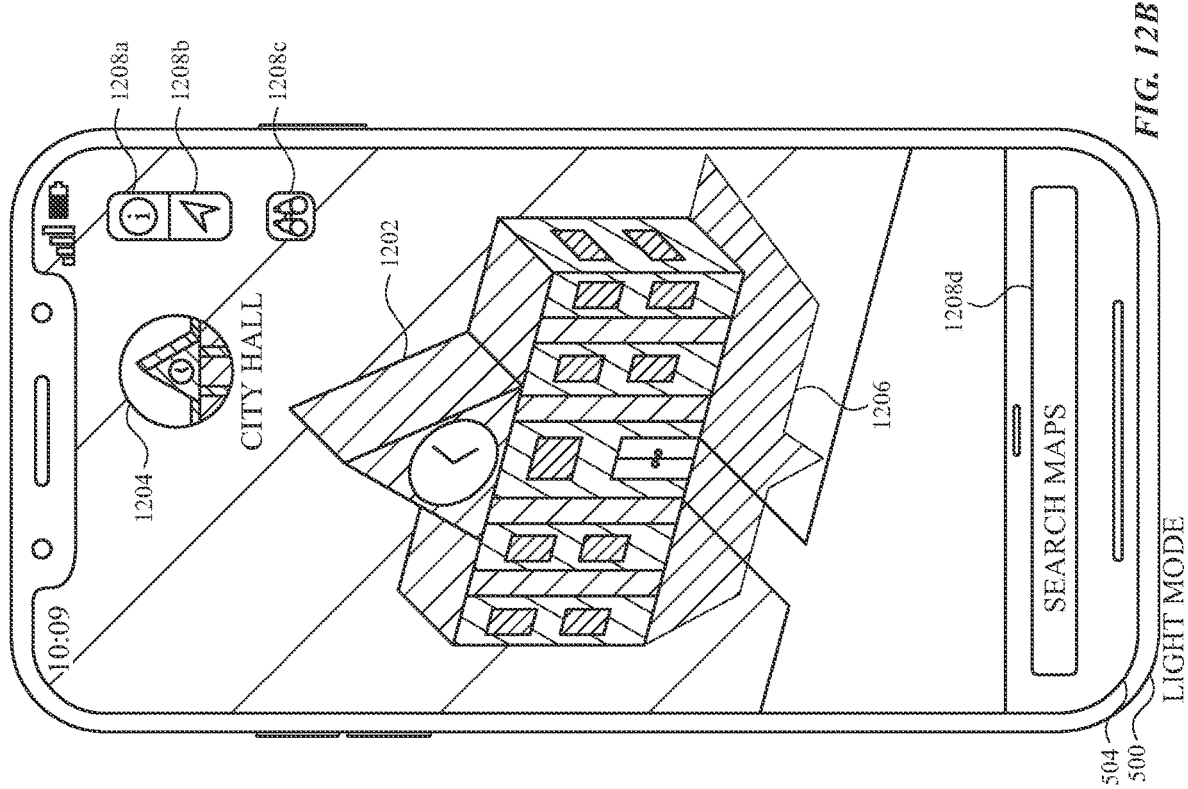

FIG. 12A illustrates an example of the electronic device 500 displaying a representation 1202 of a physical object (e.g., a building, City Hall) and an icon 1204 representing the physical object in a light mode of a maps user interface. In some embodiments, the representation 1202 is a three-dimensional rendering of the physical object. In some embodiments, the electronic device 500 displays the representation 1202 of the physical object in response to a sequence of one or more inputs panning and zooming the map to the location of the representation 1202 of the physical object at a zoom level at which the representation 1202 of the physical object is displayed. In some embodiments, the colors of the representation 1202 correspond to the colors of the physical object in real life. While presenting the representation 1202 in the light mode, in some embodiments, the electronic device 500 optionally applies a light mode or daytime virtual lighting effect to the representation 1202, such as simulating lighting provided by the sun, optionally without simulating lighting provided by manmade light sources (e.g., lights within or around the building). For example, the electronic device 500 displays a virtual shadow 1206 of the representation 1202 of the physical object to simulate the representation 1202 being lit by sunlight.

In some embodiments, the icon 1204 representing the physical object includes a three-dimensional representation of the physical object in colors that correspond to the colors of the physical object. In some embodiments, the icon 1204 includes a different portion of the physical object than the portion(s) of the physical object represented by the representation 1202. In some embodiments, the icon 1204 presents the object from a different perspective than the perspective from which the representation 1202 is displayed. In some embodiments, the icon 1204 is displayed in different colors than the representation 1202 (e.g., the colors of the icon 1204 and the colors of the representation 1202 both correspond to the same visual characteristic mode (e.g., day mode or light mode)). In some embodiments, while displaying the icon 1204 in the light mode, the electronic device 500 displays the image of the physical object in the icon with simulated daytime natural light. For example, the background of the icon 1204 is a daytime sky and the colors and shading correspond to the appearance of the object when illuminated in sunlight. In some embodiments, the representation 1202 and icon 1204 are displayed at a location on the map that corresponds to a location of the physical object in the real world.

In some embodiments, the maps user interface further includes a settings option 1208a that, when selected, causes the electronic device 500 to present a plurality of display settings for the map. In some embodiments, the maps user interface further includes an option 1208b that, when selected, causes the electronic device 500 to present a portion of the map including the current location of the electronic device 500. In some embodiments, the maps user interface further includes an option 1208c to present one or more images corresponding to the location shown on the map (e.g., ground-level photos of the region represented by the map). In some embodiments, the maps user interface further includes a search box 1208d to which a search input may be directed to cause the electronic device 500 to search for addresses, landmarks, and other objects on the map, optionally in accordance with one or more steps of method 1500.

In some embodiments, in response to a request to update the perspective with which the map is displayed, the electronic device 500 updates the perspective of the representation 1202 of the physical object without updating the perspective of the icon 1204 representing the object. For example, in FIG. 12A, the electronic device 500 detects (e.g., circular) movement of contacts 1203a and 1203b, which corresponds to a request to rotate the perspective from which the map is presented. In response to the input illustrated in FIG. 12A, the electronic device 500 updates the user interface as shown in FIG. 12B.

Figure 12B:
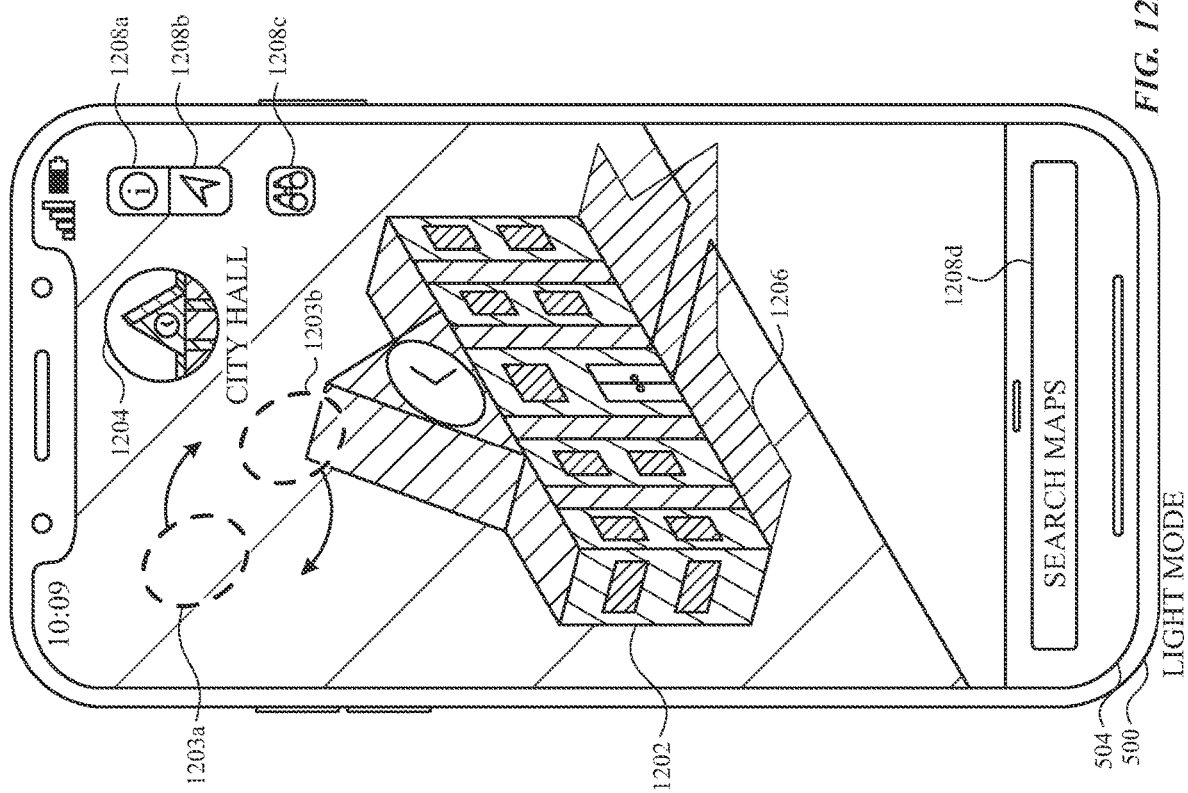

FIG. 12B illustrates an example of the maps user interface including the representation 1202 of the physical object and the icon 1204 representing the physical object from an updated perspective in accordance with the input illustrated in FIG. 12A. As shown in FIG. 12B, for example, the electronic device 500 rotates the map, including rotating the representation 1202 of the physical object, in response to the input illustrated in FIG. 12A. In some embodiments, the electronic device 500 does not rotate the view of the physical object included in icon 1204 in response to the input in FIG. 12A, as shown in FIG. 12B. In some embodiments, in response to detecting the input illustrated in FIG. 12A, the electronic device updates the position in the user interface at which icon 1204 is displayed. In some embodiments, in response to detecting the input illustrated in FIG. 12A, the electronic device forgoes updating the position in the user interface at which icon 1204 is displayed. In some embodiments, as shown in FIG. 12B, the electronic device 500 continues to display the maps user interface in the light mode with the same light mode styling, shading, and virtual lighting as those of FIG. 12A.

In some embodiments, when transitioning from displaying the map in the light mode to the dark mode (and vice-versa), the electronic device 500 displays an animated transition of the colors, styling, shading, and/or virtual lighting changing in accordance with the change in the mode in which the map is being displayed by the electronic device 500. For example, FIG. 12C illustrates a portion of the animated transition between displaying the map in the light mode shown in FIG. 12B and a dark mode shown in FIG. 12D. In some embodiments, the electronic device 500 transitions between the light and dark modes in response to a user input corresponding to a request to change the display mode of the electronic device 500. In some embodiments, the electronic device 500 transitions between the light and dark modes in accordance with a determination that the electronic device 500 is configured to change display modes at a predetermined time and the current time is the predetermined time. In some embodiments, the electronic device 500 transitions between the light and dark modes in accordance with a determination that the electronic device 500 is configured to change display modes at sunrise or sunset and it is currently sunrise or sunset at the current location of the electronic device 500.

In some embodiments, displaying the animated transition between the light mode and the dark mode includes displaying the map with colors, styling, shading, and virtual lighting that correspond to lighting conditions between the light mode and dark mode or between daytime and nighttime. For example, differences between the shading of the map, including the representation 1202 of the physical object and the icon 1204 representing the physical object in FIG. 12C from the shading in FIGS. 12A-12B represent differences in the colors of the image of the map displayed by the electronic device in the light mode and during the animated transition.

In some embodiments, the representation 1202 and icon 1204 are darker during the animated transition than they are during the light mode. In some embodiments, the electronic device 500 simulates lighting sources in a different way during the animated transition than the way the electronic device 500 simulates the lighting sources during the light mode. For example, the position and/or color of the sun are different during the animated transition than during the light mode. As another example, the electronic device 500 introduces one or more artificial light sources during the animated transition that were not used during the light mode. For example, the electronic device 500 displays the representation 1202 of the physical object with simulated lighting corresponding to lighting by the sun during sundown (or sunrise, for a transition from dark mode to light mode) and simulated lighting corresponding to one or more artificial light sources (e.g., lights inside the building corresponding to the physical object, lights external to the physical object, etc.). For example, the electronic device 500 updates the virtual shadow 1206 in FIG. 12C to correspond to a shadow of the physical object during sunset (or sunrise, for a transition from dark mode to light mode). In some embodiments, the virtual lighting applied to the icon 1204 is different from the virtual lighting applied to the representation 1202 of the physical object. For example, the representation 1202 of the physical object is lit by artificial lighting sources positioned at the bottom of the representation 1202, the sun, and/or the moon and the icon 1204 is lit by the sun and/or the moon without being lit by the artificial lighting sources. In some embodiments, the virtual lighting applied to the icon 1204 is the same as the virtual lighting applied to the representation 1202 of the physical object. In some embodiments, the icon 1204 displayed during the animated transition in FIG. 12C includes an image of the same portion of the physical object from the same perspective as the icon 1204 displayed in the light mode in FIGS. 12A-12B.

FIG. 12D illustrates an example of the electronic device 500 displaying the representation 1202 of the physical object and the icon 1204 representing the physical object during the dark mode of the electronic device. In some embodiments, the electronic device 500 displays the map in the dark mode after displaying the animated transition illustrated in FIG. 12C. In some embodiments, displaying the map in the dark mode includes displaying the map, including representation 1202 and icon 1204, with dark mode colors, styling, shading, and/or virtual lighting.

While presenting the representation 1202 in the dark mode, in some embodiments, the electronic device 500 optionally applies a dark mode or nighttime virtual lighting effect to the representation 1202, such as simulating lighting provided by the moon and/or by artificial light sources, such as lights external to the building corresponding to representation 1202 and/or lights from inside the building corresponding to representation 1202 (e.g., visible through the windows of the representation 1202).

In some embodiments, while displaying the icon 1204 in the dark mode, the electronic device 500 displays the representation of the physical object in the icon with simulated nighttime light, including natural and/or artificial light. For example, the background of the icon 1204 is a nighttime sky and the colors and shading correspond to the appearance of the object when illuminated by the moon and artificial light sources at night. In some embodiments, the artificial light sources include lights external to the object (e.g., streetlights, path lighting) and lights internal to the object (e.g., lights inside of the building). In some embodiments, the number and positions of light sources applied to the icon 1204 are different from the number and positions of light sources applied to the representation 1202

In some embodiments, in response to an input to zoom the map out, the electronic device 500 updates the map to no longer include the representation 1202 of the physical object while still including the icon 1204 representing the physical object. For example, in FIG. 12D, the electronic device 500 detects movement of contacts 1203c and 1203d towards each other corresponding to a request to zoom the map out. In response to the input illustrated in FIG. 12D, the electronic device 500 updates the map user interface as shown in FIG. 12E.

Figure 12E:
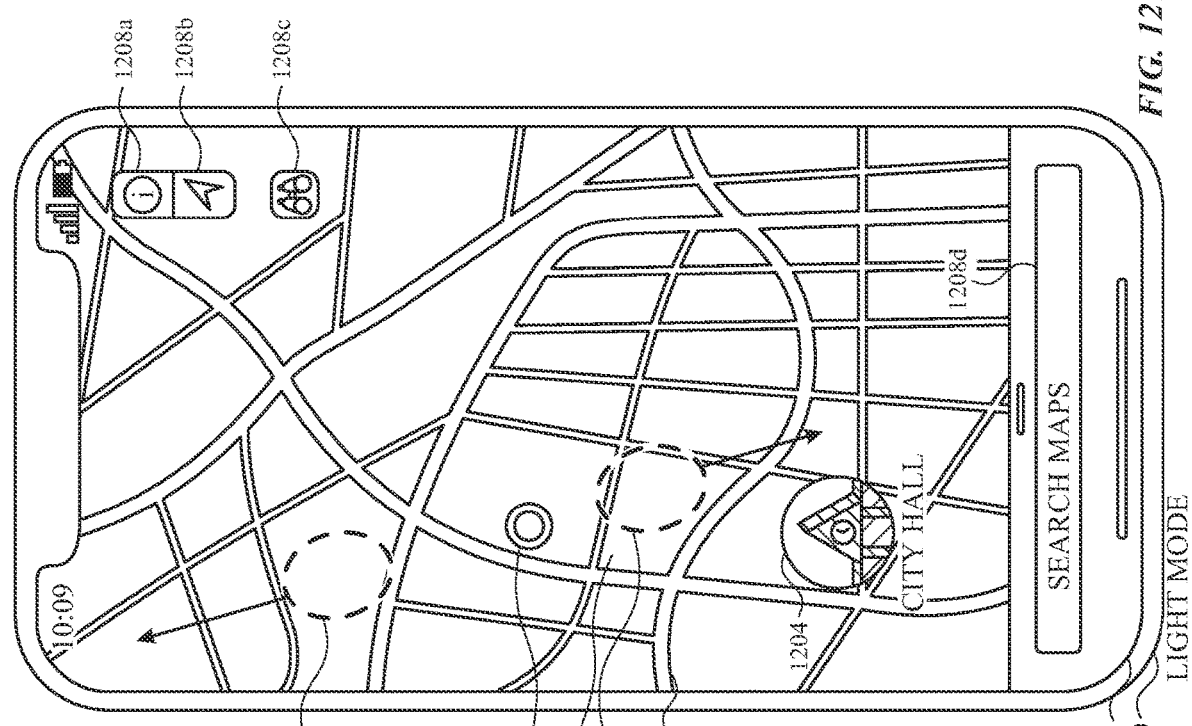

FIG. 12E illustrates an example of the map user interface zoomed out in response to the input illustrated in FIG. 12D. At the level of zoom in FIG. 12E, the electronic device 500 does not display the representation 1202 of the physical object, for example. In some embodiments, the electronic device 500 displays the icon 1204 representing the physical object at a location on the map corresponding to the location of the physical object in real life and an indication 1210 of the current location of the electronic device 500 at a location on the map corresponding to the current location of the electronic device 500. FIG. 12E illustrates an example of the electronic device 500 displaying the map in the dark mode of the electronic device 500, including dark mode colors, shading, styling, etc. for the map. For example, the indications 1212 of roads and the indications of blocks 1214 between roads in FIG. 12E are displayed with darker colors than the colors used to display the indications 1212 of roads and indications of blocks 1214 in the light mode, such as in FIG. 12F, for example. In some embodiments, the electronic device 500 displays the icon 1204 with the same coloring, shading, styling, etc. as those used when displaying the user interface in the dark mode as illustrated in FIG. 12D.

Figure 12F:
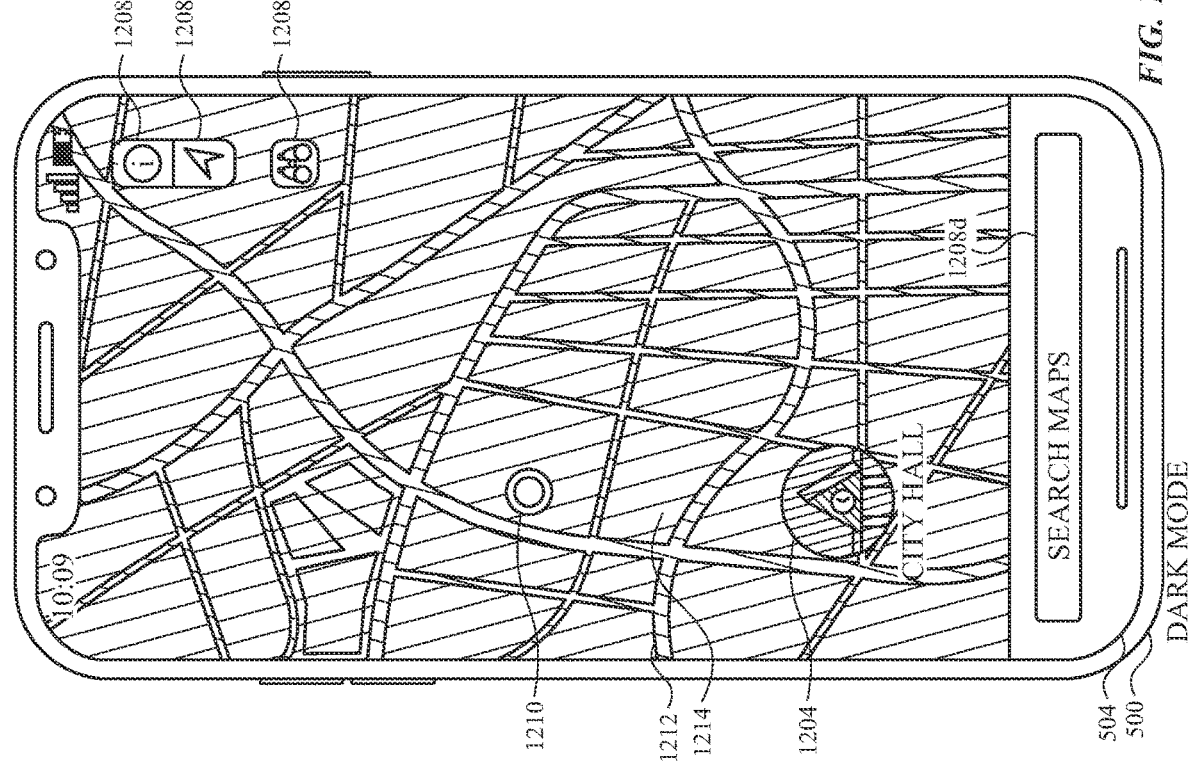

FIG. 12F illustrates an example of the electronic device 500 displaying the map at the same level of zoom as the level of zoom in FIG. 12E in the light mode of the electronic device 500. Like in FIG. 12E, in FIG. 12F, the electronic device 500 displays the icon 1204 representing the physical object at a location on the map corresponding to the location of the physical object in real life and an indication 1210 of the current location of the electronic device 500 at a location on the map corresponding to the current location of the electronic device 500. FIG. 12F illustrates an example of the electronic device 500 displaying the map in the light mode of the electronic device 500, including light mode colors, shading, styling, etc. for the map. For example, the indications 1212 of roads and the indications of blocks 1214 between roads in FIG. 12F are displayed with lighter colors than the colors used to display the indications 1212 of roads and indications of blocks 1214 in the dark mode, such as in FIG. 12E, for example. In some embodiments, while displaying the map illustrated in FIG. 12F in the light mode, the electronic device 500 displays the icon 1204 representing the physical object with the same coloring, shading, styling, etc. as those used when displaying the user interface in the light mode as illustrated in FIGS. 12A-12B.

In some embodiments, the electronic device 500 displays portions of the map in different colors to indicate physical regions with high density of activity, such as areas with a high density of traffic, foot traffic, points of interest, business activity, and the like. In some embodiments, the electronic device forgoes applying high-density styling to one or more objects or regions when displaying the map with the level of zoom illustrated in FIGS. 12E-12F. In some embodiments, when displaying the map at a level of zoom that is greater than the level of zoom in FIGS. 12E-12F, the electronic device 500 applies the high-density styling to one or more objects or regions with high density of activity as described above.

For example, in FIG. 12F, the electronic device 500 detects movement of contacts 1203e and 1203f away from each other corresponding to a request to zoom the map in. In some embodiments, in response to detecting the input illustrated in FIG. 12F, the electronic device 500 updates the map user interface as shown in FIG. 12G.

FIG. 12G illustrates an example of the electronic device 500 presenting the map user interface updated in response to the input illustrated in FIG. 12F. In some embodiments, the electronic device 500 displays the map with a higher level of zoom in FIG. 12G than the level of zoom illustrated in FIG. 12F. At the level of zoom illustrated in FIG. 12G, the electronic device 500 displays representations 1216 of buildings that correspond to physical buildings in the physical area represented by the map and displays representations 1214a of blocks with high densities of activity in a different color than representation 1214b of blocks without high densities of activity. In some embodiments, the electronic device 500 displays representations 1214a of blocks with high densities of activities with varying degrees of shading corresponding to the degrees of activity in each block. For example, blocks 1214a with more activity are shaded more than blocks 1214a with less activity (but still enough activity to be shaded). In some embodiments, rather than or in addition to coloring representations 1214a and 1214b of blocks differently based on whether or not the blocks have high densities of activity, the electronic device colors the representations 1216 of buildings based on whether or not the buildings have high densities of activity.

In some embodiments, the electronic device 500 reduces the difference in color between representations of areas with high densities of activity and representations of areas without high densities of activity when displaying the map at higher levels of zoom than the level of zoom in FIG. 12G. For example, in FIG. 12G, the electronic device 500 detects movement of contacts 1203g and 1203h away from each other corresponding to a request to zoom the map in. In some embodiments, in response to the input illustrated in FIG. 12G, the electronic device 500 updates the map as shown in FIG. 12H.

FIG. 12H illustrates the electronic device 500 presenting the maps user interface in response to the input illustrated in FIG. 12G. For example, the level of zoom in FIG. 12H is greater than the level of zoom in FIG. 12G. In some embodiments, while presenting the map user interface at the level of zoom in FIG. 12H, the electronic device 500 presents representations 1214a of blocks with high densities of activity in a different color from representations 1214b of blocks without high densities of activity. In some embodiments, the electronic device 500 displays representations 1214a of blocks with high densities of activities with varying degrees of shading corresponding to the degrees of activity in each block. For example, blocks 1214a with more activity are shaded more than blocks 1214a with less activity (but still enough activity to be shaded). In some embodiments, at the level of zoom illustrated in FIG. 12H, instead of shading entire blocks to indicate density of activity, the electronic device 500 shades individual buildings. In some embodiments, the difference between the shading of the representations 1214a of blocks with high densities of activity in FIG. 12H from the shading of the representations 1214a of blocks with high densities of activity in FIG. 12G can correspond to the electronic device 500 presenting representations 1214a and 1214b in FIG. 12H with colors with less of a difference between each other than the difference between colors of representations 1214a and 1214b in FIG. 12G.

Figure 13:
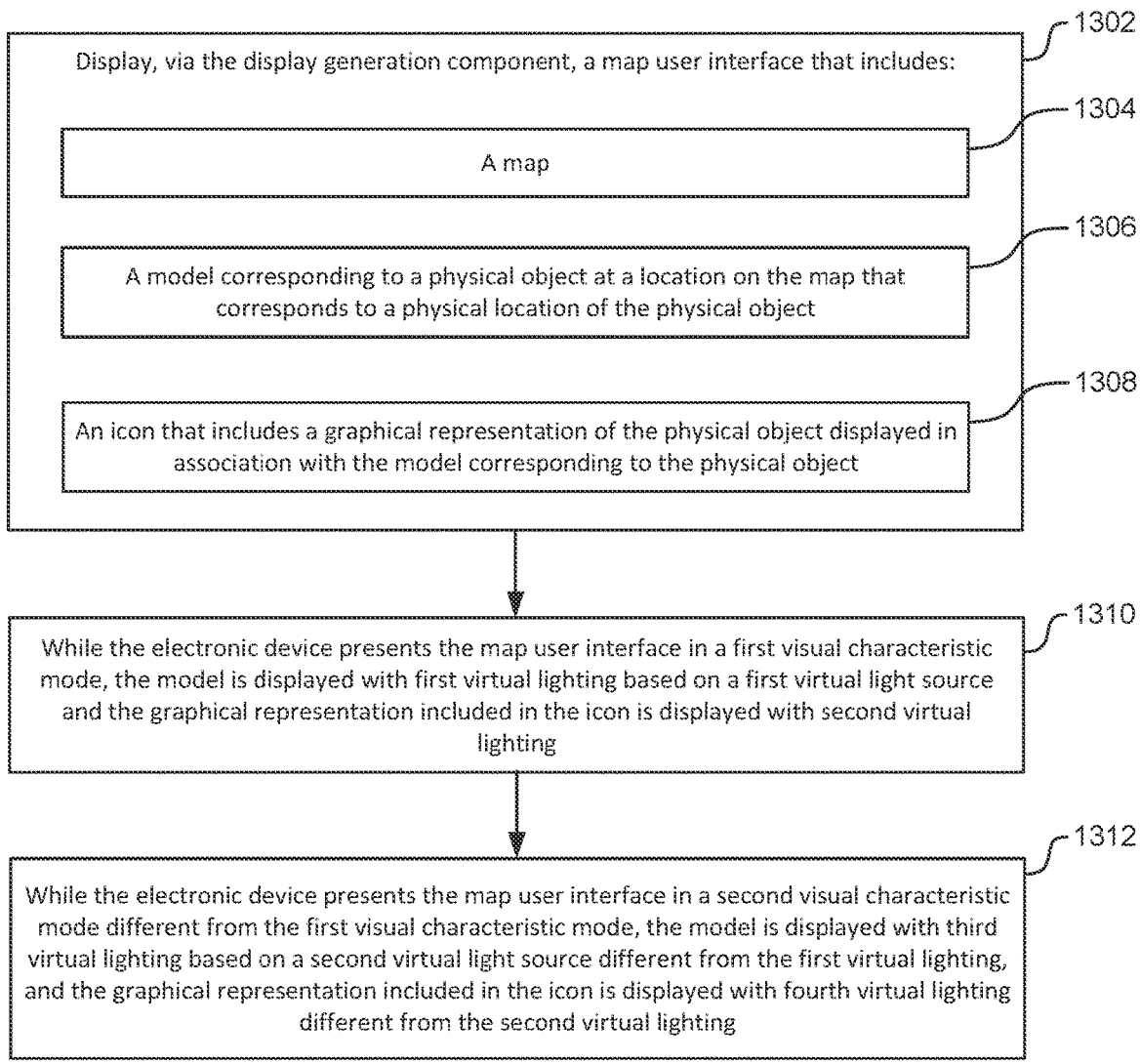
FIG. 13 is a flow diagram illustrating a method of presenting representations of (e.g., physical) objects in maps in accordance with some embodiments.

FIG. 13 is a flow diagram illustrating a method of presenting representations of physical objects in maps in accordance with some embodiments. The method 1300 is optionally performed at an electronic device such as device 100, device 300, and device 500, as described above with reference to FIGS. 1A-1B, 2-3, 4A-4B and 5A-5H. Some operations in method 1300 are, optionally combined and/or order of some operations is, optionally, changed.

As described below, the method 1300 provides ways in which an electronic device presents representations of physical objects in maps in accordance with some embodiments. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 12A, method 1300 is performed at an electronic device (e.g., 500) in communication with a display generation component. In some embodiments, the electronic device (e.g., 500) is a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication one or more input devices (e.g., a remote control). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, such as in FIG. 12A, the electronic device (e.g., 500) displays (1302), via the display generation component (e.g., 504), a map user interface that includes a map (1304). In some embodiments, the map includes representations of physical objects (e.g., buildings, landforms, landmarks, infrastructure, plants, etc.) in a physical region. In some embodiments, the locations, sizes, shapes, etc. of the representations of physical objects on the map correspond to the locations, sizes, shapes, etc. of the physical objects in the physical region.

In some embodiments, such as in FIG. 12A, the electronic device (e.g., 500) displays (1302), via the display generation component (e.g., 504), a map user interface that includes a model (e.g., 1202) corresponding to a physical object (e.g., a building, landform, landmark, infrastructure, plant, etc.) at a location on the map that corresponds to a physical location of the physical object (1306). In some embodiments, the model is a three-dimensional rendering of the physical object that includes visual details corresponding to the visual details of the physical object. For example, a model of a building includes exterior surfaces, windows, door(s), decorative or architectural features, lighting features, signage, etc. having color, style, relative size, shape, position, etc. corresponding to those of the building in real life. As another example, a model of a mountain includes plants, topography, water sources, etc. having color, style, relative size, shape, position, etc. corresponding to those of the mountain in real life. In some embodiments, the model is custom-created by a human (e.g., using a computer simulation or imaging program). In some embodiments, the model is algorithmically generated.

In some embodiments, such as in FIG. 12A, the electronic device (e.g., 500) displays (1302), via the display generation component (e.g., 504), a map user interface that includes an icon (e.g., 1204) that includes a graphical representation of the physical object displayed in association with the model (e.g., 1202) corresponding to the physical object (1308). In some embodiments, the graphical representation of the physical object is a graphical representation of a portion of the physical object and the model corresponding to the physical object is a representation of the entire physical object. In some embodiments, the icon is three-dimensional or includes a three-dimensional image of (e.g., a portion of) the physical object.

In some embodiments, such as in FIG. 12A, while the electronic device (e.g., 500) presents the map user interface in a first visual characteristic mode, the model (e.g., 1202) is displayed with first virtual lighting based on a first virtual light source and the graphical representation included in the icon (e.g., 1204) is displayed with second virtual lighting (e.g., 1310). In some embodiments, the first virtual light source has an associated virtual position relative to the model of the physical object and an associated color and/or tone. In some embodiments, the first virtual lighting and second virtual lighting are the same. In some embodiments, the first virtual lighting and the second virtual lighting are different. In some embodiments, the second virtual lighting is based on a respective virtual light source that has an associated virtual position relative to the graphical representation of the physical object of the icon and an associated color and/or tone. In some embodiments, the first virtual lighting includes one or more natural (e.g., the sun, the moon) or artificial (e.g., street lights, path lights, spotlights, interior lights visible through windows) light sources. For example, the first visual characteristic mode is a light mode or day mode in which the model is displayed with lighting from the sun at a first angle and the icon is displayed with lighting from the sun at a second angle (e.g., the same as or different from the first angle). In some embodiments, the electronic device displays one or more virtual shadows of the model and/or the graphical representation.

In some embodiments, such as in FIG. 12D, while the electronic device (e.g., 500) presents the map user interface in a second visual characteristic mode different from the first visual characteristic mode, the model (e.g., 1202) is displayed with third virtual lighting based on a second virtual light source different from the first virtual lighting, and the graphical representation included in the icon (e.g., 1204) is displayed with fourth virtual lighting different from the second virtual lighting (1312). In some embodiments, the second virtual light source has an associated virtual position relative to the model of the physical object and an associated color and/or tone. In some embodiments, the third virtual lighting and fourth virtual lighting are the same. In some embodiments, the third virtual lighting and the fourth virtual lighting are different. In some embodiments, the fourth virtual lighting is based on a respective virtual light source that has an associated virtual position relative to the graphical representation of the physical object of the icon and an associated color and/or tone. In some embodiments, the second virtual lighting includes one or more natural (e.g., the sun, the moon) or artificial (e.g., street lights, path lights, spotlights, interior lights visible through windows) light sources. For example, the second visual characteristic mode is a night mode or dark mode in which the model is displayed with lighting from the moon at a first angle and one or more artificial light sources inside of or outside of the model and the icon is displayed with lighting from the moon at a second angle (e.g., the same as or different from the first angle) and one or more artificial light sources inside of or outside of the graphical representation (e.g., the same as or different from the artificial light sources of the model). In some embodiments, the electronic device displays one or more virtual shadows of the model and/or the graphical representation. The above-described manner of using the first and second virtual lighting in the first visual characteristic mode and using the third and fourth virtual lighting in the second visual characteristic mode provides a realistic representation of the physical object that is easy for the user to interpret and understand, which additionally reduces power usage and improves battery life of the electronic device by enabling the user to use the electronic device more quickly and efficiently.

In some embodiments, such as in FIG. 12B, the model (e.g., 1202) corresponding to the physical object is displayed from a first perspective relative to a reference (e.g., gravity, cardinal directions, etc.), and the graphical representation of the physical object displayed in the icon (e.g., 1204) is displayed from a second perspective, different from the first perspective, relative to the reference. In some embodiments, the model is shown from a perspective corresponding to a perspective from which the electronic device displays the map and the graphical representation of the physical object displayed in the icon is displayed from a predetermined perspective independent form the perspective from which the electronic device displays the map. In some embodiments, the portion of the physical object corresponding to the graphical representation of the physical object displayed in the icon is not represented by a visible portion of the model of the object displayed from the first perspective. For example, the graphical representation displayed in the icon is displayed from a north-facing perspective and the model is displayed from a south-facing perspective. The above-described manner of displaying the model and the graphical representation of the physical object displayed in the icon provides an efficient way of displaying the model with the same perspective as the rest of the map and displaying a consistent icon associated with the physical object, which additionally reduces power usage and improves battery life of the electronic device by enabling the user to use the electronic device more quickly and efficiently.

In some embodiments, such as in FIG. 12B, a portion of the physical object displayed by the model (e.g., 1202) is different from a portion of the physical object displayed by the graphical representation of the physical object in the icon (e.g., 1204). In some embodiments, the portion of the physical object displayed by the model is a larger portion of the physical object than the portion of the physical object displayed by the graphical representation of the physical object in the icon. For example, the model corresponds to the entire physical object and the graphical representation of the physical object displayed in the icon corresponds to a subset of the physical object. In some embodiments, the portion of the physical object displayed by the model is a smaller portion of the physical object than the portion of the physical object displayed by the graphical representation of the physical object in the icon. For example, the map is displayed at a level of zoom that is zoomed in on a portion of the model that corresponds to a smaller portion of the physical object than the portion of the physical object corresponding to the graphical representation of the physical object displayed in the icon. The above-described manner of displaying different portions of the physical object in the model and the icon provides an efficient way of presenting a portion of the physical object in the icon at a level of detail that is visible to the user irrespective of a level of zoom with which the model is displayed, which additionally reduces power usage and improves battery life of the electronic device by enabling the user to use the electronic device more quickly and efficiently.

In some embodiments, such as in FIG. 12A, while displaying the model (e.g., 1202) corresponding to the physical object from a first perspective (e.g., the perspective from which the rest of the map is displayed) relative to a reference (e.g., gravity, the cardinal directions) and the graphical representation of the physical object in the icon (e.g., 1204) from a second perspective (e.g., a respective predetermined perspective independent from a perspective from which the map is displayed), different from the first perspective, relative to the reference, the electronic device (e.g., 500) receives, via the one or more input devices, an input (e.g., via contacts 1203*a* and 1203*b*) corresponding to a request to adjust a perspective from which the map is displayed in the map user interface. In some embodiments, the input corresponds to a request to update an angle of the perspective relative to gravity and/or relative to the cardinal directions. For example, the input corresponds to a request to increase or decrease the angle of the perspective relative to gravity to make the perspective more similar to or more different from a bird's eye view. As another example, the input corresponds to a request to change the angle of the perspective relative to the cardinal directions, such as updating the view from being north-facing to being west-facing. The input is optionally a panning, zooming and/or tilting input.

In some embodiments, such as in FIG. 12B, in response to receiving the input, the electronic device (e.g., 500) displays, in the map user interface, the map from a respective perspective, different from the first perspective, relative to the reference (e.g., in accordance with the input). In some embodiments, the electronic device presents objects in the map other than the model of the physical object and the model of the physical object from the respective perspective. In some embodiments, the position and orientation of the model of the physical object relative to the other objects in the map from the first perspective are the same as those from the respective perspective.

In some embodiments, such as in FIG. 12B, in response to receiving the input, the electronic device (e.g., 500) displays the model (e.g., 1202) corresponding to the physical object from the respective perspective relative to the reference (e.g., in accordance with the input).

In some embodiments, such as in FIG. 12B, in response to receiving the input, the electronic device (e.g., 500) displays the graphical representation of the physical object in the icon (e.g., 1204) from the second perspective relative to the reference. In some embodiments, the electronic device displays the graphical representation of the physical object displayed in the icon from the second perspective irrespective of the respective perspective from which the map and the model are displayed. The above-described manner of maintaining the second perspective of the graphical representation of the physical object displayed in the icon when updating the respective perspective of the map and model provides an efficient way of maintaining display of a recognizable portion of the physical object in the icon irrespective of the perspective from which the map and model are displayed, which additionally reduces power usage and improves battery life of the electronic device by enabling the user to use the electronic device more quickly and efficiently.

In some embodiments, such as in FIGS. 12B and 12D, a difference between the first and third virtual lightings (e.g., the lightings with which the model is displayed) is different from a difference between the second and fourth virtual lightings (e.g., the lightings with which the icon is displayed). In some embodiments, the difference in color, tone, angle, brightness etc. between the first and third virtual lightings is different from those between the second and fourth virtual lightings. For example, displaying the model with the first virtual lighting corresponds to displaying the model with virtual lighting corresponding to sunlight at a first time of day and displaying the icon with the second virtual lighting corresponds to displaying the model with virtual lighting corresponding to sunlight at a second time of day, and displaying the model with the third virtual lighting corresponds to displaying the model with virtual lighting corresponding to moonlight at night and one or more artificial light sources inside the physical object and displaying the icon with the fourth virtual lighting corresponds to displaying the icon with virtual lighting corresponding to one or more artificial light sources outside of the physical object. The above-described manner of changing the virtual lighting of the model in a differently from how the electronic device changes the virtual lighting of the icon provides an efficient way of preserving the level of detail and visibility of the icon in both visual characteristic modes, which additionally reduces power usage and improves battery life of the electronic device by enabling the user to use the electronic device more quickly and efficiently.

In some embodiments, such as in FIG. 12B, the model (e.g., 1202) corresponding to the physical object is a three-dimensional representation of the physical object (e.g., the model includes shadows and contouring to appear three-dimensional), and the graphical representation of the physical object in the icon (e.g., 1204) is a three-dimensional representation of the physical object (e.g., the graphical representation includes shadows and contouring to appear three-dimensional). In some embodiments, the three-dimensional image included in the graphical representation of the physical object displayed in the icon is different from the three-dimensional image corresponding to the model. In some embodiments, the model and the graphical representation of the physical object displayed in the icon are different from each other and it is not possible to display the map from a perspective (e.g., zoom and angle) that causes the model and the graphical representation of the physical object displayed in the icon to be the same. The above-described manner of displaying three-dimensional representations as the model and the graphical representation of the physical object displayed in the icon provides an efficient way of presenting three-dimensional details corresponding to the physical object in the map, which additionally reduces power usage and improves battery life of the electronic device by enabling the user to use the electronic device more quickly and efficiently.

In some embodiments, such as in FIG. 12D, displaying the model (e.g., 1202) with the third virtual lighting includes displaying the model (e.g., 1202) with simulated artificial light (e.g., artificial light inside the object and/or outside the object) and simulated natural light (e.g., the moon). In some embodiments, displaying the model with the first virtual lighting includes displaying the model with simulated natural light (e.g., the sun), optionally without displaying the model with simulated artificial light. In some embodiments, displaying the icon with the fourth lighting includes displaying the icon with simulated artificial light (e.g., inside the object and/or outside the object) and simulated natural light (e.g., the moon). In some embodiments, displaying the icon with the second lighting includes displaying the icon with simulated natural light (e.g., the sun). For example, displaying a representation of a building with simulated artificial light inside the building includes displaying the representation of the building with light coming through the windows the building. The above-described manner of displaying the model with the third virtual lighting with simulate artificial light and simulated natural light provides an efficient way of providing lighting that is realistic and makes the model visible, which additionally reduces power usage and improves battery life of the electronic device by enabling the user to use the electronic device more quickly and efficiently.

In some embodiments, such as in FIG. 12B, displaying the model (e.g., 1202) with the first virtual lighting includes displaying the model (e.g., 1202) with simulated natural light (e.g., the sun) without simulated artificial light. In some embodiments, displaying the icon with the second virtual lighting includes displaying the icon with simulated natural light without simulated artificial light (e.g., simulated electric or other manmade lights, such as lights inside buildings, street lights, security lights, other outdoor or indoor lighting). The above-described manner of displaying the model with the first virtual lighting with simulated natural light without simulated artificial light provides an efficient way of making the model look like the physical object, which additionally reduces power usage and improves battery life of the electronic device by enabling the user to use the electronic device more quickly and efficiently.

In some embodiments, such as in FIG. 12G, the map includes a representation (e.g., 1216) of a building (e.g., at a location on the map corresponding to the location of the building). In some embodiments, such as in FIG. 12G, while displaying the map in the map user interface, in accordance with a determination that one or more first criteria are satisfied (e.g., based on a level of zoom with which the map is displayed), the electronic device (e.g., 500) displays the representation (e.g., 1216) of the building with a visual characteristic having a value based on commercial activity associated with the building. In some embodiments, while the one or more first criteria are satisfied, representations of buildings with density of traffic above a threshold, foot traffic above a threshold, points of interest satisfying one or more criteria, public spaces satisfying one or more criteria, or businesses satisfying one or more criteria are displayed with a first visual characteristic (e.g., color, shading, translucency, highlighting, style, etc.) and representations of buildings that do not have density of traffic above a threshold, foot traffic above a threshold, points of interest satisfying one or more criteria, public spaces satisfying one or more criteria, or businesses satisfying one or more criteria are displayed with a second visual characteristic (e.g., color, shading, translucency, highlighting, style) different from the first visual characteristic. In some embodiments, representations of (e.g., city) blocks with density of traffic above a threshold, foot traffic above a threshold, points of interest satisfying one or more criteria, public spaces satisfying one or more criteria, or businesses satisfying one or more criteria are displayed with a first visual characteristic (e.g., color, shading, translucency, highlighting, style, etc.) and representations of (e.g., city) blocks without density of traffic above a threshold, foot traffic above a threshold, points of interest satisfying one or more criteria, public spaces satisfying one or more criteria, or businesses satisfying one or more criteria are displayed with a second visual characteristic (e.g., color, shading, translucency, highlighting, style) different from the first visual characteristic. The above-described manner of displaying the representation of the building with the visual characteristic having a value based on commercial activity associated with the building provides an efficient way of identifying and locating buildings that are more likely to be of interest to the user, which additionally reduces power usage and improves battery life of the electronic device by enabling the user to use the electronic device more quickly and efficiently.

In some embodiments, the one or more first criteria include a criterion that is satisfied when a zoom level of the map is greater than a threshold zoom level, such as in FIG. 12G, and not satisfied when the zoom level of the map is less than the threshold zoom level, such as in FIG. 12F. In some embodiments, the threshold zoom level is a level of zoom at which representations of buildings are displayed. In some embodiments, at levels of zoom that are less than the threshold level of zoom, the map includes representations of (e.g., a subset of) roads in a respective region without displaying representations of buildings.

In some embodiments, such as in FIG. 12F, while displaying the map in the map user interface, in accordance with a determination that the one or more first criteria are not satisfied, the electronic device (e.g., 500) displays the representation (e.g., 1214) of the building with the visual characteristic having a value not based on the commercial activity associated with the building. In some embodiments, in accordance with a determination that the one or more first criteria are not satisfied, the electronic device forgoes display of the representation of the building and displays representations of geographical areas (e.g., including a geographical area including the building) with a visual characteristic irrespective of the commercial activity of associated with one or more buildings in the geographical areas. In some embodiments, in accordance with the determination that the one or more first criteria are not satisfied, representations of buildings are displayed with the same visual characteristic irrespective of commercial activity associated with the buildings. In some embodiments, in accordance with the determination that the one or more first criteria are not satisfied, representations of (e.g., city) blocks are displayed with the same visual characteristic irrespective of commercial activity associated with the (e.g., city) blocks. The above-described manner of displaying the representation of the building with the visual characteristic having the value not based on the commercial activity associated with the building in accordance with the determination that the one or more criteria are not satisfied provides an efficient way of forgoing the use of visual characteristics corresponding to commercial activity at levels of zoom at which differences in visual characteristics from building to building (or block to block) are not visible, which additionally reduces power usage and improves battery life of the electronic device by enabling the user to use the electronic device more quickly and efficiently.

In some embodiments, such as in FIG. 12G, displaying the representation (e.g., 1216) of the building with the visual characteristic having the value based on the commercial activity associated with the building includes, in accordance with a determination that a zoom level of the map is greater than a threshold zoom level, displaying the representation (e.g., 1216) of the building with the visual characteristic having a first respective value based on the commercial activity associated with the building. In some embodiments, buildings with relatively high densities of commercial activity are displayed with a first visual characteristic (e.g., color, pattern, translucency, style, highlighting, etc.) and buildings with relatively low densities of commercial activity are displayed with a second visual characteristic (e.g., color, pattern, translucency, style, highlighting, etc.) different from the first visual characteristic. In some embodiments, (e.g., city) blocks with relatively high densities of commercial activity are displayed with a first visual characteristic (e.g., color, pattern, translucency, style, highlighting, etc.) and (e.g., city) blocks with relatively low densities of commercial activity are displayed with a second visual characteristic (e.g., color, pattern, translucency, style, highlighting, etc.) different from the first visual characteristic.

In some embodiments, such as in FIG. 12H, displaying the representation (e.g., 1216) of the building with the visual characteristic having the value based on the commercial activity associated with the building includes, in accordance with a determination that the zoom level of the map is less than the threshold zoom level, displaying the representation (e.g., 1216) of the building with the visual characteristic having a second respective value, different from the first respective value, based on the commercial activity associated with the building. In some embodiments, the higher the level of zoom of the map, the greater the difference in visual characteristics between representations of buildings with relatively high levels of commercial activity and representations of buildings with relatively low levels of commercial activity. In some embodiments, the higher the level of zoom of the map, the greater the difference in visual characteristics between representations of (e.g., city) blocks with relatively high levels of commercial activity and representations of (e.g., city) blocks with relatively low levels of commercial activity. For example, the electronic device displays representations of buildings (or e.g., city) blocks) with relatively low levels of commercial activity in a first color irrespective of the level of zoom, displays representations of buildings (or (e.g., city) blocks) with relatively high levels of commercial activity in a second color at a respective level of zoom, and displays representations of buildings (or (e.g., city) blocks) with relatively high levels of commercial activity in a third color at a level of zoom that is greater than the respective level of zoom, with the third color being closer to the first color than how close the second color is to the first color. The above-described manner of modifying the visual characteristic based on commercial activity depending on the level of zoom with which the map is displayed provides an efficient way of preserving visibility of commercial activity and other map details at a variety of zoom levels, which additionally reduces power usage and improves battery life of the electronic device by enabling the user to use the electronic device more quickly and efficiently.

In some embodiments, some objects are associated with icons without being associated with models. In some embodiments, the electronic device displays icons associated with these objects at locations on the map corresponding to the physical objects without displaying models corresponding to the objects irrespective of a level of zoom of the map. For example, the electronic device concurrently displays, at a respective level of zoom, a model and icon corresponding to a first object and an icon corresponding to a second object without displaying a model corresponding to the second object.

In some embodiments, some objects are associated with models without being associated with icons. In some embodiments, the electronic device displays models associated with these objects at locations on the map corresponding to the physical objects without displaying icons corresponding to the objects irrespective of a level of zoom of the map. For example, the electronic device concurrently displays, at a respective level of zoom, a model and icon corresponding to a first object and model of a second object without displaying an icon corresponding to the second object.

In some embodiments, while the electronic device (e.g., 500) is presenting the map user interface in the first visual characteristic mode (e.g., day mode, light mode) and displaying the model (e.g., 1202) with the first virtual lighting and the graphical representation included in the icon (e.g., 1204) with the second virtual lighting, such as in FIG. 12B, the electronic device (e.g., 500) detects an event corresponding to transitioning from presenting the map user interface in the first visual characteristic mode to presenting the map user interface in the second visual characteristic mode (e.g., night mode, dark mode). In some embodiments, the event corresponding to transitioning from presenting the map user interface in the first visual characteristic mode to presenting the map user interface in the second visual characteristic mode is the user changing the visual characteristic mode of the electronic device. In some embodiments, the event corresponding to transitioning from presenting the map user interface in the first visual characteristic mode to presenting the map user interface in the second visual characteristic mode is a change in the time of day from a time of day associated with the first visual characteristic mode to a time of day associated with the second visual characteristic mode.

In some embodiments, in response to detecting the event, the electronic device (e.g., 500) displays an animation of the model (e.g., 1202) transitioning from being displayed with the first virtual lighting to the model being displayed with the third virtual lighting, and the graphical representation included in the icon (e.g., 1204) transitioning from being displayed with the second virtual lighting to the graphical representation included in the icon (e.g., 1204) being displayed with the fourth virtual lighting, such as in FIG. 12C. In some embodiments, in response to detecting an event corresponding to transitioning from presenting the map user interface in the second visual characteristic mode to presenting the map user interface in the first visual characteristic mode, the electronic device displays an animated transition of the third virtual lighting transitioning to the first virtual lighting and the fourth virtual lighting transitioning to the second virtual lighting. In some embodiments, the animation includes artificial lights gradually turning on, sunlight gradually fading, the sun moving, etc. The above-described manner of displaying an animated transition between the first and second visual characteristic modes provides an efficient way of updating the visual characteristics of the map while the map is being displayed, which additionally reduces power usage and improves battery life of the electronic device by enabling the user to use the electronic device more quickly and efficiently.

In some embodiments, such as in FIG. 12F, while presenting the map user interface in the first visual characteristic mode, including displaying the icon (e.g., 1204) that includes the graphical representation of the physical object at a respective location on the map corresponding to the physical object without displaying the model corresponding to the physical object on the map, wherein the graphical representation included in the icon (e.g., 1204) is displayed with the second virtual lighting, the electronic device (e.g., 500) detects an event corresponding to transitioning from presenting the map user interface in the first visual characteristic mode to presenting the map user interface in the second visual characteristic mode. In some embodiments, the event corresponding to transitioning from presenting the map user interface in the first visual characteristic mode to presenting the map user interface in the second visual characteristic mode is the user changing the visual characteristic mode of the electronic device. In some embodiments, the event corresponding to transitioning from presenting the map user interface in the first visual characteristic mode to presenting the map user interface in the second visual characteristic mode is a change in the time of day from a time of day associated with the first visual characteristic mode to a time of day associated with the second visual characteristic mode. In some embodiments, the electronic device displays the icon without displaying the model when the level of zoom of the map is less than a predetermined threshold (e.g., a level of zoom at which the electronic device does not display models of physical objects).

In some embodiments, in response to detecting the event, the electronic device (e.g., 500) displays the icon (e.g., 1204) that includes the graphical representation of the physical object at the respective location on the map without displaying the model corresponding to the physical object on the map, wherein the graphical representation included in the icon (e.g., 1204) is displayed with the fourth virtual lighting. In some embodiments, the electronic device displays an animated transition between displaying the icon with the second lighting to displaying the icon with the fourth lighting in response to detecting the event. In some embodiments, the electronic device displays the icon at the same location in the user interface irrespective of whether the electronic device is in the first visual characteristic mode or in the second visual characteristic mode. In some embodiments, the electronic device forgoes display of the model corresponding to the physical object and maintains display of the icon when the level of zoom of the map is too far for the model to be visible. The above-described manner of transitioning between displaying the icon with the second virtual lighting to displaying the icon with the fourth virtual lighting without displaying the model corresponding to the object provides an efficient way of presenting the icon with a visual characteristic that matches the rest of the map, which additionally reduces power usage and improves battery life of the electronic device by enabling the user to use the electronic device more quickly and efficiently.

In some embodiments, such as in FIG. 12B, the first virtual lighting (e.g., of the model) is different from the second virtual lighting (e.g., of the icon). For example, displaying the model with the first virtual lighting corresponds to displaying the model with virtual lighting corresponding to sunlight at a first time of day and displaying the icon with the second virtual lighting corresponds to displaying the model with virtual lighting corresponding to sunlight at a second time of day.

In some embodiments, such as in FIG. 12B, the third virtual lighting (e.g., of the model) is different from the fourth virtual lighting (e.g., of the icon). For example, displaying the model with the third virtual lighting includes displaying the model with virtual lighting corresponding to moonlight at night and one or more artificial light sources inside the physical object and displaying the icon with the fourth virtual lighting corresponds to displaying the icon with virtual lighting corresponding to one or more artificial light sources outside of the physical object. The above-described manner of displaying the model and the icon with different virtual lighting provides an efficient way of making the details of the model and icon visible, which additionally reduces power usage and improves battery life of the electronic device by enabling the user to use the electronic device more quickly and efficiently.

In some embodiments, the electronic device simulates lighting of the map based on the relative position of the earth to the sun at the current time and current location of the electronic device or the location shown on the map. For example, in the morning, the electronic device presents virtual shadows of representations of physical objects at angles based on the sun being positioned in the east. As another example, in the afternoon at the location of the electronic device or the location shown on the map, the electronic device presents virtual shadows of representations of physical objects at angles based on the sun being positioned in the west. In some embodiments, the first virtual light source and/or second virtual light source includes the sun and the position of the first virtual light source and/or second virtual light source is based on the current position of the sun relative to the earth at the current time and current location of the electronic device or the location shown on the map.

In some embodiments, the electronic device simulates one or more light sources that are positioned relative to the virtual camera that defines the perspective and field of view with which the maps user interface is presented. In some embodiments, in response to an input to change the perspective with which the maps user interface is presented, the electronic device updates the perspective with which the maps user interface is presented and updates the position of the simulated light source in accordance with the input.

In some embodiments, the electronic device transitions between the first visual characteristic mode and the second visual characteristic mode based on the angle of the sun relative to the earth at the current time and the current location of the electronic device or the location shown on the map. For example, while the sun is above the horizon, the electronic device presents the map in a light or daytime mode and while the sun is below the horizon, the electronic device presents the map in a dark or nighttime mode.

In some embodiments, the electronic device presents the maps user interface in one or more respective visual characteristic modes that are interpolated between the first visual characteristic mode and the second visual characteristic mode based on the angle of the sun relative to the earth at the current location of the electronic device or the location shown on the map during the current time. For example, the first visual characteristic mode is associated with the sun having a first respective position relative to the earth and the second visual characteristic mode is associated with the sun having a second respective position relative to the earth.

In some embodiments, the model of the physical object has a pattern, texture or style that is based on the texture and color of the physical object. For example, the electronic device constructs a vector or array based on the texture of the physical object and multiplies the vector or array by the color of the physical object to create the texture and color of the model. In some embodiments, the texture of the object includes effects of ambient (e.g., time of day) lighting and corresponds to a precomputation of the lighting value for each pixel for each possible direction of lighting (e.g., time of day light source lighting, such as the sun or moon).

It should be understood that the particular order in which the operations in FIG. 13 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, and/or 1500) are also applicable in an analogous manner to method 1300 described above with respect to FIG. 13. For example, the ways of presenting representations of physical objects in maps described above with reference to method 1300 optionally have one or more of the characteristics of the ways of presenting navigation routes from various perspectives, modifying display of representations of physical objects in the vicinity of a navigation route while presenting navigation directions, modifying display of portions of a navigation route that are occluded by representations of (e.g., physical) objects in a map, and/or presenting representations of physical objects in maps in response to requests to search for physical objects described herein with reference to other methods described herein (e.g., methods 700, 900, 1100, and/or 1500). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 13 are, optionally, implemented by components depicted in FIGS. 1A-1B. For example, displaying operation 1302 is, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

User Interfaces for Searching for Physical Objects on Maps

Users interact with electronic devices in many different manners, including using electronic devices to search for physical objects on maps. In some embodiments, in response to detecting an input corresponding to a request to search for a physical object, the electronic device presents a representation of the physical object on a map with a perspective that optionally corresponds to the representation of the physical object. The embodiments described below provide ways in which an electronic device presents representations of physical objects from different perspectives in response to requests to search for the physical objects. Providing efficient manners of presenting representations of physical objects on maps in response to requests to search for physical objects enhances interactions with a device, thus reducing the amount of time a user needs to interact with the device while viewing a map, which increases battery life for battery-powered devices. It is understood that people use devices. When a person uses a device, that person is optionally referred to as a user of the device.

Figure 14B:
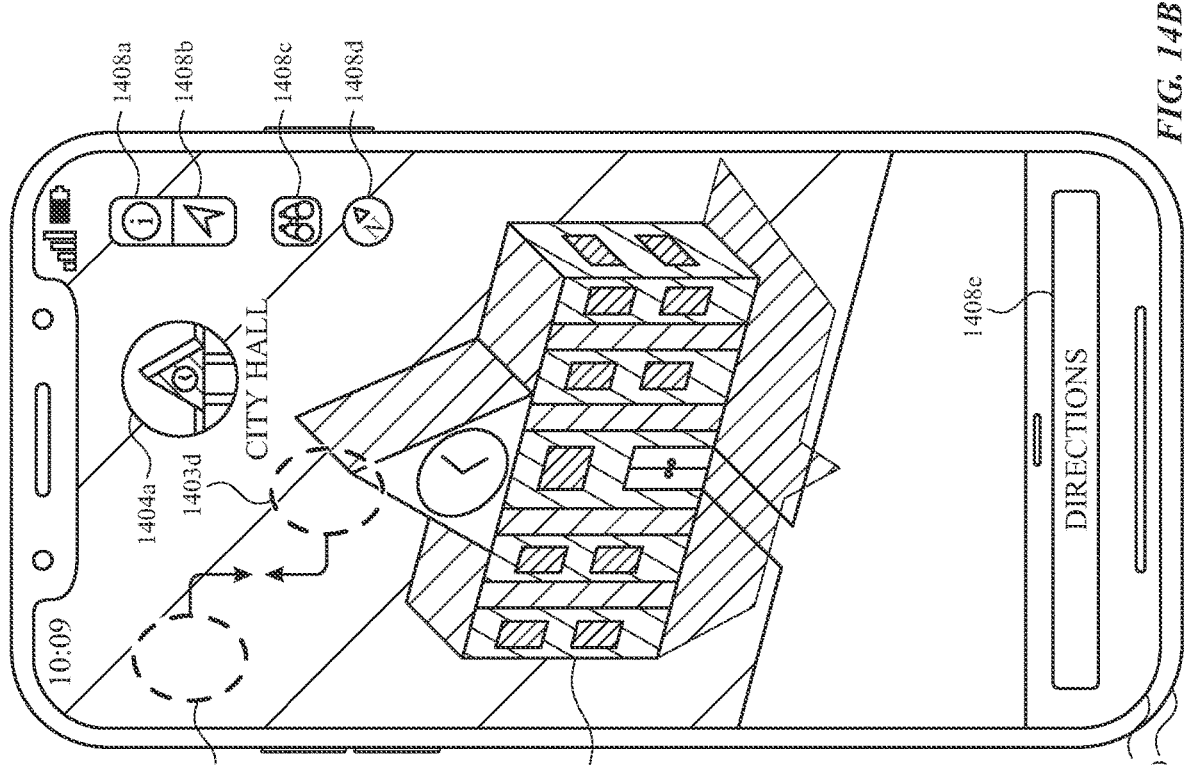
FIGS. 14A-14Q illustrate exemplary ways in which an electronic device presents representations of (e.g., physical)
Figure 14A:
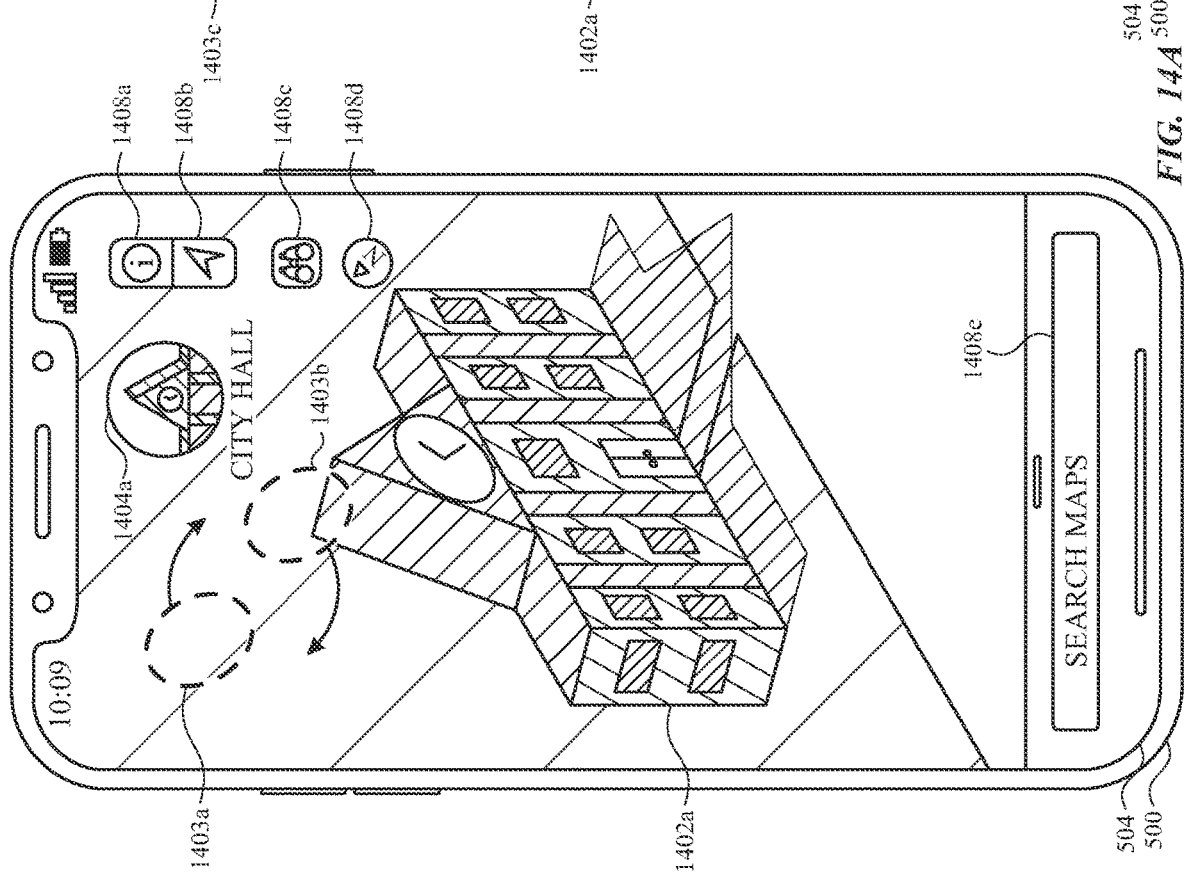
Figure 14Q:
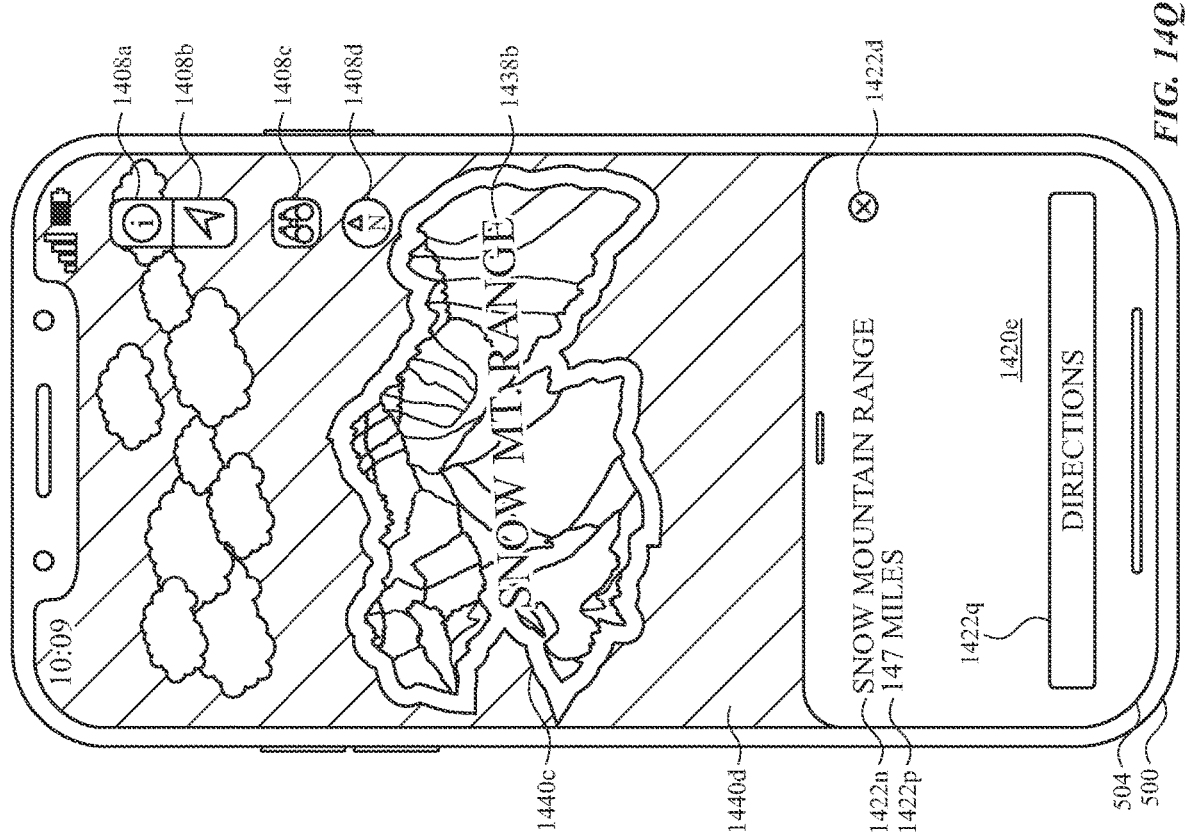

FIGS. 14A-14Q illustrate exemplary ways in which an electronic device presents representations of physical objects in maps in response to requests to search for physical objects in accordance with some embodiments. The embodiments in these figures are used to illustrate the processes described below, including the processes described with reference to FIG. 15. Although FIGS. 14A-14Q illustrate various examples of ways an electronic device is able to perform the processes described below with reference to FIG. 15, it should be understood that these examples are not meant to be limiting, and the electronic device is able to perform one or more processes described below with reference to FIG. 15 in ways not expressly described with reference to FIGS. 14A-14Q.

FIG. 14A illustrates an example of the electronic device 500 presenting a representation 1402a of a physical object (e.g., a building) in a map user interface in accordance with some embodiments. In some embodiments, the physical object is represented by icon 1404a. The electronic device optionally displays the representation 1402a and icon 1404a with lighting effects according to one or more steps of method 1300.

In some embodiments, the maps user interface further includes an option 1408a to view one or more settings for display of the map user interface, an option 1408b to show a portion of the map including an indication of a current location of the electronic device 500, an option 1408c to view one or more images taken from a location shown on the map (e.g., from the perspective of a person standing on the street at the location shown on the map), an indication 1408d of the orientation of the cardinal directions relative to the perspective of the map, and a search box 1408e to which an input to search the map for a physical object may be directed. In some embodiments, the electronic device 500 concurrently displays the representation 1402a and icon 1404a with one or more representations and/or icons corresponding to physical objects in the vicinity of the physical object that corresponds to representation 1402a and icon 1404a. For example, in FIG. 14A, the indication 1408d of the orientation of the map indicates approximately a 30 degree angle relative to North.

In some embodiments, while displaying the maps user interface from the perspective shown in FIG. 14A indicated by indication 1408d, the electronic device 500 detects an input corresponding to a request to update the perspective with which the map is displayed. For example, the electronic device 500 detects circular movement of contacts 1403a and 1403b, which corresponds to a request to rotate the perspective of the map. In some embodiments, in response to the input illustrated in FIG. 14A, the electronic device 500 updates the perspective of the map to the perspective of the map illustrated in FIG. 14B.

FIG. 14B illustrates an example of the electronic device 500 displaying the updated maps user interface in response to the input illustrated in FIG. 14A. In some embodiments, as shown in FIG. 14B, the electronic device 500 updates the perspective from which the representation 1402a of the physical object is displayed and updates the indication 1408d of the perspective of the map relative to the cardinal directions in accordance with the input illustrated in FIG. 14A. For example, the indication 1408d of the orientation of the map indicates approximately a 330 degree angle relative to North. In some embodiments, the perspective of the icon 1404a is not updated in response to the input illustrated in FIG. 14A, as described above with reference to FIGS. 12A-13. Thus, in some embodiments, the electronic device 500 is able to present the representation 1402a of the physical object from a variety of perspectives in response to one or more user inputs for adjusting the perspective with which the map is displayed.

In some embodiments, as shown in FIG. 14B, the electronic device 500 detects movement of contacts 1403c and 1403d towards each other corresponding to a request to zoom the map out and rotate the perspective with which the map is displayed. In some embodiments, the electronic device 500 updates the map as shown in FIG. 14C in response to the input illustrated in FIG. 14B.

FIG. 14C illustrates an example of the electronic device 500 displaying the maps user interface updated in accordance with the input illustrated in FIG. 14B. In some embodiments, as shown in FIG. 14B, the electronic device 500 displays a bird's eye view of the map with an orientation relative to the cardinal directions indicated by indication 1408d. For example, indication 1408d indicates that the angle with which the map is displayed has a 0 degree angle relative to North. In some embodiments, at the level of zoom of the map in FIG. 14C, the electronic device 500 displays the icon 1404a representing the physical object but does not display the representation 1402a of the physical object, as described above with reference to FIGS. 12A-13. In some embodiments, the icon 1402a is displayed at a location on the map corresponding to the location of the object in real life. In some embodiments, the map further includes an indication 1410 of the current location of the electronic device 500. In some embodiments, while displaying the map from the perspective illustrated in FIG. 14C, the electronic device 500 detects selection (e.g., via input 1403e) of the search box 1408e. In some embodiments, in response to detecting the input illustrated in FIG. 14C, the electronic device 500 configures the search box 1408e to receive further input defining a search term to be searched on the map. In some embodiments, the electronic device 500 detects one or more additional inputs defining the search term, such as a voice input or text input provided by a soft keyboard displayed via display generation component 504 (e.g., a touch screen) or another input device in communication with the electronic device 500.

FIG. 14D illustrates an example of the electronic device 500 presenting a search user interface in response to the sequence of inputs described above, including the input illustrated in FIG. 14C. As shown in FIG. 14D, the electronic device 500 updates the search box 1408e to include an indication of the search term provided by the user (e.g., "CITY HALL"). In some embodiments, the search user interface further includes an option 1412a to cancel the process to search for the object and a soft keyboard 1412b with which the search input can be provided by the user.

In some embodiments, while the electronic device 500 detects the input(s) providing the search term, the electronic device 500 presents a plurality of indications 1414a-1414c of search results based on the portion of the search term that has already been provided to the electronic device. In some embodiments, the indication 1414a of the first search result (e.g., the search result that the electronic device 500 determines to be the most likely result corresponding to the search term) includes an option 1416a to view an image of the object corresponding to indication 1414a from the perspective of someone standing on the street near the object and an option 1416b to present navigation directions from the current location of the electronic device 500 to the location of the object. In some embodiments, the second indication 1414b corresponds to performing a search based on the search term as it has already been provided to the search box 1408e. For example, in response to detecting selection of indication 1414b, the electronic device 500 displays a plurality of indications of objects corresponding to the search term provided to the search box 1408e. In some embodiments, the third indication 1414c corresponds to an object different from the object corresponding to the first indication 1414a. In some embodiments, in response to detecting selection of indication 1414a (e.g., in a location of indication 1414a other than options 1416a or 1416b) or indication 1414c, the electronic device 500 presents a representation of the respective object on the map.

In some embodiments, as shown in FIG. 14D, the electronic device 500 detects selection of an option 1418 to present an indication of the object that most likely corresponds to the search term provided to search box 1408e. In some embodiments, the result of the input illustrated in FIG. 14D is the same result that would occur in response to detecting selection of representation 1414a. In some embodiments, in response to detecting selection of option 1418, the electronic device 500 presents a representation of the search result. In some embodiments, if there is a three-dimensional representation associated with the search result available in the map, the electronic device 500 presents the three-dimensional representation from a perspective associated with the three-dimensional representation. In some embodiments, if there is not a three-dimensional representation associated with the search result available in the map, the electronic device 500 presents an indication of the search result on a map displayed from a default perspective, such as a bird's eye view with a predetermined orientation with respect to the cardinal directions (e.g., such that north is up). In some embodiments, there is a three-dimensional representation associated with the search result corresponding to the search term shown in search box 1408e and the electronic device 500 presents the user interface illustrated in FIG. 14E in response to the input illustrated in FIG. 14D.

FIG. 14E illustrates an example of a user interface the electronic device 500 presents in response to the input illustrated in FIG. 14D in some embodiments. In some embodiments, the user interface includes the icon 1404a representing the object corresponding to the search term, the representation 1402a of the object corresponding to the search term, and an indication 1420a of the object corresponding to the search term that includes information associated with the object corresponding to the search term. In some embodiments, the indication 1420a includes the name 1422a of the object corresponding to the search term, the distance 1422b between the current location of the electronic device 500 and the object corresponding to the search term, an option 1422c that, when selected, causes the electronic device 500 to present navigation directions from the current location of the electronic device 500 to the location of the object corresponding to the search term, and an option 1422d to cease display of the indication 1420a. In some embodiments, the perspective from which the electronic device 500 presents the representation 1402a of the object corresponding to the search term is a predetermined perspective associated with the representation 1402a of the object. For example, the perspective is selected to show the portion of the representation 1402a that includes the building entrance of the object. For example, the indication 1408d in FIG. 14E indicates that the perspective is 330 degrees relative to North, which is the same as the orientation illustrated in FIG. 14B. In some embodiments, as described above with reference to FIGS. 14A-14B, the electronic device 500 displays the representation 1402a of the object from the perspective shown in FIG. 14E in response to a sequence of inputs for adjusting the perspective of the map that does not include a search input. In some embodiments, the electronic device 500 presents the representation 1402a of the object from the perspective in FIG. 14E in response to a search input that does not include one or more inputs for adjusting the perspective of the map. In some embodiments, the number of inputs required to display the representation 1402a as shown in FIG. 14E in response to the search input is lower than the number of inputs required to display the representation 1402a from the same perspective using a sequence of inputs for adjusting the perspective of the map without a search input.

Thus, FIGS. 14D-14E illustrate an example of the electronic device 500 presenting search results corresponding to a man-made object (e.g., a building). In some embodiments, the electronic device 500 is able to similarly present search results corresponding to a natural object (e.g., a landform, body of water, etc.). For example, FIG. 14F illustrates an example of the electronic device 500 presenting a search user interface that includes a search term corresponding to a natural object (e.g., a mountain, "POTATO MOUNTAIN").

FIG. 14F illustrates an example of the search user interface while searching for a natural object. In some embodiments, the electronic device 500 presents the search user interface illustrated in FIG. 14F in response to detecting selection of a search box 1408e in a user interface similar to the manner described above with reference to FIG. 14C. In some embodiments, the search user interface includes elements similar to the elements described above with reference to FIG. 14D. In FIG. 14F, for example, the search box 1408e includes the search term "POTATO MOUNTAIN" and the indications 1414d-f of search results are indications of objects that correspond to the search term "POTATO MOUNTAIN". In some embodiments, the first indication 1414d of the first search result includes an icon 1404b representing the object corresponding to the first search result, an option 1416c to view an image of the object corresponding to the first search result, and an option 1416d to cause the electronic device 500 to present navigation directions from the current location of the electronic device 500 to the location of the object corresponding to the first search result. In some embodiments, the indication 1414e includes an indication 1424 of a pin instead of an icon representing the object corresponding to the second search result because the object corresponding to the second search result is not associated with an icon. In some embodiments, the indication 1414f of the third search result includes an icon 1404c associated with the object corresponding to the third search result.

In some embodiments, as shown in FIG. 14F, the electronic device 500 detects selection (e.g., with contact 1403g) of the option 1418 to present the first search result. In some embodiments, the electronic device 500 detects selection of indication 1414d and the result is the same as the result of detecting selection of option 1418. In some embodiments, in response to the input illustrated in FIG. 14F, the electronic device 500 presents a representation of the object corresponding to the first search result, including an animation of the representation of the object illustrated in FIGS. 14G-14K.

FIG. 14G illustrates an example of a portion of an animation the electronic device 500 displays in response to the input illustrated in FIG. 14F. In some embodiments, the electronic device 500 displays a representation 1402b of the object corresponding to the search term provided in FIG. 14F and an icon 1404b representing the object corresponding to the search term. In some embodiments, the electronic device 500 displays the representation 1402b from a perspective associated with the representation 1402b. For example, the electronic device 500 indicates the orientation of the perspective relative to the cardinal directions with indication 1408d. For example, the indication 1408d indicates an angle of approximately 100 degrees relative to North. In some embodiments, the perspective is associated with the representation 1402b. For example, the perspective is a perspective from which a plurality of points of interest of the object corresponding to the search term are visible.

In some embodiments, the electronic device 500 presents an animation of text 1426 that indicates the name of the object corresponding to the search term. In some embodiments, the electronic device 500 animates display of the text 1426, such as displaying an animation of the text 1426 gradually appearing or displaying the text 1426 with an animated effect (e.g., shimmering, movement, etc.).

FIG. 14H illustrates an example of a continuation of the animation displayed in response to the input illustrated in FIG. 14F. In some embodiments, the electronic device 500 ceases to display the text 1426 illustrated in FIG. 14G that indicates the name of the object corresponding to the search term. In some embodiments, the electronic device 500 animates the transition between displaying the text 1426 in FIG. 14G and not displaying the text in FIG. 14H. In some embodiments, while displaying the animation of the text 1426, the electronic device 500 continues to display the representation 1402b of the object corresponding to the search result and the icon 1404b representing the object.

FIG. 14I illustrates an example of a continuation of the animation displayed in response to the input illustrated in FIG. 14F. In some embodiments, the electronic device 500 displays an indication 1428a of a first point of interest included in the object corresponding to the search result that was not previously displayed in FIG. 14H. In some embodiments, the indication 1428a of the first point of interest included in the object corresponding to the search result is displayed at a location of the representation 1402b of the object that corresponds to the location of the first point of interest. In some embodiments, the indication 1428a includes text including the name of the point of interest. In some embodiments, the electronic device 500 displays an animation including displaying indications of additional points of interest of the object corresponding to the search result, that were not previously displayed, one by one.

For example, in FIG. 14J, the electronic device displays an indication 1428b of a second point of interest included in the object corresponding to the search result while continuing to display the indication 1428a of the first point of interest included in the object corresponding to the search result. In some embodiments, the electronic device continues to display the animation as illustrated in FIG. 14K. For example, in FIG. 14K, the electronic device 500 displays an indication 1428c of a third point of interest included in the object corresponding to the search result while continuing to display the indication 1428a of the first point of interest and the indication 1428b of the second point of interest.

As shown in FIGS. 14G-14K, the electronic device 500 continues to display the representation 1402b of the object corresponding to the search result and the icon 1404b representing the object corresponding to the search result while displaying the animation of the text 1426 indicating the object corresponding to the search result and the animation of the indications 1428a-1428c of the points of interest in the object corresponding to the search result. In some embodiments, while displaying the animation the electronic device 500 maintains the perspective with which the representation 1402b of the object corresponding to the search result is displayed. In some embodiments, once the electronic device 500 completes the animation, the electronic device 500 maintains display of the representation 1402b of the object corresponding to the search result with the indications 1428a of the points of interest as shown in FIG. 14K. In some embodiments, in addition to displaying the representation 1402b and indications 1428a-1428c, the electronic device 500 displays the text 1426 at the position in the user interface illustrated in FIG. 14G after displaying the animation. In some embodiments, after displaying the animation, the electronic device 500 is able to update the perspective with which the representation 1402b is displayed in response to one or more inputs to update the perspective with which the map is displayed, such as the inputs illustrated in FIGS. 14A, 14B, and 14C. In some embodiments, in response to detecting one or more inputs to update the perspective with which the map is displayed while presenting the animation illustrated in FIGS. 14G-14K, the electronic device 500 ceases display of the animation and updates the perspective with which the representation 1402b is displayed in accordance with the one or more inputs.

Thus, in some embodiments, the electronic device 500 presents three-dimensional representations of objects from perspectives that correspond to the representations in response to a request to search for the objects corresponding to the representations, as described above with reference to FIGS. 14C-14K. In some embodiments, in response to a request to search for an object that is not associated with a three-dimensional representation in the map, the electronic device 500 presents an indication of the location of the object from a predetermined perspective irrespective of the indication being presented and/or the object that was searched for.

For example, FIG. 14L illustrates the electronic device 500 presenting the search user interface while the user searches for a physical object that is not associated with a three-dimensional representation. In FIG. 14L, the search box 1408e includes an address entered by the user, for example. It should be understood that, in some embodiments, it is possible for the electronic device 500 to present three-dimensional representations of objects in response to a search for the address of the object if the object is associated with a three-dimensional representation. It should also be understood that, in some embodiments, it is possible for the electronic device 500 to forgo presenting a three-dimensional representation of an object in response to a search for the name of the object if the object is not associated with a three-dimensional representation.

In some embodiments, in response to entry of the address in the search box 1408e illustrated in FIG. 14L, the electronic device 500 presents representations 1414g-1414i of a plurality of search results corresponding to the address entered into the search box 1408e. In some embodiments, the objects associated with the search results are not associated with icons, and the electronic device 500 displays indications 1424 of pins representing the objects in lieu of icons in the representations 1414g-i of the search results. In some embodiments, the representation 1414g of the first search result (e.g., the search result that the electronic device 500 determines is the most likely object to correspond to the search term) includes an option 1416c to present an image of the object corresponding to the first search result and an option 1416d to present navigation directions from the current location of the electronic device 500 to the location of the object corresponding to the first search result.

As shown in FIG. 14L, the electronic device 500 detects selection (e.g., via contact 1403h) of an option 1418 to present an indication of the first search result. In some embodiments, the electronic device 500 detects selection of indication 1414g and the result is the same as the result of detecting selection of option 1418. In some embodiments, the object corresponding to the first search result is not associated with a three-dimensional representation in the map, so the electronic device 500 presents an indication of the location of the object without presenting a three-dimensional representation of the object in response to the input illustrated in FIG. 14L, as shown in FIG. 14M. In some embodiments, the object corresponding to the first result is associated with a type of three-dimensional model that is different from the three-dimensional models illustrated in FIGS. 14A-14B, 14E, and 14G-14K. For example, the models illustrated in FIGS. 14A-14B, 14E, and 14G-14K are designed by humans (e.g., using computer imaging programs) whereas the models of other objects are algorithmically generated. In some embodiments, the models illustrated in FIGS. 14A-14B, 14E, and 14G-14K have a higher level of detail than the other three-dimensional models. In some embodiments, the other three-dimensional models are projections of two-dimensional footprints of the objects they represent.

FIG. 14M illustrates an example of the electronic device 500 presenting an indication of the location of the object corresponding to the search result in response to the input illustrated in FIG. 14L. In some embodiments, because there is no three-dimensional model associated with the object corresponding to the search result in the map (e.g., no three-dimensional model of the same type as the three-dimensional models illustrated in FIGS. 14A-14B, 14E, and 14G-14K), the electronic device 500 presents a map including an indication of the location of the object. For example, the map includes representations 1434 of buildings in the vicinity of the object, a representation 1432a of the object, a pin 1430a indicating the location of the object, an indication 1436a of the address of the object, and an indication 1420b of information about the object. In some embodiments, the indication 1420b of information about the object includes an indication 1422e of the address of the object, an indication 1422f of the distance between the current location of the electronic device and the object, an option 1422g to present navigation directions from the current location of the electronic device 500 to the object, and an option 1422d to cease display of indication 1420b.

In some embodiments, because there is no three-dimensional representation corresponding to the object (e.g., no three-dimensional model of the same type as the three-dimensional models illustrated in FIGS. 14A-14B, 14E, and 14G-14K), the electronic device 500 presents the map from a bird's eye view with a respective orientation relative to the cardinal directions. For example, as shown in FIG. 14M, the electronic device 500 presents an indication 1408d that the map is oriented so that the upper portion of the map corresponds to north and the bottom portion of the map corresponds to south (e.g., a 0 degree angle relative to North). In some embodiments, the electronic device 500 presents indications of locations of search results from the same perspective (e.g., the perspective illustrated in FIG. 14M) for searches for all objects not associated with three-dimensional models. In some embodiments, rather than presenting a two-dimensional bird's eye view of the location of the object corresponding to the search terms, the electronic device 500 presents a three-dimensional map including the indication of the location of the object corresponding to the search terms from a respective perspective used for all searches for objects not associated with three-dimensional representations. In some embodiments, three-dimensional maps include three-dimensional indications of objects that are different from the three-dimensional representations in that the three-dimensional indications of objects include less detail than the three-dimensional representations.

FIG. 14N illustrates another example of the electronic device 500 presenting the search user interface while the user searches for a physical object that is not associated with a three-dimensional representation (e.g., no three-dimensional model of the same type as the three-dimensional models illustrated in FIGS. 14A-14B, 14E, and 14G-14K). In FIG. 14N, the search box 1408e includes an address entered by the user, for example. It should be understood that, in some embodiments, it is possible for the electronic device 500 to present three-dimensional representations of objects in response to a search for the address of the object if the object is associated with a three-dimensional representation. It should also be understood that, in some embodiments, it is possible for the electronic device 500 to forgo presenting a three-dimensional representation of an object in response to search for the name of the object if the object is not associated with a three-dimensional representation.

In some embodiments, in response to entry of the address in the search box 1408e illustrated in FIG. 14N, the electronic device 500 presents representations 1414j-1414L of a plurality of search results corresponding to the address entered into the search box 1408e. In some embodiments, the objects associated with the search results are not associated with icons, and the electronic device 500 displays indications 1424 of pins representing the objects in lieu of icons in the representations 1414j-L of the search results. In some embodiments, the representation 1414j of the first search result (e.g., the search result that the electronic device 500 determines is the most likely object to correspond to the search term) includes an option 1416e to present navigation directions from the current location of the electronic device 500 to the location of the object corresponding to the first search result.

As shown in FIG. 14N, the electronic device 500 detects selection (e.g., via contact 1403i) of an option 1418 to present an indication of the first search result. In some embodiments, the electronic device 500 detects selection of indication 1414j and the result is the same as the result of detecting selection of option 1418. In some embodiments, the object corresponding to the first search result is not associated with a three-dimensional representation in the map, so the electronic device 500 presents an indication of the location of the object without presenting a three-dimensional representation of the object in response to the input illustrated in FIG. 14N, as shown in FIG. 14O. In some embodiments, the object corresponding to the first result is associated with a type of three-dimensional model that is different from the three-dimensional models illustrated in FIGS. 14A-14B, 14E, and 14G-14K. For example, the models illustrated in FIGS. 14A-14B, 14E, and 14G-14K are designed by humans (e.g., using computer imaging programs) whereas the models of other objects are algorithmically generated. In some embodiments, the models illustrated in FIGS. 14A-14B, 14E, and 14G-14K have a higher level of detail than the other three-dimensional models. In some embodiments, the other three-dimensional models are projections of two-dimensional footprints of the objects they represent.

FIG. 14O illustrates an example of the electronic device 500 presenting an indication of the location of the object corresponding to the search result in response to the input illustrated in FIG. 14N. In some embodiments, because there is no three-dimensional model associated with the object corresponding to the search result in the map (e.g., no three-dimensional model of the same type as the three-dimensional models illustrated in FIGS. 14A-14B, 14E, and 14G-14K), the electronic device 500 presents a map including an indication of the location of the object. For example, the map includes representations 1434 of buildings in the vicinity of the object, a representation 1432b of the object, a pin 1430b indicating the location of the object, an indication 1436b of the address of the object, and an indication 1420c of information about the object. In some embodiments, the indication 1420c of information about the object includes an indication 1422h of the address of the object, an indication 1422i of the distance between the current location of the electronic device and the object, an option 1422j to present navigation directions from the current location of the electronic device 500 to the object, and an option 1422d to cease display of indication 1420c.

In some embodiments, because there is no three-dimensional representation corresponding to the object (e.g., no three-dimensional model of the same type as the three-dimensional models illustrated in FIGS. 14A-14B, 14E, and 14G-14K), the electronic device 500 presents the map from a bird's eye view with a respective orientation relative to the cardinal directions that is the same as the orientation with which the map is displayed in FIG. 14M. For example, as shown in FIG. 14O, the electronic device 500 presents an indication 1408d that the map is oriented so that the upper portion of the map corresponds to north and the bottom portion of the map corresponds to south (e.g., a 0 degree angle relative to North). In some embodiments, the electronic device 500 presents indications of locations of search results from the same perspective (e.g., the perspective illustrated in FIGS. 14M and 14O) for searches for all objects not associated with three-dimensional models. In some embodiments, rather than presenting a two-dimensional bird's eye view of the location of the object corresponding to the search terms, the electronic device 500 presents a three-dimensional map including the indication of the location of the object corresponding to the search terms from a respective perspective used for all searches for objects not associated with three-dimensional representations. In some embodiments, three-dimensional maps include three-dimensional indications of objects that are different from the three-dimensional representations in that the three-dimensional indications of objects include less detail than the three-dimensional representations.

In some embodiments, in response to a request to search for a respective region, the electronic device 500 presents a map in which the respective region is displayed with different visual characteristic(s) than the visual characteristic(s) with which other regions are displayed on the map. For example, the respective region is displayed with more visual prominence than the other regions on the map and the electronic device 500 presents indications of points of interest within the respective region and forgoes display of the indications of points of interest in other regions on the map.

For example, FIG. 14P illustrates display of a map in response to a search for a "downtown" region. In some embodiments, the electronic device 500 displays the user interface illustrated in FIG. 14P in response to a sequence of inputs similar to the inputs illustrated in FIGS. 14C and 14D. In some embodiments, the user interface includes an indication 1438*a* of the name of the downtown region, a portion 1440*a* of the map that corresponds to the downtown region, a portion 1440*b* of the map that corresponds to regions other than the downtown region, and an indication 1420*d* of information about the downtown region.

In some embodiments, the portion 1440*a* of the map corresponding to the downtown region is displayed more visually prominently than the portion 1440*b* of the map corresponding to regions other than the downtown region. For example, the portion 1440*b* of the map corresponding to regions other than the downtown region is blurred and/or darkened, as represented by the shading of portion 1440*b* in FIG. 14P. In some embodiments, the electronic device 500 presents indications 1442*a* of points of interest within the downtown region within portion 1440*a* of the map. FIG. 14P illustrates locations 1442*b* on the map at which points of interest would be displayed if the portion of the map were displayed not in response to a search for the downtown region. In some embodiments, because the map is displayed in response to a request to search for the downtown region, the electronic device 500 does not display indications of points of interest at locations 1442*b* because these locations 1442*b* are outside of the portion 1440*a* of the map corresponding to the downtown region. In some embodiments, the electronic device 500 forgoes display of one or more representations of roads in portion 1440*b* of the map that would otherwise be displayed if the electronic device 500 presented the region of the map illustrated in FIG. 14P other than in response to a request to search for the downtown region.

In some embodiments, if the electronic device 500 were to display the region of the map illustrated in FIG. 14P not in response to a request to search for the downtown region, then region 1440*b* of the map would not be blurred and/or darkened and/or would include visual indications of the points of interest at the locations 1442*b* indicated in FIG. 14P. In some embodiments, indication 1420*d* includes an indication 1422*k* of the name of the downtown region, an indication 1422L of the distance between the current location of the electronic device and the downtown region, an option 1422*m* to present navigation directions from the current location of the electronic device to the downtown region, and an option 1422*d* to cease display of the indication 1420*d*.

Thus, FIG. 14P illustrates an example of the electronic device 500 presenting a map of a manmade region (e.g., a neighborhood of a city). In some embodiments, the electronic device 500 similarly presents a map of a natural region, as shown in FIG. 14Q.

For example, FIG. 14Q illustrates display of a map in response to a search for the "snow mountain range". In some embodiments, the electronic device 500 displays the user interface illustrated in FIG. 14Q in response to a sequence of inputs similar to the inputs illustrated in FIGS. 14C and 14D. In some embodiments, the user interface includes an indication 1438*b* of the name of the snow mountain range, a portion 1440*c* of the map that corresponds to the snow mountain range, a portion 1440*d* of the map that corresponds to regions other than the snow mountain range, and an indication 1420*e* of information about the downtown region.

In some embodiments, the portion 1440*c* of the map corresponding to the snow mountain range is displayed more visually prominently than the portion 1440*d* of the map corresponding to regions other than the snow mountain range. For example, the portion 1440*d* of the map corresponding to regions other than the snow mountain range is blurred and/or darkened, as represented by the shading of portion 1440*d* in FIG. 14Q. In some embodiments, if the portion of the map illustrated in FIG. 14Q was displayed not in response to a request to search for the snow mountain range, then portions 1440*d* of the map would not be blurred and/or darkened. In some embodiments, indication 1420*e* includes an indication 1422*n* of the name of the snow mountain range, an indication 1422*p* of the distance between the current location of the electronic device 500 and the snow mountain range, an option 1422*q* to present navigation directions from the current location of the electronic device 500 to the snow mountain range, and an option 1422*d* to cease display of the indication 1420*e*.

Although FIGS. 14P-14Q show no details of the map outside of the region corresponding to a result of a search input provided to the electronic device 500, it should be understood that, in some embodiments, the electronic device 500 displays some detail outside of the highlighted regions, but less detail than what would be shown in a map displayed other than in response to the request to search. For example, referring to FIG. 14P, in some embodiments, the electronic device 500 displays one or more indications of roads, buildings, and/or points of interest in region 1440*b* but with less in number or with less detail than the number and detail of these elements that would be displayed if the electronic device 500 presented the portion of the map illustrated in FIG. 14P other than in response to a request to search for the downtown region. As another example, referring to FIG. 14Q, in some embodiments, the electronic device 500 displays one or more indications of topography, plants, and/or points of interest in region 1440*d* but with less in number or with less detail than the number and detail of these elements that would be displayed if the electronic device 500 presented the portion of the map illustrated in FIG. 14Q other than in response to a request to search for the snow mountain range. Moreover, in some embodiments, the electronic device 500 displays regions other than the region corresponding to the search with reduced visual prominence (e.g., darkened, blurred, increased translucency) relative to the region corresponding to the search.

FIG. 15 is a flow diagram illustrating a method of presenting representations of physical objects in maps in response to requests to search for physical objects in accordance with some embodiments. The method 1500 is optionally performed at an electronic device such as device 100, device 300, and device 500, as described above with reference to FIGS. 1A-1B, 2-3, 4A-4B and 5A-5H. Some operations in method 1500 are, optionally combined and/or order of some operations is, optionally, changed.

As described below, the method 1500 provides ways in which an electronic device presents representations of physical objects in maps in response to requests to search for physical objects in accordance with some embodiments. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 14A, method 1500 is performed at an electronic device (e.g., 500) in communication with a display generation component (e.g., 504) and one or more input devices. In some embodiments, the electronic device (e.g., 500) is a mobile device (e.g., a tablet, a smartphone, a media player, or a wearable device), a computer (e.g., a desktop computer, a laptop computer), or a wearable device (e.g., a watch, a head-mounted device), optionally in communication with one or more of a mouse (e.g., external), trackpad (optionally integrated or external), remote control device (e.g., external), another mobile device (e.g., separate from the electronic device), a handheld device (e.g., external), and/or a controller (e.g., external, etc.), or a set-top box in communication with one or more input devices (e.g., a remote control). In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, such as in FIG. 14C, while displaying, via the display generation component, a map user interface that includes a map, the electronic device (e.g., 500) detects (1502), via the one or more input devices, an input (e.g., via contact 1403*e*) corresponding to a request to search for a respective physical object in the map user interface. In some embodiments, the map includes representations of physical objects (e.g., buildings, landforms, landmarks, infrastructure, plants, etc.) in a physical region. In some embodiments, the locations, sizes, shapes, etc. of the representations of physical objects on the map correspond to the locations, sizes, shapes, etc. of the physical objects in the physical region. In some embodiments, the respective physical object is an address, point of interest, business name, landform, landmark, body of water, category of place (e.g., "restaurant," "shopping mall," "deli," "hiking trail," etc.).

In some embodiments, in response to detecting the input (1504), in accordance with a determination that the respective physical object is a first physical object, the electronic device (e.g., 500) displays (1506), in the map user interface, a first representation (e.g., 1402*a*) of the first physical object on the map, wherein the first representation is displayed from a first perspective relative to a reference point with respect to the map, such as in FIG. 14E. In some embodiments, the first representation is a three-dimensional model of the respective physical object, such as the three-dimensional models described above with reference to method 1300. In some embodiments, the first representation is a two-dimensional image of the first physical object. In some embodiments, if there is a three-dimensional model corresponding to the respective physical object, the first perspective is a view of a respective portion of the three-dimensional model. For example, if the respective physical object is a building, the first perspective is a view of the front of the building. In some embodiments, the three-dimensional model is custom-made by a human (e.g., using computer imaging software). In some embodiments, the three-dimensional model is algorithmically generated. In some embodiments, if there is not a three-dimensional model corresponding to the respective physical object, the electronic device displays a two-dimensional representation of the object and the first perspective is a bird's-eye view with an orientation independent from the orientation of the physical object (e.g., such that north (or south) is at the top of the display generation component).

In some embodiments, in response to detecting the input (1504), in accordance with a determination that the respective physical object is a second physical object, different from the first physical object, the electronic device (e.g., 500) displays (1508), in the map user interface, a second representation (e.g., 1402*b*) of the second physical object on the map, wherein the second representation is displayed from a second perspective relative to the reference point, the second perspective different from the first perspective. In some embodiments, the second perspective differs from the first perspective in amount of zoom and virtual camera angle. In some embodiments, at least one of the perspectives is a non-zero angle relative to gravity, such that at least one (e.g., partially) vertical surface of the representation of the object is visible. In some embodiments, at least one of the perspectives is a bird's eye view. The above-described manner of displaying the representation of the physical object from one of two perspectives provides an efficient way of orienting the representation of the physical object to show relevant information to the user, which additionally reduces power usage and improves battery life of the electronic device by enabling the user to use the electronic device more quickly and efficiently.

In some embodiments, such as in FIG. 14C, when the input (e.g., via contact 1403*e*) corresponding to the request to search for the respective physical object is received, the map user interface includes the map displayed from a third perspective relative to the reference point, different from the first perspective. In some embodiments, in accordance with the determination that the respective physical object is the first physical object, the electronic device updates the perspective of the map from the third perspective to the first perspective in response to the input automatically without detecting one or more inputs for adjusting the perspective of the map. The above-described manner of displaying the map from the third perspective when the input corresponding to the request to search is detected and updating the perspective to the first perspective when presenting the first representation provides an efficient way of automatically presenting the first representation from the first perspective in response to the input to search which additionally reduces power usage and improves battery life of the electronic device by enabling the user to use the electronic device more quickly and efficiently.

In some embodiments, the first representation (e.g., 1402*a*) of the first physical object on the map is a three-dimensional representation of the first physical object on the map, such as in FIG. 14E, and the second representation (e.g., 1432*b*) of the second physical object on the map is a two-dimensional representation of the second physical object on the map, such as in FIG. 14O. In some embodiments, the first physical object is associated with a three-dimensional representation that was created by a human (e.g., using a computer imaging application) and the second physical object is not associated with a three-dimensional representation (e.g., a three-dimensional representation created by a human). In some embodiments, the electronic device presents search results that have associated three-dimensional representations from perspectives associated with the particular three-dimensional representations being presented and presents search results that do not have associated three-dimensional representations from a predetermined perspective irrespective of the particular object being presented. In some embodiments, the electronic device always presents search results that do not have associated three-dimensional representations from the same predetermined respective perspective. In some embodiments, the first perspective is a perspective that shows at least part of a (e.g., partially, substantially) vertical surface of the first representation and the second perspective is a bird's eye view. The above-described manner of presenting the three-dimensional representation of the first physical object from the first perspective and presenting the two-dimensional representation of the second physical object from the second perspective provides an efficient way of presenting the representations from perspectives that show respective interesting or important features of the physical objects, which additionally reduces power usage and improves battery life of the electronic device by enabling the user to use the electronic device more quickly and efficiently.

In some embodiments, the first representation (e.g., 1402a) of the first physical object on the map is a three-dimensional representation of the first physical object on the map, such as in FIG. 14E, and the second representation (e.g., 1402b) of the second physical object on the map is a two-dimensional representation of the second physical object on the map, such as in FIG. 14G. In some embodiments, the electronic device presents three-dimensional representations of search results from perspectives that show at least part of a (e.g., partially, substantially) vertical surface of the three-dimensional representations. In some embodiments, the perspectives show a predetermined portion or side of the three-dimensional representations. For example, the first perspective shows the entrance of a building corresponding to the first physical object and the second perspective shows a plurality of well-known features of a natural landmark corresponding to the second physical object. In some embodiments, if the front/façade of different models are oriented differently, the electronic device displays the models from different perspectives in response to requests to search for the objects corresponding to the models. The above-described manner of presenting the three-dimensional representations of the first and second physical objects from different perspectives provides an efficient way of presenting well-known or recognizable details related to the first and second physical objects in response to an input to search, which additionally reduces power usage and improves battery life of the electronic device by enabling the user to use the electronic device more quickly and efficiently.

In some embodiments, such as in FIG. 14L, the input (e.g., via contact 1403h) corresponding to the request to search for the respective physical object in the map user interface includes input of an address associated with the respective physical object (e.g., without input of a name for the object). In some embodiments, in response to the search input, the electronic device presents a representation of the respective physical object located at the address provided by the user. The above-described manner of presenting search results in response to receiving an input corresponding to a request to search for an address provides an efficient way of presenting representations of a physical objects at respective addresses, which additionally reduces power usage and improves battery life of the electronic device by enabling the user to use the electronic device more quickly and efficiently.

In some embodiments, such as in FIG. 14F, the input (e.g., via contact 1403g) corresponding to the request to search for the respective physical object in the map user interface includes input of a name associated with the respective physical object (e.g., without input of an address for the object). In some embodiments, the name associated with the object is a proper name of the object (e.g., the name of a building, natural landmark, institution, business, etc.) or a name of the type of the object (e.g., a category of a business, a category of a natural landmark, etc.). For example, the electronic device is able to search for "Joe's Restaurant," "Chinese food," "dinner," "restaurant," etc. In some embodiments, the name of the physical object is associated with a contact of (e.g., a user account of) the electronic device. For example, if an address book of (e.g., a user account associated with) the electronic device includes an address for a respective contact, in response to a request to search the map for the respective contact, the electronic device displays an indication of the location of the address (or a model of the address if one is available). The above-described manner of presenting search results in response to an input corresponding to a request to search for the name of a respective physical object provides an efficient way of presenting representations of objects based on the names of the objects, which additionally reduces power usage and improves battery life of the electronic device by enabling the user to use the electronic device more quickly and efficiently.

In some embodiments, while displaying, via the display generation component (e.g., 504), the map user interface that includes the map, wherein the map is displayed from a third perspective relative to the reference point, different from the first perspective, the electronic device (e.g., 500) detects, via the one or more input devices, a respective input (e.g., via contacts 1403a and 1403b) (e.g., or sequence of a plurality of respective inputs) other than a search input corresponding to an input to modify display of the map in the map user interface, such as in FIG. 14A. In some embodiments, the respective input corresponds to a request to pan, rotate, and/or zoom the viewpoint through which the maps user interface is presented.

In some embodiments, in response to receiving the respective input (e.g., or sequence of a plurality of respective inputs), the electronic device (e.g., 500) modifies) display of the map in the map user interface in accordance with the respective input, including displaying the first representation (e.g., 1402a) of the first physical object on the map, wherein the first representation (e.g., 1402a) is displayed from the first perspective relative to the reference point with respect to the map, such as in FIG. 14B. In some embodiments, the electronic device displays the first representation from the first perspective in response to a sequence of a plurality of inputs to adjust the perspective relative to the reference point that includes more inputs than the number of inputs needed to search from the first object. Thus, in some embodiments, the search result for the first physical object displays a portion of the map that is also displayable via a manual pan, rotate, and/or zoom input. The above-described manner of presenting the first representation from the first perspective in response to the respective input other than a search input to modify display of the map in the map user interface provides an efficient way of viewing the first representation from the first perspective without searching for the first object which additionally reduces power usage and improves battery life of the electronic device by enabling the user to use the electronic device more quickly and efficiently.

In some embodiments, such as in FIG. 14E, the first representation (e.g., 1402a) of the first physical object is a three-dimensional representation of the first physical object (e.g., building, bridge, other manmade structure), other than terrain, on the map. In some embodiments, the three-dimensional representation includes shading, contours, etc. that capture the three-dimensional details of the first physical object. The above-described manner of displaying the three-dimensional representation in response to the search input provides an efficient way of presenting the appearance of the first physical object in response to the input to search for the first physical object, which additionally reduces power usage and improves battery life of the electronic device by enabling the user to use the electronic device more quickly and efficiently.

In some embodiments, such as in FIG. 14G, the first representation (e.g., 1402b) of the first physical object is a three-dimensional representation of a portion of a terrain (e.g., and/or topography) of the map. In some embodiments, the first physical object is a mountain, mountain range, valley, canyon, island, peninsula, or other landform. In some embodiments, the three-dimensional representation includes shading, contours, etc. that capture the three-dimensional details of the first physical object. Thus, in some embodiments, the search result focuses in on a portion of the terrain/land of the map rather than an object on top of that terrain/land of the map. The above-described manner of displaying the three-dimensional representation in response to the search input provides an efficient way of presenting the appearance of the first physical object in response to the input to search for the first physical object, which additionally reduces power usage and improves battery life of the electronic device by enabling the user to use the electronic device more quickly and efficiently.

In some embodiments, such as in FIG. 14C, while displaying, via the display generation component (e.g., 504), the map user interface that includes the map, the electronic device (e.g., 500) detects, via the one or more input devices, a respective input (e.g., via contact 1403e) corresponding to a request to search for a first respective region in the map user interface. In some embodiments, the region is a city, state, country, county, or neighborhood.

In some embodiments, such as in FIG. 14P, in response to detecting the respective input, the electronic device (e.g., 500) displays, in the map user interface the first respective region (e.g., 1440a) of the map. In some embodiments, such as in FIG. 14P, in response to detecting the respective input, the electronic device (e.g., 500) displays, in the map user interface a second respective region (e.g., 1440b), different from the first respective region (e.g., 1440a), of the map, wherein the first respective region (e.g., 1440a) of the map is displayed with a visual characteristic (e.g., color, translucency, style, shading, etc.) having a first value, and the second respective region (e.g., 1440b) of the map is displayed with the visual characteristic having a second value, different from the first value. In some embodiments, the first visual characteristic is more visually prominent than the second visual characteristic. In some embodiments, the electronic device displays the map with the first respective region highlighted (e.g., in a lighter color, in more vibrant colors, with more contrast, with less translucency, with less blur, and/or etc.) with respect to one or more regions in the vicinity of the region. For example, the electronic device displays the first respective region in full color and displays the second respective region with a darkened and/or blurred appearance. In some embodiments, in response to a request to search for the second respective region, the electronic device displays the second respective region with the visual characteristic having the first value and displays the first respective region with the visual characteristic having the second value. The above-described manner of displaying the first and second regions with different visual characteristics in response to the input corresponding to a request to search for the first region provides an efficient way of distinguishing the first region from the second region on the map, which additionally reduces power usage and improves battery life of the electronic device by enabling the user to use the electronic device more quickly and efficiently.

In some embodiments, such as in FIG. 14P, displaying the first respective region (e.g., 1440a) of the map with the visual characteristic having the first value includes, in accordance with a determination that the first respective region (e.g., 1440a) includes a first respective point of interest, the electronic device (e.g., 500) displays, in the first respective region (e.g., 1440a), a first visual indication (e.g., 1442a) of the first respective point of interest. In some embodiments, displaying the first respective region of the map with the visual characteristic having the first value includes displaying indications of points of interest within the region. In some embodiments, the points of interest displayed in the first region are curated points of interest that are displayed in response to a request to search for the first respective region. In some embodiments, points of interest include businesses and other public spaces.

In some embodiments, such as in FIG. 14P, displaying second first respective region (e.g., 1440b) of the map with the visual characteristic having the second value includes, in accordance with a determination that the second respective region (e.g., 1440b) includes a second respective point of interest, forgoing displaying, in the second respective region, a second visual indication of the second respective point of interest. In some embodiments, displaying the second respective region of the map with the visual characteristic having the second value includes not displaying indications of points of interest within the region. In some embodiments, while displaying the first respective region and second respective region in the map (e.g., from the same perspective with which the first and second region are displayed in response to the input to search for the first region) without having detected an input corresponding to a request to search for the first region, the electronic device concurrently displays the first visual indication of the first respective point of interest and the second visual indication of the second respective point of interest. In some embodiments, in response to an input corresponding to a request to search for the second region, the electronic device displays the second visual indication of the second respective point of interest without displaying the first visual indication of the first respective point of interest. The above-described manner of displaying visual indications of points of interest in the first respective region and forgoing display of indications of points of interest outside of the first respective region in response to an input to search for the first respective region provides an efficient way of presenting details about the first respective region in response to the input to search for the first respective region, which additionally reduces power usage and improves battery life of the electronic device by enabling the user to use the electronic device more quickly and efficiently.

In some embodiments, such as in FIG. 14P, displaying the first respective region (e.g., 1440*a*) of the map with the visual characteristic having the first value includes displaying a given feature (e.g., representation of physical object, representation of terrain, etc.) of the map in the first respective region with a first level of detail. In some embodiments, the level of detail includes ornamental detail (e.g., colors, shading, visual effects) and informational detail (e.g., street names, points of interest, representations of physical objects, trees, buildings, lane markings). In some embodiments, while displaying the map including the first respective region not in response to an input to search for the first respective region, the electronic device displays the given feature of the map in the first respective region with the first level of detail.

In some embodiments, such as in FIG. 14P, displaying second respective region (e.g., 1440*a*) of the map with the visual characteristic having the second value includes displaying the given feature of the map in the second respective region with a second level of detail, lower than the first level of detail. In some embodiments, while displaying the map including the second respective region not in response to an input to search for the first respective region, the electronic device displays the given feature of the map in the second respective region with the first level of detail. In some embodiments, while displaying the map including the first and second respective regions not in response to an input to search for the first respective region, the electronic device displays the given features of the map in the first and second respective regions at the same level of detail. For example, the electronic device displays indications of points of interest within the region and forgoes display of indications of points of interest outside of the region (e.g., that would have been displayed at the respective zoom level with which the electronic device is currently displaying the map if the first respective region of the map was not being highlighted). The above-described manner of presenting the first respective region in more detail than the second respective region provides an efficient way of presenting additional details about a region that the user searched for, which additionally reduces power usage and improves battery life of the electronic device by enabling the user to use the electronic device more quickly and efficiently.

In some embodiments, the map includes visual indications of political borders. In some embodiments, the electronic device displays visual indications of disputed borders with a different visual characteristic (e.g., color, pattern, line styling, etc.) than visual indications of borders that are not disputed.

In some embodiments, in response to detecting the input, in accordance with the determination that the respective physical object is the first physical object, the electronic device (e.g., 500) displays, in the map user interface, an animation of information associated with the first physical object, such as in FIGS. 14G-14K. In some embodiments, the electronic device animates text including information associated with the first physical object. In some embodiments, the electronic device animates visual indications of points of interest of the first physical object. For example, the first physical object is a mountain and the electronic device presents an animation of the name of the mountain (e.g., being typed out one letter at a time, shimmering, sparkling, appearing and then disappearing, etc.) and an animation of initiating display of indications of points of interest (e.g., summits, landmarks, etc.) on the mountain one at a time. The above-described manner of presenting an animation of information associated with the first physical object provides an efficient way of presenting information about an object the user searched for, which additionally reduces power usage and improves battery life of the electronic device by enabling the user to use the electronic device more quickly and efficiently.

It should be understood that the particular order in which the operations in FIG. 15 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, 1100, and/or 1300) are also applicable in an analogous manner to method 1500 described above with respect to FIG. 15. For example, the ways of presenting representations of physical objects in maps in response to requests to search for physical objects described above with reference to method 1500 optionally have one or more of the characteristics of the ways of presenting navigation routes from various perspectives, modifying display of representations of physical objects in the vicinity of a navigation route while presenting navigation directions, modifying display of portions of a navigation route that are occluded by representations of (e.g., physical) objects in a map, and/or presenting representations of physical objects in maps described herein with reference to other methods described herein (e.g., methods 700, 900, 1100, and/or 1300). For brevity, these details are not repeated here.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIG. 15 are, optionally, implemented by components depicted in FIGS. 1A-1B. For example, detecting operation 1502 is, optionally, implemented by event sorter 170, event recognizer 180, and event handler 190. Event monitor 171 in event sorter 170 detects a contact on touch screen 504, and event dispatcher module 174 delivers the event information to application 136-1. A respective event recognizer 180 of application 136-1 compares the event information to respective event definitions 186, and determines whether a first contact at a first location on the touch screen corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the display of device location information to users. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, license plate numbers, or any other personal information.

The present disclosure recognizes that the use of such personal information data, in the present technology, can be used to the benefit of users. For example, the personal information data can be used to display the user's current location, display the user's favorite or recently visited locations, and/or provide suggested navigation routes. Accordingly, use of such personal information data enables users to have more information about the user's or the device's location. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to enable location services (e.g., while not using a navigation or maps application). In yet another example, users can select to limit the sharing of the device's location information. In addition to providing "opt in" and "opt out" options, the present disclosure contemplates providing notifications relating to the access or use of personal information. For instance, a user may be notified upon displaying the map application that the current location of the electronic device will be used and then reminded again before navigation routes are determined and/or displayed.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, users can browse locations and/or navigation routes on maps without providing the current location of the electronic device.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users, such as by anonymizing personally identifiable information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
   at an electronic device in communication with a display generation component and one or more input devices:
   while navigating along a route from a first physical location to a second physical location, displaying, via the display generation component, a representation of a map corresponding to a respective region including:
   a plurality of visual representations of a plurality of objects in the respective region at locations represented by the map; and
   a visual indication of the route on the representation of the map, wherein:
   in accordance with a determination that a first portion of a first visual representation of a first object of the plurality of objects in the respective region is a first distance from the route, wherein the first portion of the first visual representation corresponds to a first portion of the first object, the first portion of the first visual representation of the first object is displayed with a first degree of visual prominence, including first visual characteristics of the first portion of the first visual representation of the first object; and in accordance with a determination that a second portion of the first visual representation of the first object is a second distance from the route, wherein the second portion of the first visual representation corresponds to a second portion of the first object and the second distance is different from the first distance, the second portion of the first visual representation of the first object is displayed with a second degree of visual prominence, different from the first degree of visual prominence, including second visual characteristics, different from the first visual characteristics, of the second portion of the first visual representation of the first object.

2. The method of claim 1, further comprising:
while not navigating along a respective route and while displaying the representation of the map, displaying the first visual representation of the first object on the representation of the map at a third degree of visual prominence, including third visual characteristics of the first visual representation of the first object different from the first visual characteristics and the second visual characteristics, that is independent of a distance from the first visual representation of the first object to any point on the representation of the map.

3. The method of claim 1, wherein the first distance is less than the second distance, and the first degree of visual prominence is greater than the second degree of visual prominence.

4. The method of claim 1, wherein:
the first distance is less than the second distance, and the first degree of visual prominence is greater than the second degree of visual prominence,
in accordance with a determination that a second visual representation of a second object of the plurality of objects in the respective region is a third distance from the route, the second visual representation of the second object is displayed with a third degree of visual prominence, and
in accordance with a determination that the second visual representation of the second object is a fourth distance from the route, less than the third distance, the second visual representation of the second object is displayed with a fourth degree of visual prominence, less than the third degree of visual prominence.

5. The method of claim 1, wherein the first visual representation of the first object includes a lane marking representation, a tree representation, a building representation, land cover representation, or a point of interest representation.

6. The method of claim 1, wherein the plurality of visual representations of the plurality of objects in the respective region is:
in accordance with a determination that the representation of the map is displayed at a first zoom level, a first set of visual representations of a first set of objects in the respective region, and
in accordance with a determination that the representation of the map is displayed at a second zoom level, greater than the first zoom level, a second set of visual representations of a second set of objects in the respective region, including and greater than the first set of visual representations of the first set of objects in the respective region.

7. The method of claim 1, wherein the representation of the map includes representations of topographies of areas represented by the map in the respective region, and the representations of the topographies are displayed with a third degree of visual prominence that is independent of a distance between the representations of the topographies and the route.

8. The method of claim 1, wherein the first degree and the second degree of visual prominence include degrees of opacity.

9. The method of claim 1, wherein the first degree and the second degree of visual prominence include degrees of blur.

10. The method of claim 1, wherein the first degree and the second degree of visual prominence include degrees of color saturation.

11. The method of claim 1, wherein:
in accordance with a determination that a portion of the representation of the map is a third distance from the route, the portion of the map is displayed with a third degree of visual prominence, and
in accordance with a determination that the portion of the map is a fourth distance from the route, the fourth distance different from the third distance, the portion of the map is displayed with a fourth degree of visual prominence different from the third degree of visual prominence.

12. The method of claim 1, further comprising:
receiving, via the one or more input devices, a first input corresponding to a request to display navigation directions from a third physical location to a fourth physical location; and
in response to receiving the first input, displaying, overlaid on the representation of the map, a first respective indication of a first route from the third physical location to the fourth physical location having a first route length, and a second respective indication of a second route from the third physical location to the fourth physical location having a second route length, greater than the first route length, wherein:
displaying the first respective indication of the first route includes displaying a first animation of progression through the first route, the first animation having a first length, and
displaying the second respective indication of the second route includes displaying a second animation of progression through the second route, the second animation having a second length, greater than the first length.

13. The method of claim 1, wherein the representation of the map includes a portion corresponding to land cover, and displaying the portion corresponding to land cover includes displaying the portion with a visual characteristic based on precipitation and/or climate data corresponding to the portion of the representation of the map.

14. The method of claim 1, wherein:
the first distance is included in a first range of distances associated with the first degree of visual prominence, and the second distance is included in a second range of distances associated with the second degree of visual prominence, in accordance with a determination that the first portion of the first visual representation of the first object is a third distance from the route, different from the first and second distances, the third distance within the first range of distances, the first portion of the first visual representation of the first object is displayed with the first degree of visual prominence, and in accordance with a determination that the second portion of the first visual representation of the first object is a fourth distance from the route, different from the first, second and third distances, the fourth distance within the second range of distances, the second portion of the first visual representation of the first object is displayed with the second degree of visual prominence.

15. The method of claim 1, wherein the first portion of the first visual representation of the first object is displayed with the first degree of visual prominence only if it is the first distance from the route, the second portion of the first visual representation of the first object is displayed with the second degree of visual prominence only if it is the second distance from the route, and in accordance with a determination that the first portion of the first visual representation of the first object or the second portion of the first visual representation of the first object is a third distance, different from the first and second distances, from the route, the first portion of the first visual representation of the first object or the second portion of the first visual representation of the first object is displayed with a third degree, different from the first and second degrees, of visual prominence.

16. The method of claim 1, wherein:
the first object is a first type of object,
in accordance with a determination that a second visual representation of a second object of the plurality of objects is the first distance from the route, wherein the second object is a second type of object, different from the first type of object, the second visual representation of the second object is displayed with a third degree of visual prominence different from the first degree of visual prominence, and in accordance with a determination that the second visual representation of the second object is the second distance from the route, the second visual representation of the second object is displayed with a fourth degree of visual prominence different from the second degree of visual prominence.

17. The method of claim 16, wherein the first type of object is a tree, the second type of object is a building, the first degree of visual prominence is less than the second degree of visual prominence, and the third degree of visual prominence is greater than the fourth degree of visual prominence.

18. The method of claim 1, wherein the first distance includes a vertical distance component.

19. The method of claim 1, wherein the first distance includes a lateral distance component.

20. The method of claim 1, wherein displaying the representation of the map includes:
in accordance with a determination that a first plurality of visual representations corresponding to objects in the respective region are associated with the first degree of visual prominence, and a second plurality of visual representations of objects in the respective region are associated with the second degree of visual prominence:

displaying, as a batch, the first plurality of visual representations displayed with the first degree of visual prominence; and displaying, as a batch, the second plurality of visual representations displayed with the second degree of visual prominence; and in accordance with a determination that a third plurality of visual representations, different from the first plurality of visual representations of objects in the respective region are associated with the first degree of visual prominence, and a fourth plurality of visual representations, different from the second plurality of visual representations, of objects in the respective region are associated with the second degree of visual prominence:

displaying, as a batch, the third plurality of visual representations displayed with the first degree of visual prominence; and displaying, as a batch, the fourth plurality of visual representations displayed with the second degree of visual prominence.

21. An electronic device, comprising:
one or more processors;
memory; and
one or more programs, wherein the one or more programs are stored in the memory and configured to be executed by the one or more processors, the one or more programs including instructions for:
while navigating along a route from a first physical location to a second physical location, displaying, via a display generation component, a representation of a map corresponding to a respective region including:
a plurality of visual representations of a plurality of objects in the respective region at locations represented by the map; and
a visual indication of the route on the representation of the map, wherein:
in accordance with a determination that a first portion of a first visual representation of a first object of the plurality of objects in the respective region is a first distance from the route, wherein the first portion of the first visual representation corresponds to a first portion of the first object, the first portion of the first visual representation of the first object is displayed with a first degree of visual prominence, including first visual characteristics of the first portion of the first visual representation of the first object; and in accordance with a determination that a second portion of the first visual representation of the first object is a second distance from the route, wherein the second portion of the first visual representation corresponds to a second portion of the first object and the second distance is different from the first distance, the second portion of the first visual representation of the first object is displayed with a second degree of visual prominence, different from the first degree of visual prominence, including second visual characteristics, different from the first visual characteristics, of the second portion of the first visual representation of the first object.

22. The electronic device of claim 21, the one or more programs including further instructions for:
while not navigating along a respective route and while displaying the representation of the map, displaying the first visual representation of the first object on the representation of the map at a third degree of visual prominence, including third visual characteristics of the first visual representation of the first object different from the first visual characteristics and the second visual characteristics, that is independent of a distance from the first visual representation of the first object to any point on the representation of the map.

23. The electronic device of claim 21, wherein the first distance is less than the second distance, and the first degree of visual prominence is greater than the second degree of visual prominence.

24. The electronic device of claim 21, wherein:
the first distance is less than the second distance, and the first degree of visual prominence is greater than the second degree of visual prominence,
in accordance with a determination that a second visual representation of a second object of the plurality of objects in the respective region is a third distance from the route, the second visual representation of the second object is displayed with a third degree of visual prominence, and
in accordance with a determination that the second visual representation of the second object is a fourth distance from the route, less than the third distance, the second visual representation of the second object is displayed with a fourth degree of visual prominence, less than the third degree of visual prominence.

25. The electronic device of claim 21, wherein the first visual representation of the first object includes a lane marking representation, a tree representation, a building representation, land cover representation, or a point of interest representation.

26. The electronic device of claim 21, wherein the plurality of visual representations of the plurality of objects in the respective region is:
in accordance with a determination that the representation of the map is displayed at a first zoom level, a first set of visual representations of a first set of objects in the respective region, and
in accordance with a determination that the representation of the map is displayed at a second zoom level, greater than the first zoom level, a second set of visual representations of a second set of objects in the respective region, including and greater than the first set of visual representations of the first set of objects in the respective region.

27. The electronic device of claim 21, wherein the representation of the map includes representations of topographies of areas represented by the map in the respective region, and the representations of the topographies are displayed with a third degree of visual prominence that is independent of a distance between the representations of the topographies and the route.

28. The electronic device of claim 21, wherein the first degree and the second degree of visual prominence include degrees of opacity.

29. The electronic device of claim 21, wherein the first degree and the second degree of visual prominence include degrees of blur.

30. The electronic device of claim 21, wherein the first degree and the second degree of visual prominence include degrees of color saturation.

31. The electronic device of claim 21, wherein:
in accordance with a determination that a portion of the representation of the map is a third distance from the route, the portion of the map is displayed with a third degree of visual prominence, and
in accordance with a determination that the portion of the map is a fourth distance from the route, the fourth distance different from the third distance, the portion of the map is displayed with a fourth degree of visual prominence different from the third degree of visual prominence.

32. The electronic device of claim 21, the one or more programs including further instruction for:
receiving, via one or more input devices, a first input corresponding to a request to display navigation directions from a third physical location to a fourth physical location; and
in response to receiving the first input, displaying, overlaid on the representation of the map, a first respective indication of a first route from the third physical location to the fourth physical location having a first route length, and a second respective indication of a second route from the third physical location to the fourth physical location having a second route length, greater than the first route length, wherein:
displaying the first respective indication of the first route includes displaying a first animation of progression through the first route, the first animation having a first length, and
displaying the second respective indication of the second route includes displaying a second animation of progression through the second route, the second animation having a second length, greater than the first length.

33. The electronic device of claim 21, wherein the representation of the map includes a portion corresponding to land cover, and displaying the portion corresponding to land cover includes displaying the portion with a visual characteristic based on precipitation and/or climate data corresponding to the portion of the representation of the map.

34. The electronic device of claim 21, wherein:
the first distance is included in a first range of distances associated with the first degree of visual prominence, and the second distance is included in a second range of distances associated with the second degree of visual prominence,
in accordance with a determination that the first portion of the first visual representation of the first object is a third distance from the route, different from the first and second distances, the third distance within the first range of distances, the first portion of the first visual representation of the first object is displayed with the first degree of visual prominence, and
in accordance with a determination that the second portion of the first visual representation of the first object is a fourth distance from the route, different from the first, second and third distances, the fourth distance within the second range of distances, the second portion of the first visual representation of the first object is displayed with the second degree of visual prominence.

35. The electronic device of claim 21, wherein the first portion of the first visual representation of the first object is displayed with the first degree of visual prominence only if it is the first distance from the route, the second portion of the first visual representation of the first object is displayed with the second degree of visual prominence only if it is the second distance from the route, and in accordance with a determination that the first portion of the first visual representation of the first object or the second portion of the first visual representation of the first object is a third distance, different from the first and second distances, from the route, the first portion of the first visual representation of the first object or the second portion of the first visual representation of the first object is displayed with a third degree, different from the first and second degrees, of visual prominence.

36. The electronic device of claim 21, wherein:
the first object is a first type of object,
in accordance with a determination that a second visual representation of a second object of the plurality of objects is the first distance from the route, wherein the second object is a second type of object, different from the first type of object, the second visual representation of the second object is displayed with a third degree of visual prominence different from the first degree of visual prominence, and
in accordance with a determination that the second visual representation of the second object is the second distance from the route, the second visual representation of the second object is displayed with a fourth degree of visual prominence different from the second degree of visual prominence.

37. The electronic device of claim 36, wherein the first type of object is a tree, the second type of object is a building, the first degree of visual prominence is less than the second degree of visual prominence, and the third degree of visual prominence is greater than the fourth degree of visual prominence.

38. The electronic device of claim 21, wherein the first distance includes a vertical distance component.

39. The electronic device of claim 21, wherein the first distance includes a lateral distance component.

40. The electronic device of claim 21, wherein displaying the representation of the map includes:
in accordance with a determination that a first plurality of visual representations corresponding to objects in the respective region are associated with the first degree of visual prominence, and a second plurality of visual representations of objects in the respective region are associated with the second degree of visual prominence:
displaying, as a batch, the first plurality of visual representations displayed with the first degree of visual prominence; and
displaying, as a batch, the second plurality of visual representations displayed with the second degree of visual prominence; and
in accordance with a determination that a third plurality of visual representations, different from the first plurality of visual representations of objects in the respective region are associated with the first degree of visual prominence, and a fourth plurality of visual representations, different from the second plurality of visual representations, of objects in the respective region are associated with the second degree of visual prominence:
displaying, as a batch, the third plurality of visual representations displayed with the first degree of visual prominence; and
displaying, as a batch, the fourth plurality of visual representations displayed with the second degree of visual prominence.

41. A non-transitory computer readable storage medium storing one or more programs, the one or more programs comprising instructions, which when executed by one or more processors of an electronic device, cause the electronic device to perform a method comprising:
while navigating along a route from a first physical location to a second physical location, displaying, via a display generation component, a representation of a map corresponding to a respective region including:
a plurality of visual representations of a plurality of objects in the respective region at locations represented by the map; and
a visual indication of the route on the representation of the map, wherein:
in accordance with a determination that a first portion of a first visual representation of a first object of the plurality of objects in the respective region is a first distance from the route, wherein the first portion of the first visual representation corresponds to a first portion of the first object, the first portion of the first visual representation of the first object is displayed with a first degree of visual prominence, including first visual characteristics of the first portion of the first visual representation of the first object; and
in accordance with a determination that a second portion of the first visual representation of the first object is a second distance from the route, wherein the second portion of the first visual representation corresponds to a second portion of the first object and the second distance is different from the first distance, the second portion of the first visual representation of the first object is displayed with a second degree of visual prominence, different from the first degree of visual prominence, including second visual characteristics, different from the first visual characteristics, of the second portion of the visual representation of the first object.

42. The non-transitory computer readable storage medium of claim 41, further storing instructions which, when executed by the one or more processors, further cause the electronic device to perform:
while not navigating along a respective route and while displaying the representation of the map, displaying the first visual representation of the first object on the representation of the map at a third degree of visual prominence, including third visual characteristics of the first visual representation of the first object different from the first visual characteristics and the second visual characteristics, that is independent of a distance from the first visual representation of the first object to any point on the representation of the map.

43. The non-transitory computer readable storage medium of claim 41, wherein the first distance is less than the second distance, and the first degree of visual prominence is greater than the second degree of visual prominence.

44. The non-transitory computer readable storage medium of claim 41, wherein:
the first distance is less than the second distance, and the first degree of visual prominence is greater than the second degree of visual prominence,
in accordance with a determination that a second visual representation of a second object of the plurality of objects in the respective region is a third distance from the route, the second visual representation of the second object is displayed with a third degree of visual prominence, and
in accordance with a determination that the second visual representation of the second object is a fourth distance from the route, less than the third distance, the second visual representation of the second object is displayed with a fourth degree of visual prominence, less than the third degree of visual prominence.

45. The non-transitory computer readable storage medium of claim 41, wherein the first visual representation of the first object includes a lane marking representation, a tree representation, a building representation, land cover representation, or a point of interest representation.

46. The non-transitory computer readable storage medium of claim 41, wherein the plurality of visual representations of the plurality of objects in the respective region is:
in accordance with a determination that the representation of the map is displayed at a first zoom level, a first set of visual representations of a first set of objects in the respective region, and
in accordance with a determination that the representation of the map is displayed at a second zoom level, greater than the first zoom level, a second set of visual representations of a second set of objects in the respective region, including and greater than the first set of visual representations of the first set of objects in the respective region.

47. The non-transitory computer readable storage medium of claim 41, wherein the representation of the map includes representations of topographies of areas represented by the map in the respective region, and the representations of the topographies are displayed with a third degree of visual prominence that is independent of a distance between the representations of the topographies and the route.

48. The non-transitory computer readable storage medium of claim 41, wherein the first degree and the second degree of visual prominence include degrees of opacity.

49. The non-transitory computer readable storage medium of claim 41, wherein the first degree and the second degree of visual prominence include degrees of blur.

50. The non-transitory computer readable storage medium of claim 41, wherein the first degree and the second degree of visual prominence include degrees of color saturation.

51. The non-transitory computer readable storage medium of claim 41, wherein:
in accordance with a determination that a portion of the representation of the map is a third distance from the route, the portion of the map is displayed with a third degree of visual prominence, and
in accordance with a determination that the portion of the map is a fourth distance from the route, the fourth distance different from the third distance, the portion of the map is displayed with a fourth degree of visual prominence different from the third degree of visual prominence.

52. The non-transitory computer readable storage medium of claim 41, further storing instructions which, when executed by the one or more processors, further cause the electronic device to perform:
receiving, via one or more input devices, a first input corresponding to a request to display navigation directions from a third physical location to a fourth physical location; and
in response to receiving the first input, displaying, overlaid on the representation of the map, a first respective indication of a first route from the third physical location to the fourth physical location having a first route length, and a second respective indication of a second route from the third physical location to the fourth physical location having a second route length, greater than the first route length, wherein:
displaying the first respective indication of the first route includes displaying a first animation of progression through the first route, the first animation having a first length, and
displaying the second respective indication of the second route includes displaying a second animation of progression through the second route, the second animation having a second length, greater than the first length.

53. The non-transitory computer readable storage medium of claim 41, wherein the representation of the map includes a portion corresponding to land cover, and displaying the portion corresponding to land cover includes displaying the portion with a visual characteristic based on precipitation and/or climate data corresponding to the portion of the representation of the map.

54. The non-transitory computer readable storage medium of claim 41, wherein:
the first distance is included in a first range of distances associated with the first degree of visual prominence, and the second distance is included in a second range of distances associated with the second degree of visual prominence,
in accordance with a determination that the first portion of the first visual representation of the first object is a third distance from the route, different from the first and second distances, the third distance within the first range of distances, the first portion of the first visual representation of the first object is displayed with the first degree of visual prominence, and
in accordance with a determination that the second portion of the first visual representation of the first object is a fourth distance from the route, different from the first, second and third distances, the fourth distance within the second range of distances, the second portion of the first visual representation of the first object is displayed with the second degree of visual prominence.

55. The non-transitory computer readable storage medium of claim 41, wherein the first portion of the first visual representation of the first object is displayed with the first degree of visual prominence only if it is the first distance from the route, the second portion of the first visual representation of the first object is displayed with the second degree of visual prominence only if it is the second distance from the route, and in accordance with a determination that the first portion of the first visual representation of the first object or the second portion of the first visual representation of the first object is a third distance, different from the first and second distances, from the route, the first portion of the first visual representation of the first object or the second portion of the first visual representation of the first object is displayed with a third degree, different from the first and second degrees, of visual prominence.

56. The non-transitory computer readable storage medium of claim 41, wherein:
the first object is a first type of object,
in accordance with a determination that a second visual representation of a second object of the plurality of objects is the first distance from the route, wherein the second object is a second type of object, different from the first type of object, the second visual representation of the second object is displayed with a third degree of visual prominence different from the first degree of visual prominence, and
in accordance with a determination that the second visual representation of the second object is the second distance from the route, the second visual representation of the second object is displayed with a fourth degree of visual prominence different from the second degree of visual prominence.

57. The non-transitory computer readable storage medium of claim 56, wherein the first type of object is a tree, the second type of object is a building, the first degree of visual prominence is less than the second degree of visual prominence, and the third degree of visual prominence is greater than the fourth degree of visual prominence.

58. The non-transitory computer readable storage medium of claim 41, wherein the first distance includes a vertical distance component.

59. The non-transitory computer readable storage medium of claim 41, wherein the first distance includes a lateral distance component.

60. The non-transitory computer readable storage medium of claim 41, wherein displaying the representation of the map includes:
    in accordance with a determination that a first plurality of visual representations corresponding to objects in the respective region are associated with the first degree of visual prominence, and a second plurality of visual representations of objects in the respective region are associated with the second degree of visual prominence:
    displaying, as a batch, the first plurality of visual representations displayed with the first degree of visual prominence; and
    displaying, as a batch, the second plurality of visual representations displayed with the second degree of visual prominence; and
  in accordance with a determination that a third plurality of visual representations, different from the first plurality of visual representations of objects in the respective region are associated with the first degree of visual prominence, and a fourth plurality of visual representations, different from the second plurality of visual representations, of objects in the respective region are associated with the second degree of visual prominence:
    displaying, as a batch, the third plurality of visual representations displayed with the first degree of visual prominence; and
    displaying, as a batch, the fourth plurality of visual representations displayed with the second degree of visual prominence.

* * * * *